(12) United States Patent
Kondo et al.

(10) Patent No.: US 7,260,260 B2
(45) Date of Patent: *Aug. 21, 2007

(54) IMAGE PROCESSING APPARATUS AND METHOD

(75) Inventors: Tetsujiro Kondo, Tokyo (JP); Takahiro Nagano, Kanagawa (JP); Junichi Ishibashi, Saitama (JP); Takashi Sawao, Tokyo (JP); Naoki Fujiwara, Tokyo (JP); Seiji Wada, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 706 days.

This patent is subject to a terminal disclaimer.

(21) Appl. No.: 10/362,663

(22) PCT Filed: Jun. 26, 2002

(86) PCT No.: PCT/JP02/06384

§ 371 (c)(1),
(2), (4) Date: Aug. 27, 2003

(87) PCT Pub. No.: WO03/003306

PCT Pub. Date: Jan. 9, 2003

(65) Prior Publication Data

US 2004/0052415 A1    Mar. 18, 2004

(30) Foreign Application Priority Data

Jun. 27, 2001    (JP) ............................. 2001-194610

(51) Int. Cl.
  *G06K 9/34*    (2006.01)
  *G06K 9/36*    (2006.01)
  *G06K 9/54*    (2006.01)
(52) U.S. Cl. ........................ 382/173; 382/284; 382/302

(58) Field of Classification Search ................ 382/173, 382/190, 191, 282, 291, 294, 284, 302; 348/222.1, 348/578
See application file for complete search history.

(56) References Cited

U.S. PATENT DOCUMENTS 5,502,482 A    3/1996    Graham ....................... 348/140

(Continued)

FOREIGN PATENT DOCUMENTS

EP    0 933 727    8/1999

(Continued)

OTHER PUBLICATIONS

Or S et al: "Panoramic video segmentation using color mixture models" Pattern Recognition, 2000. Proceedings. 15th International Conference on Sep. 3-7, 2000, Los Alamitos, CA, USA, IEEE Comput. Soc, US, vol. 3, Sep. 3, 2000, pp. 387-390, XP010533309 ISBN: 0-7695-0750-6.

*Primary Examiner*—Duy M. Dang
(74) *Attorney, Agent, or Firm*—Frommer Lawrence & Haug LLP; William S. Frommer; Thomas F. Presson

(57) ABSTRACT

An object of the present invention is to separate in real time a captured image into a foreground component image and a background component image. An image captured by an image-capturing unit 74 is separated into a foreground component image and a background component image, which are stored in an image storage unit 72. A billing processor 75 performs billing processing to charge fees for separating the image. A separating portion 91 performs motion-blur processing of the separated foreground component image and outputs the processed foreground component image and the background component image to a synthesizer 92. The synthesizer 92 combines the input motion-blur-processed foreground component image and the separated background component image to synthesize an image and displays the synthesized image on a display unit 73. The present invention is applicable to a camera terminal device.

44 Claims, 101 Drawing Sheets

U.S. PATENT DOCUMENTS

| | | | |
|---|---|---|---|
| 5,761,651 A | 6/1998 | Hasebe et al. | 705/400 |
| 5,978,424 A | 11/1999 | Turner | 375/368 |

FOREIGN PATENT DOCUMENTS

| | | |
|---|---|---|
| JP | 7-336688 | 12/1995 |
| JP | 8-54952 | 2/1996 |
| JP | 10-164436 | 6/1998 |
| JP | 2000-30040 | 1/2000 |
| JP | 2001-250119 | 9/2001 |
| JP | 2002-190015 | 7/2002 |
| JP | 2002-190016 | 7/2002 |
| JP | 2002-190028 | 7/2002 |
| WO | WO 94 30008 | 12/1994 |

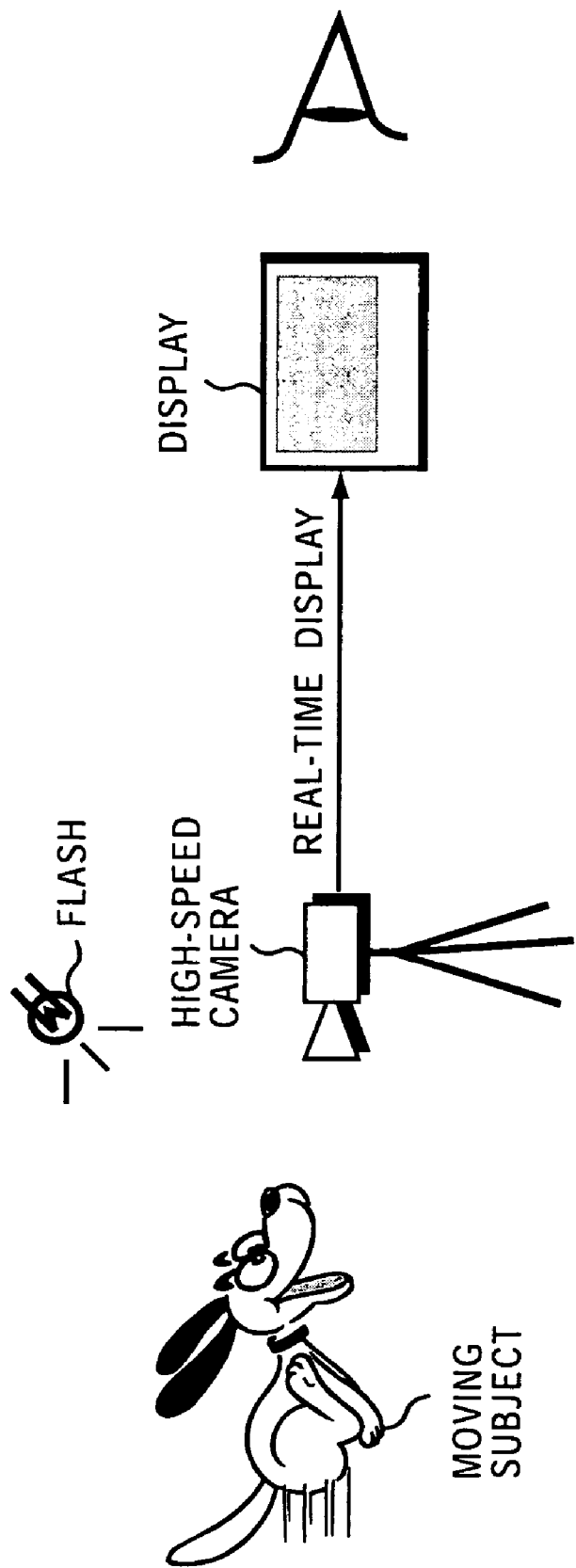

FIG. 10
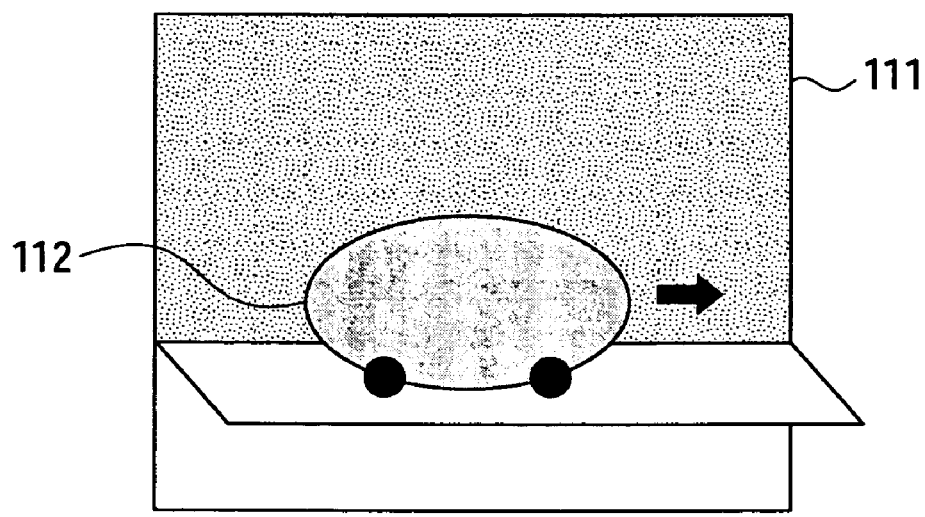
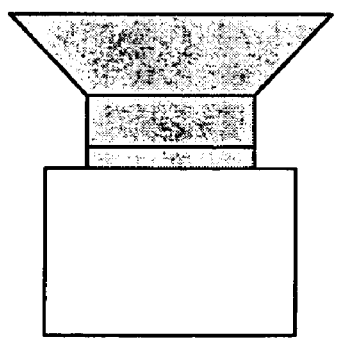

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

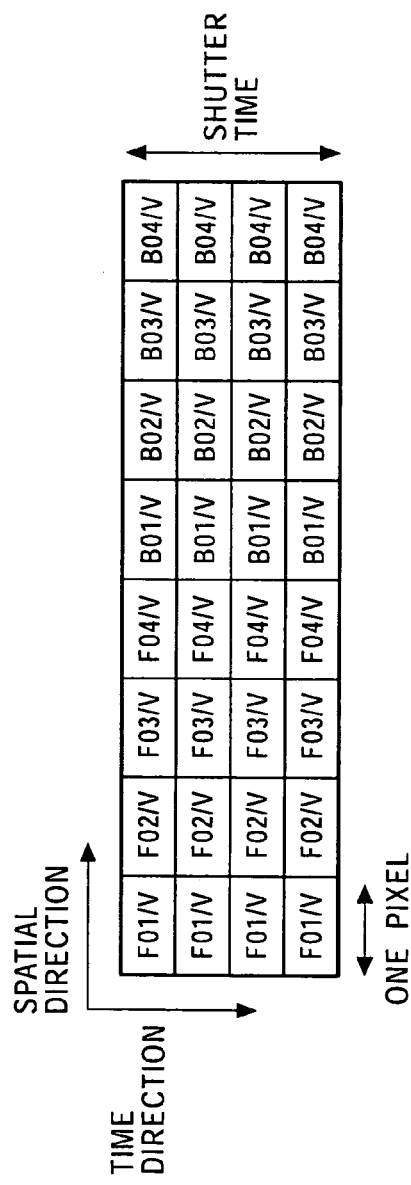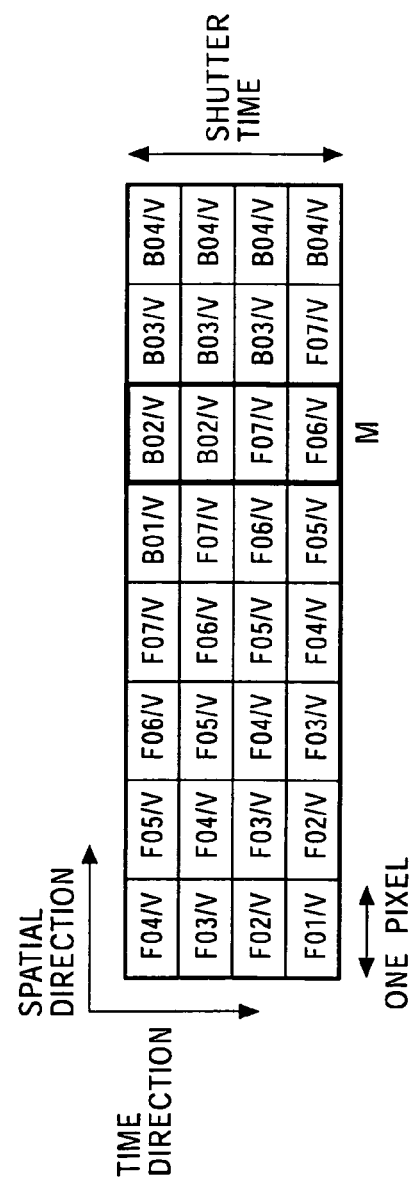

FIG. 32

| AREA DETERMINATION | STATIONARY/MOVING DETERMINATION BETWEEN FRAME #n-2 AND FRAME #n-1 | STATIONARY/MOVING DETERMINATION BETWEEN FRAME #n-1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED-BACKGROUND-AREA DETERMINATION | STATIONARY | MOVING | — | — |
| STATIONARY-AREA DETERMINATION | — | STATIONARY | STATIONARY | — |
| MOVING-AREA DETERMINATION | — | MOVING | MOVING | — |
| UNCOVERED-BACKGROUND-AREA DETERMINATION | — | — | MOVING | STATIONARY |

FIG. 40A

| $X_0$ | $X_1$ | $X_2$ |
|---|---|---|
| $X_3$ | $X_4$ | $X_5$ |
| $X_6$ | $X_7$ | $X_8$ |

FIG. 40B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 41A

| $X_0$ | $X_1$ | $X_2$ |
|---|---|---|
| $X_3$ | $X_4$ | $X_5$ |
| $X_6$ | $X_7$ | $X_8$ |

FIG. 41B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 44

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 72A
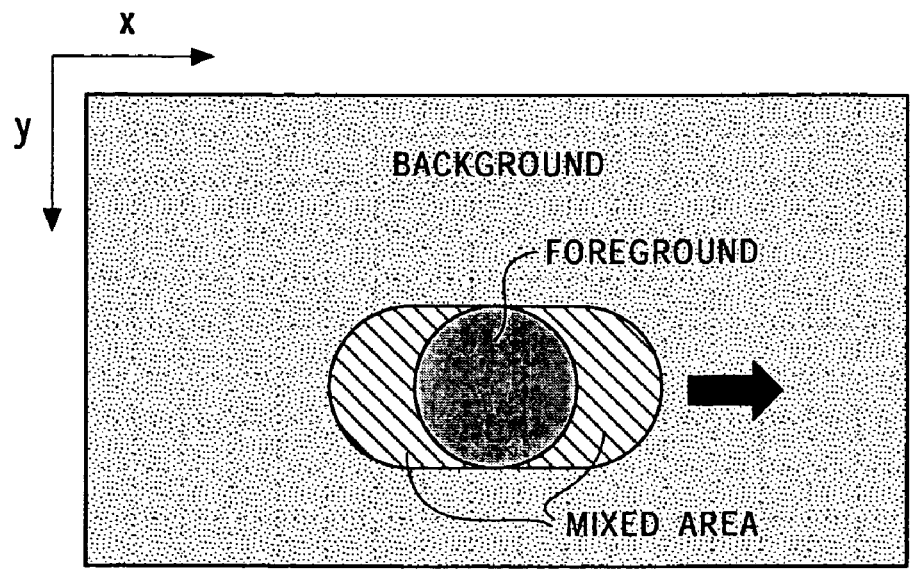
SEPARATE FOREGROUND AND BACKGROUND
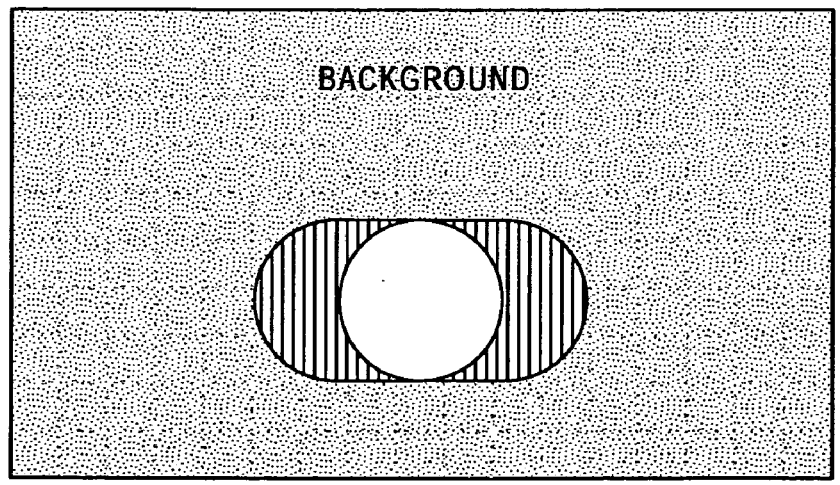
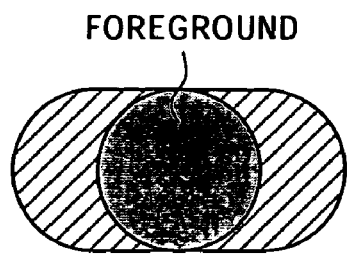

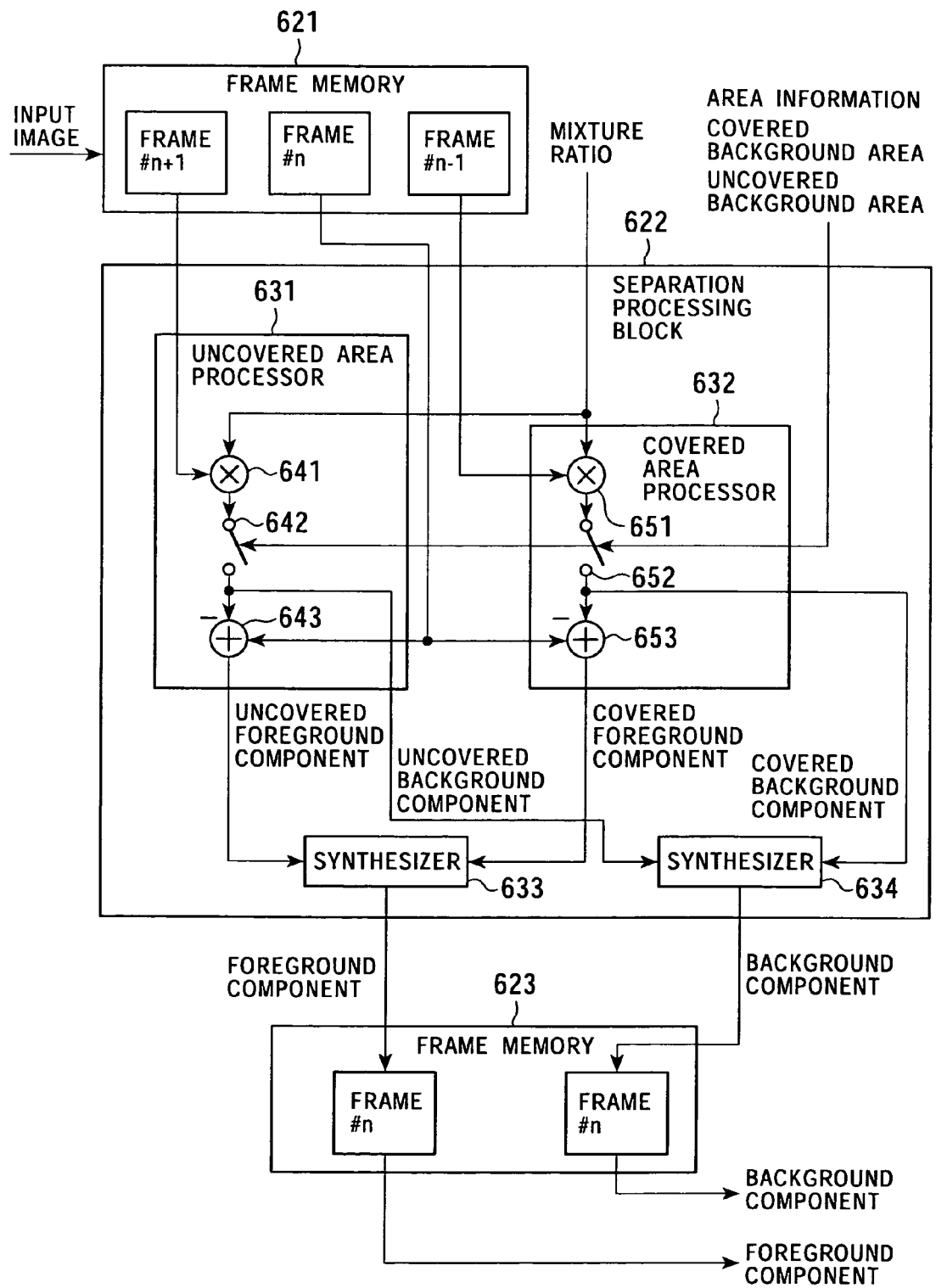

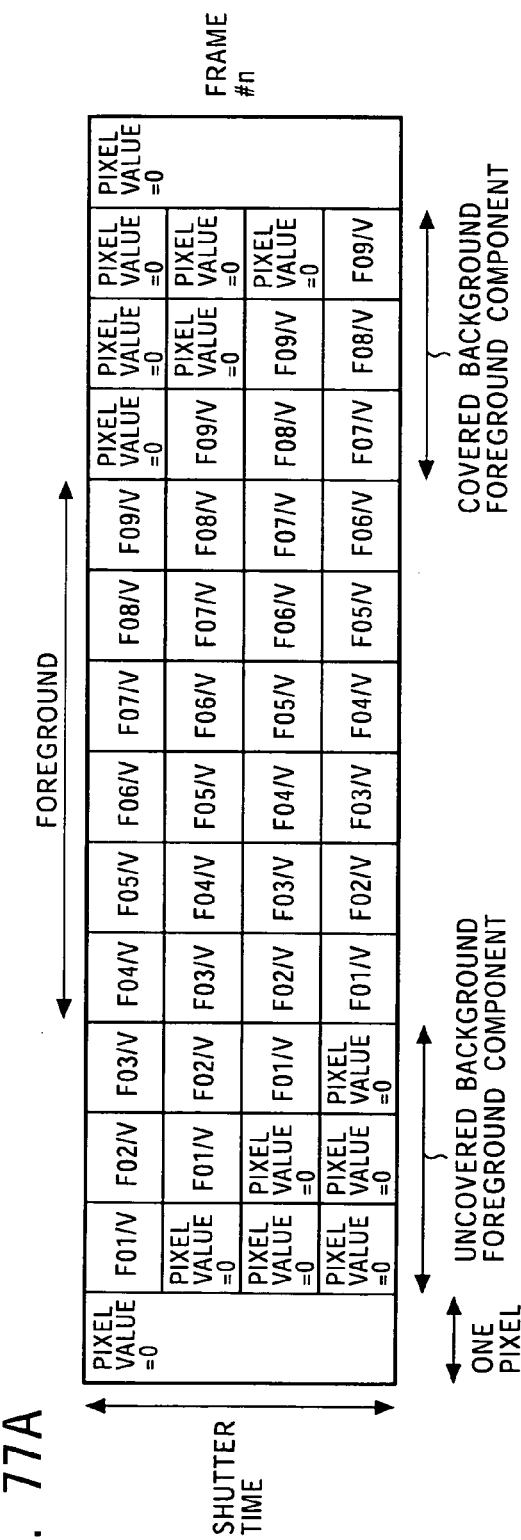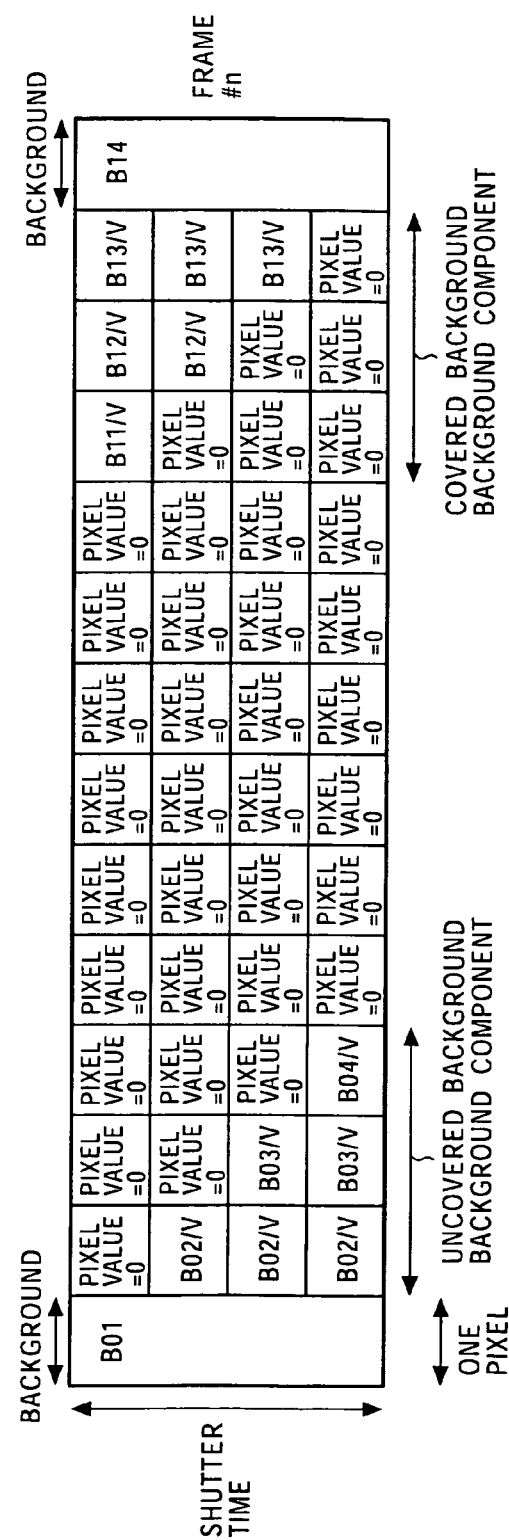

IMAGE PROCESSING APPARATUS AND METHOD

TECHNICAL FIELD

The present invention relates to image processing apparatuses and methods, and more particularly, to an image processing apparatus and method for separating in real time a captured image into a foreground component image and a background component image and for performing real-time motion-blur processing of the foreground component image.

BACKGROUND ART

Technology for processing captured images has gradually become popular and widely used.

Hitherto, motion blur that arises when two different images are combined or when an image of a moving subject is captured is eliminated by separately combining the images after the images have been captured or by eliminating the motion blur.

In the latter case, that is, when the image of the moving subject is captured, there is a method for eliminating in real time motion blur that arises due to the motion. Specifically, for example, as shown in FIG. 1A, when an image of a subject swinging a golf club is captured, a displayed image includes a blurred golf club due to the motion of the golf club. The effect that arises when such a blurred image is displayed is the so-called motion blur.

In order to eliminate the motion blur in real time, as shown in FIG. 1B, one possible method uses a high-speed camera to capture an image. When an image is captured by the high-speed camera, the amount of luminance at the time the image is captured is insufficient (since one shutter period is short, the amount of light obtained is small, and hence, the luminance is insufficient). The subject needs to be irradiated with special intense light, or, as shown in FIG. 2, irradiated with a flash of intense light at the same time as the shutter is pressed, and an image of the subject needs to be captured by the high-speed camera.

In the foregoing method, the image synthesis processing cannot be performed in real time. In the synthesis processing, if there is no image needed for synthesis, an image must again be captured at the same place. There is a method for performing the motion-blur elimination processing in real time. For example, capturing an image of a wild animal at night for the purpose of ecological observation using the foregoing method may frighten the wild animal, which is the subject, since the foregoing method involves using intense lighting. As a result, the natural ecology may not be observed.

DISCLOSURE OF INVENTION

The present invention has been made in view of the above-described background. Accordingly, it is an object of the present invention to achieve in real time synthesis processing and motion-blur adjustment processing in processing an image.

An image processing apparatus of the present invention includes input means for inputting image data which is formed of a predetermined number of pixel data obtained by a predetermined number of image-capturing devices including pixels, the image-capturing devices each having a time integrating function; mixture-ratio estimating means for estimating a mixture ratio for a mixed area in the image data input from the input means, the mixed area including a mixture of foreground object components forming a foreground object of the image data and background object components forming a background object of the image data; separation means for separating in real time, on the basis of the mixture ratio estimated by the mixture-ratio estimating means, the image data input from the input means into a foreground component image formed of the foreground object components forming the foreground object of the image data and a background component image formed of the background object components forming the background object of the image data; and storage means for storing in real time the foreground component image and the background component image, which are separated by the separation means.

The image processing apparatus may further include image-capturing means for capturing an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

The image processing apparatus may further include image-capturing command means for giving a command to the image-capturing means to capture the image; and image-capturing billing means for executing billing processing in response to the command from the image-capturing command means.

The image processing apparatus may further include image display means for displaying the foreground component image and the background component image which are separated in real time by the separation means and the foreground component image and the background component image which are already stored in the storage means; image specifying means for specifying a desired foreground component image and background component image from among the foreground component image and the background component image which are separated in real time by the separation means and which are displayed by the image display means and the foreground component image and the background component image which are already stored in the storage means and which are displayed by the image display means; and combining means for combining the desired foreground component image and background component image which are specified by the specifying means.

The image processing apparatus may further include combining command means for giving a command to the combining means to combine images; and combining billing means for executing billing processing in response to the command from the combining command means.

The image processing apparatus may further include storage command means for giving a command to the storage means, the command instructing whether or not to store in real time the foreground component image and the background component image which are separated by the separation means; and storage billing means for executing billing processing in response to the command from the storage command means.

The image processing apparatus may further include motion-blur adjusting means for adjusting motion blur of the foreground component image which is separated in real time by the separation means or the foreground component image which is already stored in the storage means.

The image processing apparatus may further include motion-blur-adjusted-image display means for displaying the motion-blur-adjusted foreground component image generated by the motion-blur adjusting means.

The image processing apparatus may further include combining means for combining the motion-blur-adjusted foreground component image generated by the motion-blur adjusting means and the background component image. The motion-blur-adjusted-image display means may display an image generated by combining, by the combining means, the motion-blur-adjusted foreground component image generated by the motion-blur adjusting means and the background component image.

The image processing apparatus may further include processing-time measuring means for measuring time required by the motion-blur adjusting means to adjust the motion blur of the foreground component image; and motion-blur-adjustment billing means for executing billing processing in accordance with the time measured by the processing-time measuring means.

The image processing apparatus may further include operation-time measuring means for measuring operation time thereof; and operation billing means for executing billing processing in accordance with the time measured by the operation-time measuring means.

An image processing method of the present invention includes an input step of inputting image data which is formed of a predetermined number of pixel data obtained by a predetermined number of image-capturing devices including pixels, the image-capturing devices each having a time integrating function; a mixture-ratio estimating step of estimating a mixture ratio for a mixed area in the image data input in the input step, the mixed area including a mixture of foreground object components forming a foreground object of the image data and background object components forming a background object of the image data; a separation step of separating in real time, on the basis of the mixture ratio estimated in the mixture-ratio estimating step, the image data input in the input step into a foreground component image formed of the foreground object components forming the foreground object of the image data and a background component image formed of the background object components forming the background object of the image data; and a storage step of storing in real time the foreground component image and the background component image, which are separated in the separation step.

The image processing method may further include an image-capturing step of capturing an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

The image processing method may further include an image-capturing command step of giving a command to the image-capturing step to capture the image; and an image-capturing billing step of executing billing processing in response to the command in the image-capturing command step.

The image processing method may further include an image display step of displaying the foreground component image and the background component image which are separated in real time in the separation step and the foreground component image and the background component image which are already stored in the storage step; an image specifying step of specifying a desired foreground component image and background component image from among the foreground component image and the background component image which are separated in real time in the separation step and which are displayed in the image display step and the foreground component image and the background component image which are already stored in the storage step and which are displayed in the image display step; and a combining step of combining the desired foreground component image and background component image which are specified in the specifying step.

The image processing method may further include a combining command step of giving a command to the combining step to combine images; and a combining billing step of executing billing processing in response to the command in the combining command step.

The image processing method may further include a storage command step of giving a command to the storage step, the command instructing whether or not to store in real time the foreground component image and the background component image which are separated in the separation step; and a storage billing step of executing billing processing in response to the command in the storage command step.

The image processing method may further include a motion-blur adjusting step of adjusting motion blur of the foreground component image which is separated in real time in the separation step or the foreground component image which is already stored in the storage step.

The image processing method may further include a motion-blur-adjusted-image display step of displaying the motion-blur-adjusted foreground component image generated in the motion-blur adjusting step.

The image processing method may further include a combining step of combining the motion-blur-adjusted foreground component image generated in the motion-blur adjusting step and the background component image. The motion-blur-adjusted-image display step may display an image generated by combining, in the combining step, the motion-blur-adjusted foreground component image generated in the motion-blur adjusting step and the background component image.

The image processing method may further include a processing-time measuring step of measuring time required in the motion-blur adjusting step to adjust the motion blur of the foreground component image; and a motion-blur-adjustment billing step of executing billing processing in accordance with the time measured in the processing-time measuring step.

The image processing method may further include an operation-time measuring step of measuring operation time thereof; and an operation billing step of executing billing processing in accordance with the time measured in the operation-time measuring step.

A program in a recording medium of the present invention includes an input control step of controlling the inputting of image data which is formed of a predetermined number of pixel data obtained by a predetermined number of image-capturing devices including pixels, the image-capturing devices each having a time integrating function; a mixture-ratio estimating control step of controlling the estimation of a mixture ratio for a mixed area in the image data input in the input control step, the mixed area including a mixture of foreground object components forming a foreground object of the image data and background object components forming a background object of the image data; a separation control step of controlling the separation in real time, on the basis of the mixture ratio estimated in the mixture-ratio estimating control step, of the image data input in the input control step into a foreground component image formed of the foreground object components forming the foreground object of the image data and a background component image formed of the background object components forming the background object of the image data; and a storage control step of controlling the storing, in real time, of the foreground component image and the background component image, which are separated in the separation control step.

The program may further include an image-capturing control step of controlling the capturing of an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

The program may further include an image-capturing command control step of controlling the giving of a command to the image-capturing control step to capture the image; and an image-capturing billing control step of controlling the execution of billing processing in response to the command in the image-capturing command control step.

The program may further include an image display control step of controlling the displaying of the foreground component image and the background component image which are separated in real time in the separation control step and the foreground component image and the background component image which are already stored in the storage control step; an image specifying control step of controlling the specifying of a desired foreground component image and background component image from among the foreground component image and the background component image which are separated in real time in the separation control step and which are displayed in the image display control step and the foreground component image and the background component image which are already stored in the storage control step and which are displayed in the image display control step; and a combining control step of controlling the combining of the desired foreground component image and background component image which are specified in the specifying control step.

The program may further include a combining command control step of controlling the giving of a command to the combining control step to combine images; and a combining billing control step of controlling the execution of billing processing in response to the command in the combining command control step.

The program may further include a storage command control step of controlling the giving of a command to the storage control step, the command instructing whether or not to store in real time the foreground component image and the background component image which are separated in the separation control step; and a storage billing control step of controlling the execution of billing processing in response to the command in the storage command control step.

The program may further include a motion-blur adjusting control step of controlling the adjustment of motion blur of the foreground component image which is separated in real time in the separation control step or the foreground component image which is already stored in the storage control step.

The program may further include a motion-blur-adjusted-image display control step of controlling the displaying of the motion-blur-adjusted foreground component image generated in the motion-blur adjusting control step.

The program may further include a combining control step of controlling the combining of the motion-blur-adjusted foreground component image generated in the motion-blur adjusting control step and the background component image. The motion-blur-adjusted-image display control step may display an image generated by combining, in the combining control step, the motion-blur-adjusted foreground component image generated in the motion-blur adjusting control step and the background component image.

The program may further include a processing-time measuring control step of controlling the measurement of time required in the motion-blur adjusting step to adjust the motion blur of the foreground component image; and a motion-blur-adjustment billing control step of controlling the execution of billing processing in accordance with the time measured in the processing-time measuring control step.

The program may further include an operation-time measuring control step of controlling the measurement of operation time thereof; and an operation billing control step of controlling the execution of billing processing in accordance with the time measured in the operation-time measuring control step.

A program of the present invention causes a computer to perform a process including an input control step of controlling the inputting of image data which is formed of a predetermined number of pixel data obtained by a predetermined number of image-capturing devices including pixels, the image-capturing devices each having a time integrating function; a mixture-ratio estimating control step of controlling the estimation of a mixture ratio for a mixed area in the image data input in the input control step, the mixed area including a mixture of foreground object components forming a foreground object of the image data and background object components forming a background object of the image data; a separation control step of controlling the separation in real time, on the basis of the mixture ratio estimated in the mixture-ratio estimating control step, of the image data input in the input control step into a foreground component image formed of the foreground object components forming the foreground object of the image data and a background component image formed of the background object components forming the background object of the image data; and a storage control step of controlling the storing, in real time, of the foreground component image and the background component image, which are separated in the separation control step.

The process may further include an image-capturing control step of controlling the capturing of an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

The process may further include an image-capturing command control step of controlling the giving of a command to the image-capturing control step to capture the image; and an image-capturing billing control step of controlling the execution of billing processing in response to the command in the image-capturing command control step.

The process may further include an image display control step of controlling the displaying of the foreground component image and the background component image which are separated in real time in the separation control step and the foreground component image and the background component image which are already stored in the storage control step; an image specifying control step of controlling the specifying of a desired foreground component image and background component image from among the foreground component image and the background component image which are separated in real time in the separation control step and which are displayed in the image display control step and the foreground component image and the background component image which are already stored in the storage control step and which are displayed in the image display control step; and a combining control step of controlling the combining of the desired foreground component image and background component image which are specified in the specifying control step.

The process may further include a combining command control step of controlling the giving of a command to the combining control step to combine images; and a combining billing control step of controlling the execution of billing processing in response to the command in the combining command control step.

The process may further include a storage command control step of controlling the giving of a command to the storage control step, the command instructing whether or not to store in real time the foreground component image and the background component image which are separated in the separation control step; and a storage billing control step of controlling the execution of billing processing in response to the command in the storage command control step.

The process may further include a motion-blur adjusting control step of controlling the adjustment of motion blur of the foreground component image which is separated in real time in the separation control step or the foreground component image which is already stored in the storage control step.

The process may further include a motion-blur-adjusted-image display control step of controlling the displaying of the motion-blur-adjusted foreground component image generated in the motion-blur adjusting control step.

The process may further include a combining control step of controlling the combining of the motion-blur-adjusted foreground component image generated in the motion-blur adjusting control step and the background component image. The motion-blur-adjusted-image display control step may display an image generated by combining, in the combining control step, the motion-blur-adjusted foreground component image generated in the motion-blur adjusting control step and the background component image.

The process may further include a processing-time measuring control step of controlling the measurement of time required in the motion-blur adjusting control step to adjust the motion blur of the foreground component image; and a motion-blur-adjustment billing control step of controlling the execution of billing processing in accordance with the time measured in the processing-time measuring control step.

The process may further include an operation-time measuring control step of controlling the measurement of operation time thereof; and an operation billing control step of controlling the execution of billing processing in accordance with the time measured in the operation-time measuring control step.

According to an information processing apparatus and method and a program of the present invention, image data which is formed of a predetermined number of pixel data obtained by a predetermined number of image-capturing devices including pixels is input, the image-capturing devices each having a time integrating function. A mixture ratio for a mixed area in the input image data is estimated, the mixed area including a mixture of foreground object components forming a foreground object of the image data and background object components forming a background object of the image data. On the basis of the estimated mixture ratio, the input image data is separated in real time into a foreground component image formed of the foreground object components forming the foreground object of the image data and a background component image formed of the background object components forming the background object of the image data. The separated foreground component image and background component image are stored in real time.

BRIEF DESCRIPTION OF THE DRAWINGS

FIG. 2 illustrates a known image processing method.
FIG. 10 illustrates the image-capturing performed by a sensor.
FIG. 16 illustrates a model in which pixel values are expanded in the time direction and the period corresponding to the shutter time is divided.
FIG. 17 illustrates a model in which pixel values are expanded in the time direction and the period corresponding to the shutter time is divided.

FIG. 32 illustrates the conditions for determining the area.

FIG. 40A illustrates the calculation of a correlation value.

FIG. 40B illustrates the calculation of a correlation value.

FIG. 41A illustrates the calculation of a correlation value.

FIG. 41B illustrates the calculation of a correlation value.

FIG. 44 illustrates determinations made by an area determining portion 342.

FIG. 72A illustrates an input image, a foreground component image, and a background component image.

FIG. 76 is a block diagram illustrating an example of the configuration of a separating portion 601.

FIG. 77A illustrates examples of a separated foreground component image and a separated background component image.

FIG. 77B illustrates examples of a separated background component image and a separated background component image.

BEST MODE FOR CARRYING OUT THE INVENTION

Figure 3:
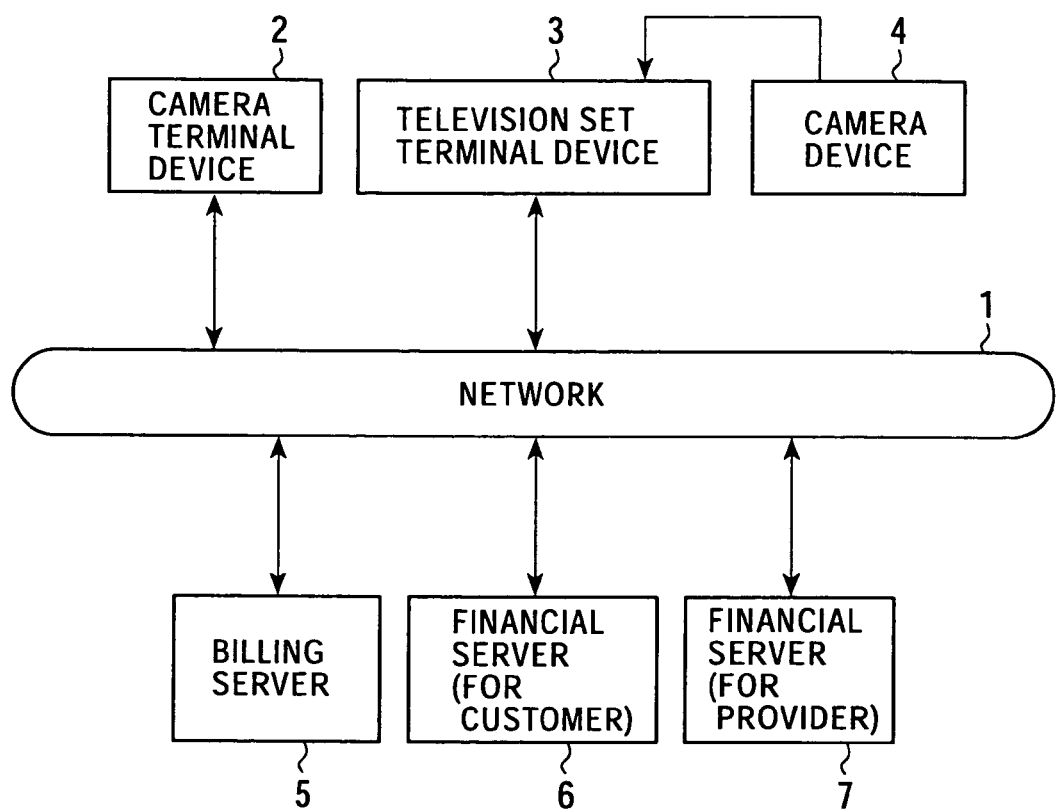
FIG. 3 illustrates the configuration of an embodiment of an image processing system to which the present invention is applied.

FIG. 3 illustrates an embodiment of an image processing system according to the present invention.

The image processing system of the present invention includes, for example, a camera terminal device 2, a television terminal device 3, a billing server 5, a financial server (for customer) 6, and a financial server (for provider) 7, which are connected with one another over a network 1, such as the Internet, and which can exchange data with one another. The camera terminal device 2 captures images, separates/combines the captured images in real time, and displays the images. Fees are charged for separating and combining the images. For example, provided that the camera terminal device 2 is to be rented out, fees for separating and combining images may be charged by the billing server 5 via the network 1 so as to transfer the fees from the user's financial server 6 to the provider's (for example, a service provider renting the camera terminal device 2) financial server 7. The television set terminal device 3 separates an image captured by a camera device 4 in real time, combines the image portions, and displays the image. Fees for separating and combining the images are similarly charged as in the camera terminal device 2.

Figure 4:
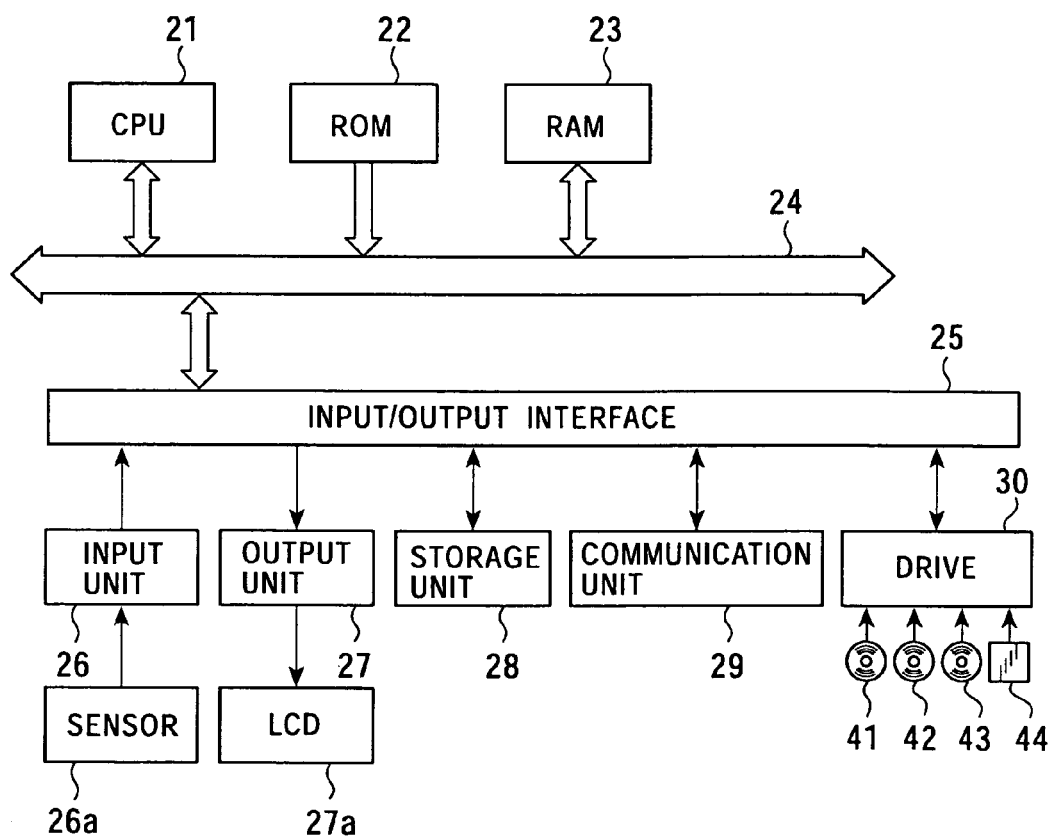
FIG. 4 illustrates the configuration of a camera terminal device shown in FIG. 3.

FIG. 4 illustrates the configuration of the camera terminal device 2 according to the present invention. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via a bus 44. An input unit 26, which is formed of a keyboard, a mouse, a microphone, and so on, and an output unit 27, which is formed of a display, a speaker, and so on, are connected to the input/output interface 25. The CPU 21 executes various types of processing in response to a command input from the input unit 26 including a shutter button and various input keys. Also, a sensor 26a serving as an image-capturing device is connected to the input unit 26, and captured images are input thereto. The CPU 21 outputs images and audio obtained as a result of processing to the output unit 27, and the images are displayed on an LCD (Liquid Crystal Display) 27a.

The storage unit 28 connected to the input/output interface 25 is formed of, for example, a hard disk, and stores programs executed by the CPU 21 and various types of data. A communication unit 29 communicates with an external device via the Internet or another network.

Also, a program may be obtained via the communication unit 29 and stored in the storage unit 28.

A drive 30 connected to the input/output interface 25 drives a magnetic disk 41, an optical disc 42, a magneto-optical disk 43, a semiconductor memory 44, or the like, when such a recording medium is attached to the drive 30, and obtains a program or data stored in the corresponding medium. The obtained program or data is transferred to the storage unit 28 and stored therein if necessary.

Figure 1A:
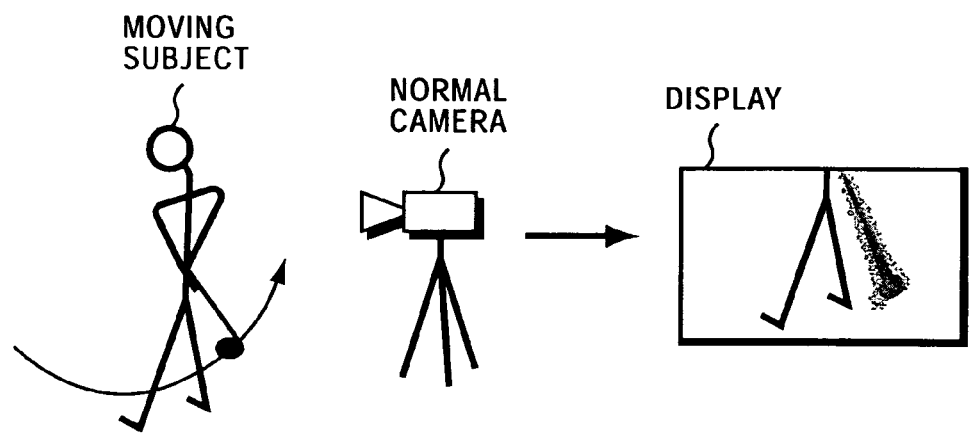
FIG. 1A illustrates a known image processing method.
Figure 1B:
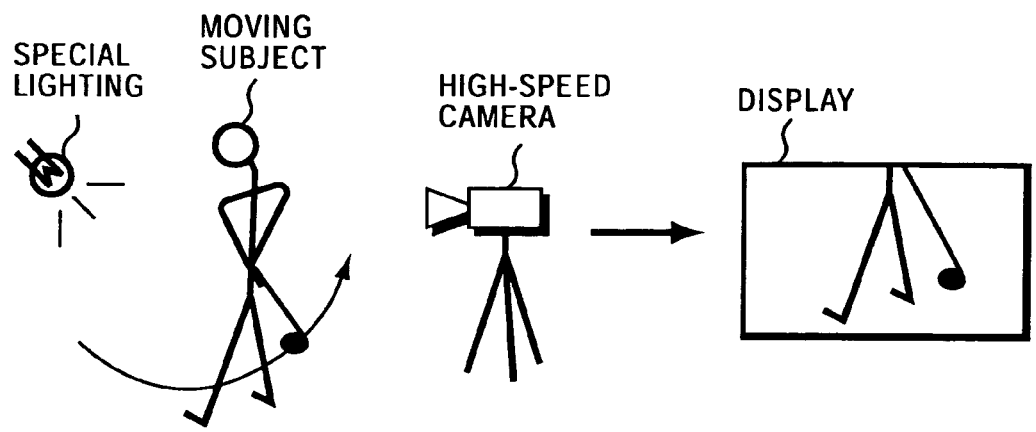
FIG. 1B illustrates a known image processing method.
Figure 5:
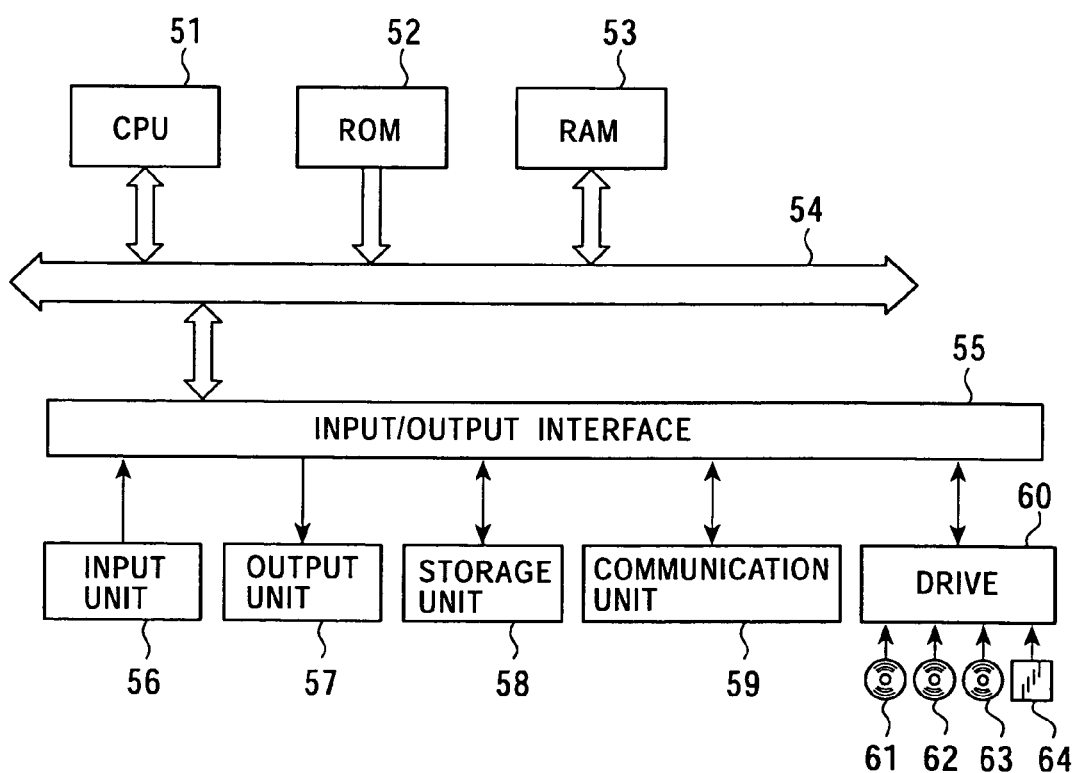
FIG. 5 illustrates the configuration of a television set terminal device shown in FIG. 3.

FIG. 5 shows the configuration of the television set 3 according to the present invention. The configuration of the television set 3 is basically the same as that of the camera terminal device 2. Specifically, a CPU 51, a ROM 52, a RAM 53, a bus 54, an input/output interface 55, an input unit 56, an output unit 57, a storage unit 58, a communication unit 59, a drive 60, a magnetic disk 61, an optical disk 62, a magneto-optical disk 63, and a semiconductor memory 64 of the television set terminal device 3 correspond to the CPU 21, the ROM 22, the RAM 23, the bus 24, the input/output interface 25, the input unit 26, the output unit 27, the storage unit 28, the communication unit 29, the drive 30, the magnetic disk 41, the optical disk 52, the magneto-optical disk 53, and the semiconductor memory 54, respectively, of the camera terminal device 2. In this example, as shown in FIGS. 1A and 1B, the camera device 4 is connected to the communication unit 59 of the television set terminal device 3, and captured images are input thereto.

Since the basic configurations of the billing server 5, the financial server (for customer) 6, and the financial server (for provider) 7 are similar to that of the television set terminal device 3, descriptions thereof are omitted.

Figure 6:
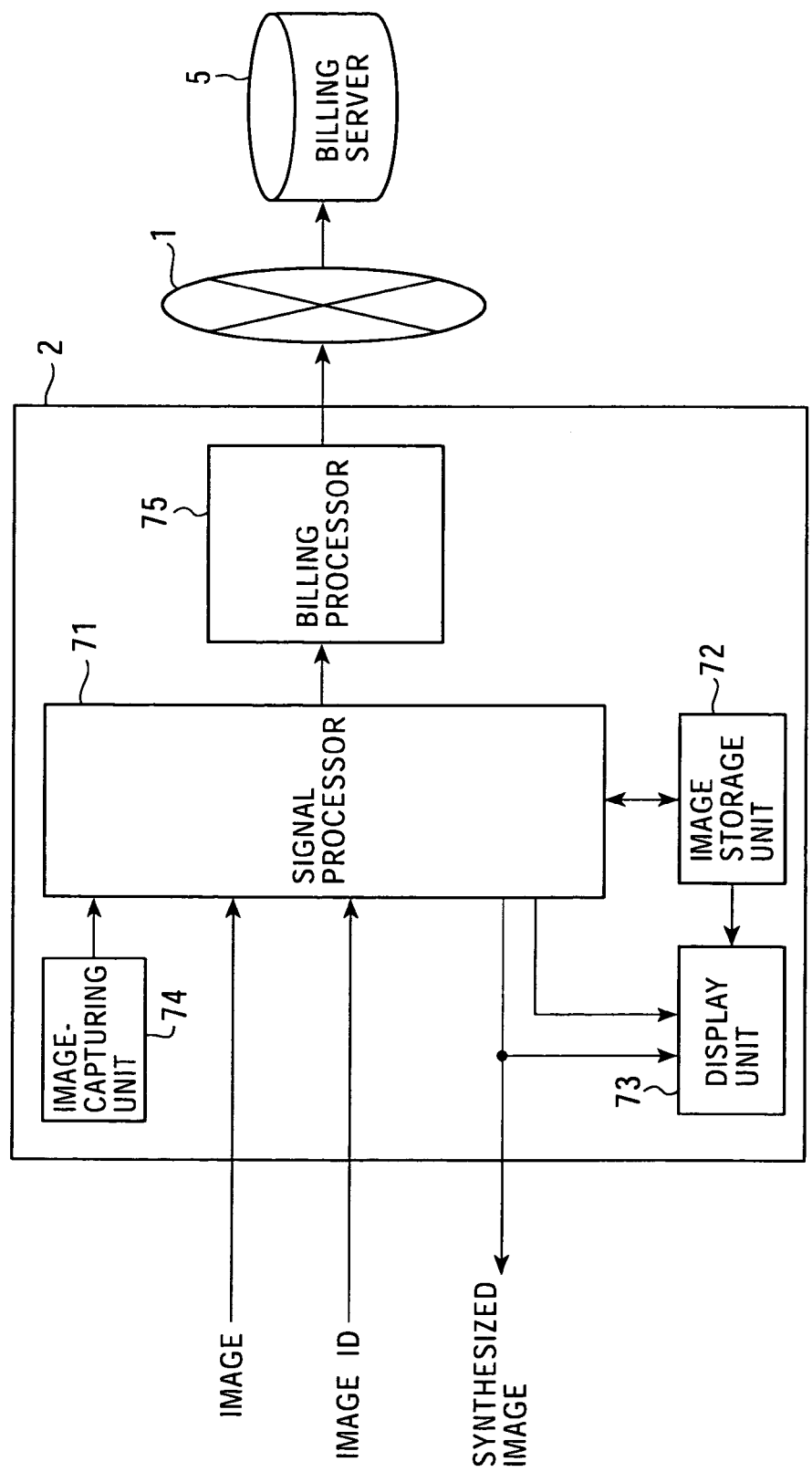
FIG. 6 is a block diagram showing the configuration of the camera terminal device shown in FIG. 4.

Referring to FIG. 6, the camera terminal device 2 will now be described.

A signal processor 71 of the camera terminal device 2 displays, on the basis of an image input from an image-capturing unit 74 (corresponding to a sensor 76*a* shown in FIG. 4) or an image input from a unit other than the image-capturing unit 74, the input image on a display unit 73 without changing the input image. Also, the signal processor 71 generates any one of the foreground of the input image, the background of the input image, a synthesized image generated by combining the foreground of the input image and a background prestored in an image storage unit 72, a synthesized image generated by combining the background of the input image and a foreground prestored in the image storage unit 72, a synthesized image generated by combining a foreground and a background prestored in the image storage unit 72, a foreground prestored in the image storage unit 72, and a background prestored in the image storage unit 72 and displays the generated image on the display unit 73.

An image input to the signal controller 71 needs not to be an image. Specifically, when displaying the above-described various output images on the display unit 73, the signal controller 71 stores the images in the image storage unit 72 while assigning the ID to each image (the ID is assigned to each of a foreground component image, a background component image, and a synthesized image). By inputting the image ID specifying the stored image, the signal controller 71 uses, as an input image, an image corresponding to the image ID among the images stored in the image storage unit 72.

A billing processor 75 cooperates with the billing server 5 via the network 1 in performing the billing processing for charging fees for the image separation processing or image synthesis processing performed by the signal processor 71. The billing processor 75 stores the ID thereof and, when performing the billing processing, transmits the ID along with the user ID, authentication information, and the fees to the billing server 5.

Details of the signal processor 71 will be described later with reference to FIG. 8.

Figure 7:
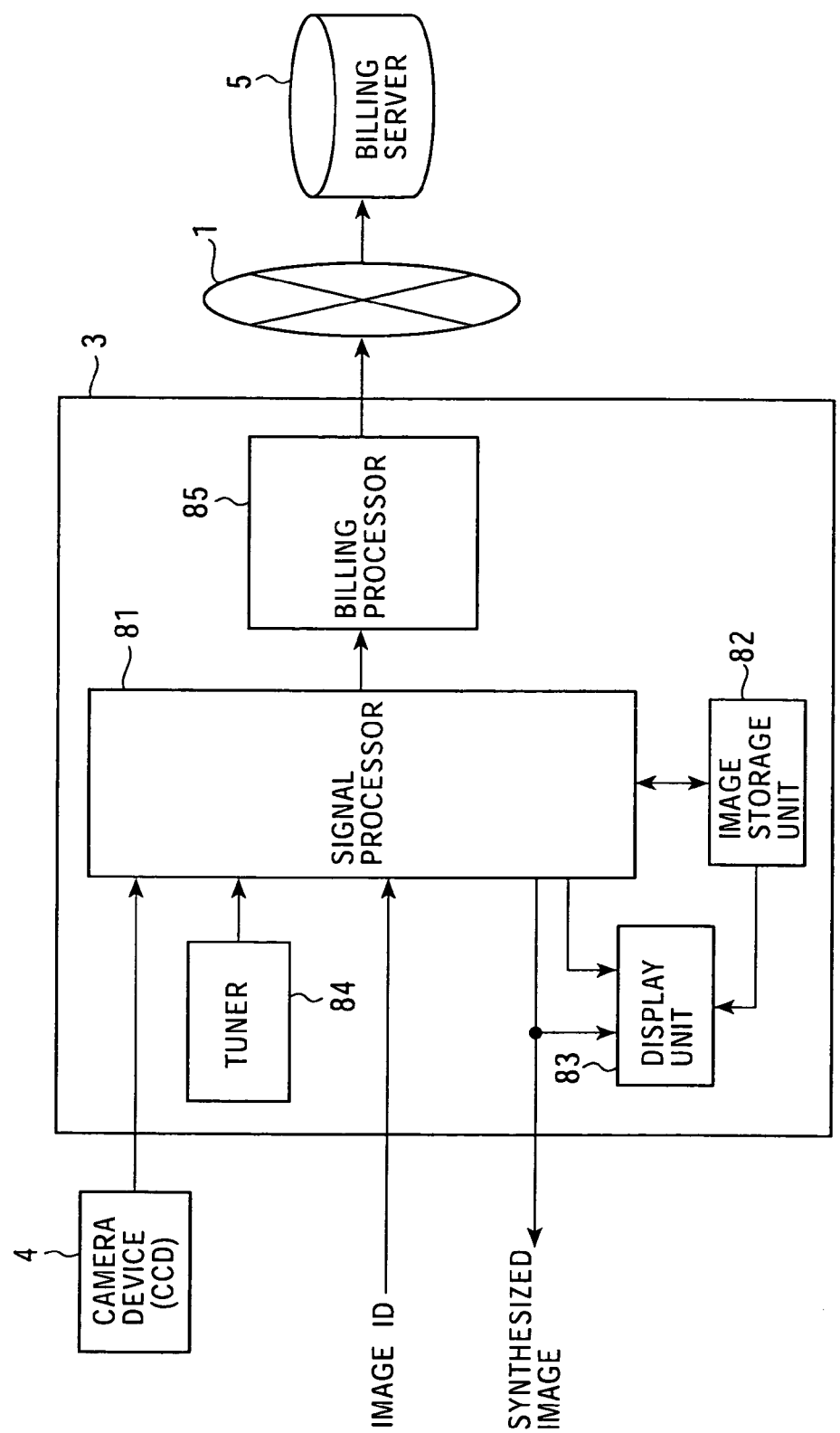
FIG. 7 is a block diagram showing the configuration of the television set terminal device shown in FIG. 5.

Referring to FIG. 7, the configuration of the television set terminal device 3 will now be described. The configuration of the television set terminal device 3 is the same as that of the camera terminal device 2 except for the fact that the television set terminal device 3 does not include the image-capturing unit 74, which is included in the camera terminal device 2, and instead includes a tuner 84 for outputting an image captured by the external camera device 4 or an image in the form of an NTSC (National Television Standards Committee) signal generated from electromagnetic waves received by an antenna (not shown) to a signal processor 81. That is, the signal processor 81, an image storage unit 82, a display unit 83, and a billing processor 85 of the television set terminal device 3 correspond to the signal processor 71, the image storage unit 72, the display unit 73, and the billing processor 75, respectively, of the camera terminal device 2, and descriptions thereof are thus omitted.

Figure 8:
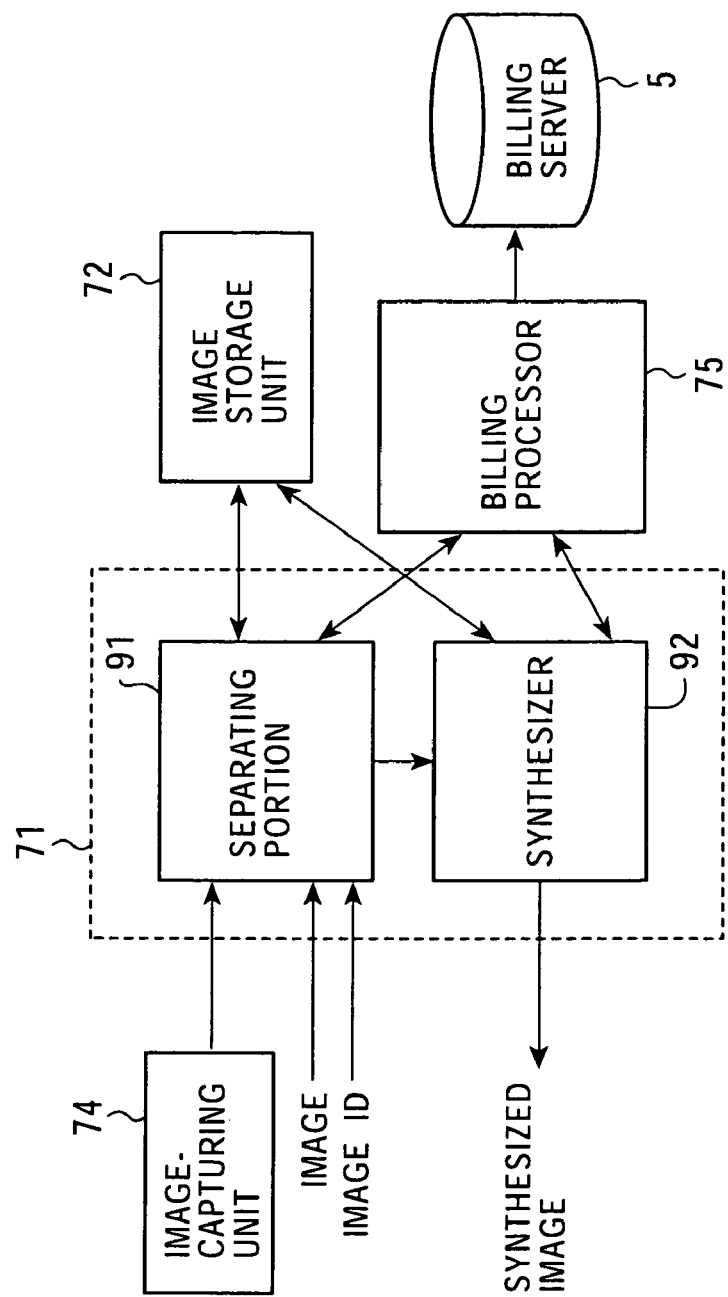
FIG. 8 is a block diagram illustrating the configuration of a signal processor shown in FIG. 6.

With reference to FIG. 8, a description of the configuration of the signal processor 71 will be given as follows.

A separating portion 91 of the signal processor 71 separates an input image input from the image-capturing unit 74, another input image, or an image specified by the image ID and stored in the image storage unit 72 into a foreground component image and a background component image and outputs a desired image to a synthesizer 92. In other words, when the image to be output, that is, the desired image, is the foreground component image, only the foreground component image of the separated image portions is output to the synthesizer 92. In contrast, when an image required by the image to be output is the background component image, only the background component image of the separated image portions is output to the synthesizer 92. The ID is assigned to each image output to the synthesizer 92, and each image is thus stored in the image storage unit 72. Needless to say, the separating portion 91 can output the input image to the synthesizer 92 without separating the input image. In this case, the separating portion 91 assignees the ID to the output image and stores the output image in the image storage unit 72.

If necessary, the synthesizer. 92 combines the image input from the separating portion 91 with an image stored in the image storage unit 72 to synthesize an image and outputs the synthesized image. Specifically, when outputting the foreground or the background of the input image, the synthesizer 92 outputs the foreground component image or the background component image input from the separating portion 91 without changing the foreground component image or the background component image. When outputting a synthesized image generated by combining the foreground of the input image and a background prestored in the image storage unit 72 or when outputting a synthesized image generated by combining the background of the input image and a foreground prestored in the image storage unit 72, the synthesizer 92 combines the foreground component image or the background component image input from the separating portion 91 with a background component image or a foreground component image prestored in the image storage unit 72 to synthesize an image and outputs the synthesized image. When outputting a synthesized image generated by combining a foreground and a background prestored in the image storage unit 72, a foreground prestored in the image storage unit 72, or a background prestored in the image storage unit 72, the synthesizer 92 combines a foreground component image and a background component image pre-stored in the image storage unit 72 to synthesize an image and outputs the synthesized image or outputs a foreground component image or a background component image pre-stored in the image storage unit 72 without changing the foreground component image or the background component image.

The billing processor 75 performs the billing processing when the separating portion 91 performs the separation processing or when the synthesizer 92 performs the combining processing. When the separating portion 91 does not perform the separation processing and outputs the image without changing it to the synthesizer 92, or when the synthesizer 92 does not perform the combining processing and outputs the image without changing it, fees may not be charged.

Figure 9:
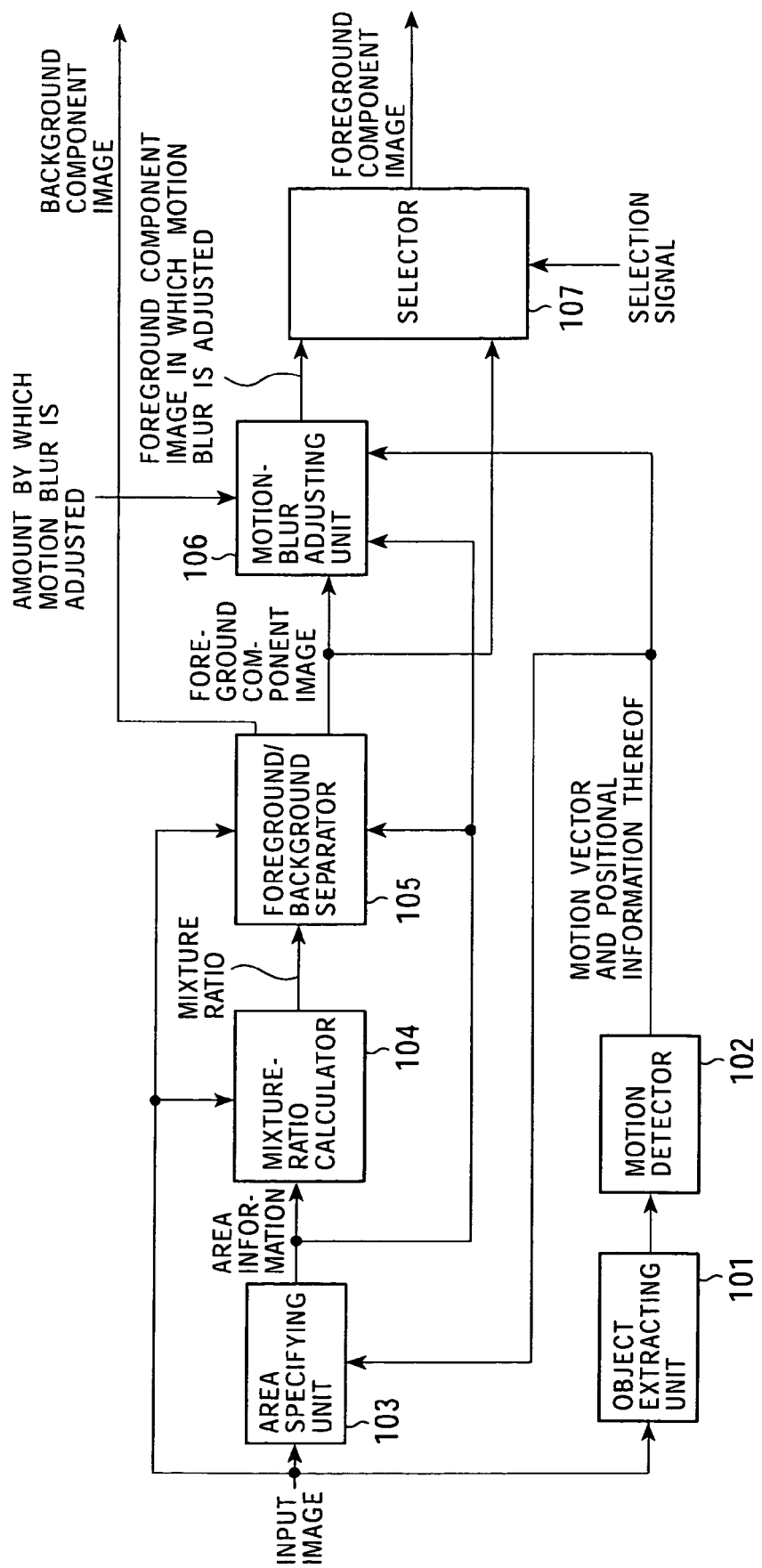
FIG. 9 is a block diagram illustrating an image processing apparatus.

FIG. 9 is a block diagram illustrating the separating portion 91.

It does not matter whether the individual functions of the separating portion 91 are implemented by hardware or software. That is, the block diagrams of this specification may be hardware block diagrams or software functional block diagrams.

An input image supplied to the separating portion 91 is supplied to an object extracting unit 101, an area specifying unit 103, a mixture-ratio calculator 104, and a foreground/background separator 105.

The object extracting unit 101 extracts a rough image object corresponding to a foreground object contained in the input image, and supplies the extracted image object to a motion detector 102. The object extracting unit 101 detects, for example, an outline of the foreground image object contained in the input image so as to extract a rough image object corresponding to the foreground object.

The object extracting unit 101 extracts a rough image object corresponding to a background object contained in the input image, and supplies the extracted image object to the motion detector 102. The object extracting unit 101 extracts a rough image object corresponding to the background object from, for example, the difference between the input image and the extracted image object corresponding to the foreground object.

Alternatively, for example, the object extracting unit 101 may extract the rough image object corresponding to the foreground object and the rough image object corresponding to the background object from the difference between the background image stored in a built-in background memory and the input image.

The motion detector 102 calculates a motion vector of the roughly extracted image object corresponding to the foreground object according to a technique, such as block matching, gradient, phase correlation, or pel-recursive technique, and supplies the calculated motion vector and the motion-vector positional information (which is information for specifying the positions of the pixels corresponding to the motion vector) to the area specifying unit 103 and a motion-blur adjusting unit 106.

The motion vector output from the motion detector 102 contains information corresponding to the amount of movement v.

The motion detector 102 may output the motion vector of each image object, together with the pixel positional information for specifying the pixels of the image object, to the motion-blur adjusting unit 106.

The amount of movement v is a value indicating a positional change in an image corresponding to a moving object in units of the pixel pitch. For example, if an object image corresponding to a foreground is moving such that it is displayed at a position four pixels away from a reference frame when it is positioned in the subsequent frame, the amount of movement v of the object image corresponding to the foreground is 4.

The object extracting unit 101 and the motion detector 102 are needed when adjusting the amount of motion blur corresponding to a moving object.

The area specifying unit 103 determines to which of a foreground area, a background area, or a mixed area each pixel of the input image belongs, and supplies information indicating to which area each pixel belongs (hereinafter referred to as "area information") to the mixture-ratio calculator 104, the foreground/background separator 105, and the motion-blur adjusting unit 106.

The mixture-ratio calculator 104 calculates the mixture ratio corresponding to the pixels contained in a mixed area (hereinafter referred to as the "mixture ratio $\alpha$") based on the input image and the area information supplied from the area specifying unit 103, and supplies the calculated mixture ratio to the foreground/background separator 105.

The mixture ratio $\alpha$ is a value indicating the ratio of the image components corresponding to the background object (hereinafter also be referred to as "background components") to the pixel value as expressed by equation (3), which is shown below.

The foreground/background separator 105 separates the input image into a foreground component image formed of only the image components corresponding to the foreground object (hereinafter also be referred to as "foreground components") and a background component image formed of only the background components based on the area information supplied from the area specifying unit 103 and the mixture ratio $\alpha$ supplied from the mixture-ratio calculator 104, and supplies the foreground component image to the motion-blur adjusting unit 106 and a selector 107. The separated foreground component image may be set as the final output. A more precise foreground and background can be obtained compared to a known method in which only a foreground and a background are specified without considering the mixed area.

The motion-blur adjusting unit 106 determines the unit of processing indicating at least one pixel contained in the foreground component image based on the amount of movement v obtained from the motion vector and based on the area information. The unit of processing is data that specifies a group of pixels to be subjected to the motion-blur adjustments.

Based on the amount by which the motion blur is to be adjusted, which is input to the separating portion 91, the foreground component image supplied from the foreground/background separator 105, the motion vector and the positional information thereof supplied from the motion detector 102, and the unit of processing, the motion-blur adjusting unit 106 adjusts the amount of motion blur contained in the foreground component image by removing, decreasing, or increasing the motion blur contained in the foreground component image. The motion-blur adjusting unit 106 then outputs the foreground component image in which amount of motion blur is adjusted to the selector 107. It is not essential that the motion vector and the positional information thereof be used.

Motion blur is a distortion contained in an image corresponding to a moving object caused by the movement of an object to be captured in the real world and the image-capturing characteristics of a sensor.

The selector 107 selects one of the foreground component image supplied from the foreground/background separator 105 and the foreground component image in which the amount of motion blur is adjusted supplied from the motion-blur adjusting unit 106 based on, for example, a selection signal reflecting a user's selection, and outputs the selected foreground component image.

An input image supplied to the separating portion 91 is discussed below with reference to FIGS. 10 through 25.

FIG. 10 illustrates image-capturing performed by a sensor. The sensor is formed of, for example, a CCD (Charge-Coupled Device) video camera provided with a CCD area sensor, which is a solid-state image-capturing device. An object 112 corresponding to a foreground in the real world moves, for example, horizontally from the left to the right, between an object 111 corresponding to a background and the sensor.

The sensor captures the image of the object 112 corresponding to the foreground together with the image of the object 111 corresponding to the background. The sensor outputs the captured image in units of frames. For example, the sensor outputs an image having 30 frames per second. The exposure time of the sensor can be 1/30 second. The exposure time is a period from when the sensor starts converting input light into electrical charge until when the conversion from the input light to the electrical charge is finished. The exposure time is also referred to as a "shutter time".

Figure 11:
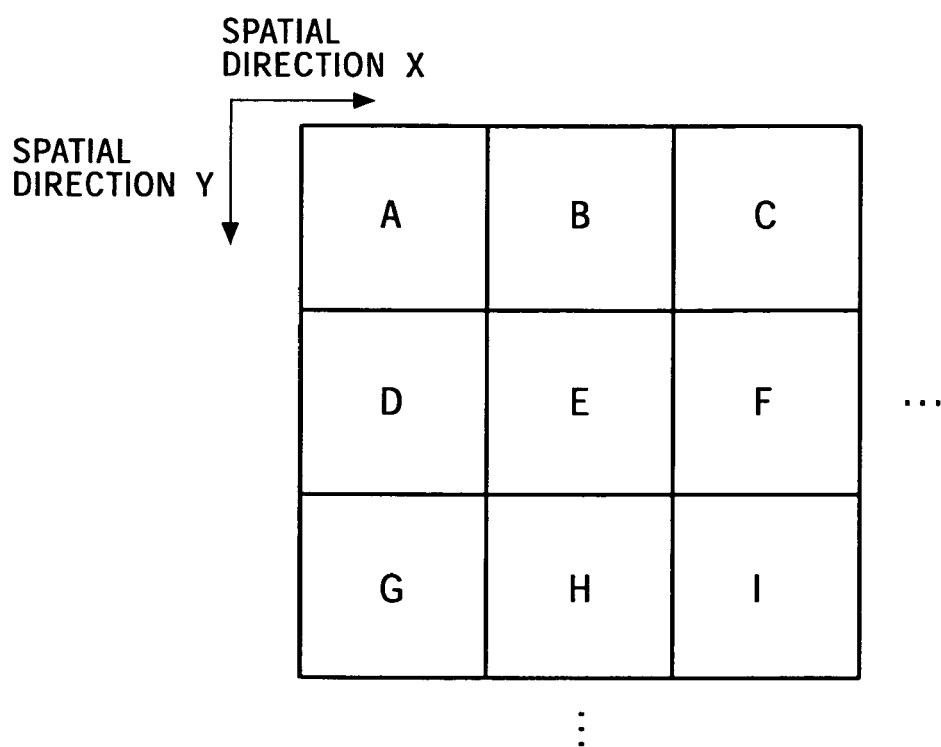
FIG. 11 illustrates the arrangement of pixels.

FIG. 11 illustrates the arrangement of pixels. In FIG. 11, A through I indicate the individual pixels. The pixels are disposed on a plane of a corresponding image. One detection device corresponding to each pixel is disposed on the sensor. When the sensor performs image-capturing, each detection device outputs a pixel value of the corresponding pixel forming the image. For example, the position of the detection device in the X direction corresponds to the horizontal direction on the image, while the position of the detection device in the Y direction corresponds to the vertical direction on the image.

Figure 12:
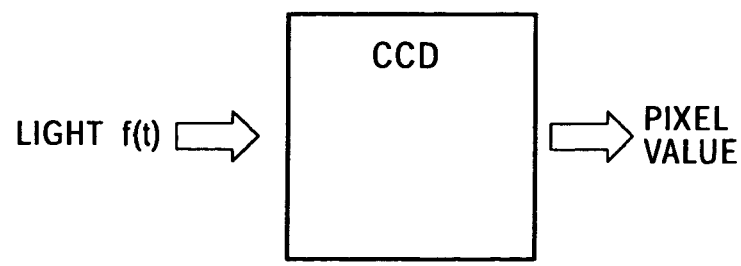
FIG. 12 illustrates the operation of a detection device.

As shown in FIG. 12, the detection device, which is, for example, a CCD, converts input light into electrical charge during a period corresponding to a shutter time, and stores the converted electrical charge. The amount of charge is almost proportional to the intensity of the input light and the period for which the light is input. The detection device sequentially adds the electrical charge converted from the input light to the stored electrical charge during the period corresponding to the shutter time. That is, the detection device integrates the input light during the period corresponding to the shutter time and stores the electrical charge corresponding to the amount of integrated light. It can be considered that the detection device has an integrating function with respect to time.

The electrical charge stored in the detection device is converted into a voltage value by a circuit (not shown), and the voltage value is further converted into a pixel value, such as digital data, and is output. Accordingly, each pixel value output from the sensor is a value projected on a linear space, which is a result of integrating a certain three-dimensional portion of the object corresponding to the foreground or the background with respect to the shutter time.

The separating portion 91 extracts significant information embedded in the output signal, for example, the mixture ratio α, by the storage operation of the sensor. The separating portion 91 adjusts the amount of distortion, for example, the amount of motion blur, caused by the mixture of the foreground image object itself. The separating portion 91 also adjusts the amount of distortion caused by the mixture of the foreground image object and the background image object.

Figure 13A:
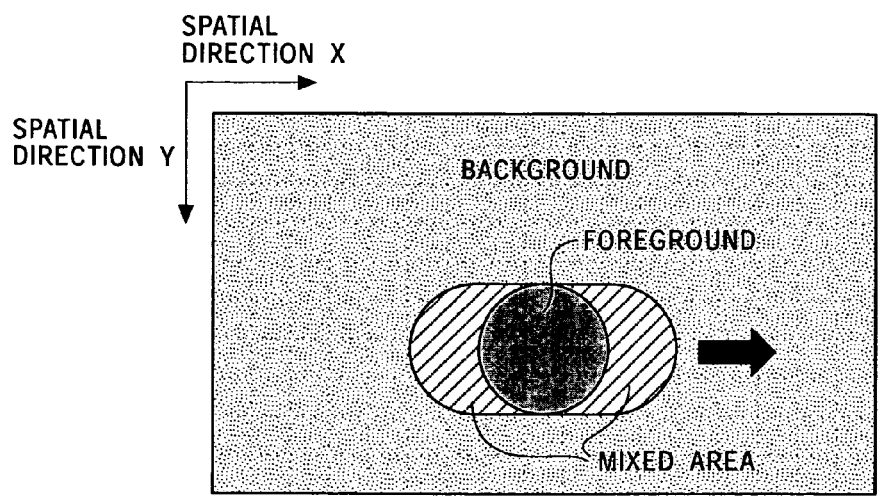
FIG. 13A illustrates an image obtained by image-capturing an object corresponding to a moving foreground and an object corresponding to a stationary background.
Figure 13B:
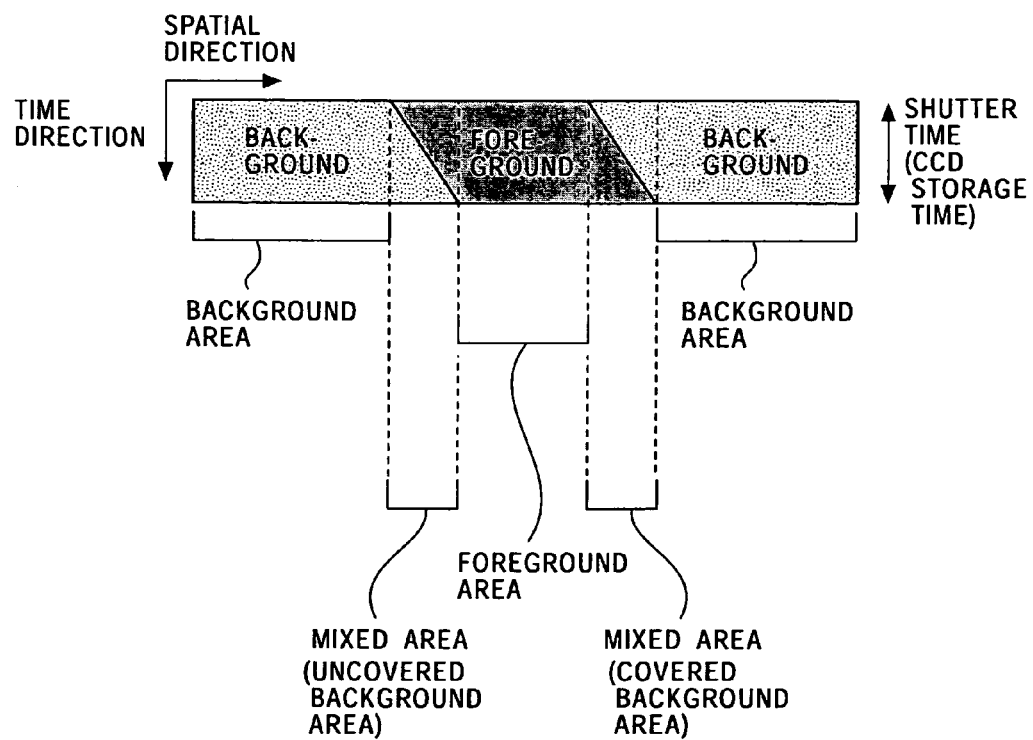
FIG. 13B illustrates an image obtained by image-capturing an object corresponding to a moving foreground and an object corresponding to a stationary background.

FIGS. 13A and 13B illustrate an image obtained by image-capturing an object corresponding to a moving foreground and an object corresponding to a stationary background. FIG. 13A illustrates an image obtained by capturing a moving object corresponding to a foreground and a stationary object corresponding to a background. In the example shown in FIG. 13A, the object corresponding to the foreground is moving horizontally from the left to the right with respect to the screen.

FIG. 13B illustrates a model obtained by expanding pixel values corresponding to one line of the image shown in FIG. 13A in the time direction. The horizontal direction shown in FIG. 13B corresponds to the spatial direction X in FIG. 13A.

The values of the pixels in the background area are formed only from the background components, that is, the image components corresponding to the background object. The values of the pixels in the foreground area are formed only from the foreground components, that is, the image components corresponding to the foreground object.

The values of the pixels of the mixed area are formed from the background components and the foreground components. Since the values of the pixels in the mixed area are formed from the background components and the foreground components, it may be referred to as a "distortion area". The mixed area is further classified into a covered background area and an uncovered background area.

The covered background area is a mixed area at a position corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, the image containing the foreground area, the background area, or the covered background area or the uncovered background area is input into the area specifying unit 103, the mixture-ratio calculator 104, and the foreground/background separator 105 as the input image.

Figures 14, 15:
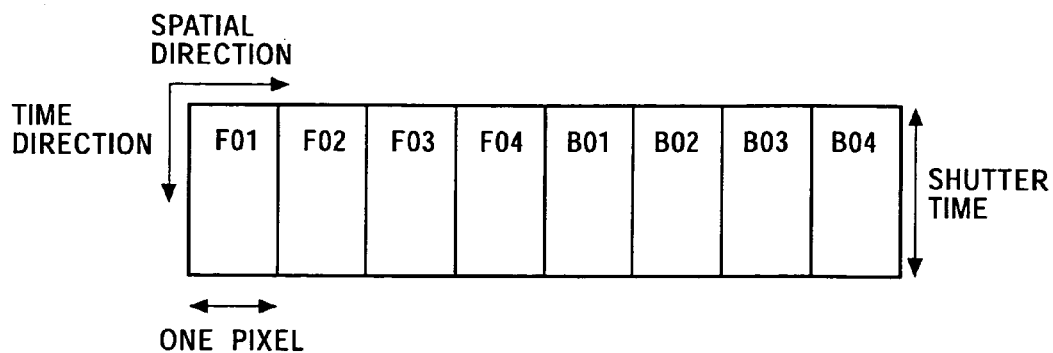
FIG. 14 illustrates a background area, a foreground area, a mixed area, a covered background area, and an uncovered background area.
FIG. 15 illustrates a model obtained by expanding in the time direction the pixel values of pixels aligned side-by-side in an image obtained by image-capturing an object corresponding to a stationary foreground and an the object corresponding to a stationary background.

FIG. 14 illustrates the background area, the foreground area, the mixed area, the covered background area, and the uncovered background area discussed above. In the areas corresponding to the image shown in FIGS. 13A and 13B, the background area is a stationary portion, the foreground area is a moving portion, the covered background area of the mixed area is a portion that changes from the background to the foreground, and the uncovered background area of the mixed area is a portion that changes from the foreground to the background.

FIG. 15 illustrates a model obtained by expanding in the time direction the pixel values of the pixels aligned side-by-side in the image obtained by capturing the image of the object corresponding to the stationary foreground and the image of the object corresponding to the stationary background. For example, as the pixels aligned side-by-side, pixels arranged in one line on the screen can be selected.

The pixel values indicated by F01 through F04 shown in FIG. 15 are values of the pixels corresponding to the object of the stationary foreground. The pixel values indicated by B01 through B04 shown in FIG. 15 are values of the pixels corresponding to the object of the stationary background.

The vertical direction in FIG. 15 corresponds to time, and time elapses from the top to the bottom in FIG. 15. The position at the top side of the rectangle in FIG. 15 corresponds to the time at which the sensor starts converting input light into electrical charge, and the position at the bottom side of the rectangle in FIG. 15 corresponds to the time at which the conversion from the input light into the electrical charge is finished. That is, the distance from the top side to the bottom side of the rectangle in FIG. 15 corresponds to the shutter time.

The pixels shown in FIG. 15 are described below assuming that, for example, the shutter time is equal to the frame size.

The horizontal direction in FIG. 15 corresponds to the spatial direction X in FIG. 13A. More specifically, in the example shown in FIG. 15, the distance from the left side of the rectangle indicated by "F01" in FIG. 15 to the right side of the rectangle indicated by "B04" is eight times the pixel pitch, i.e., eight consecutive pixels.

When the foreground object and the background object are stationary, the light input into the sensor does not change during the period corresponding to the shutter time.

The period corresponding to the shutter time is divided into two or more portions of equal periods. For example, if the number of virtual divided portions is 4, the model shown in FIG. 15 can be represented by the model shown in FIG. 9. The number of virtual divided portions can be set according to the amount of movement v of the object corresponding to the foreground within the shutter time. For example, the number of virtual divided portions is set to 4 when the amount of movement v is 4, and the period corresponding to the shutter time is divided into four portions.

The uppermost line in the diagram corresponds to the first divided period from when the shutter has opened. The second line in the diagram corresponds to the second divided period from when the shutter has opened. The third line in the diagram corresponds to the third divided period from when the shutter has opened. The fourth line in the diagram corresponds to the fourth divided period from when the shutter has opened.

The shutter time divided in accordance with the amount of movement v is also hereinafter referred to as the "shutter time/v".

When the object corresponding to the foreground is stationary, the light input into the sensor does not change, and thus, the foreground component F01/v is equal to the value obtained by dividing the pixel value F01 by the number of virtual divided portions. Similarly, when the object corresponding to the foreground is stationary, the foreground component F02/v is equal to the value obtained by dividing the pixel value F02 by the number of virtual divided portions, the foreground component F03/v is equal to the value obtained by dividing the pixel value F03 by the number of virtual divided portions, and the foreground component F04/v is equal to the value obtained by dividing the pixel value F04 by the number of virtual divided portions.

When the object corresponding to the background is stationary, the light input into the sensor does not change, and thus, the background component B01/v is equal to the value obtained by dividing the pixel value B01 by the number of virtual divided portions. Similarly, when the object corresponding to the background is stationary, the background component B02/v is equal to the value obtained by dividing the pixel value B02 by the number of virtual divided portions, the background component B03/v is equal to the value obtained by dividing the pixel value B03 by the number of virtual divided portions, and the background component B04/v is equal to the value obtained by dividing the pixel value B04 by the number of virtual divided portions.

More specifically, when the object corresponding to the foreground is stationary, the light corresponding to the foreground object input into the sensor does not change during the period corresponding to the shutter time. Accordingly, the foreground component F01/v corresponding to the first portion of the shutter time/v from when the shutter has opened, the foreground component F01/v corresponding to the second portion of the shutter time/v from when the shutter has opened, the foreground component F01/v corresponding to the third portion of the shutter time/v from when the shutter has opened, and the foreground component F01/v corresponding to the fourth portion of the shutter time/v from when the shutter has opened become the same value. The same applies to F02/v through F04/v, as in the case of F01/v.

When the object corresponding to the background is stationary, the light corresponding to the background object input into the sensor does not change during the period corresponding to the shutter time. Accordingly, the background component B01/v corresponding to the first portion of the shutter time/v from when the shutter has opened, the background component B01/v corresponding to the second portion of the shutter time/v from when the shutter has opened, the background component B01/v corresponding to the third portion of the shutter time/v from when the shutter has opened, and the background component B01/v corresponding to the fourth portion of the shutter time/v from when the shutter has opened become the same value. The same applies to B02/v through B04/v.

A description is given of the case in which the object corresponding to the foreground is moving and the object corresponding to the background is stationary.

FIG. 17 illustrates a model obtained by expanding in the time direction the pixel values of the pixels in one line, including a covered background area, when the object corresponding to the foreground is moving to the right in FIG. 17. In FIG. 17, the amount of movement v is 4. Since one frame is a short period, it can be assumed that the object corresponding to the foreground is a rigid body moving with constant velocity. In FIG. 17, the object image corresponding to the foreground is moving such that it is positioned four pixels to the right with respect to a reference frame when it is displayed in the subsequent frame.

In FIG. 17, the pixels from the leftmost pixel to the fourth pixel belong to the foreground area. In FIG. 17, the pixels from the fifth pixel to the seventh pixel from the left belong to the mixed area, which is the covered background area. In FIG. 17, the rightmost pixel belongs to the background area.

The object corresponding to the foreground is moving such that it gradually covers the object corresponding to the background over time. Accordingly, the components contained in the pixel values of the pixels belonging to the covered background area change from the background components to the foreground components at a certain time during the period corresponding to the shutter time.

For example, the pixel value M surrounded by the thick frame in FIG. 17 is expressed by equation (1) below.

$$M = B02/v + B02/v + F07/v + F06/v \qquad (1)$$

For example, the fifth pixel from the left contains a background component corresponding to one portion of the shutter time/v and foreground components corresponding to three portions of the shutter time/v, and thus, the mixture ratio α of the fifth pixel from the left is ¼. The sixth pixel from the left contains background components corresponding to two portions of the shutter time/v and foreground components corresponding to two portions of the shutter time/v, and thus, the mixture ratio α of the sixth pixel from the left is ½. The seventh pixel from the left contains background components corresponding to three portions of the shutter time/v and a foreground component corresponding to one portion of the shutter time/v, and thus, the mixture ratio α of the fifth pixel from the left is ¾.

It can be assumed that the object corresponding to the foreground is a rigid body, and the foreground object is moving with constant velocity such that it is displayed four pixels to the right in the subsequent frame. Accordingly, for example, the foreground component F07/v of the fourth pixel from the left in FIG. 17 corresponding to the first portion of the shutter time/v from when the shutter has opened is equal to the foreground component of the fifth pixel from the left in FIG. 17 corresponding to the second portion of the shutter time/v from when the shutter has opened. Similarly, the foreground component F07/v is equal to the foreground component of the sixth pixel from the left in FIG. 17 corresponding to the third portion of the shutter time/v from when the shutter has opened, and the foreground component of the seventh pixel from the left in FIG. 17 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F06/v of the third pixel from the left in FIG. 17 corresponding to the first portion of the shutter time/v from when the shutter has opened is equal to the foreground component of the fourth pixel from the left in FIG. 17 corresponding to the second portion of the shutter time/v from when the shutter has opened. Similarly, the foreground component F06/v is equal to the foreground component of the fifth pixel from the left in FIG. 17 corresponding to the third portion of the shutter time/v from when the shutter has opened, and the foreground component of the sixth pixel from the left in FIG. 17 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F05/v of the second pixel from the left in FIG. 17 corresponding to the first portion of the shutter time/v from when the shutter has opened is equal to the foreground component of the third pixel from the left in FIG. 17 corresponding to the second portion of the shutter time/v from when the shutter has opened. Similarly, the foreground component F05/v is equal to the foreground component of the fourth pixel from the left in FIG. 17 corresponding to the third portion of the shutter time/v from when the shutter has opened, and the foreground component of the fifth pixel from the left in FIG. 17 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F04/v of the left most pixel in FIG. 17 corresponding to the first portion of the shutter time/v from when the shutter has opened is equal to the foreground component of the second pixel from the left in FIG. 17 corresponding to the second portion of the shutter time/v from when the shutter has opened. Similarly, the foreground component F04/v is equal to the foreground component of the third pixel from the left in FIG. 17 corresponding to the third portion of the shutter time/v from when the shutter has opened, and the foreground component of the fourth pixel from the left in FIG. 17 corresponding to the fourth portion of the shutter time/v from when the shutter has opened.

Since the foreground area corresponding to the moving object contains motion blur as discussed above, it can also be referred to as a "distortion area".

Figure 18:
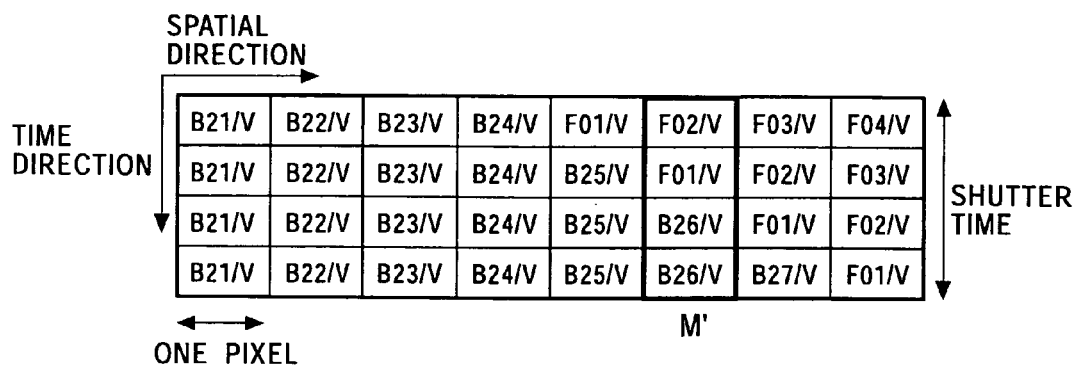
FIG. 18 illustrates a model in which pixel values are expanded in the time direction and the period corresponding to the shutter time is divided.

FIG. 18 illustrates a model obtained by expanding in the time direction the pixel values of the pixels in one line including an uncovered background area when the object corresponding to the foreground is moving to the right in FIG. 18. In FIG. 18, the amount of movement v is 4. Since one frame is a short period, it can be assumed that the object corresponding to the foreground is a rigid body moving with constant velocity. In FIG. 18, the object image corresponding to the foreground is moving to the right such that it is positioned four pixels to the right with respect to a reference frame when it is displayed in the subsequent frame.

In FIG. 18, the pixels from the leftmost pixel to the fourth pixel belong to the background area. In FIG. 18, the pixels from the fifth pixel to the seventh pixels from the left belong to the mixed area, which is an uncovered background area. In FIG. 18, the rightmost pixel belongs to the foreground area.

The object corresponding to the foreground which covers the object corresponding to the background is moving such that it is gradually removed from the object corresponding to the background over time. Accordingly, the components contained in the pixel values of the pixels belonging to the uncovered background area change from the foreground components to the background components at a certain time of the period corresponding to the shutter time.

For example, the pixel value M' surrounded by the thick frame in FIG. 18 is expressed by equation (2).

$$M' = F02/v + F01/v + B26/v + B26/v \qquad (2)$$

For example, the fifth pixel from the left contains background components corresponding to three portions of the shutter time/v and a foreground component corresponding to one shutter portion of the shutter time/v, and thus, the mixture ratio α of the fifth pixel from the left is ¾. The sixth pixel from the left contains background components corresponding to two portions of the shutter time/v and foreground components corresponding to two portions of the shutter time/v, and thus, the mixture ratio α of the sixth pixel from the left is ½. The seventh pixel from the left contains a background component corresponding to one portion of the shutter time/v and foreground components corresponding to three portions of the shutter time/v, and thus, the mixture ratio α of the seventh pixel from the left is ¼.

When equations (1) and (2) are generalized, the pixel value M can be expressed by equation (3):

$$M = \alpha \cdot B + \sum_i Fi/v \qquad (3)$$

where α is the mixture ratio, B indicates a pixel value of the background, and Fi/v designates a foreground component.

It can be assumed that the object corresponding to the foreground is a rigid body, which is moving with constant velocity, and the amount of movement is 4. Accordingly, for example, the foreground component F01/v of the fifth pixel from the left in FIG. 18 corresponding to the first portion of the shutter time/v from when the shutter has opened is equal to the foreground component of the sixth pixel from the left in FIG. 18 corresponding to the second portion of the shutter time/v from when the shutter has opened. Similarly, the foreground component F01/v is equal to the foreground component of the seventh pixel from the left in FIG. 18 corresponding to the third portion of the shutter time/v from when the shutter has opened, and the foreground component of the eighth pixel from the left in FIG. 18 corresponding to the fourth portion of the shutter time/v from when the shutter has opened.

It can be assumed that the object corresponding to the foreground is a rigid body, which is moving with constant velocity, and the amount of movement v is 4. Accordingly, for example, the foreground component F02/v of the sixth pixel from the left in FIG. 18 corresponding to the first portion of the shutter time/v from when the shutter has opened is equal to the foreground component of the seventh pixel from the left in FIG. 18 corresponding to the second portion of the shutter time/v from when the shutter has opened. Similarly, the foreground component F02/v is equal to the foreground component of the eighth pixel from the left in FIG. 18 corresponding to the third portion of the shutter time/v from when the shutter has opened.

It can be assumed that the object corresponding to the foreground is a rigid body, which is moving with constant velocity, and the amount of movement v is 4. Accordingly, for example, the foreground component F03/v of the seventh pixel from the left in FIG. 18 corresponding to the first portion of the shutter time/v from when the shutter has opened is equal to the foreground component of the eighth pixel from the left in FIG. 18 corresponding to the second portion of the shutter time/v from when the shutter has opened.

It has been described with reference to FIGS. 16 through 18 that the number of virtual divided portions is 4. The number of virtual divided portions corresponds to the amount of movement v. Generally, the amount of movement v corresponds to the moving speed of the object corresponding to the foreground. For example, if the object corresponding to the foreground is moving such that it is displayed four pixels to the right with respect to a certain frame when it is positioned in the subsequent frame, the amount of movement v is set to 4. The number of virtual divided portions is set to 4 in accordance with the amount of movement v. Similarly, when the object corresponding to the foreground is moving such that it is displayed six pixels to the left with respect to a certain frame when it is positioned in the subsequent frame, the amount of movement v is set to 6, and the number of virtual divided portions is set to 6.

Figure 19:
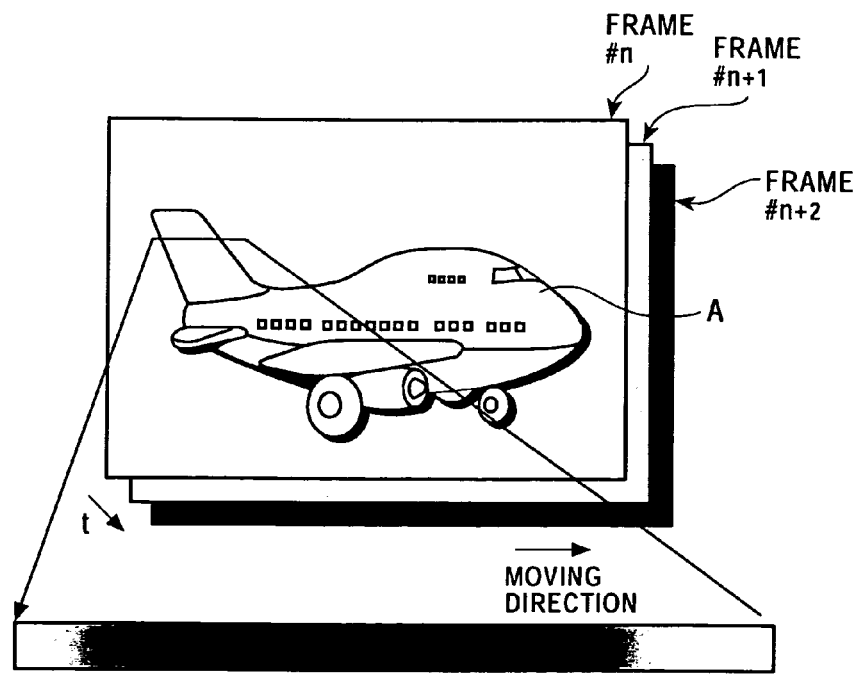
FIG. 19 illustrates an example in which pixels in a foreground area, a background area, and a mixed area are extracted.
Figure 20:
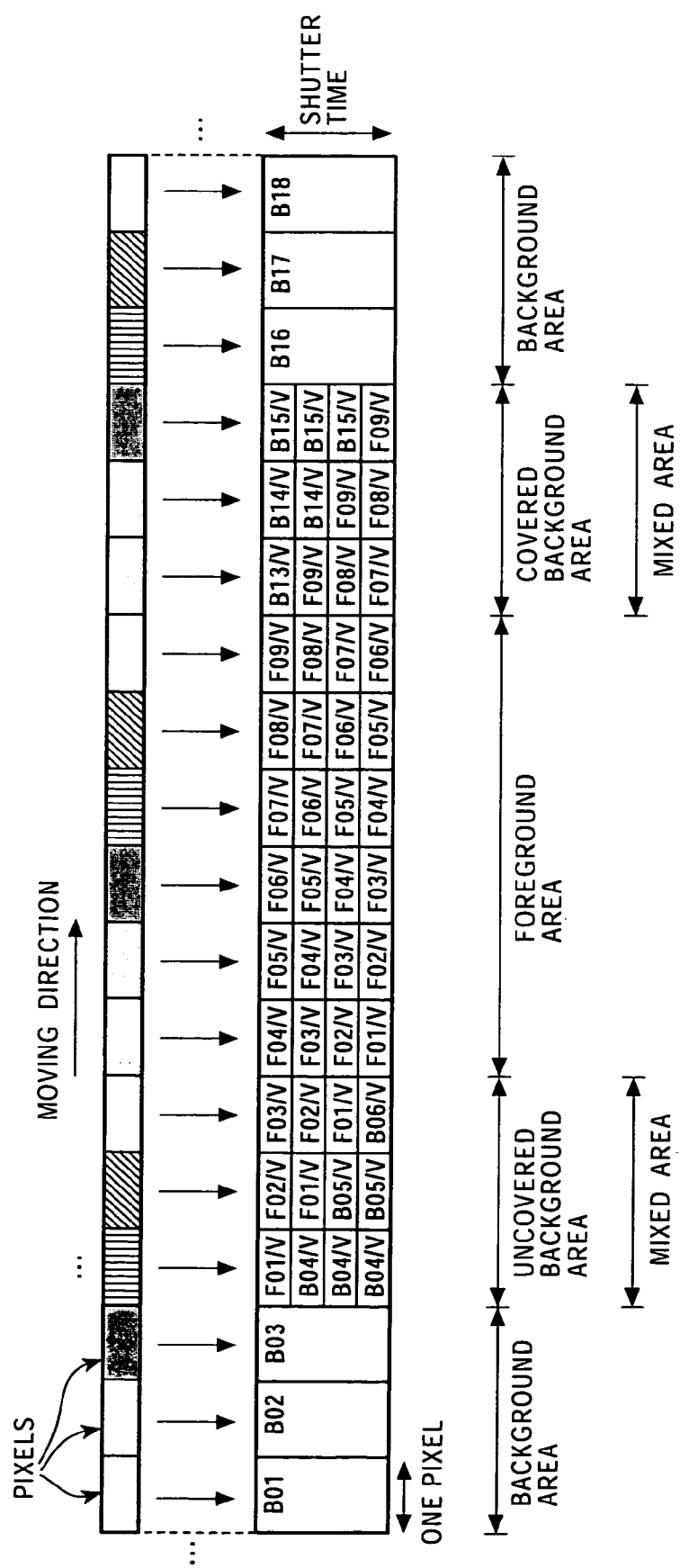
FIG. 20 illustrates the relationships between pixels and a model obtained by expanding the pixel values in the time direction.

FIGS. 19 and 20 illustrate the relationship of the foreground area, the background area, and the mixed area which consists of a covered background or an uncovered background, which are discussed above, to the foreground components and the background components corresponding to the divided periods of the shutter time.

FIG. 19 illustrates an example in which pixels in the foreground area, the background area, and the mixed area are extracted from an image containing a foreground corresponding to an object moving in front of a stationary background. In the example shown in FIG. 19, an object A corresponding to the foreground is horizontally moving with respect to the screen.

Frame #n+1 is a frame subsequent to frame #n, and frame #n+2 is a frame subsequent to frame #n+1.

Pixels in the foreground area, the background area, and the mixed area are extracted from one of frames #n through #n+2, and the amount of movement v is set to 4. A model obtained by expanding the pixel values of the extracted pixels in the time direction is shown in FIG. 20.

Since the object A corresponding to the foreground is moving, the pixel values in the foreground area are formed of four different foreground components corresponding to the shutter time/v. For example, the leftmost pixel of the pixels in the foreground area shown in FIG. 20 consists of F01/v, F02/v, F03/v, and F04/v. That is, the pixels in the foreground contain motion blur.

Since the object corresponding to the background is stationary, light input into the sensor corresponding to the background during the shutter time does not change. In this case, the pixel values in the background area do not contain motion blur.

The pixel values in the mixed area consisting of a covered background area or an uncovered background area are formed of foreground components and background components.

A description is given below of a model obtained by expanding in the time direction the pixel values of the pixels which are aligned side-by-side in a plurality of frames and which are located at the same positions when the frames are overlapped when the image corresponding to the object is moving. For example, when the image corresponding to the object is moving horizontally with respect to the screen, pixels aligned on the screen can be selected as the pixels aligned side-by-side.

Figure 21:
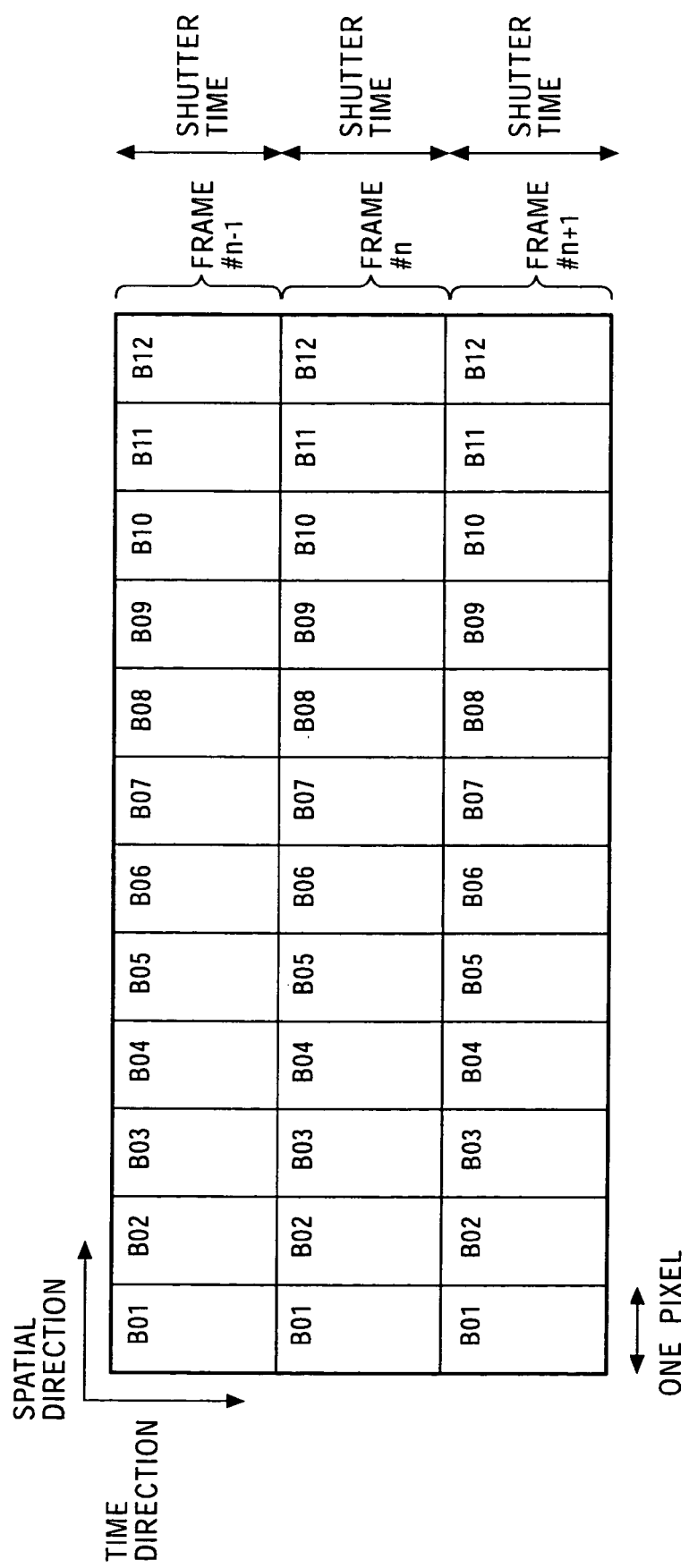
FIG. 21 illustrates a model in which pixel values are expanded in the time direction and the period corresponding to the shutter time is divided.

FIG. 21 illustrates a model obtained by expanding in the time direction the pixels which are aligned side-by-side in three frames of an image obtained by capturing an object corresponding to a stationary background and which are located at the same positions when the frames are overlapped. Frame #n is the frame subsequent to frame #n−1, and frame #n+1 is the frame subsequent to frame #n. The same applies to the other frames.

The pixel values B01 through B12 shown in FIG. 21 are pixel values corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

Figure 22:
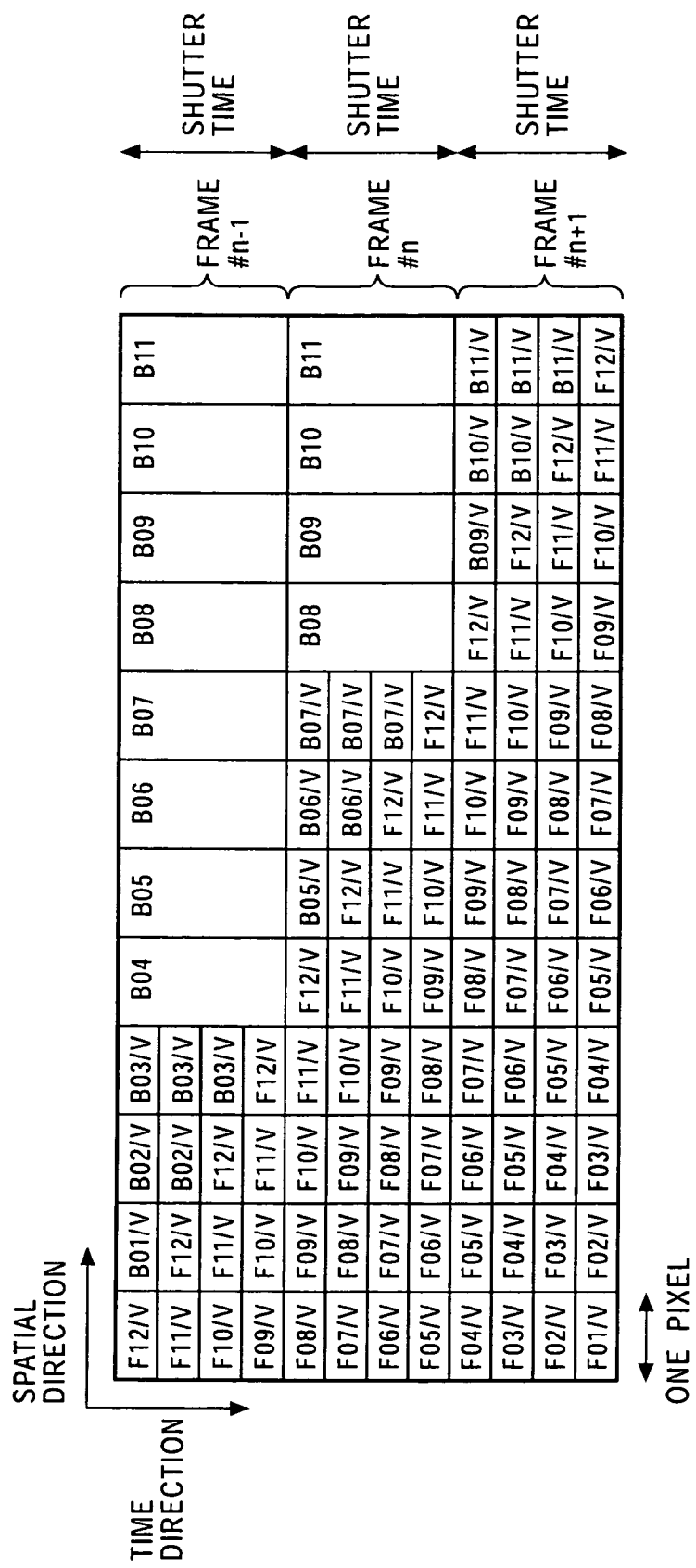
FIG. 22 illustrates a model in which pixel values are expanded in the time direction and the period corresponding to the shutter time is divided.

FIG. 22 illustrates a model obtained by expanding in the time direction the pixels which are aligned side-by-side in three frames of an image obtained by capturing an object corresponding to a foreground that is moving to the right in FIG. 22 together with an object corresponding to a stationary background and which are located at the same positions when the frames are overlapped. The model shown in FIG. 22 contains a covered background area.

In FIG. 22, it can be assumed that the object corresponding to the foreground is a rigid body moving with constant velocity, and that it is moving such that it is displayed four pixels to the right in the subsequent frame. Accordingly, the amount of movement v is 4, and the number of virtual divided portions is 4.

For example, the foreground component of the leftmost pixel of frame #n−1 in FIG. 22 corresponding to the first portion of the shutter time/v from when the shutter has opened is F12/v, and the foreground component of the second pixel from the left in FIG. 22 corresponding to the second portion of the shutter time/v from when the shutter has opened is also F12/v. The foreground component of the third pixel from the left in FIG. 22 corresponding to the third portion of the shutter time/v from when the shutter has opened and the foreground component of the fourth pixel from the left in FIG. 22 corresponding to the fourth portion of the shutter time/v from when the shutter has opened are F12/v.

The foreground component of the leftmost pixel of frame #n−1 in FIG. 22 corresponding to the second portion of the shutter time/v from when the shutter has opened is F11/v. The foreground component of the second pixel from the left in FIG. 22 corresponding to the third portion of the shutter time/v from when the shutter has opened is also F11/v. The foreground component of the third pixel from the left in FIG. 22 corresponding to the fourth portion of the shutter time/v from when the shutter has opened is F11/v.

The foreground component of the leftmost pixel of frame #n−1 in FIG. 22 corresponding to the third portion of the shutter time/v from when the shutter has opened is F10/v. The foreground component of the second pixel from the left in FIG. 22 corresponding to the fourth portion of the shutter time/v from when the shutter has opened is also F10/v. The foreground component of the leftmost pixel of frame #n−1 in FIG. 22 corresponding to the fourth portion of the shutter time/v from when the shutter has opened is F09/v.

Since the object corresponding to the background is stationary, the background component of the second pixel from the left of frame #n−1 in FIG. 22 corresponding to the first portion of the shutter time/v from when the shutter has opened is B01/v. The background components of the third pixel from the left of frame #n−1 in FIG. 22 corresponding to the first and second portions of the shutter time/v from when the shutter has opened are B02/v. The background components of the fourth pixel from the left of frame #n−1 in FIG. 22 corresponding to the first through third portions of the shutter time/v from when the shutter has opened are B03/v.

In frame #n−1 in FIG. 22, the leftmost pixel from the left belongs to the foreground area, and the second through fourth pixels from the left belong to the mixed area, which is a covered background area.

The fifth through twelfth pixels from the left of frame #n−1 in FIG. 22 belong to the background area, and the pixel values thereof are B04 through B11, respectively.

The first through fifth pixels from the left in frame #n in FIG. 22 belong to the foreground area. The foreground component in the shutter time/v in the foreground area of frame #n is any one of F05/v through F12/v.

It can be assumed that the object corresponding to the foreground is a rigid body moving with constant velocity, and that it is moving such that the foreground image is displayed four pixels to the right in the subsequent frame. Accordingly, the foreground component of the fifth pixel from the left of frame #n in FIG. 22 corresponding to the first portion of the shutter time/v from when the shutter has opened is F12/v, and the foreground component of the sixth pixel from the left in FIG. 22 corresponding to the second portion of the shutter time/v from when the shutter has opened is also F12/v. The foreground component of the seventh pixel from the left in FIG. 22 corresponding to the third portion of the shutter time/v from when the shutter has opened and the foreground component of the eighth pixel from the left in FIG. 22 corresponding to the fourth portion of the shutter time/v from when the shutter has opened are F12/v.

The foreground component of the fifth pixel from the left of frame #n in FIG. 22 corresponding to the second portion of the shutter time/v from when the shutter has opened is F11/v. The foreground component of the sixth pixel from the left in FIG. 22 corresponding to the third portion of the shutter time/v from when the shutter has opened is also F11/v. The foreground component of the seventh pixel from the left in FIG. 22 corresponding to the fourth portion of the shutter time/v from when the shutter has opened is F11/v.

The foreground component of the fifth pixel from the left of frame #n in FIG. 22 corresponding to the third portion of the shutter time/v from when the shutter has opened is F10/v. The foreground component of the sixth pixel from the left in FIG. 22 corresponding to the fourth portion of the shutter time/v from when the shutter has opened is also F10/v. The foreground component of the fifth pixel from the left of frame #n in FIG. 22 corresponding to the fourth portion of the shutter time/v from when the shutter has opened is F09/v.

Since the object corresponding to the background is stationary, the background component of the sixth pixel from the left of frame #n in FIG. 22 corresponding to the first portion of the shutter time/v from when the shutter has opened is B05/v. The background components of the seventh pixel from the left of frame #n in FIG. 22 corresponding to the first and second portions of the shutter time/v from when the shutter has opened are B06/v. The background components of the eighth pixel from the left of frame #n in FIG. 22 corresponding to the first through third portion of the shutter time/v from when the shutter has opened are B07/v.

In frame #n in FIG. 22, the sixth through eighth pixels from the left belong to the mixed area, which is a covered background area.

The ninth through twelfth pixels from the left of frame #n in FIG. 22 belong to the background area, and the pixel values thereof are B08 through B11, respectively.

The first through ninth pixels from the left in frame #n+1 in FIG. 22 belong to the foreground area. The foreground component in the shutter time/v in the foreground area of frame #n+1 is any one of F01/v through F12/v.

It can be assumed that the object corresponding to the foreground is a rigid body moving with constant velocity, and that it is moving such that the foreground image is displayed four pixels to the right in the subsequent frame. Accordingly, the foreground component of the ninth pixel from the left of frame #n+1 in FIG. 22 corresponding to the first portion of the shutter time/v from when the shutter has opened is F12/v, and the foreground component of the tenth pixel from the left in FIG. 22 corresponding to the second portion of the shutter time/v from when the shutter has opened is also F12/v. The foreground component of the eleventh pixel from the left in FIG. 22 corresponding to the third portion of the shutter time/v from when the shutter has opened and the foreground component of the twelfth pixel from the left in FIG. 22 corresponding to the fourth portion of the shutter time/v from when the shutter has opened are F12/v.

The foreground component of the ninth pixel from the left of frame #n+1 in FIG. 22 corresponding to the second portion of the shutter time/v from when the shutter has opened is F11/v. The foreground component of the tenth pixel from the left in FIG. 22 corresponding to the third portion of the shutter time/v from when the shutter has opened is also F11/v. The foreground component of the eleventh pixel from the left in FIG. 22 corresponding to the fourth portion of the shutter time/v from when the shutter has opened is F11/v.

The foreground component of the ninth pixel from the left of frame #n+1 in FIG. 22 corresponding to the third portion of the shutter time/v from when the shutter has opened is F10/v. The foreground component of the tenth pixel from the left in FIG. 22 corresponding to the fourth portion of the shutter time/v from when the shutter has opened is also F10/v. The foreground component of the ninth pixel from the left of frame #n+1 in FIG. 22 corresponding to the fourth portion of the shutter time/v from when the shutter has opened is F09/v.

Since the object corresponding to the background is stationary, the background component of the tenth pixel from the left of frame #n+1 in FIG. 22 corresponding to the first portion of the shutter time/v from when the shutter has opened is B09/v. The background components of the eleventh pixel from the left of frame #n+1 in FIG. 22 corresponding to the first and second portions of the shutter time/v from when the shutter has opened are B10/v. The background components of the twelfth pixel from the left of frame #n+1 in FIG. 22 corresponding to the first through third portion of the shutter time/v from when the shutter has opened are B11/v.

In frame #n+1 in FIG. 22, the tenth through twelfth pixels from the left belong to the mixed area, which is a covered background area.

Figure 23:
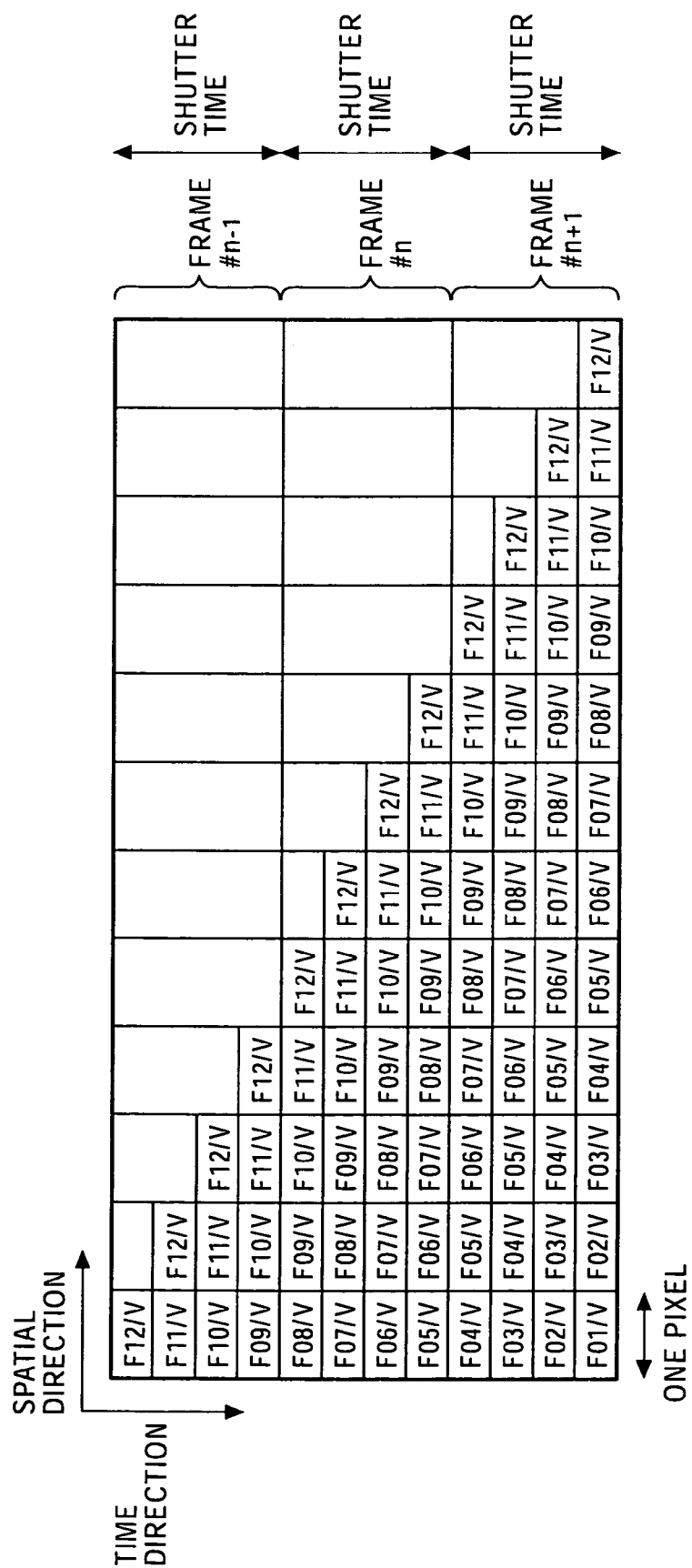
FIG. 23 illustrates a model in which pixel values are expanded in the time direction and the period corresponding to the shutter time is divided.

FIG. 23 is a model of an image obtained by extracting the foreground components from the pixel values shown in FIG. 22.

Figure 24:
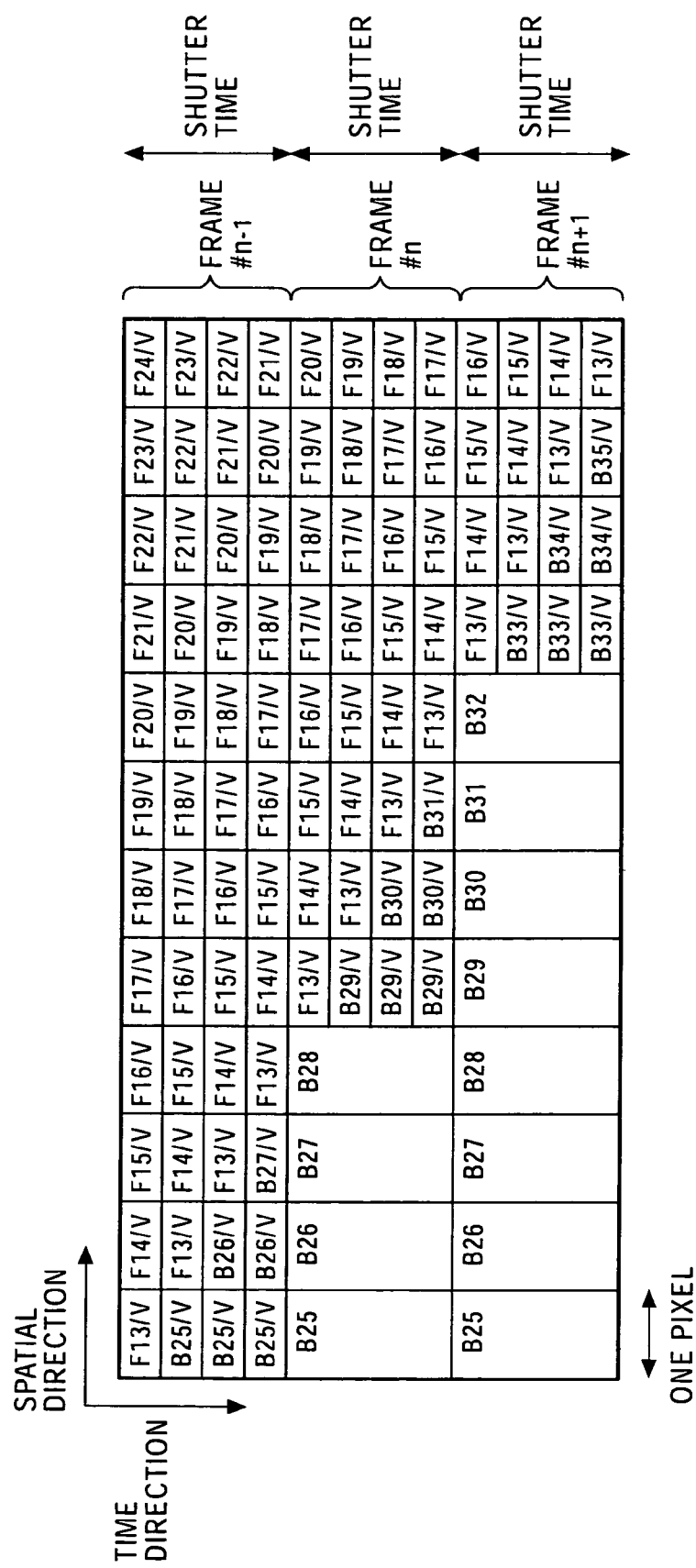
FIG. 24 illustrates a model in which pixel values are expanded in the time direction and the period corresponding to the shutter time is divided.

FIG. 24 illustrates a model obtained by expanding in the time direction the pixels which are aligned side-by-side in three frames of an image obtained by capturing an object corresponding to a foreground that is moving to the right in FIG. 24 together with an object corresponding to a stationary background and which are located at the same positions when the frames are overlapped. The model shown in FIG. 24 contains an uncovered background area.

In FIG. 24, it can be assumed that the object corresponding to the foreground is a rigid body moving with constant velocity, and that it is moving such that it is displayed four pixels to the right in the subsequent frame. Accordingly, the amount of movement v is 4.

For example, the foreground component of the leftmost pixel of frame #n−1 in FIG. 24 corresponding to the first portion of the shutter time/v from when the shutter has opened is F13/v, and the foreground component of the second pixel from the left in FIG. 24 corresponding to the second portion of the shutter time/v from when the shutter has opened is also F13/v. The foreground component of the third pixel from the left in FIG. 24 corresponding to the third portion of the shutter time/v from when the shutter has opened and the foreground component of the fourth pixel from the left in FIG. 24 corresponding to the fourth portion of the shutter time/v from when the shutter has opened are F13/v.

The foreground component of the second pixel from the left of frame #n−1 in FIG. 24 corresponding to the first portion of the shutter time/v from when the shutter has opened is F14/v. The foreground component of the third pixel from the left in FIG. 24 corresponding to the second portion of the shutter time/v from when the shutter has opened is also F14/v. The foreground component of the third pixel from the left in FIG. 24 corresponding to the first portion of the shutter time/v from when the shutter has opened is F15/v.

Since the object corresponding to the background is stationary, the background components of the leftmost pixel of frame #n−1 in FIG. 24 corresponding to the second through fourth portions of the shutter time/v from when the shutter has opened are B25/v. The background components of the second pixel from the left of frame #n−1 in FIG. 24 corresponding to the third and fourth portions of the shutter time/v from when the shutter has opened are B26/v. The background component of the third pixel from the left of frame #n−1 in FIG. 24 corresponding to the fourth portion of the shutter time/v from when the shutter has opened is B27/v.

In frame #n−1 in FIG. 24, the leftmost pixel through the third pixel belong to the mixed area, which is an uncovered background area.

The fourth through twelfth pixels from the left of frame #n−1 in FIG. 24 belong to the foreground area. The foreground component of the frame is any one of F13/v through F24/v.

The leftmost pixel through the fourth pixel from the left of frame #n in FIG. 24 belong to the background area, and the pixel values thereof are B25 through B28, respectively.

It can be assumed that the object corresponding to the foreground is a rigid body moving with constant velocity, and that it is moving such that it is displayed four pixels to the right in the subsequent frame. Accordingly, the foreground component of the fifth pixel from the left of frame #n in FIG. 24 corresponding to the first portion of the shutter time/v from when the shutter has opened is F13/v, and the foreground component of the sixth pixel from the left in FIG. 24 corresponding to the second portion of the shutter time/v from when the shutter has opened is also F13/v. The foreground component of the seventh pixel from the left in FIG. 24 corresponding to the third portion of the shutter time/v from when the shutter has opened and the foreground component of the eighth pixel from the left in FIG. 24 corresponding to the fourth portion of the shutter time/v from when the shutter has opened are F13/v.

The foreground component of the sixth pixel from the left of frame #n in FIG. 24 corresponding to the first portion of the shutter time/v from when the shutter has opened is F14/v. The foreground component of the seventh pixel from the left in FIG. 24 corresponding to the second portion of the shutter time/v from when the shutter has opened is also F14/v. The foreground component of the eighth pixel from the left in FIG. 24 corresponding to the first portion of the shutter time/v from when the shutter has opened is F15/v.

Since the object corresponding to the background is stationary, the background components of the fifth pixel from the left of frame #n in FIG. 24 corresponding to the second through fourth portions of the shutter time/v from when the shutter has opened are B29/v. The background components of the sixth pixel from the left of frame #n in FIG. 24 corresponding to the third and fourth portions of the shutter time/v from when the shutter has opened are B30/v. The background component of the seventh pixel from the left of frame #n in FIG. 24 corresponding to the fourth portion of the shutter time/v from when the shutter has opened is B31/v.

In frame #n in FIG. 24, the fifth pixel through the seventh pixel from the left belong to the mixed area, which is an uncovered background area.

The eighth through twelfth pixels from the left of frame #n in FIG. 24 belong to the foreground area. The value in the foreground area of frame #n corresponding to the period of the shutter time/v is any one of F13/v through F20/v.

The leftmost pixel through the eighth pixel from the left of frame #n+1 in FIG. 24 belong to the background area, and the pixel values thereof are B25 through B32, respectively.

It can be assumed that the object corresponding to the foreground is a rigid body moving with constant velocity, and that it is moving such that it is displayed four pixels to the right in the subsequent frame. Accordingly, the foreground component of the ninth pixel from the left of frame #n+1 in FIG. 24 corresponding to the first portion of the shutter time/v from when the shutter has opened is F13/v, and the foreground component of the tenth pixel from the left in FIG. 24 corresponding to the second portion of the shutter time/v from when the shutter has opened is also F13/v. The foreground component of the eleventh pixel from the left in FIG. 24 corresponding to the third portion of the shutter time/v from when the shutter has opened and the foreground component of the twelfth pixel from the left in FIG. 24 corresponding to the fourth portion of the shutter time/v from when the shutter has opened are F13/v.

The foreground component of the tenth pixel from the left of frame #n+1 in FIG. 24 corresponding to the first portion of the shutter time/v from when the shutter has opened is F14/v. The foreground component of the eleventh pixel from the left in FIG. 24 corresponding to the second portion of the shutter time/v from when the shutter has opened is also F14/v. The foreground component of the twelfth pixel from the left in FIG. 24 corresponding to the first portion of the shutter time/v from when the shutter has opened is F15/v.

Since the object corresponding to the background is stationary, the background components of the ninth pixel from the left of frame #n+1 in FIG. 24 corresponding to the second through fourth portions of the shutter time/v from when the shutter has opened are B33/v. The background components of the tenth pixel from the left of frame #n+1 in FIG. 24 corresponding to the third and fourth portions of the shutter time/v from when the shutter has opened are B34/v. The background component of the eleventh pixel from the left of frame #n+1 in FIG. 24 corresponding to the fourth portion of the shutter time/v from when the shutter has opened is B35/v.

In frame #n+1 in FIG. 24, the ninth through eleventh pixels from the left in FIG. 24 belong to the mixed area, which is an uncovered background area.

The twelfth pixel from the left of frame #n+1 in FIG. 24 belongs to the foreground area. The foreground component in the shutter time/v in the foreground area of frame #n+1 is any one of F13 through F16, respectively.

Figure 25:
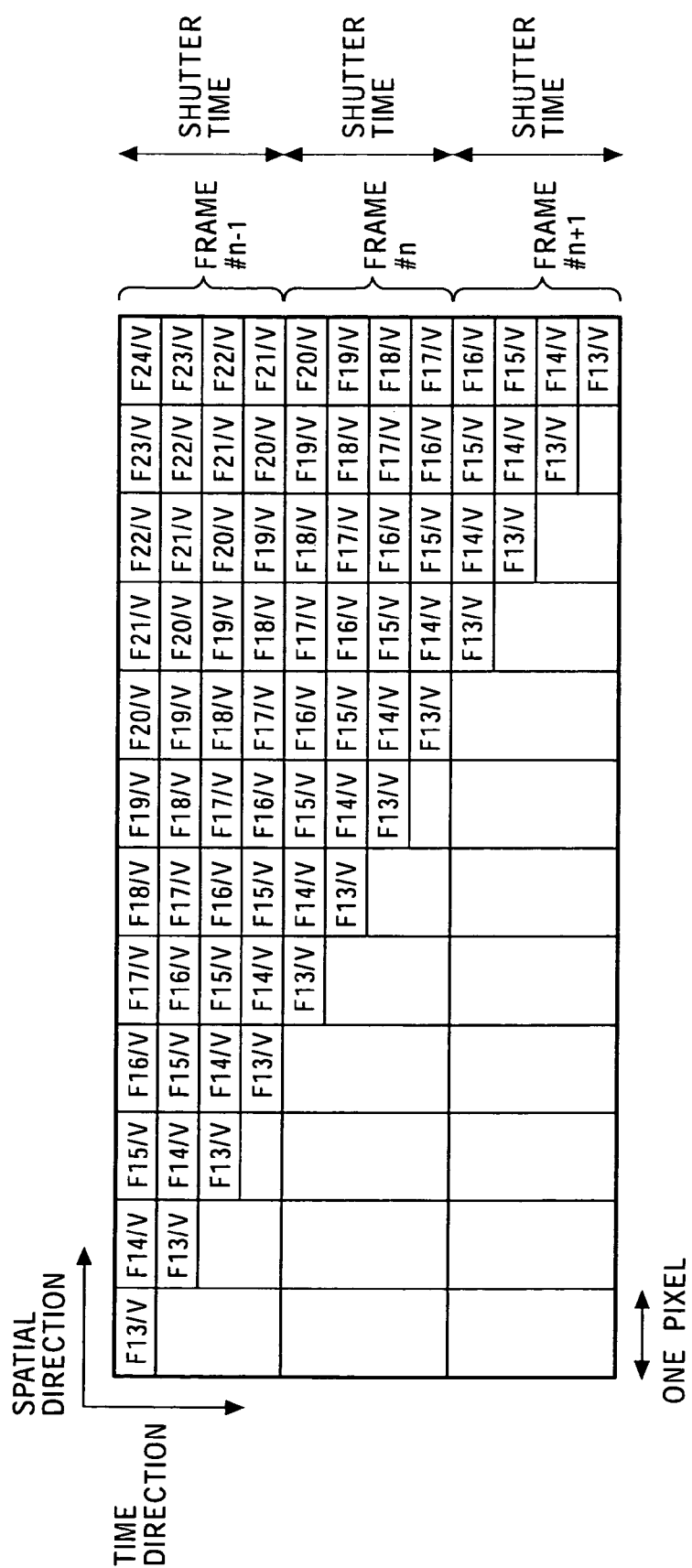
FIG. 25 illustrates a model in which pixel values are expanded in the time direction and the period corresponding to the shutter time is divided.

FIG. 25 illustrates a model of an image obtained by extracting the foreground components from the pixel values shown in FIG. 24.

Referring back to FIG. 9, the area specifying unit 103 specifies flags indicating to which of a foreground area, a background area, a covered background area, or an uncovered background area the individual pixels of the input image belong by using the pixel values of a plurality of frames, and supplies the flags to the mixture-ratio calculator 104 and the motion-blur adjusting unit 106 as the area information.

The mixture-ratio calculator 104 calculates the mixture ratio α for each pixel contained in the mixed area based on the pixel values of a plurality of frames and the area information, and supplies the calculated mixture ratio α to the foreground/background separator 105.

The foreground/background separator 105 extracts the foreground component image consisting of only the foreground components based on the pixel values of a plurality of frames, the area information, and the mixture ratio α, and supplies the foreground component image to the motion-blur adjusting unit 106.

The motion-blur adjusting unit 106 adjusts the amount of motion blur contained in the foreground component image based on the foreground component image supplied from the foreground/background separator 105, the motion vector supplied from the motion detector 102, and the area information supplied from the area specifying unit 103, and then outputs the foreground component image in which motion blur is adjusted.

Figure 26:
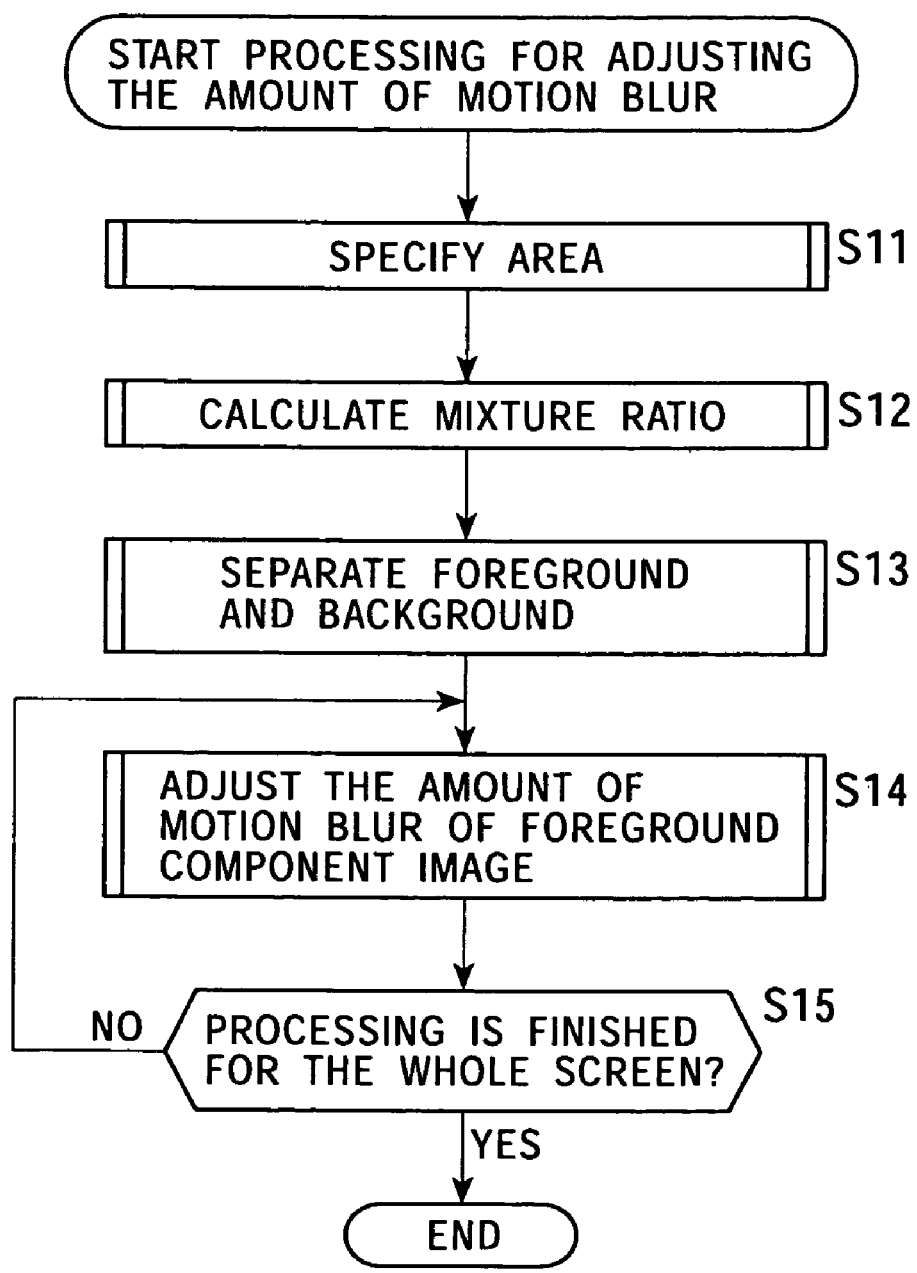
FIG. 26 is a flowchart illustrating the processing for adjusting the amount of motion blur.

The processing for adjusting the amount of motion blur performed by the separating portion 91 is described below with reference to the flowchart of FIG. 26. In step S11, the area specifying unit 103 executes area specifying processing, based on an input image, for generating area information indicating to which of a foreground area, a background area, a covered background area, or an uncovered background area each pixel of the input image belongs. Details of the area specifying processing are given below. The area specifying unit 103 supplies the generated area information to the mixture-ratio calculator 104.

In step S11, the area specifying unit 103 may generate, based on the input image, area information indicating to which of the foreground area, the background area, or the mixed area (regardless of whether each pixel belongs to a covered background area or an uncovered background area) each pixel of the input image belongs. In this case, the foreground/background separator 105 and the motion-blur adjusting unit 106 determine based on the direction of the motion vector whether the mixed area is a covered background area or an uncovered background area. For example, if the input image is disposed in the order of the foreground area, the mixed area, and the background area in the direction of the motion vector, it is determined that the mixed area is a covered background area. If the input image is disposed in the order of the background area, the mixed area, and the foreground area in the direction of the motion vector, it is determined that the mixed area is an uncovered background area.

In step S12, the mixture-ratio calculator 104 calculates the mixture ratio α for each pixel contained in the mixed area based on the input image and the area information. Details of the mixture ratio calculating processing are given below. The mixture-ratio calculator 104 supplies the calculated mixture ratio α to the foreground/background separator 105.

In step S13, the foreground/background separator 105 extracts the foreground components from the input image based on the area information and the mixture ratio α, and supplies the foreground components to the motion-blur adjusting unit 106 as the foreground component image.

In step S14, the motion-blur adjusting unit 106 generates, based on the motion vector and the area information, the unit of processing that indicates the positions of consecutive pixels disposed in the moving direction and belonging to any of the uncovered background area, the foreground area, and the covered background area, and adjusts the amount of motion blur contained in the foreground components corresponding to the unit of processing. Details of the processing for adjusting the amount of motion blur are given below.

In step S15, the separating portion 91 determines whether the processing is finished for the whole screen. If it is determined, that the processing is not finished for the whole screen, the process proceeds to step S14, and the processing for adjusting the amount of motion blur for the foreground components corresponding to the unit of processing is repeated.

If it is determined in step S15 that the processing is finished for the whole screen, the processing is completed.

In this manner, the separating portion 91 is capable of adjusting the amount of motion blur contained in the foreground by separating the foreground and the background. That is, the separating portion 91 is capable of adjusting the amount of motion blur contained in sampled data indicating the pixel values of the foreground pixels.

The configuration of each of the area specifying unit 103, the mixture-ratio calculator 104, the foreground/background separator 105, and the motion-blur adjusting unit 106 is described below.

Figure 27:
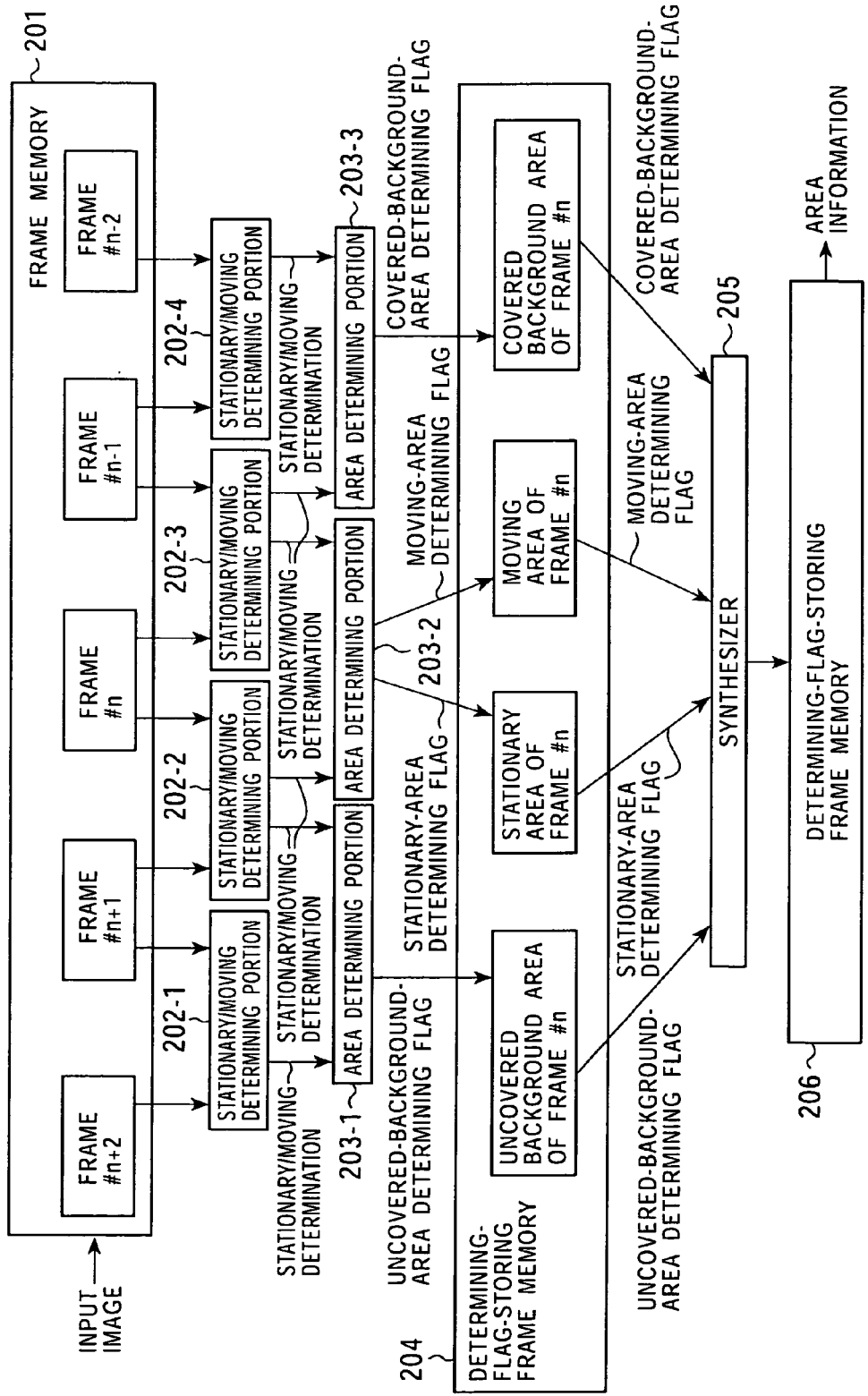
FIG. 27 is a block diagram illustrating an example of the configuration of an area specifying unit 103.

FIG. 27 is a block diagram illustrating an example of the configuration of the area specifying unit 103. The area specifying unit 103 shown in FIG. 27 does not use a motion vector. A frame memory 201 stores an input image in units of frames. When the image to be processed is frame #n, the frame memory 201 stores frame #n−2, which is the frame two frames before frame #n, frame #n−1, which is the frame one frame before frame #n, frame #n, frame #n+1, which is the frame one frame after frame #n, frame #n+2, which is the frame two frames after frame #n.

A stationary/moving determining portion 202-1 reads the pixel value of the pixel of frame #n+2 located at the same position as a designated pixel of frame #n in which the area to which the pixel belongs is determined, and reads the pixel value of the pixel of frame #n+1 located at the same position of the designated pixel of frame #n from the frame memory 201, and calculates the absolute value of the difference between the read pixel values. The stationary/moving determining portion 202-1 determines whether the absolute value of the difference between the pixel value of frame #n+2 and the pixel value of frame #n+1 is greater than a preset threshold Th. If it is determined that the difference is greater than the threshold Th, a stationary/moving determination indicating "moving" is supplied to an area determining portion 203-1. If it is determined that the absolute value of the difference between the pixel value of the pixel of frame #n+2 and the pixel value of the pixel of frame #n+1 is smaller than or equal to the threshold Th, the stationary/moving determining portion 202-1 supplies a stationary/moving determination indicating "stationary" to the area determining portion 203-1.

A stationary/moving determining portion 202-2 reads the pixel value of a designated pixel of frame #n in which the area to which the pixel belongs is determined, and reads the pixel value of the pixel of frame #n+1 located at the same position as the designated pixel of frame #n from the frame memory 201, and calculates the absolute value of the difference between the pixel values. The stationary/moving determining portion 202-2 determines whether the absolute value of the difference between the pixel value of frame #n+1 and the pixel value of frame #n is greater than a preset threshold Th. If it is determined that the absolute value of the difference between the pixel values is greater than the threshold Th, a stationary/moving determination indicating "moving" is supplied to the area determining portion 203-1 and an area determining portion 203-2. If it is determined that the absolute value of the difference between the pixel value of the pixel of frame #n+1 and the pixel value of the pixel of frame #n is smaller than or equal to the threshold Th, the stationary/moving determining portion 202-2 supplies a stationary/moving determination indicating "stationary" to the area determining portion 203-1 and the area determining portion 203-2.

A stationary/moving determining portion 202-3 reads the pixel value of a designated pixel of frame #n in which the area to which the pixel belongs is determined, and reads the pixel value of the pixel of frame #n−1 located at the same position as the designated pixel of frame #n from the frame memory 201, and calculates the absolute value of the difference between the pixel values. The stationary/moving determining portion 202-3 determines whether the absolute value of the difference between the pixel value of frame #n and the pixel value of frame #n−1 is greater than a preset threshold Th. If it is determined that the absolute value of the difference between the pixel values is greater than the threshold Th, a stationary/moving determination indicating "moving" is supplied to the area determining portion 203-2 and an area determining portion 203-3. If it is determined that the absolute value of the difference between the pixel value of the pixel of frame #n and the pixel value of the pixel of frame #n−1 is smaller than or equal to the threshold Th, the stationary/moving determining portion 202-3 supplies a stationary/moving determination indicating "stationary" to the area determining portion 203-2 and the area determining portion 203-3.

A stationary/moving determining portion 202-4 reads the pixel value of the pixel of frame #n−1 located at the same position as a designated pixel of frame #n in which the area to which the pixel belongs is determined, and reads the pixel value of the pixel of frame #n−2 located at the same position as the designated pixel of frame #n from the frame memory 201, and calculates the absolute value of the difference between the pixel values. The stationary/moving determining portion 202-4 determines whether the absolute value of the difference between the pixel value of frame #n−1 and the pixel value of frame #n−2 is greater than a preset threshold Th. If it is determined that the absolute value of the difference between the pixel values is greater than the threshold Th, a stationary/moving determination indicating "moving" is supplied to the area determining portion 203-3. If it is determined that the absolute value of the difference between the pixel value of the pixel of frame #n−1 and the pixel value of the pixel of frame #n−2 is smaller than or equal to the threshold Th, the stationary/moving determining portion 202-4 supplies a stationary/moving determination indicating "stationary" to the area determining portion 203-3.

When the stationary/moving determination supplied from the stationary/moving determining portion 202-1 indicates "stationary" and when the stationary/moving determination supplied from the stationary/moving determining portion 202-2 indicates "moving", the area determining portion 203-1 determines that the designated pixel of frame #n belongs to an uncovered background area, and sets "1", which indicates that the designated pixel belongs to an uncovered background area, in an uncovered-background-area determining flag associated with the designated pixel.

When the stationary/moving determination supplied from the stationary/moving determining portion 202-1 indicates "moving" or when the stationary/moving determination supplied from the stationary/moving determining portion 202-2 indicates "stationary", the area specifying unit 203-1 determines that the designated pixel of frame #n does not belong to an uncovered background area, and sets "0", which indicates that the designated pixel does not belong to an uncovered background area, in the uncovered-background-area determining flag associated with the designated pixel.

The area determining portion 203-1 supplies the uncovered-background-area determining flag in which "1" or "0" is set as discussed above to a determining-flag-storing frame memory 204.

When the stationary/moving determination supplied from the stationary/moving determining portion 202-2 indicates "stationary" and when the stationary/moving determination supplied from the stationary/moving determining portion 202-3 indicate "stationary", the area determining portion 203-2 determines that the designated pixel of frame #n belongs to the stationary area, and sets "1", which indicates that the pixel belongs to the stationary area, in a stationary-area determining flag associated with the designated pixel.

When the stationary/moving determination supplied from the stationary/moving determining portion 202-2 indicates "moving" or when the stationary/moving determination supplied from the stationary/moving determining portion 202-3 indicate "moving", the area determining portion 203-2 determines that the designated pixel of frame #n does not belong to the stationary area, and sets "0", which indicates that the pixel does not belong to the stationary area, in the stationary-area determining flag associated with the designated pixel.

The area determining portion 203-2 supplies the stationary-area determining flag in which "1" or "0" is set as discussed above to the determining-flag-storing frame memory 204.

When the stationary/moving determination supplied from the stationary/moving determining portion 202-2 indicates "moving" and when the stationary/moving determination supplied from the stationary/moving determining portion 202-3 indicate "moving", the area determining portion 203-2 determines that the designated pixel of frame #n belongs to the moving area, and sets "1", which indicates that the designated pixel belongs to the moving area, in a moving-area determining flag associated with the designated pixel.

When the stationary/moving determination supplied from the stationary/moving determining portion 202-2 indicates "stationary" or when the stationary/moving determination supplied from the stationary/moving determining portion 202-3 indicate "stationary", the area determining portion 203-2 determines that the designated pixel of frame #n does not belong to the moving area, and sets "0", which indicates that the pixel does not belong to the moving area, in the moving-area determining flag associated with the designated pixel.

The area determining portion 203-2 supplies the moving-area determining flag in which "1" or "0" is set as discussed above to the determining-flag-storing frame memory 204.

When the stationary/moving determination supplied from the stationary/moving determining portion 202-3 indicates "moving" and when the stationary/moving determination supplied from the stationary/moving determining portion 202-4 indicate "stationary", the area determining portion 203-3 determines that the designated pixel of frame #n belongs to a covered background area, and sets "1", which indicates that the designated pixel belongs to the covered background area, in a covered-background-area determining flag associated with the designated pixel.

When the stationary/moving determination supplied from the stationary/moving determining portion 202-3 indicates "stationary" or when the stationary/moving determination supplied from the stationary/moving determining portion 202-4 indicate "moving", the area determining portion 203-3 determines that the designated pixel of frame #n does not belong to a covered background area, and sets "0", which indicates that the designated pixel does not belong to a covered background area, in the covered-background-area determining flag associated with the designated pixel.

The area determining portion 203-3 supplies the covered-background-area determining flag in which "1" or "0" is set as discussed above to the determining-flag-storing frame memory 204.

The determining-flag-storing frame memory 204 thus stores the uncovered-background-area determining flag supplied from the area determining portion 203-1, the stationary-area determining flag supplied from the area determining portion 203-2, the moving-area determining flag supplied from the area determining portion 203-2, and the covered-background-area determining flag supplied from the area determining portion 203-3.

The determining-flag-storing frame memory 204 supplies the uncovered-background-area determining flag, the stationary-area determining flag, the moving-area determining flag, and the covered-background-area determining flag stored therein to a synthesizer 205. The synthesizer 205 generates area information indicating to which of the uncovered background area, the stationary area, the moving area, or the covered background area each pixel belongs based on the uncovered-background-area determining flag, the stationary-area determining flag, the moving-area determining flag, and the covered-background-area determining flag supplied from the determining-flag-storing frame memory 204, and supplies the area information to a determining-flag-storing frame memory 206.

The determining-flag-storing frame memory 206 stores the area information supplied from the synthesizer 205, and also outputs the area information stored therein.

An example of the processing performed by the area specifying unit 103 is described below with reference to FIGS. 28 through 32.

Figure 28:
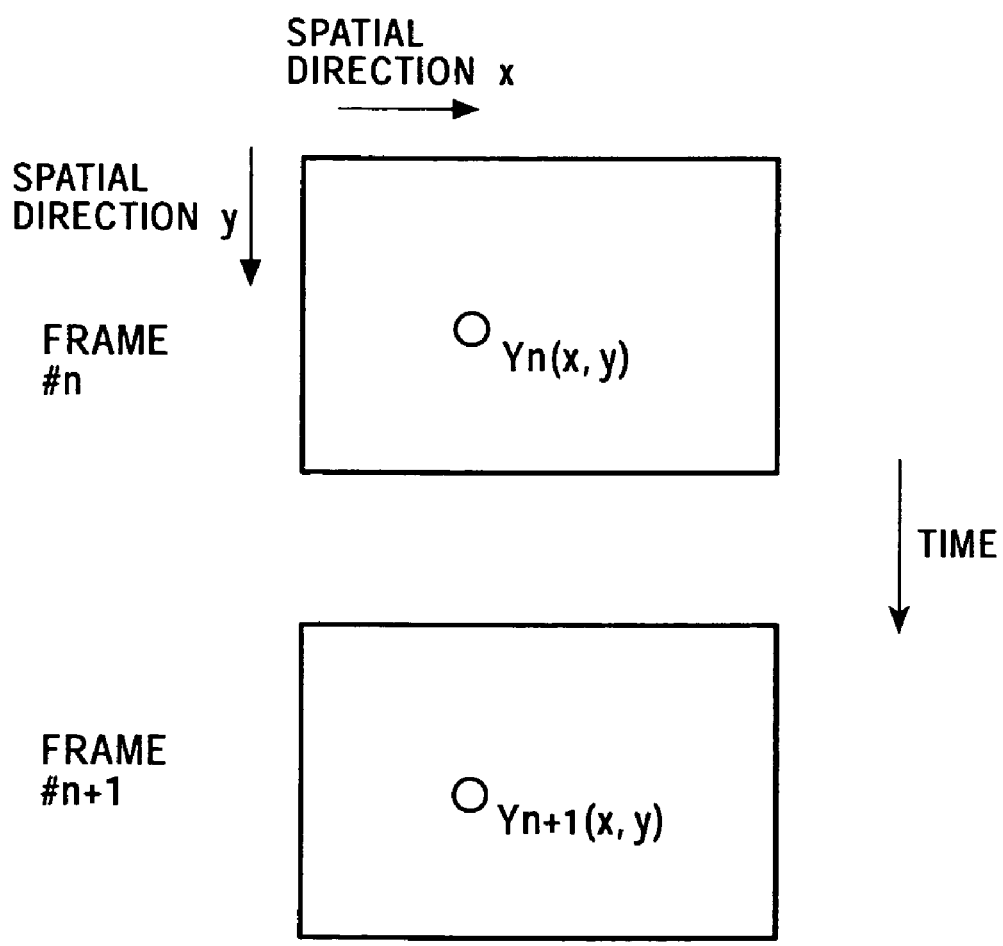
FIG. 28 illustrates an image when an object corresponding to a foreground is moving.

When the object corresponding to the foreground is moving, the position of the image corresponding to the object on the screen changes in every frame. As shown in FIG. 28, the image corresponding to the object located at the position indicated by Yn(x,y) in frame #n is positioned at Yn+1(x,y) in frame #n+1, which is subsequent to frame #n.

A model obtained by expanding in the time direction the pixel values of the pixels aligned side-by-side in the moving direction of the image corresponding to the foreground object is shown in FIG. 22. For example, if the moving direction of the image corresponding to the foreground object is horizontal with respect to the screen, the model shown in FIG. 29 is a model obtained by expanding in the time direction the pixel values of the pixels disposed on a line side-by-side.

Figure 29:
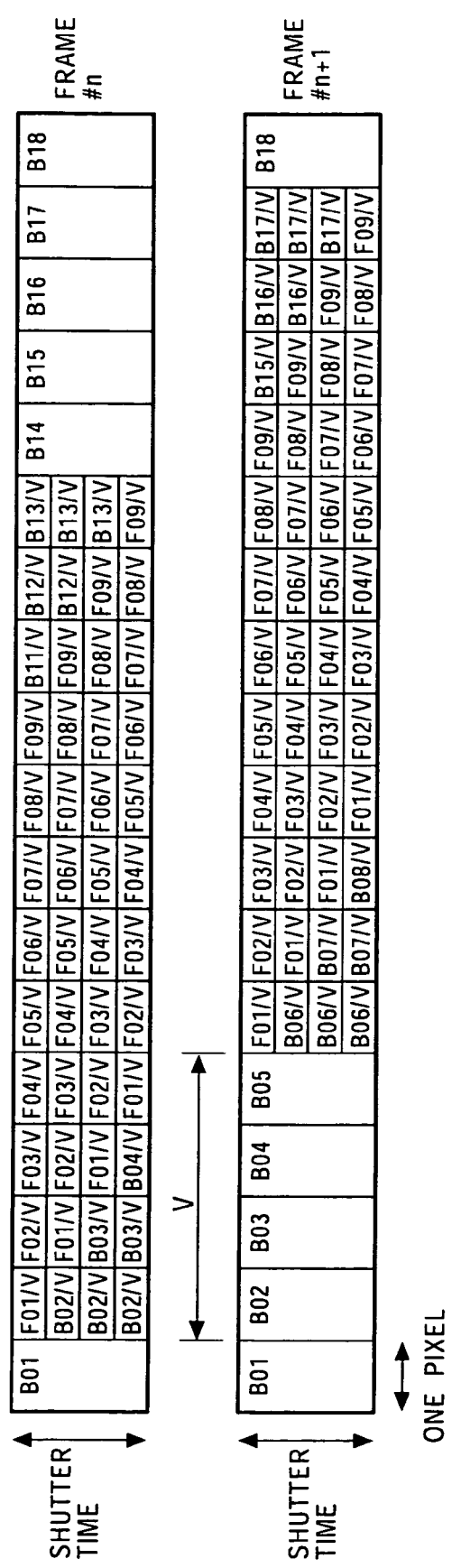
FIG. 29 illustrates a model in which pixel values are expanded in the time direction and the period corresponding to the shutter time is divided.

In FIG. 29, the line in frame #n is equal to the line in frame #n+1.

The foreground components corresponding to the object contained in the second pixel to the thirteenth pixel from the left in frame #n are contained in the sixth pixel through the seventeenth pixel from the left in frame #n+1.

In frame #n, the pixels belonging to the covered background area are the eleventh through thirteenth pixels from the left, and the pixels belonging to the uncovered background area are the second through fourth pixels from the left. In frame #n+1, the pixels belonging to the covered background area are the fifteenth through seventeenth pixels from the left, and the pixels belonging to the uncovered background area are the sixth through eighth pixels from the left.

In the example shown in FIG. 29, since the foreground components contained in frame #n are moved by four pixels in frame #n+1, the amount of movement v is 4. The number of virtual divided portions is 4 in accordance with the amount of movement v.

A description is now given of a change in pixel values of the pixels belonging to the mixed area in the frames before and after a designated frame.

Figure 30:
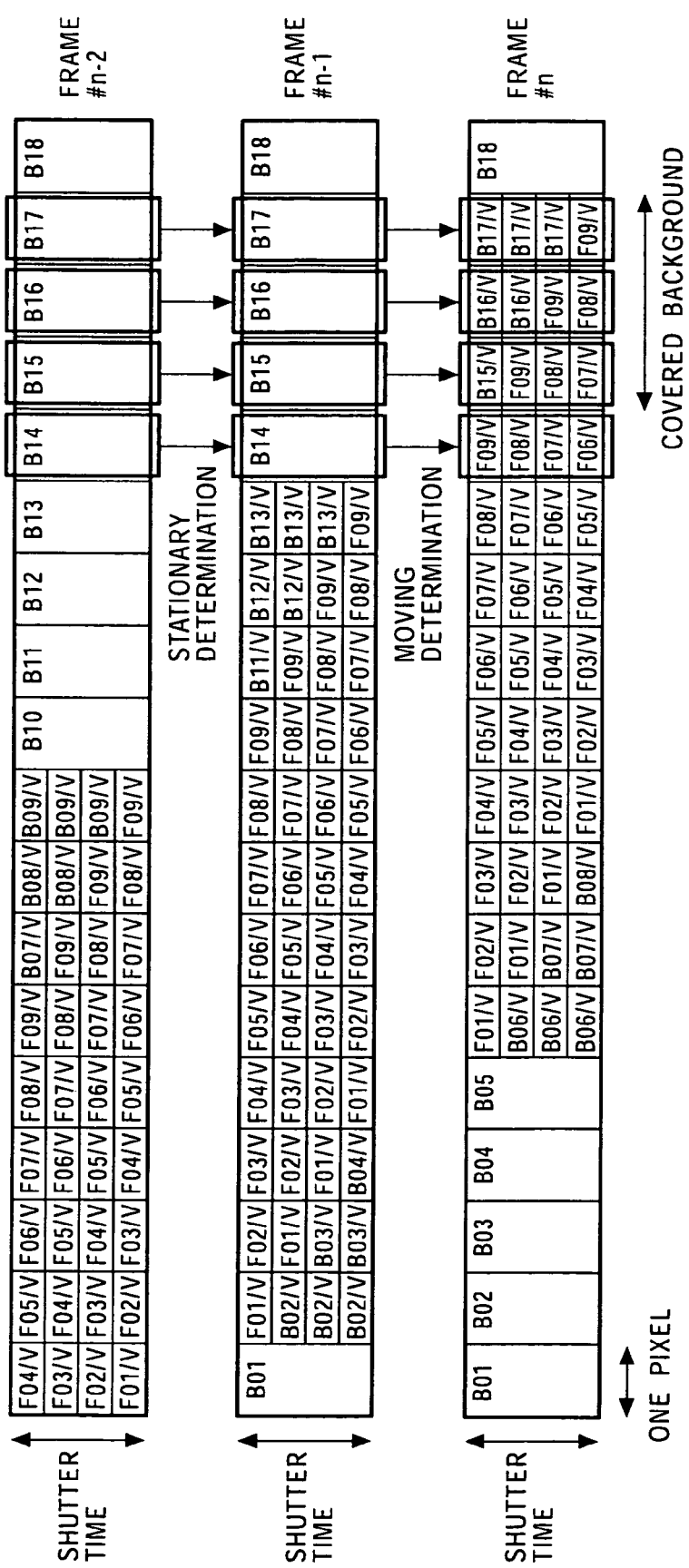
FIG. 30 illustrates a model in which pixel values are expanded in the time direction and the period corresponding to the shutter time is divided.

In FIG. 30, the pixels belonging to a covered background area in frame #n in which the background is stationary and the amount of movement v in the foreground is 4 are the fifteenth through seventeenth pixels from the left. Since the amount of movement v is 4, the fifteenth through seventeenth frames from the left in the previous frame #n−1 contain only background components and belong to the background area. The fifteenth through seventeenth pixels from the left in frame #n−2, which is one before frame #n−1, contain only background components and belong to the background area.

Since the object corresponding to the background is stationary, the pixel value of the fifteenth pixel from the left in frame #n−1 does not change from the pixel value of the fifteenth pixel from the left in frame #n−2. Similarly, the pixel value of the sixteenth pixel from the left in frame #n−1 does not change from the pixel value of the sixteenth pixel from the left in frame #n−2, and the pixel value of the seventeenth pixel from the left in frame #n−1 does not change from the pixel value of the seventeenth pixel from the left in frame #n−2.

That is, the pixels in frame #n−1 and frame #n−2 corresponding to the pixels belonging to the covered background area in frame #n consist of only background components, and the pixel values thereof do not change. Accordingly, the absolute value of the difference between the pixel values is almost 0. Thus, the stationary/moving determination made for the pixels in frame #n−1 and frame #n−2 corresponding to the pixels belonging to the mixed area in frame #n by the stationary/moving determining portion 202-4 is "stationary".

Since the pixels belonging to the covered background area in frame #n contain foreground components, the pixel values thereof are different from those of frame #n−1 consisting of only background components. Accordingly, the stationary/moving determination made for the pixels belonging to the mixed area in frame #n and the corresponding pixels in frame #n−1 by the stationary/moving determining portion 202-3 is "moving".

When the stationary/moving determination result indicating "moving" is supplied from the stationary/moving determining portion 202-3, and when the stationary/moving determination result indicating "stationary" is supplied from the stationary/moving determining portion 202-4, as discussed above, the area determining portion 203-3 determines that the corresponding pixels belong to a covered background area.

Figure 31:
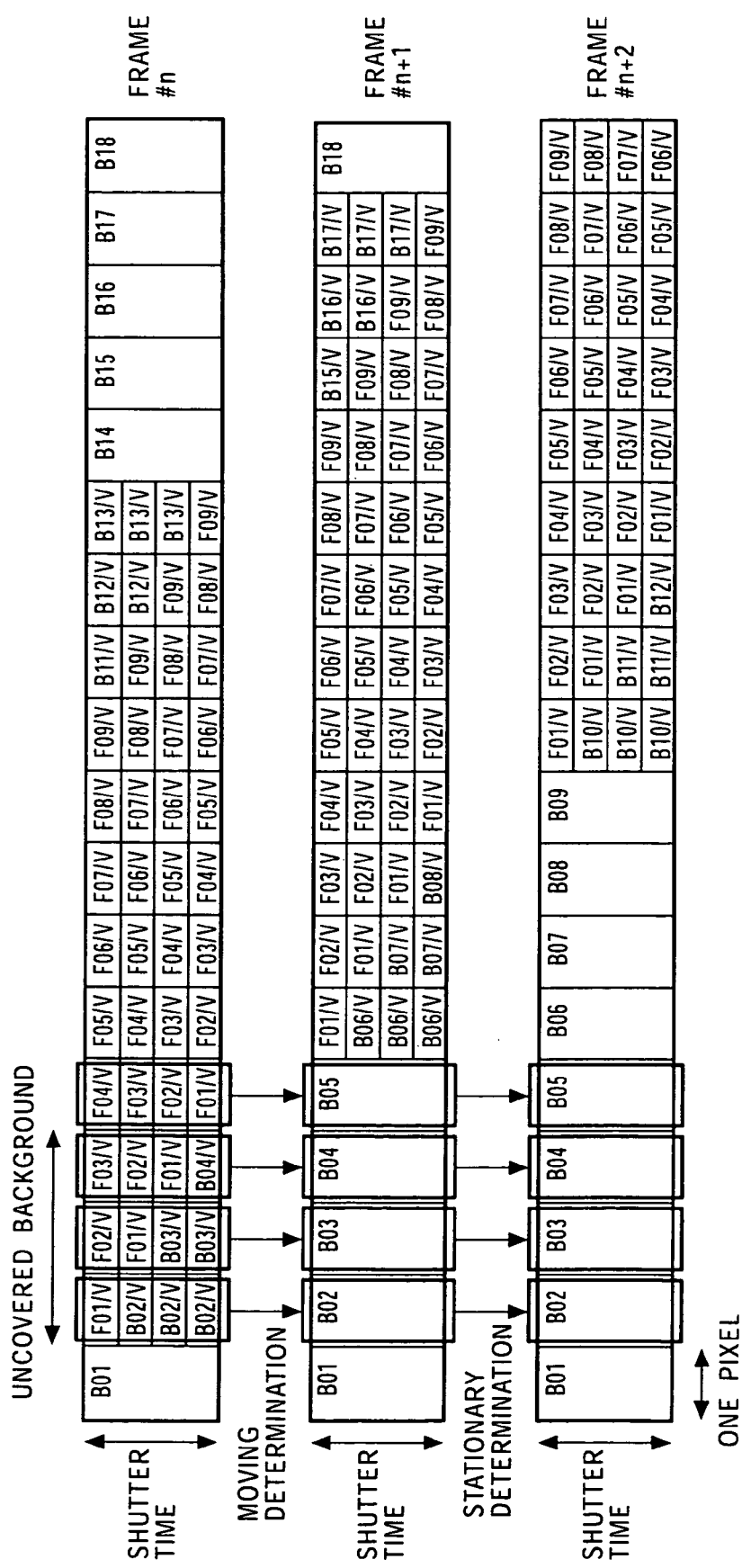
FIG. 31 illustrates a model in which pixel values are expanded in the time direction and the period corresponding to the shutter time is divided.

In FIG. 31, in frame #n in which the background is stationary and the amount of movement v in the foreground is 4, the pixels contained in an uncovered background area are the second through fourth pixels from the left. Since the amount of movement v is 4, the second through fourth pixels from the left in the subsequent frame #n+1 contain only background components and belong to the background area. In frame #n+2, which is subsequent to frame #n+1, the second through fourth pixels from the left contain only background components and belong to the background area.

Since the object corresponding to the background is stationary, the pixel value of the second pixel from the left in frame #n+2 does not change from the pixel value of the second pixel from the left in frame #n+1. Similarly, the pixel value of the third pixel from the left in frame #n+2 does not change from the pixel value of the third pixel from the left in frame #n+1, and the pixel value of the fourth pixel from the left in frame #n+2 does not change from the pixel value of the fourth pixel from the left in frame #n+1.

That is, the pixels in frame #n+1 and frame #n+2 corresponding to the pixels belonging to the uncovered background area in frame #n consist of only background components, and the pixel values thereof do not change. Accordingly, the absolute value of the difference between the pixel values is almost 0. Thus, the stationary/moving determination made for the pixels in frame #n+1 and frame #n+2 corresponding to the pixels belonging to the mixed area in frame #n by the stationary/moving determining portion 202-1 is "stationary".

Since the pixels belonging to the uncovered background area in frame #n contain foreground components, the pixel values thereof are different from those of frame #n+1 consisting of only background components. Accordingly, the stationary/moving determination made for the pixels belonging to the mixed area in frame #n and the corresponding pixels in frame #n+1 by the stationary/moving determining portion 202-2 is "moving".

When the stationary/moving determination result indicating "moving" is supplied from the stationary/moving determining portion 202-2, and when the stationary/moving determination result indicating "stationary" is supplied from the stationary/moving determining portion 202-1, as discussed above, the area determining portion 203-1 determines that the corresponding pixels belong to an uncovered background area.

FIG. 32 illustrates determination conditions for frame #n made by the area specifying unit 103. When the determination result for the pixel in frame #n−2 located at the same image position as a pixel in frame #n to be processed and for the pixel in frame #n−1 located at the same position as the pixel in frame #n is stationary, and when the determination result for the pixel in frame #n and the pixel in frame #n−1 located at the same image position as the pixel in frame #n is moving, the area specifying unit 103 determines that the pixel in frame #n belongs to a covered background area.

When the determination result for the pixel in frame #n and the pixel in frame #n−1 located at the same image position as the pixel in frame #n is stationary, and when the determination result for the pixel in frame #n and the pixel in frame #n+1 located at the same image position as the pixel in frame #n is stationary, the area specifying unit 103 determines that the pixel in frame #n belongs to the stationary area.

When the determination result for the pixel in frame #n and the pixel in frame #n−1 located at the same image position as the pixel in frame #n is moving, and when the determination result for the pixel in frame #n and the pixel in frame #n+1 located at the same image position as the pixel in frame #n is moving, the area specifying unit 103 determines that the pixel in frame #n belongs to the moving area.

When the determination result for the pixel in frame #n and the pixel in frame #n+1 located at the same image position as the pixel in frame #n is moving, and when the determination result for the pixel in frame #n+1 located at the same image position as the pixel in frame #n and the pixel in frame #n+2 located at the same image position as the pixel in frame #n is stationary, the area specifying unit 103 determines that the pixel in frame #n belongs to an uncovered background area.

Figure 33A:
FIG. 33A illustrates an example of the result obtained by specifying the area by the area specifying unit 103.
Figure 33B:
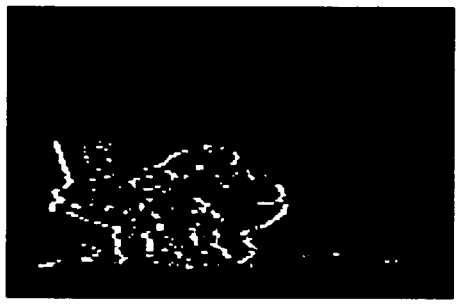
FIG. 33B illustrates an example of the result obtained by specifying the area by the area specifying unit 103.

FIGS. 33A through 33D illustrate examples of the area determination results obtained by the area specifying unit 103. In FIG. 33A, the pixels which are determined to belong to a covered background area are indicated in white. In FIG.

33B, the pixels which are determined to belong to an uncovered background area are indicated in white.

Figure 33C:
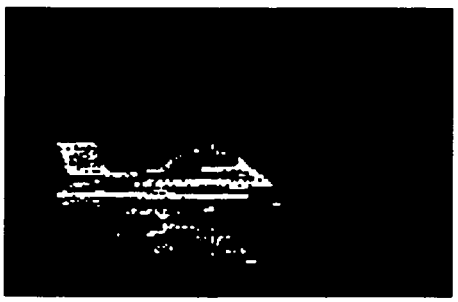
FIG. 33C illustrates an example of the result obtained by specifying the area by the area specifying unit 103.
Figure 33D:
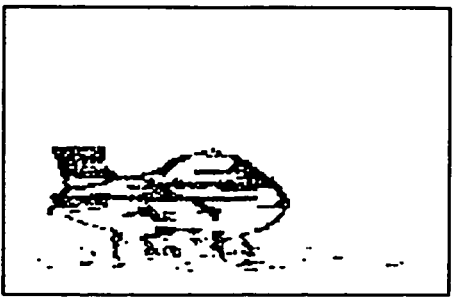
FIG. 33D illustrates an example of the result obtained by specifying the area by the area specifying unit 103.

In FIG. 33C, the pixels which are determined to belong to a moving area are indicated in white. In FIG. 33D, the pixels which are determined to belong to a stationary area are indicated in white.

Figure 34:
FIG. 34 illustrates an example of the result obtained by specifying the area by the area specifying unit 103.

FIG. 34 illustrates the area information indicating the mixed area, in the form of an image, selected from the area information output from the determining-flag-storing frame memory 206. In FIG. 34, the pixels which are determined to belong to the covered background area or the uncovered background area, i.e., the pixels which are determined to belong to the mixed area, are indicated in white. The area information indicating the mixed area output from the determining-flag-storing frame memory 206 designates the mixed area and the portions having a texture surrounded by the portions without a texture in the foreground area.

Figure 35:
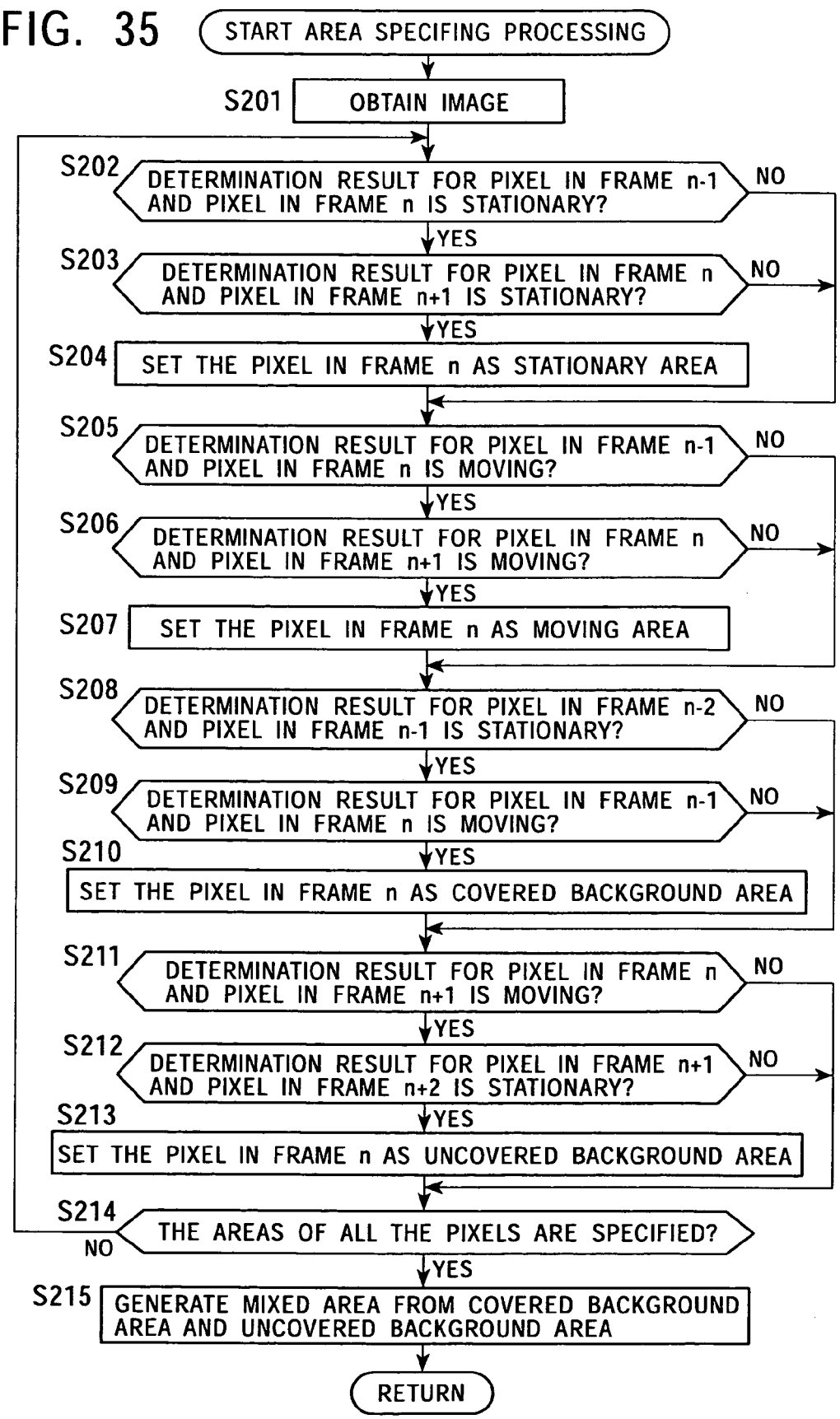
FIG. 35 is a flowchart illustrating the area specifying processing.

The area specifying processing performed by the area specifying unit 103 is described below with reference to the flowchart of FIG. 35. In step S201, the frame memory 201 obtains an image of frame #n−2 through frame #n+2 including frame #n.

In step S202, the stationary/moving determining portion 202-3 determines whether the determination result for the pixel in frame #n−1 and the pixel in frame #n located at the same position is stationary. If it is determined that the determination result is stationary, the process proceeds to step S203 in which the stationary/moving determining portion 202-2 determines whether the determination result for the pixel in frame #n and the pixel in frame #n+1 located at the same position is stationary.

If it is determined in step S203 that the determination result for the pixel in frame #n and the pixel in frame #n+1 located at the same position is stationary, the process proceeds to step S204. In step S204, the area determining portion 203-2 sets "1", which indicates that the pixel to be processed belongs to the stationary area, in the stationary-area determining flag associated with the pixel to be processed. The area determining portion 203-2 supplies the stationary-area determining flag to the determining-flag-storing frame memory 204, and the process proceeds to step S205.

If it is determined in step S202 that the determination result for the pixel in frame #n−1 and the pixel in frame #n located at the same position is moving, or if it is determined in step S203 that the determination result for the pixel in frame #n and the pixel in frame #n+1 located at the same position is moving, the pixel to be processed does not belong to a stationary area. Accordingly, the processing of step S204 is skipped, and the process proceeds to step S205.

In step S205, the stationary/moving determining portion 202-3 determines whether the determination result for the pixel in frame #n−1 and the pixel in frame #n located at the same position is moving. If it is determined that the determination result is moving, the process proceeds to step S206 in which the stationary/moving determining portion 202-2 determines whether the determination result for the pixel in frame #n and the pixel in frame #n+1 located at the same position is moving.

If it is determined in step S206 that the determination result for the pixel in frame #n and the pixel in frame #n+1 located at the same position is moving, the process proceeds to step S207. In step S207, the area determining portion 203-2 sets "1", which indicates that the pixel to be processed belongs to a moving area, in the moving-area determining flag associated with the pixel to be processed. The area determining area 203-2 supplies the moving-area determining flag to the determining-flag-storing frame memory 204, and the process proceeds to step S208.

If it is determined in step S205 that the determination result for the pixel in frame #n−1 and the pixel in frame #n located at the same position is stationary, or if it is determined in step S206 that the determination result for the pixel in frame #n and the pixel in frame #n+1 located at the same position is stationary, the pixel in frame #n does not belong to a moving area. Accordingly, the processing of step S207 is skipped, and the process proceeds to step S208.

In step S208, the stationary/moving determining portion 202-4 determines whether the determination result for the pixel in frame #n−2 and the pixel in frame #n−1 located at the same position is stationary. If it is determined that the determination result is stationary, the process proceeds to step S209 in which the stationary/moving determining portion 202-3 determines whether the determination result for the pixel in frame #n−1 and the pixel in frame #n located at the same position is moving.

If it is determined in step S209 that the determination result for the pixel in frame #n−1 and the pixel in frame #n located at the same position is moving, the process proceeds to step S210. In step S210, the area determining portion 203-3 sets "1", which indicates that the pixel to be processed belongs to a covered background area, in the covered-background-area determining flag associated with the pixel to be processed. The area determining portion 203-3 supplies the covered-background-area determining flag to the determining-flag-storing frame memory 204, and the process proceeds to step S211. The area determining portion 203-3 supplies the covered-background-area determining flag to the determining-flag-storing frame memory 204, and the process proceeds to step S211.

If it is determined in step S208 that the determination result for the pixel in frame #n−2 and the pixel in frame #n−1 located at the same position is moving, or if it is determined in step S209 that the pixel in frame #n−1 and the pixel in frame #n located at the same position is stationary, the pixel in frame #n does not belong to a covered background area. Accordingly, the processing of step S210 is skipped, and the process proceeds to step S211.

In step S211, the stationary/moving determining portion 202-2 determines whether the determination result for the pixel in frame #n and the pixel in frame #n+1 located at the same position is moving. If it is determined in step S211 that the determination result is moving, the process proceeds to step S212 in which the stationary/moving determining portion 202-1 determines whether the determination result for the pixel in frame #n+1 and the pixel in frame #n+2 located at the same position is stationary.

If it is determined in step S212 that the determination result for the pixel in frame #n+1 and the pixel in frame #n+2 located at the same position is stationary, the process proceeds to step S213. In step S213, the area determining portion 203-1 sets "1", which indicates that the pixel to be processed belongs to an uncovered background area, in the uncovered-background-area determining flag associated with the pixel to be processed. The area determining portion 203-1 supplies the uncovered-background-flag determining flag to the determining-flag-storing frame memory 204, and the process proceeds to step S214.

If it is determined in step S211 that the determination result for the pixel in frame #n and the pixel in frame #n+1 located at the same position is stationary, or if it is determined in step S212 that the determination result for the pixel in frame #n+1 and the pixel in frame #n+2 is moving, the pixel in frame #n does not belong to an uncovered background area. Accordingly, the processing of step S213 is skipped, and the process proceeds to step S214.

In step S214, the area specifying unit 103 determines whether the areas of all the pixels in frame #n are specified. If it is determined that the areas of all the pixels in frame #n are not yet specified, the process returns to step S202, and the area specifying processing is repeated for the remaining pixels.

If it is determined in step S214 that the areas of all the pixels in frame #n are specified, the process proceeds to step S215. In step S215, the synthesizer 215 generates area information indicating the mixed area based on the uncovered-background-area determining flag and the covered-background-area determining flag stored in the determining-flag-storing frame memory 204, and also generates area information indicating to which of the uncovered background area, the stationary area, the moving area, or the covered background area each pixel belongs, and sets the generated area information in the determining-flag-storing frame memory 206. The processing is then completed.

As discussed above, the area specifying unit 103 is capable of generating area information indicating to which of the moving area, the stationary area, the uncovered background area, or the covered background area each of the pixels contained in a frame belongs.

The area specifying unit 103 may apply logical OR to the area information corresponding to the uncovered background area and the area information corresponding to the covered background area so as to generate area information corresponding to the mixed area, and then may generate area information consisting of flags indicating to which of the moving area, the stationary area, or the mixed area the individual pixels contained in the frame belong.

When the object corresponding to the foreground has a texture, the area specifying unit 103 is able to specify the moving area more precisely.

The area specifying unit 103 is able to output the area information indicating the moving area as the area information indicating the foreground area, and outputs the area information indicating the stationary area as the area information indicating the background area.

The embodiment has been described, assuming that the object corresponding to the background is stationary. However, the above-described area specifying processing can be applied even if the image corresponding to the background area contains motion. For example, if the image corresponding to the background area is uniformly moving, the area specifying unit 103 shifts the overall image in accordance with this motion, and performs processing in a manner similar to the case in which the object corresponding to the background is stationary. If the image corresponding to the background area contains locally different motions, the area specifying unit 103 selects the pixels corresponding to the motions, and executes the above-described processing.

Figure 36:
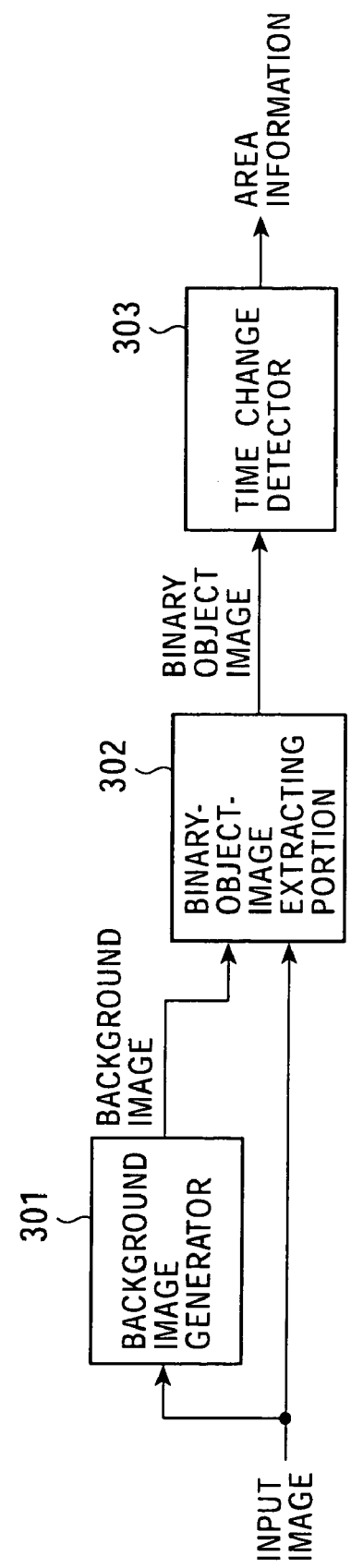
FIG. 36 is a block diagram illustrating another example of the configuration of the area specifying unit 103.

FIG. 36 is a block diagram illustrating another example of the configuration of the area specifying unit 103. The area specifying unit 103 shown in FIG. 36 does not use a motion vector. A background image generator 301 generates a background image corresponding to an input image, and supplies the generated background image to a binary-object-image extracting portion 302. The background image generator 301 extracts, for example, an image object corresponding to a background object contained in the input image, and generates the background image.

Figure 37:
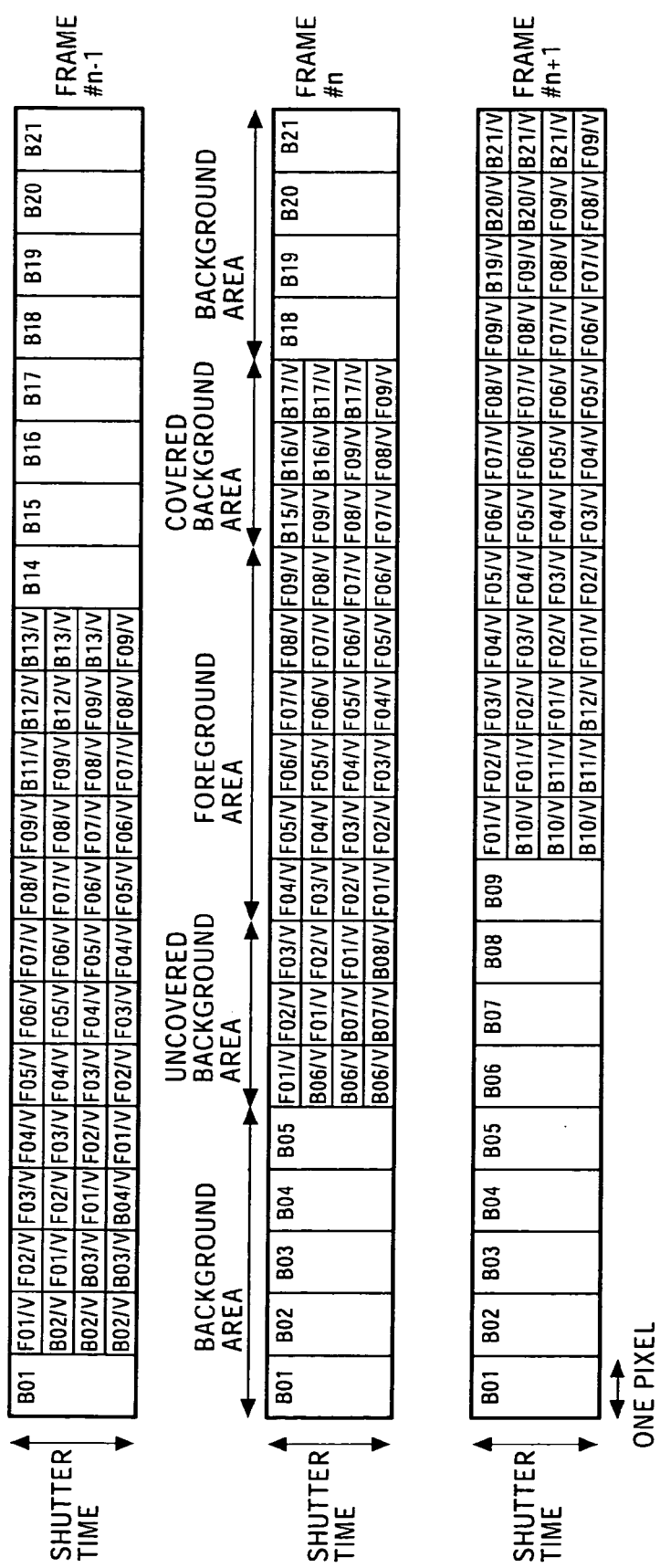
FIG. 37 illustrates a model in which pixel values are expanded in the time direction and the period corresponding to the shutter time is divided.

An example of a model obtained by expanding in the time direction the pixel values of pixels aligned side-by-side in the moving direction of an image corresponding to a foreground object is shown in FIG. 37. For example, if the moving direction of the image corresponding to the foreground object is horizontal with respect to the screen, the model shown in FIG. 37 is a model obtained by expanding the pixel values of pixels disposed side-by-side on a single line in the time domain.

In FIG. 37, the line in frame #n is the same as the line in frame #n−1 and the line in frame #n+1.

In frame #n, the foreground components corresponding to the object contained in the sixth through seventeenth pixels from the left are contained in the second through thirteenth pixels from the left in frame #n−1 and are also contained in the tenth through twenty-first pixel from the left in frame #n+1.

In frame #n−1, the pixels belonging to the covered background area are the eleventh through thirteenth pixels from the left, and the pixels belonging to the uncovered background area are the second through fourth pixels from the left. In frame #n, the pixels belonging to the covered background area are the fifteenth through seventeenth pixels from the left, and the pixels belonging to the uncovered background area are the sixth through eighth pixels from the left. In frame #n+1, the pixels belonging to the covered background area are the nineteenth through twenty-first pixels from the left, and the pixels belonging to the uncovered background area are the tenth through twelfth pixels from the left.

In frame #n−1, the pixels belonging to the background area are the first pixel from the left, and the fourteenth through twenty-first pixels from the left. In frame #n, the pixels belonging to the background area are the first through fifth pixels from the left, and the eighteenth through twenty-first pixels from the left. In frame #n+1, the pixels belonging to the background area are the first through ninth pixels from the left.

Figure 38:
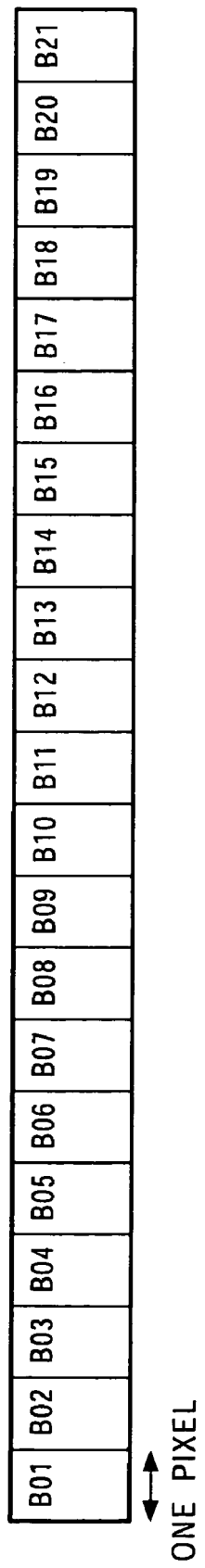
FIG. 38 illustrates an example of a background image.

An example of the background image corresponding to the example shown in FIG. 37 generated by the background image generator 301 is shown in FIG. 38. The background image consists of the pixels corresponding to the background object, and does not contain image components corresponding to the foreground object.

The binary-object-image extracting portion 302 generates a binary object image based on the correlation between the background image and the input image, and supplies the generated binary object image to a time change detector 303.

Figure 39:
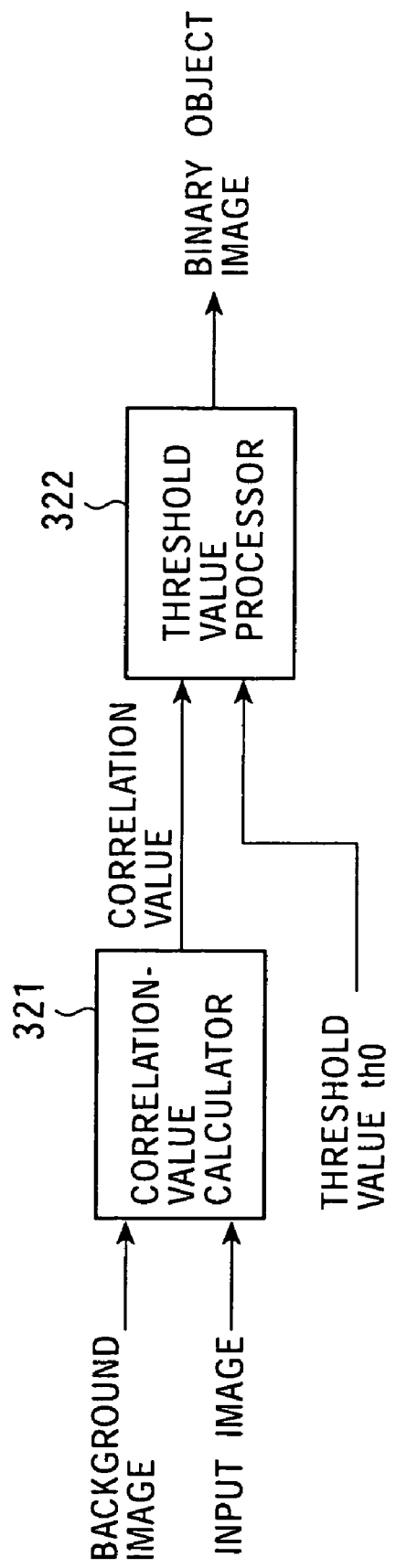
FIG. 39 is a block diagram illustrating the configuration of a binary-object-image extracting portion 302.

FIG. 39 is a block diagram illustrating the configuration of the binary-object-image extracting portion 302. A correlation-value calculator 321 calculates the correlation between the background image supplied from the background image generator 301 and the input image so as to generate a correlation value, and supplies the generated correlation value to a threshold-value processor 322.

The correlation-value calculator 321 applies equation (4) to, for example, a 3×3-background image block having $X_4$ at the center, as shown in FIG. 40A, and to, for example, a 3×3-background image block having $Y_4$ at the center which corresponds to the background image block, as shown in FIG. 40B, thereby calculating a correlation value corresponding to $Y_4$.

$$\text{Correlation value} = \frac{\sum_{i=0}^{8}(Xi - \overline{X})\sum_{i=0}^{8}(Yi - \overline{Y})}{\sqrt{\sum_{i=0}^{8}(Xi - \overline{X})^2 \cdot \sum_{i=0}^{8}(Yi - \overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation-value calculator 321 supplies the correlation value calculated for each pixel as discussed above to the threshold-value processor 322.

Alternatively, the correlation-value calculator 321 may apply equation (7) to, for example, a 3×3-background image block having $X_4$ at the center, as shown in FIG. 41A, and to, for example, a 3×3-background image block having $Y_4$ at the center which corresponds to the background image block, as shown in FIG. 41B, thereby calculating the sum of absolute values of differences corresponding to $Y_4$.

$$\text{Sum of absolute values of differences} = \sum_{i=0}^{8} |(Xi - Yi)| \quad (7)$$

The correlation-value calculator 321 supplies the sum of the absolute values of the differences calculated as described above to the threshold-value processor 322 as the correlation value.

The threshold-value processor 322 compares the pixel value of the correlation image with a threshold value th0. If the correlation value is smaller than or equal to the threshold value th0, 1 is set in the pixel value of the binary object image. If the correlation value is greater than the threshold value th0, 0 is set in the pixel value of the binary object image. The threshold-value processor 322 then outputs the binary object image whose pixel value is set to 0 or 1. The threshold-value processor 322 may store the threshold value th0 therein in advance, or may use the threshold value th0 input from an external source.

Figure 42:
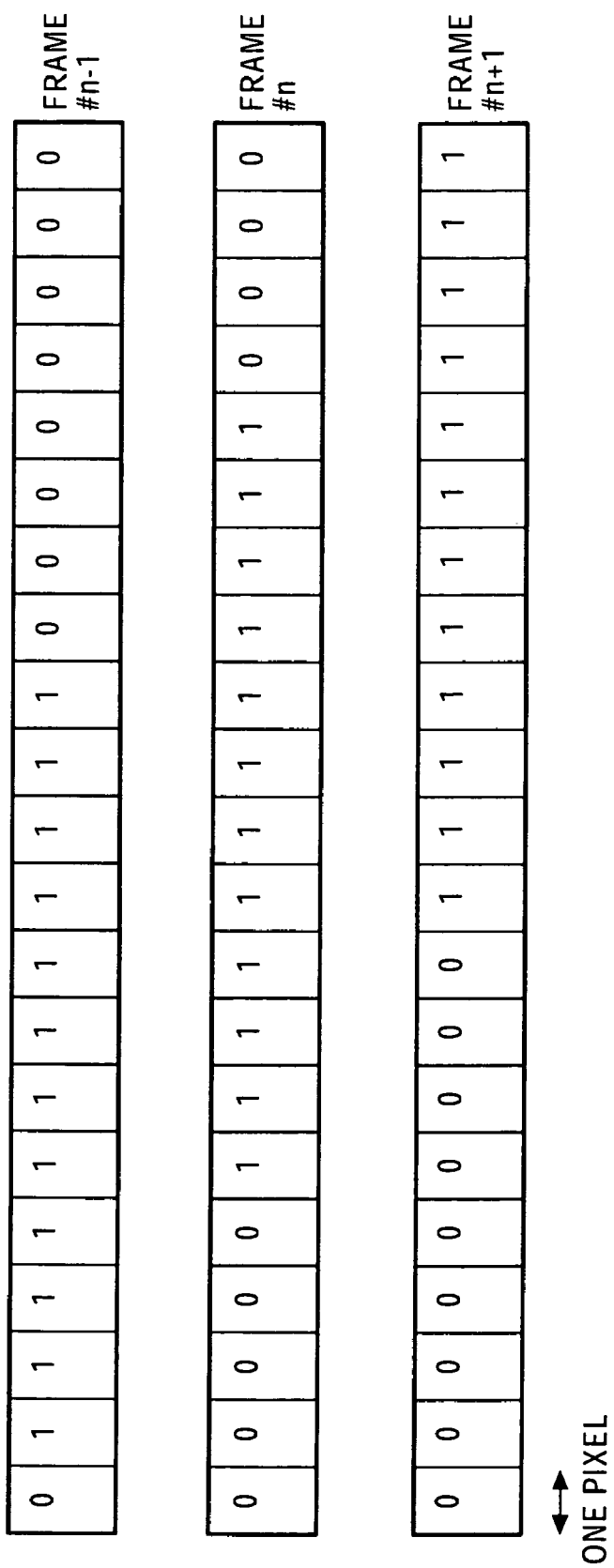
FIG. 42 illustrates an example of a binary object image.

FIG. 42 illustrates the binary object image corresponding to the model of the input image shown in FIG. 37. In the binary object image, 0 is set in the pixel values of the pixels each having a higher correlation with the background image.

Figure 43:
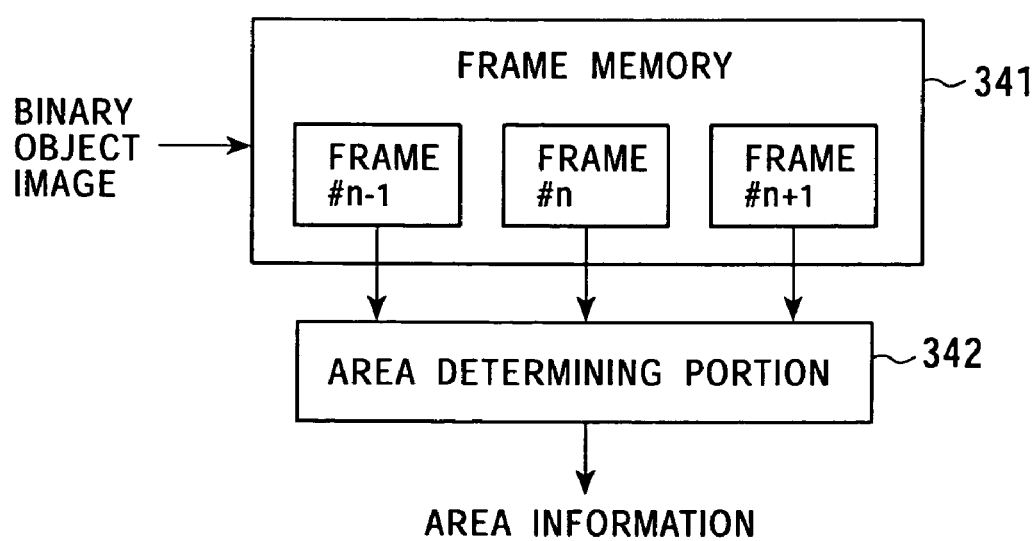
FIG. 43 is a block diagram illustrating the configuration of a time change detector 303.

FIG. 43 is a block diagram illustrating the configuration of the time change detector 303. When determining the area of a pixel in frame #n, a frame memory 341 stores a binary object image of frame #n−1 frame #n, and frame #n+1 supplied from the binary-object-image extracting portion 302.

An area determining portion 342 determines the area of each pixel of frame #n based on the binary object image of frame #n−1, frame #n, and frame #n+1 so as to generate area information, and outputs the generated area information.

FIG. 44 illustrates the determinations made by the area determining portion 342. When the designated pixel of the binary object image in frame #n is 0, the area determining portion 342 determines that the designated pixel in frame #n belongs to the background area.

When the designated pixel of the binary object image in frame #n is 1, and when the corresponding pixel of the binary object image in frame #n−1 is 1, and when the corresponding pixel of the binary object image in frame #n+1 is 1, the area determining portion 342 determines that the designated pixel in frame #n belongs to the foreground area.

When the designated pixel of the binary object image in frame #n is 1, and when the corresponding pixel of the binary object image in frame #n−1 is 0, the area determining portion 342 determines that the designated pixel in frame #n belongs to a covered background area.

When the designated pixel of the binary object image in frame #n is 1, and when the corresponding pixel of the binary object image in frame #n+1 is 0, the area determining portion 342 determines that the designated pixel in frame #n belongs to an uncovered background area.

Figure 45:
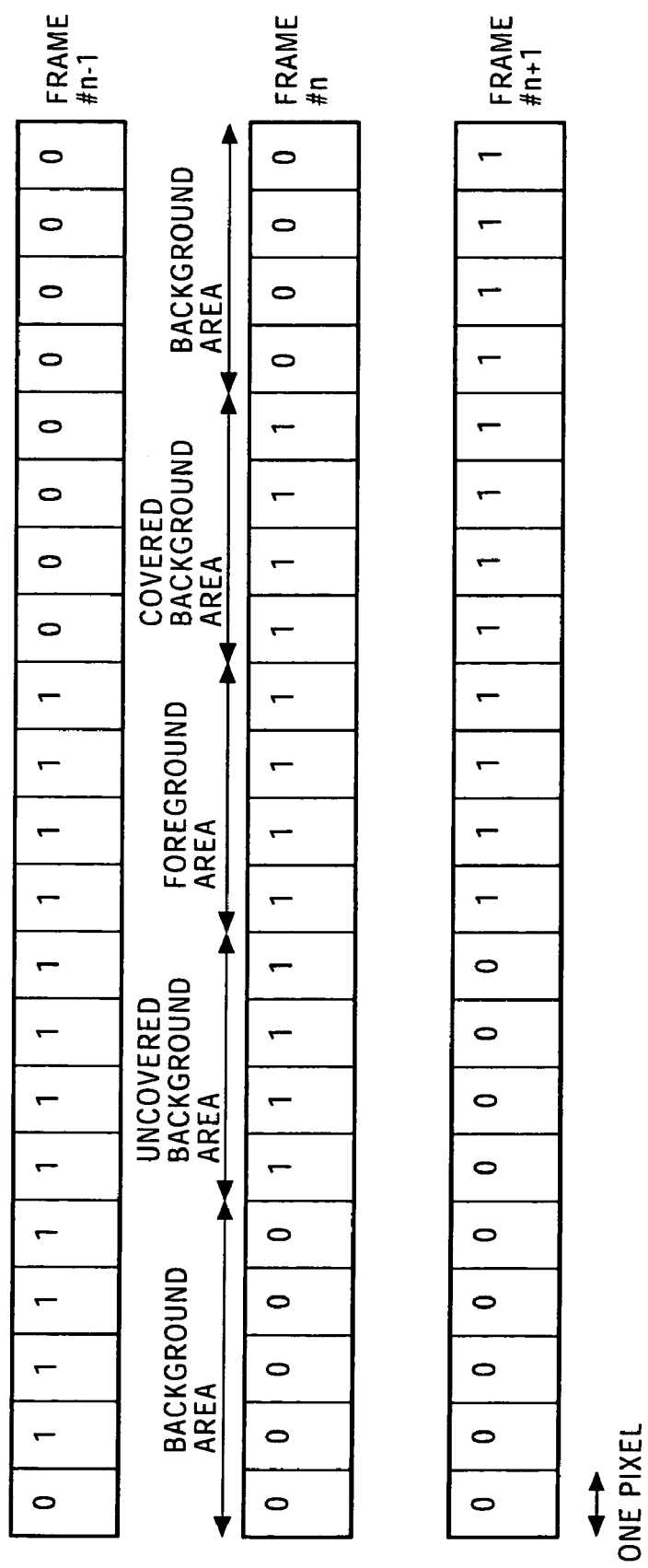
FIG. 45 illustrates an example of determinations made by the time change detector 303.

FIG. 45 illustrates an example of the determinations made by the time change detector 303 on the binary object image corresponding to the model of the input image shown in FIG. 37. The time change detector 303 determines that the first through fifth pixels from the left in frame. #n belong to the background area since the corresponding pixels of the binary object image in frame #n are 0.

The time change detector 303 determines that the sixth through ninth pixels from the left belong to the uncovered background area since the pixels of the binary object image in frame #n are 1, and the corresponding pixels in frame #n+1 are 0.

The time change detector 303 determines that the tenth through thirteenth pixels from the left belong to the foreground area since the pixels of the binary object image in frame #n are 1, the corresponding pixels in frame #n−1 are 1, and the corresponding pixels in frame #n+1 are 1.

The time change detector 303 determines that the fourteenth through seventeenth pixels from the left belong to the covered background area since the pixels of the binary object image in frame #n are 1, and the corresponding pixels in frame #n−1 are 0.

The time change detector 303 determines that the eighteenth through twenty-first pixels from the left belong to the background area since the corresponding pixels of the binary object image in frame #n are 0.

Figure 46:
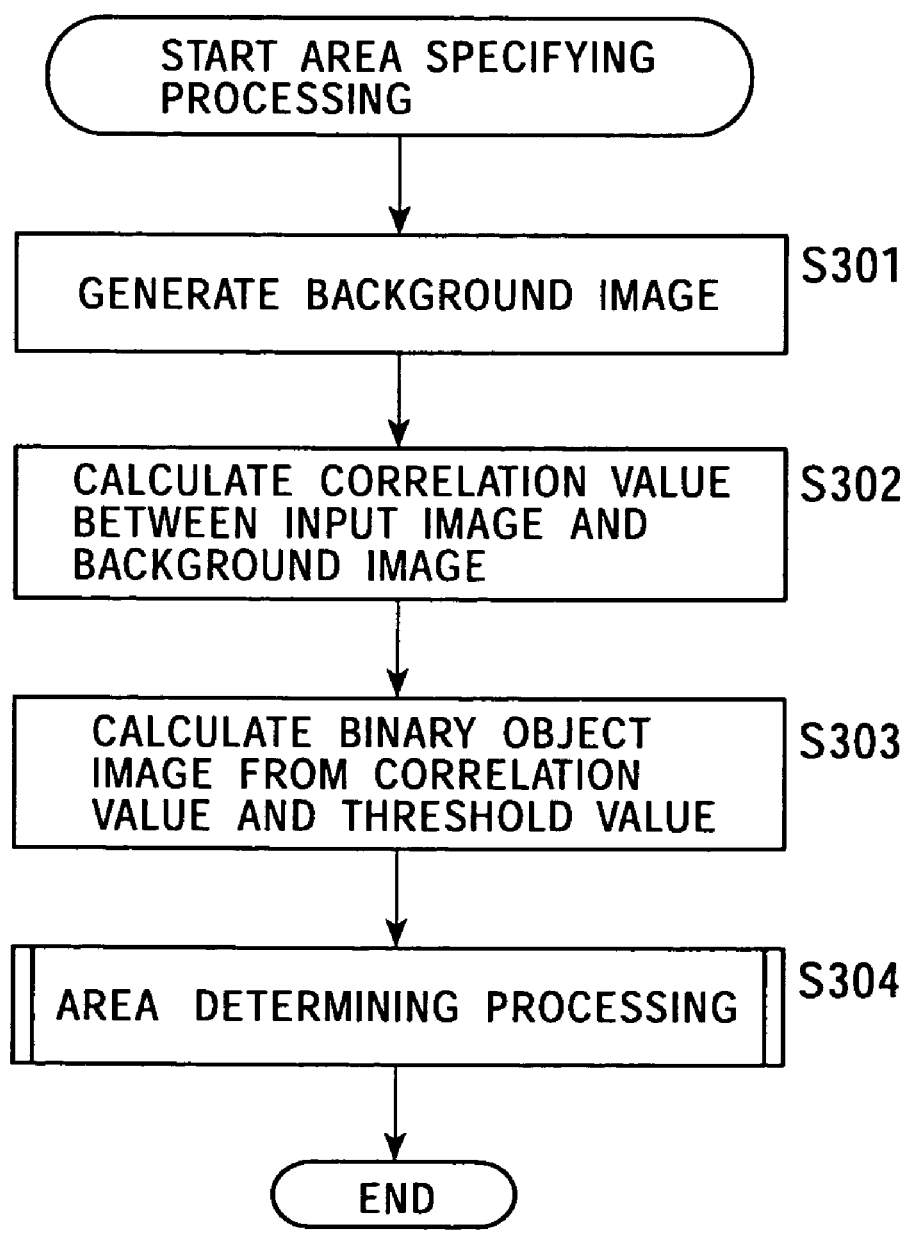
FIG. 46 is a flowchart illustrating the area specifying processing performed by the area specifying unit 103.

The area specifying processing performed by the area specifying unit 103 is described below with reference to the flowchart of FIG. 46. In step S301, the background image generator 301 of the area specifying unit 103 extracts, for example, an image object corresponding to a background object contained in an input image based on the input image so as to generate a background image, and supplies the generated background image to the binary-object-image extracting portion 302.

In step S302, the binary-object-image extracting portion 302 calculates a correlation value between the input image and the background image supplied from the background image generator 301 according to, for example, calculation discussed with reference to FIGS. 40A and 40B. In step S303, the binary-object-image extracting portion 302 computes a binary object image from the correlation value and the threshold value th0 by, for example, comparing the correlation value with the threshold value th0.

In step S304, the time change detector 303 executes the area determining processing, and the processing is completed.

Figure 47:
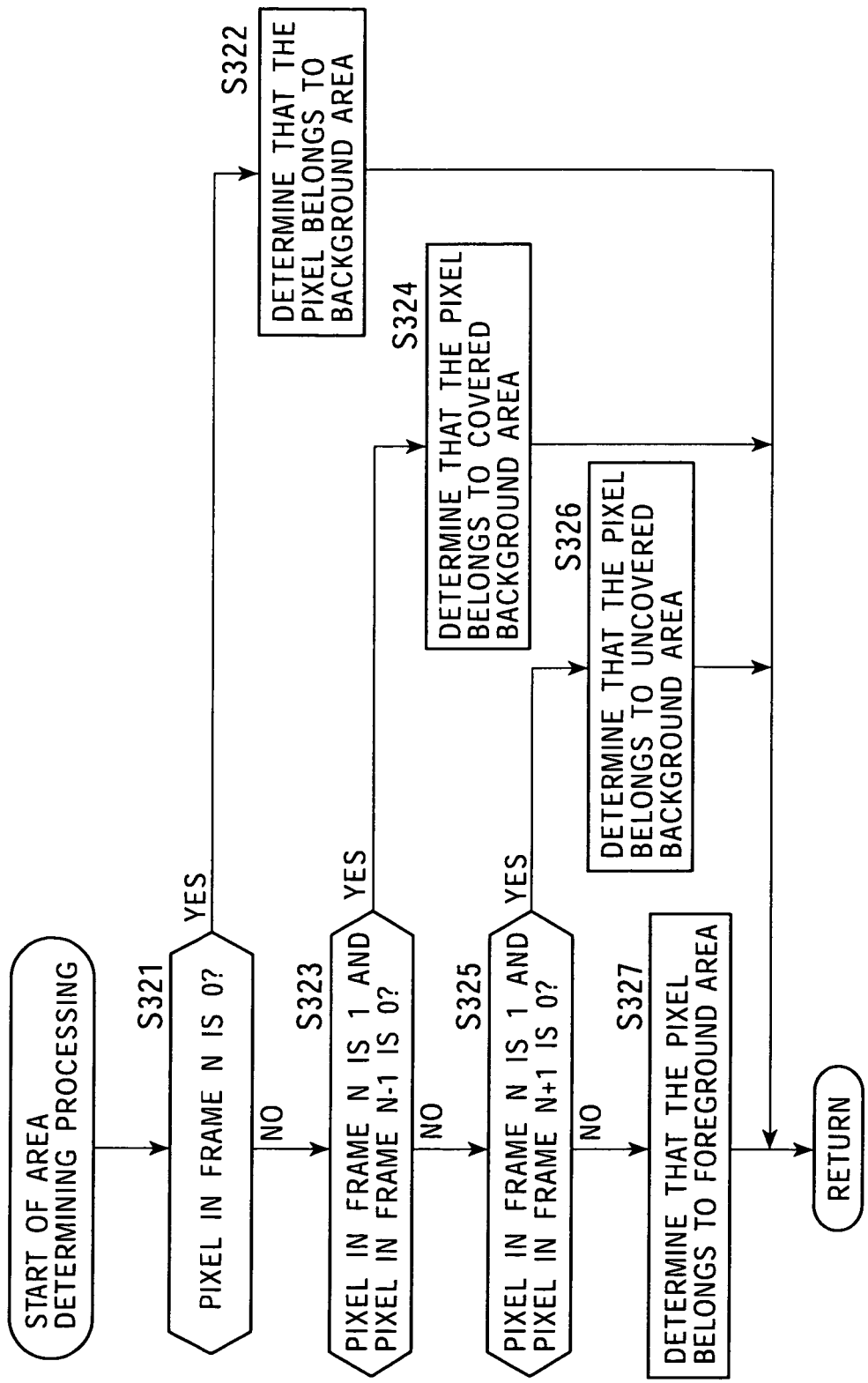
FIG. 47 is a flowchart illustrating details of the area specifying processing.

Details of the area determining processing in step S304 are described below with reference to the flowchart of FIG. 47. In step S321, the area determining portion 342 of the time change detector 303 determines whether the designated pixel in frame #n stored in the frame memory 341 is 0. If it is determined that the designated pixel in frame #n is 0, the process proceeds to step S322. In step S322, it is determined that the designated pixel in frame #n belongs to the background area, and the processing is completed.

If it is determined in step S321 that the designated pixel in frame #n is 1, the process proceeds to step S323. In step S323, the area determining portion 342 of the time change detector 303 determines whether the designated pixel in frame #n stored in the frame memory 341 is 1, and whether the corresponding pixel in frame #n−1 is 0. If it is determined that the designated pixel in frame #n is 1 and the corresponding pixel in frame #n−1 is 0, the process proceeds to step S324. In step S324, it is determined that the designated pixel in frame #n belongs to the covered background area, and the processing is completed.

If it is determined in step S323 that the designated pixel in frame #n is 0, or that the corresponding pixel in frame #n−1 is 1, the process proceeds to step S325. In step S325, the area determining portion 342 of the time change detector 303 determines whether the designated pixel in frame #n stored in the frame memory 341 is 1, and whether the corresponding pixel in frame #n+1 is 0. If it is determined that the designated pixel in frame #n is 1 and the corresponding pixel in frame #n+1 is 0, the process proceeds to step S326. In step S326, it is determined that the designated pixel in frame #n belongs to the uncovered background area, and the processing is completed.

If it is determined in step S325 that the designated pixel in frame #n is 0, or that the corresponding pixel in frame #n+1 is 1, the process proceeds to step S327. In step S327, the area determining portion 342 of the time change detector 303 determines that the designated pixel in frame #n belongs to the foreground area, and the processing is completed.

As discussed above, the area specifying unit 103 is able to specify, based on the correlation value between the input image and the corresponding background image, to which of the foreground area, the background area, the covered background area, or the uncovered background area each pixel of the input image belongs, and generates area information corresponding to the specified result.

Figure 48:
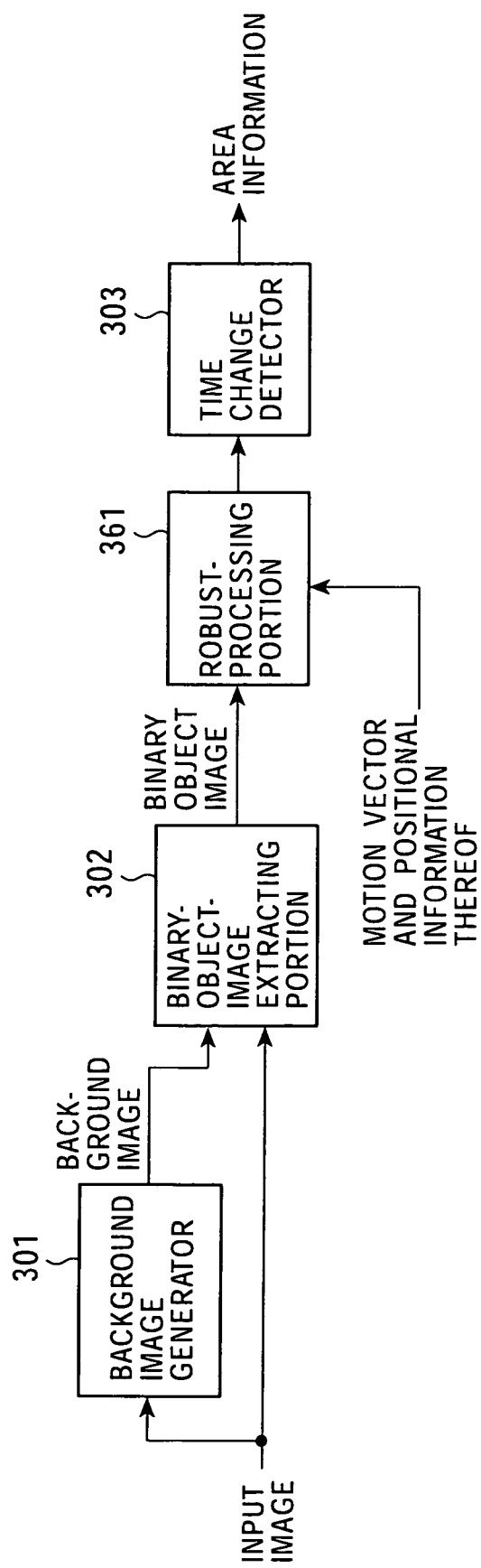
FIG. 48 is a block diagram illustrating still another configuration of the area specifying unit 103.

FIG. 48 is a block diagram illustrating another configuration of the area specifying unit 103. The area specifying unit 103 shown in FIG. 48 uses a motion vector and positional information thereof supplied from the motion detector 102. The same elements as those shown in FIG. 36 are designated with like reference numerals, and an explanation thereof is thus omitted.

A robust-processing portion 361 generates a robust binary object image based on binary object images of N frames supplied from the binary-object-image extracting portion 302, and outputs the robust binary object image to the time change detector 303.

Figure 49:
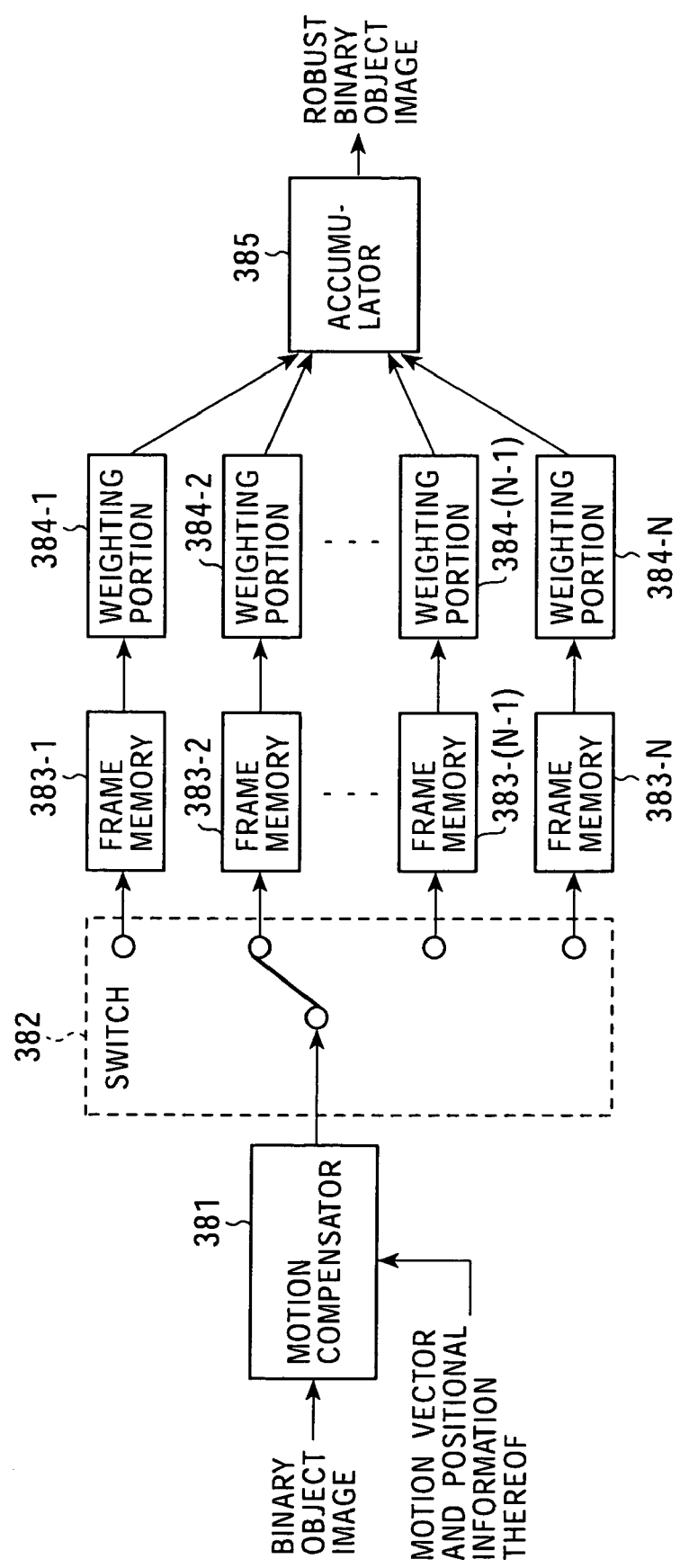
FIG. 49 is a block diagram illustrating the configuration of a robust-processing portion 361.

FIG. 49 is a block diagram illustrating the configuration of the robust-processing portion 361. A motion compensator 381 compensates for the motion of the binary object images of N frames based on the motion vector and the positional information thereof supplied from the motion detector 102, and outputs a motion-compensated binary object image to a switch 382.

Figure 50:
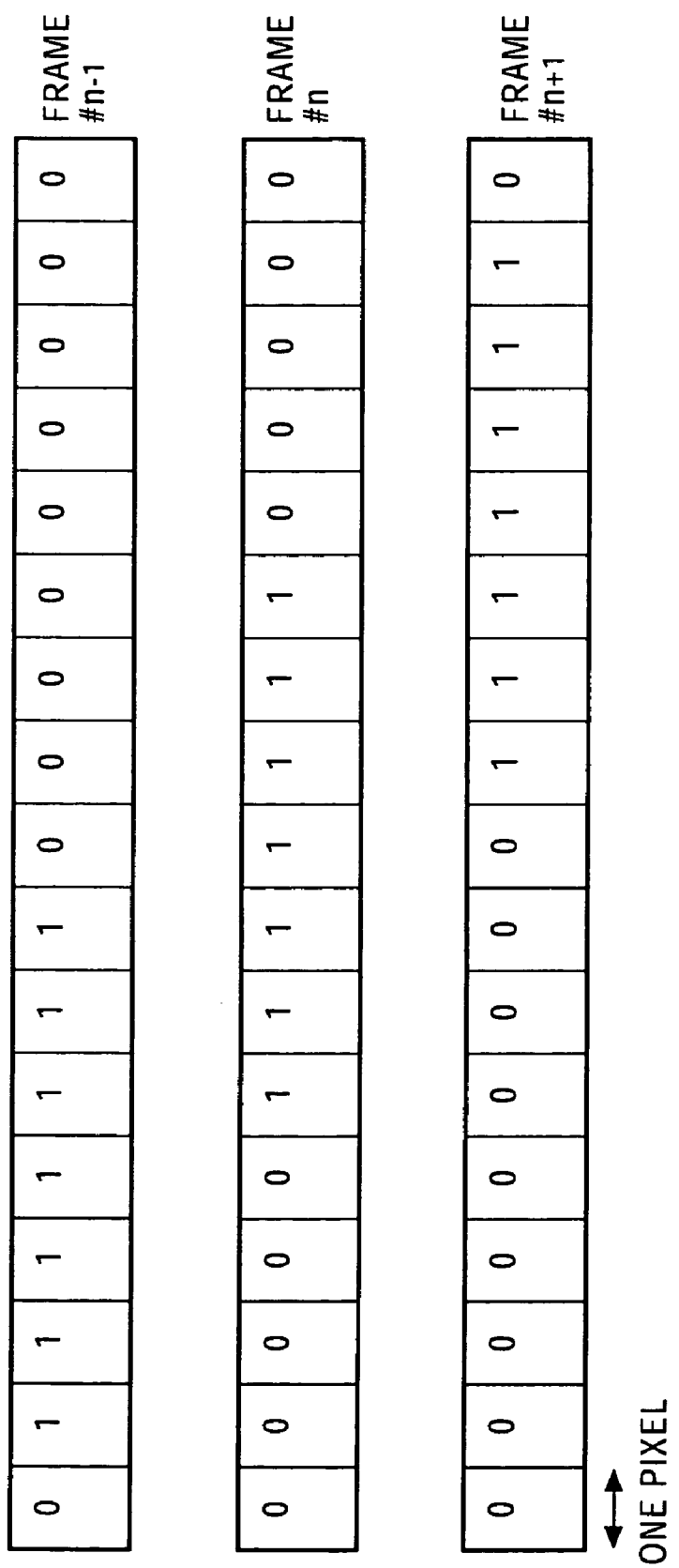
FIG. 50 illustrates motion compensation performed by a motion compensator 381.
Figure 51:
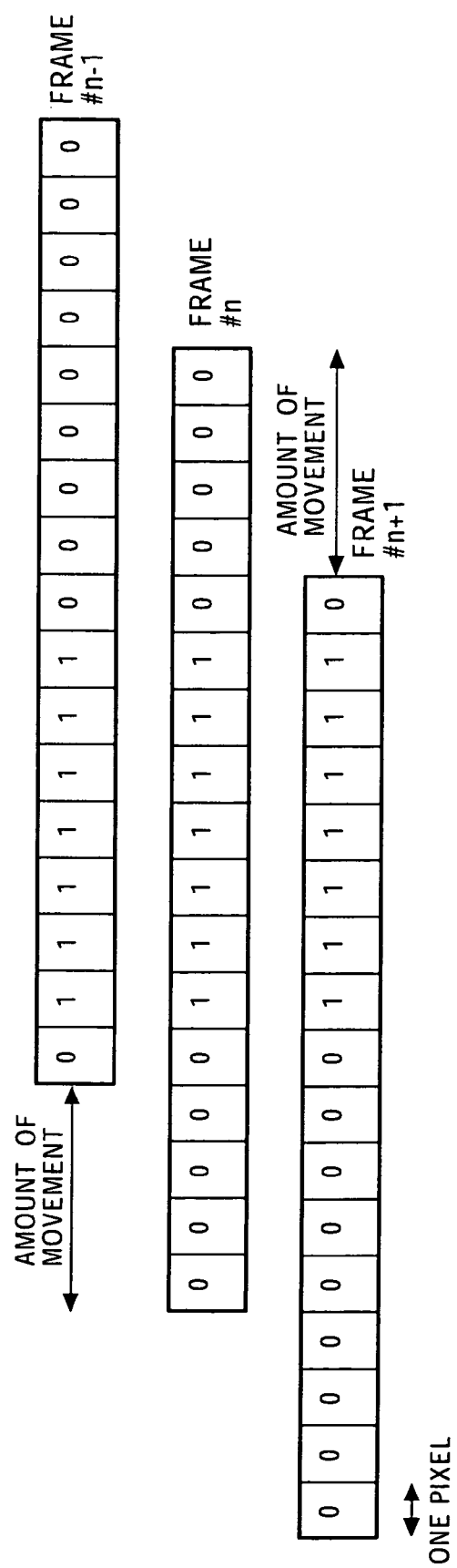
FIG. 51 illustrates motion compensation performed by the motion compensator 381.

The motion compensation performed by the motion compensator 381 is discussed below with reference to examples shown in FIGS. 50 and 51. It is now assumed, for example, that the area in frame #n is to be processed. When binary object images of frame #n−1, frame #n, and frame #n+1 shown in FIG. 50 are input, the motion compensator 381 compensates for the motion of the binary object image of frame #n−1 and the binary object image of frame #n+1, as indicated by the example shown in FIG. 51, based on the motion vector supplied from the motion detector 102, and supplies the motion-compensated binary object images to the switch 382.

The switch 382 outputs the motion-compensated binary object image of the first frame to a frame memory 383-1, and outputs the motion-compensated binary object image of the second frame to a frame memory 383-2. Similarly, the switch 382 outputs the motion-compensated binary object images of the third through (N−1)-th frame to frame memories 383-3 through 383-(N−1), and outputs the motion-compensated binary object image of the N-th frame to a frame memory 383-N.

The frame memory 383-1 stores the motion-compensated binary object image of the first frame, and outputs the stored binary object image to a weighting portion 384-1. The frame memory 383-2 stores the motion-compensated binary object image of the second frame, and outputs the stored binary object image to a weighting portion 384-2.

Similarly, the frame memories 383-3 through 383-(N−1) stores the motion-compensated binary object images of the third through (N−1)-th frames, and outputs the stored binary object images to weighting portions 384-3 through 384-(N−1). The frame memory 383-N stores the motion-compensated binary object image of the N-th frame, and outputs the stored binary object image to a weighting portion 384-N.

The weighting portion 384-1 multiplies the pixel value of the motion-compensated binary object image of the first frame supplied from the frame memory 383-1 by a predetermined weight w1, and supplies a weighted binary object image to an accumulator 385. The weighting portion 384-2 multiplies the pixel value of the motion-compensated binary object image of the second frame supplied from the frame memory 383-2 by a predetermined weight w2, and supplies the weighted binary object image to the accumulator 385.

Likewise, the weighting portions 384-3 through 384-(N−1) multiply the pixel values of the motion-compensated binary object images of the third through (N−1)-th frames supplied from the frame memories 383-3 through 383-(N−1) by predetermined weights w3 through w(N−1), and supplies the weighted binary object images to the accumulator 385. The weighting portion 384-N multiplies the pixel value of the motion-compensated binary object image of the N-th frame supplied from the frame memory 383-N by a predetermined weight wN, and supplies the weighted binary object image to the accumulator 385.

The accumulator 385 accumulates the pixel values of the motion-compensated binary object images multiplied by the weights w1 through wN of the first through N-th frames, and compares the accumulated pixel value with the predetermined threshold value th0, thereby generating the binary object image.

As discussed above, the robust-processing portion 361 generates a robust binary object image from N binary object images, and supplies it to the time change detector 303. Accordingly, the area specifying unit 103 configured as shown in FIG. 48 is able to specify the area more precisely than that shown in FIG. 36 even if noise is contained in the input image.

The area specifying processing performed by the area specifying unit 103 configured as shown in FIG. 48 is described below with reference to the flowchart of FIG. 52. The processings of step S341 through step S343 are similar to those of step S301 through step S303 discussed with reference to the flowchart of FIG. 46, and an explanation thereof is thus omitted.

In step S344, the robust-processing portion 361 performs the robust processing.

In step S345, the time change detector 303 performs the area determining processing, and the processing is completed. Details of the processing of step S345 are similar to the processing discussed with reference to the flowchart of FIG. 47, and an explanation thereof is thus omitted.

Figure 52:
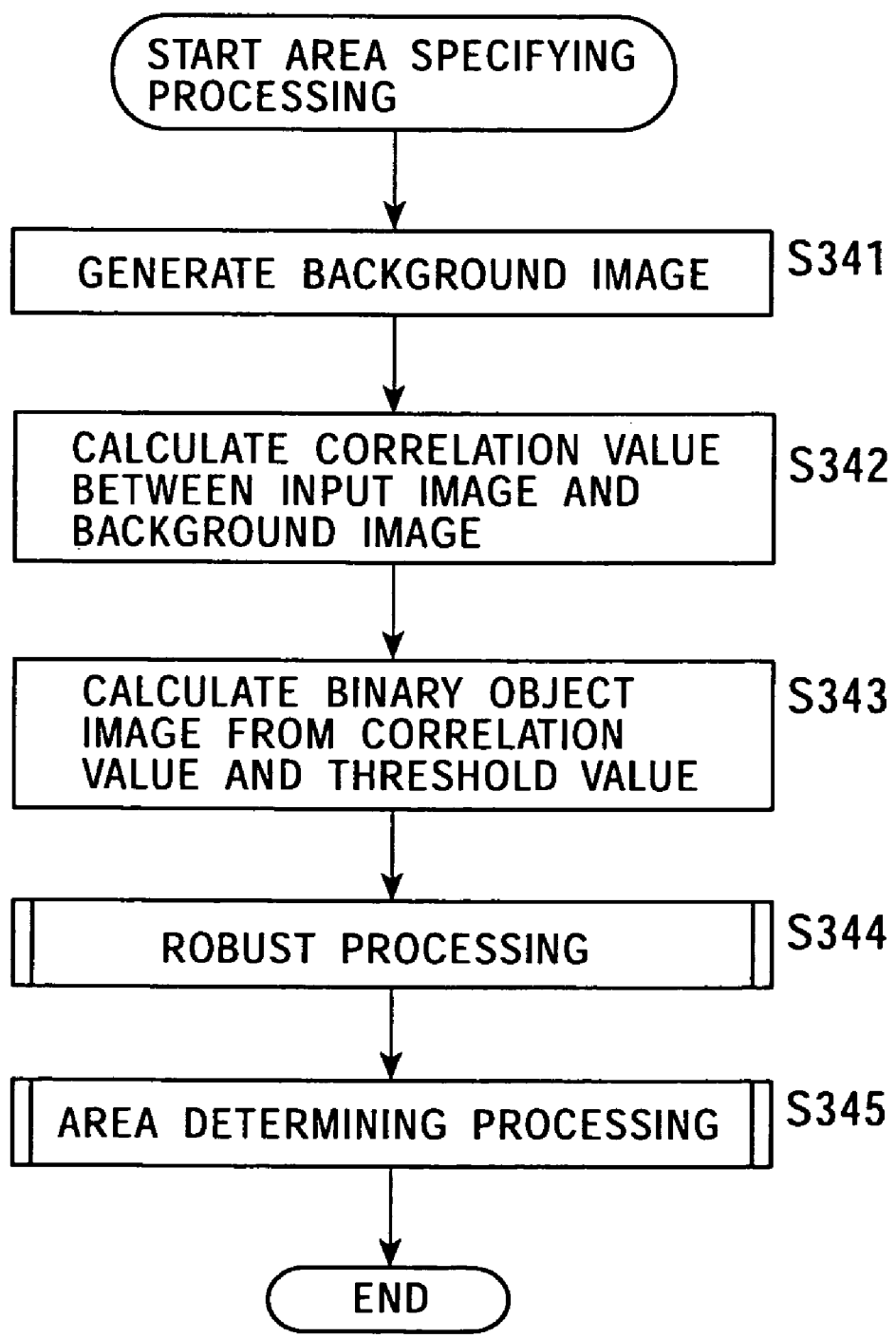
FIG. 52 is a flowchart illustrating the area specifying processing.
Figure 53:
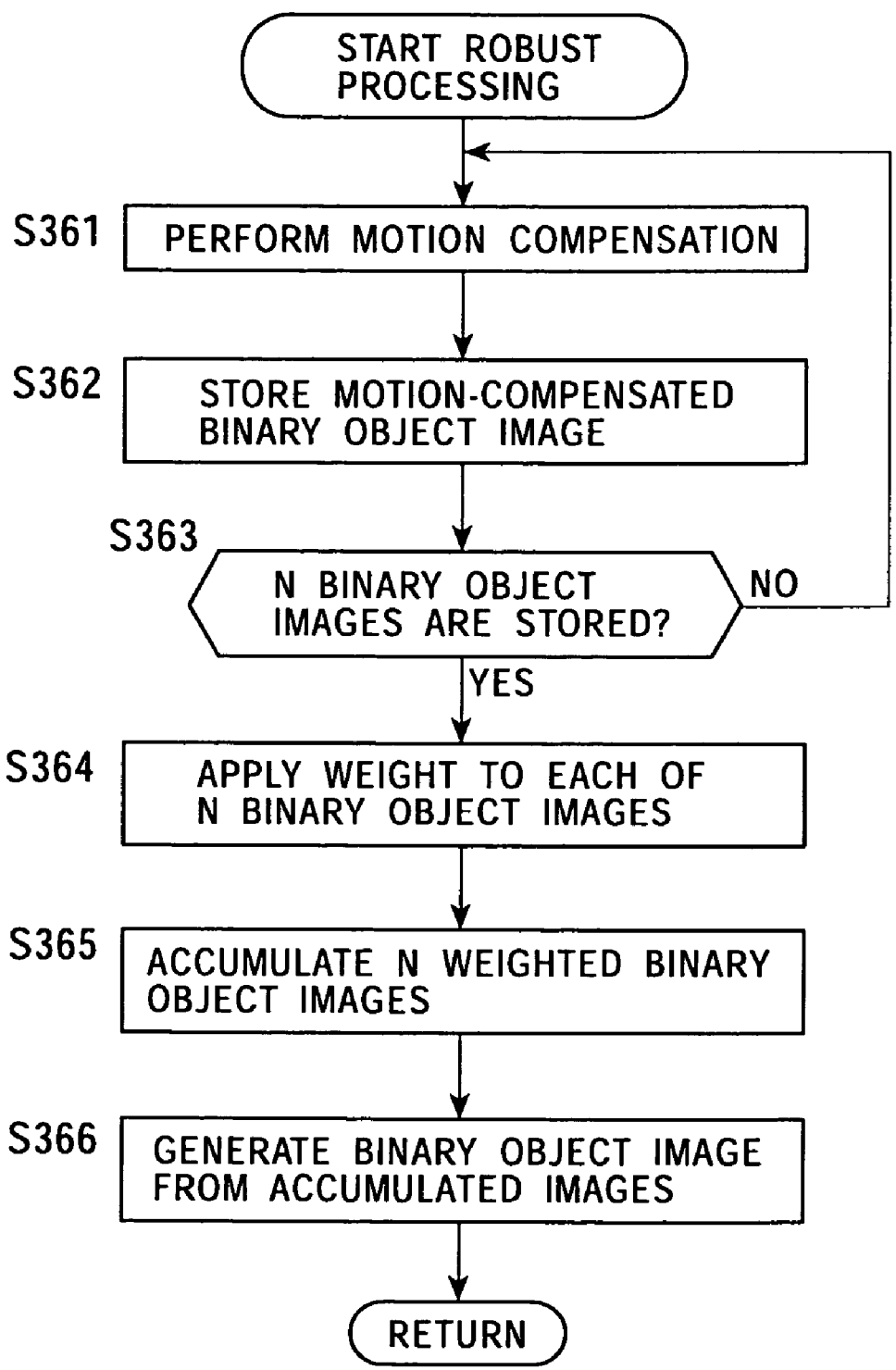
FIG. 53 is a flowchart illustrating details of the robust processing.

Details of the robust processing corresponding to the processing of step S344 in FIG. 52 are given below with reference to the flowchart of FIG. 53. In step S361, the motion compensator 381 performs the motion compensation of an input binary object image based on the motion vector and the positional information thereof supplied from the motion detector 102. In step S362, one of the frame memories 383-1 through 383-N stores the corresponding motion-compensated binary object image supplied via the switch 382.

In step S363, the robust-processing portion 361 determines whether N binary object images are stored. If it is determined that N binary object images are not stored, the process returns to step S361, and the processing for compensating for the motion of the binary object image and the processing for storing the binary object image are repeated.

If it is determined in step S363 that N binary object images are stored, the process proceeds to step S364 in which weighting is performed. In step S364, the weighting portions 384-1 through 384-N multiply the corresponding N binary object images by the weights w1 through wN.

In step S365, the accumulator 385 accumulates the N weighted binary object images.

In step S366, the accumulator 385 generates a binary object image from the accumulated images by, for example, comparing the accumulated value with a predetermined threshold value th1, and the processing is completed.

As discussed above, the area specifying unit 103 configured as shown in FIG. 48 is able to generate area information based on the robust binary object image.

As is seen from the foregoing description, the area specifying unit 103 is able to generate area information indicating to which of the moving area, the stationary area, the uncovered background area, or the covered background area each pixel contained in a frame belongs.

Figure 54:
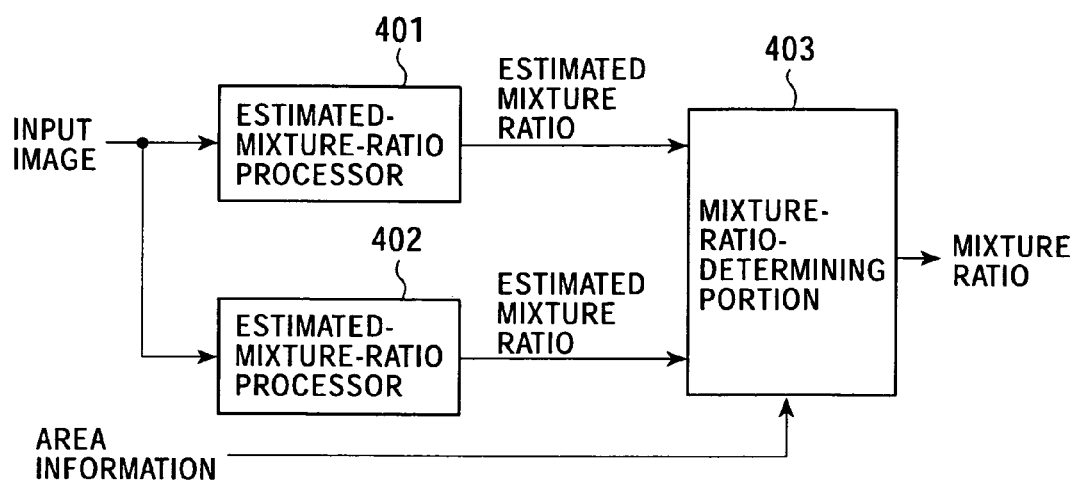
FIG. 54 is a block diagram illustrating the configuration of a mixture-ratio calculator 104.

FIG. 54 is a block diagram illustrating the configuration of the mixture-ratio calculator 104. An estimated-mixture-ratio processor 401 calculates an estimated mixture ratio for each pixel by calculating a model of a covered background area based on the input image, and supplies the calculated estimated mixture ratio to a mixture-ratio determining portion 403.

An estimated-mixture-ratio processor 402 calculates an estimated mixture ratio for each pixel by calculating a model of an uncovered background area based on the input image, and supplies the calculated estimated mixture ratio to the mixture-ratio determining portion 403.

Since it can be assumed that the object corresponding to the foreground is moving with constant velocity within the shutter time, the mixture ratio α of the pixels belonging to a mixed area exhibits the following characteristics. That is, the mixture ratio α linearly changes according to the positional change in the pixels. If the positional change in the pixels is one-dimensional, a change in the mixture ratio α can be represented linearly. If the positional change in the pixels is two-dimensional, a change in the mixture ratio α can be represented on a plane.

Since the period of one frame is short, it can be assumed that the object corresponding to the foreground is a rigid body moving with constant velocity.

The gradient of the mixture ratio α is inversely proportional to the amount of movement v within the shutter time of the foreground.

Figure 55:
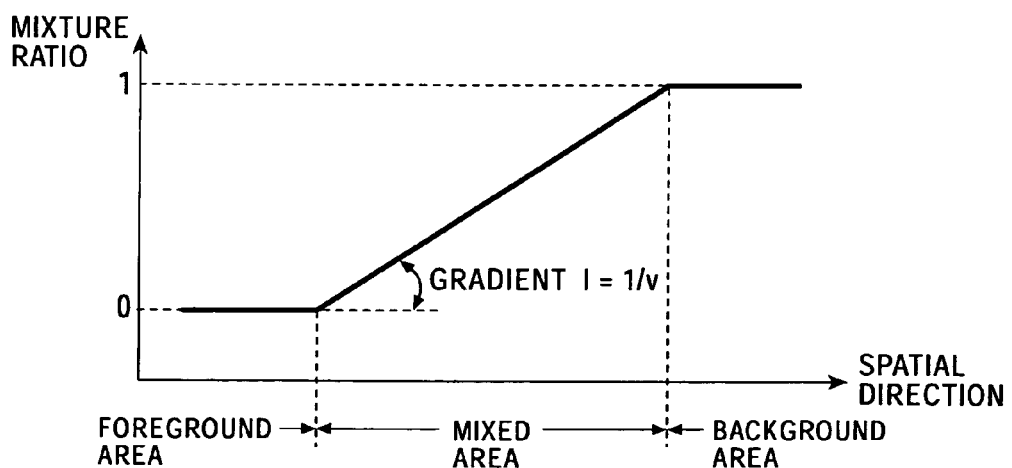
FIG. 55 illustrates an example of the ideal mixture ratio $\alpha$.

An example of the ideal mixture ratio α is shown in FIG. 55. The gradient 1 of the ideal mixture ratio α in the mixed area can be represented by the reciprocal of the amount of movement v.

As shown in FIG. 55, the ideal mixture ratio α has the value of 1 in the background area, the value of 0 in the foreground area, and the value of greater than 0 and smaller than 1 in the mixed area.

Figure 56:
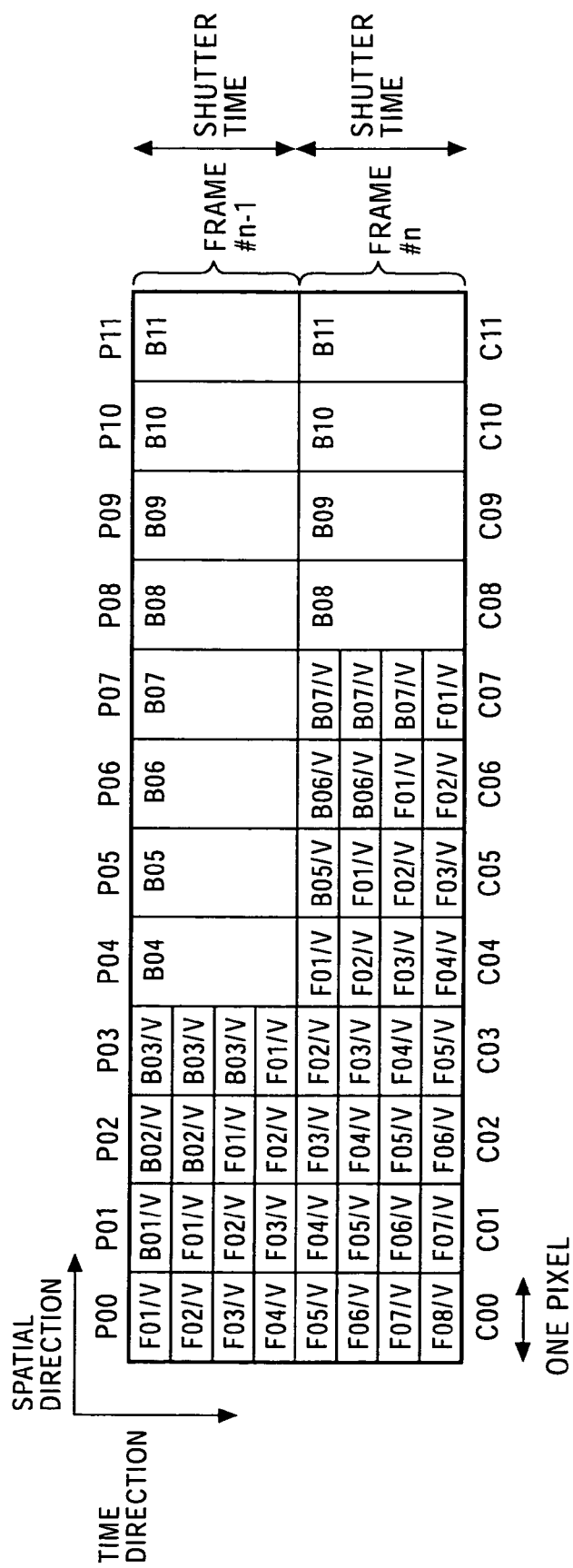
FIG. 56 illustrates a model in which pixel values are expanded in the time direction and the period corresponding to the shutter time is divided.

In the example shown in FIG. 56, the pixel value C06 of the seventh pixel from the left in frame #n can be indicated by equation (8) by using the pixel value P06 of the seventh pixel from the left in frame #n−1.

$$C06 = B06/v + B06/v + F01/v + F02/v \quad (8)$$
$$= P06/v + P06/v + F01/v + F02/v$$
$$= 2/v \cdot P06 + \sum_{i=1}^{2} Fi/v$$

In equation (8), the pixel value C06 is indicated by a pixel value M of the pixel in the mixed area, while the pixel value P06 is indicated by a pixel value B of the pixel in the background area. That is, the pixel value M of the pixel in the mixed area and the pixel value B of the pixel in the background area can be represented by equations (9) and (10), respectively.

$$M = C06 \quad (9)$$

$$B = P06 \quad (10)$$

In equation (8), 2/v corresponds to the mixture ratio α. Since the amount of movement v is 4, the mixture ratio α of the seventh pixel from the left in frame #n is 0.5.

As discussed above, the pixel value C in the designated frame #n is considered as the pixel value in the mixed area, while the pixel value P of frame #n−1 prior to frame #n is considered as the pixel value in the background area. Accordingly, equation (3) indicating the mixture ratio α can be represented by equation (11):

$$C = \alpha \cdot P + f \quad (11)$$

where f in equation (11) indicates the sum of the foreground components $\Sigma_i Fi/v$ contained in the designated pixel. The variables contained in equation (11) are two factors, i.e., the mixture ratio α and the sum f of the foreground components.

Figure 57:
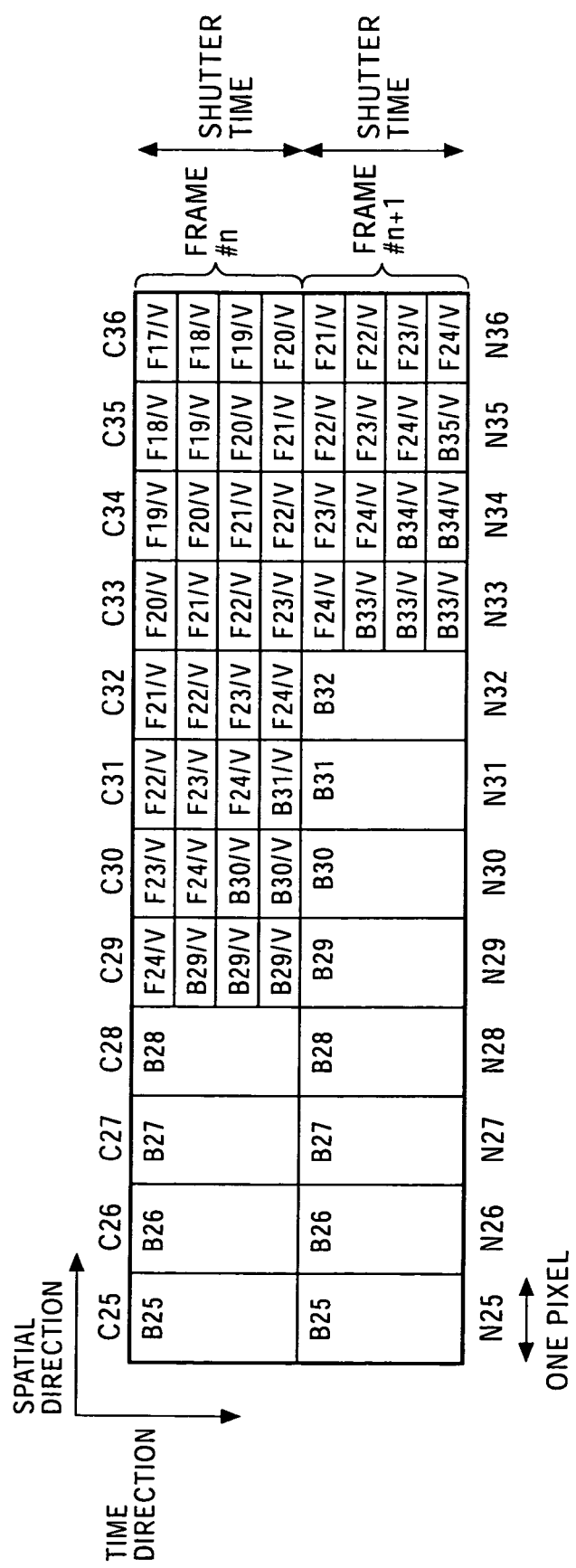
FIG. 57 illustrates a model in which pixel values are expanded in the time direction and the period corresponding to the shutter time is divided.

Similarly, a model obtained by expanding in the time direction the pixel values in which the amount of movement is 4 and the number of virtual divided portions is 4 in an uncovered background area is shown in FIG. 57.

As in the representation of the covered background area, in the uncovered background area, the pixel value C of the designated frame #n is considered as the pixel value in the mixed area, while the pixel value N of frame #n+1 subsequent to frame #n is considered as the background area. Accordingly, equation (3) indicating the mixture ratio α can be represented by equation (12).

$$C = \alpha \cdot N + f \quad (12)$$

The embodiment has been described, assuming that the background object is stationary. However, equations (8) through (12) can be applied to the case in which the background object is moving by using the pixel value of a pixel located corresponding to the amount of movement v of the background. It is now assumed, for example, in FIG. 56 that the amount of movement v of the object corresponding to the background is 2, and the number of virtual divided portions is 2. In this case, when the object corresponding to the background is moving to the right in FIG. 49, the pixel value B of the pixel in the background area in equation (10) is represented by a pixel value P04.

Since equations (11) and (12) each contain two variables, the mixture ratio α cannot be determined without modifying the equations. Since the spatial correlation in an image is generally strong, neighboring pixels are of substantially the same pixel value.

Since the spatial correlation of foreground components is strong, the equation is transformed so that the sum f of the foreground components can be obtained from the previous or subsequent frame and computes the mixture ratio α.

Figure 58:
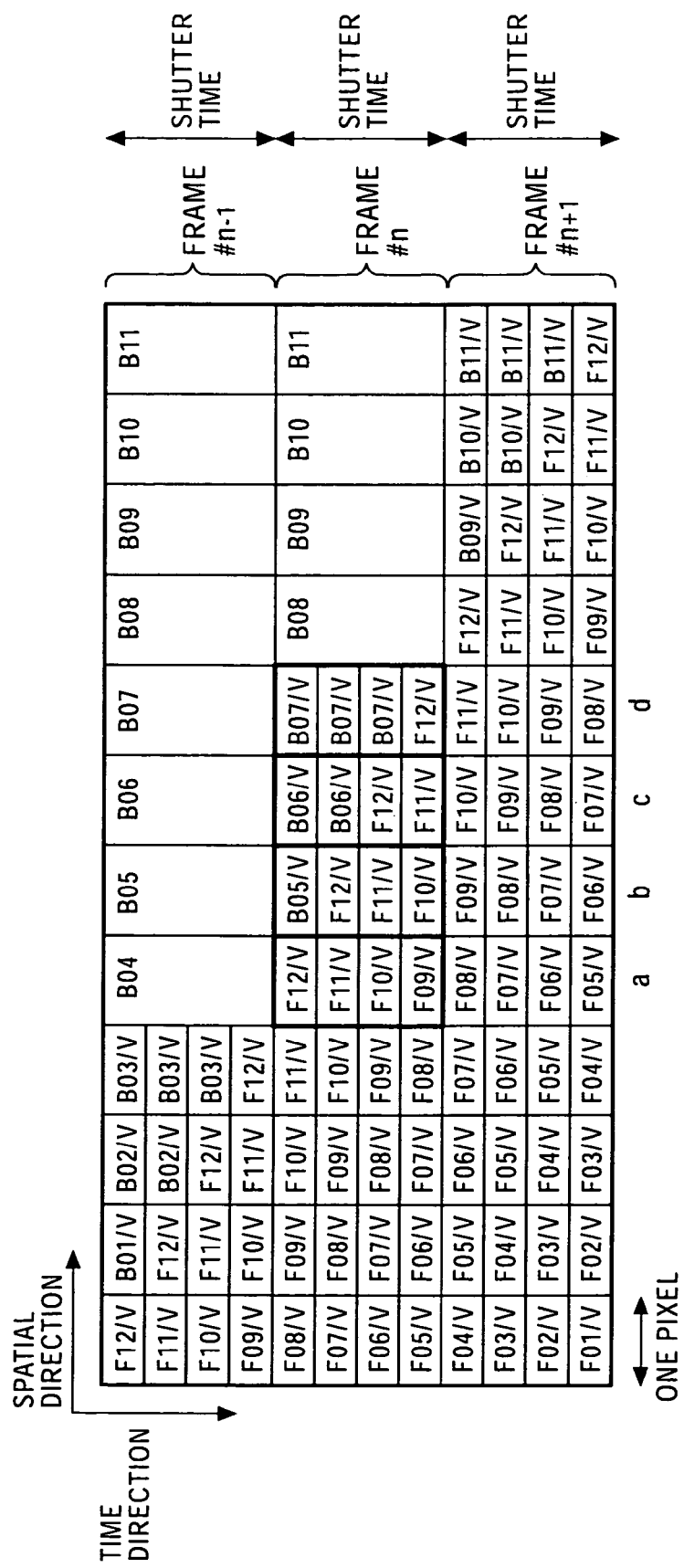
FIG. 58 illustrates approximation using the correlation of foreground components.

The pixel value Mc of the seventh pixel from the left in frame #n of FIG. 58 can be expressed by equation (13):

$$Mc = \frac{2}{v} \cdot B06 + \sum_{i=11}^{12} Fi/v \qquad (13)$$

where 2/v of the first term of the right side of equation (13) corresponds to the mixture ratio α. The second term of the right side of equation (13) is expressed by equation (14) using a pixel value in the subsequent frame #n+1:

$$\sum_{i=11}^{12} Fi/v = \beta \cdot \sum_{i=7}^{10} Fi/v \qquad (14)$$

By utilizing the spatial correlation of the foreground components, equation (15) holds true:

$$F = F05 = F06 = F07 = F08 = F09 = F10 = F11 = F12 \qquad (15)$$

Equation (14) can be replaced by equation (16) by utilizing equation (15):

$$\sum_{i=11}^{12} Fi/v = \frac{2}{v} \cdot F \qquad (16)$$
$$= \beta \cdot \frac{4}{v} \cdot F$$

As a result, β can be expressed by equation (17):

$$\beta = \frac{2}{4} \qquad (17)$$

In general, as shown by equation (15), given that the foreground components related to the mixed area are equal, equation (18) holds true with respect to all pixels in the mixed area on the basis of the internal ratio relationship:

$$\beta = 1 - \alpha \qquad (18)$$

If equation (18) holds true, equation (11) can be expanded as shown by equation (19):

$$C = \alpha \cdot P + f \qquad (19)$$
$$= \alpha \cdot P + (1-\alpha) \cdot \sum_{i=\gamma}^{\gamma+V-1} Fi/v$$
$$= \alpha \cdot P + (1-\alpha) \cdot N$$

Similarly, if equation (18) holds true, equation (12) can be expanded as shown by equation (20):

$$C = \alpha \cdot N + f \qquad (20)$$
$$= \alpha \cdot N + (1-\alpha) \cdot \sum_{i=\gamma}^{\gamma+V-1} Fi/v$$
$$= \alpha \cdot N + (1-\alpha) \cdot P$$

Figure 59:
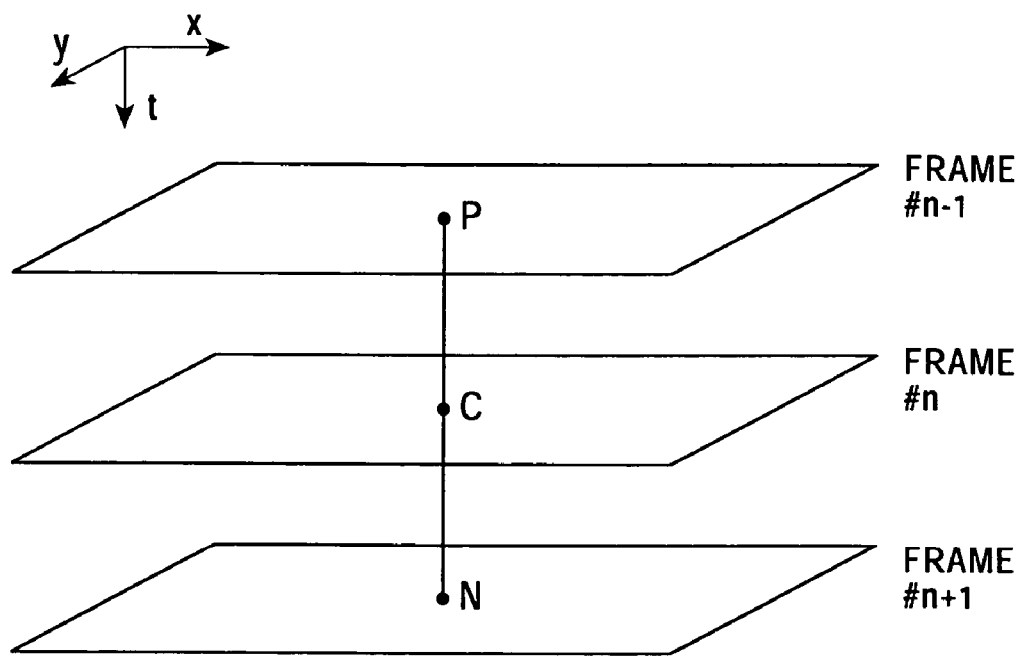
FIG. 59 illustrates the relationship among C, N and P.

In equations (19) and (20), C, N, and P are known values, and the mixed ratio α is the only variable included in equations (19) and (20). The relationship among C, N, and P in equations (19) and (20) is shown in FIG. 59. C is the pixel value of the designated pixel in frame #n, for which the mixture ratio α is to be computed. N is the pixel value of the pixel in frame #n+1, whose position in the spatial direction corresponds to that of the designated pixel. P is the pixel value of the pixel in frame #n−1 whose position in the spatial direction corresponds to that of the designated pixel.

Since one variable is included in each of equations (19) and (20), the mixture ratio α can be computed by utilizing the pixel values of the pixels in the three frames. The condition for computing the correct mixture ratio α by solving equations (19) and (20) is that the foreground components related to the mixed area are equal. In other words, in a foreground image object of an image captured when a foreground object is stationary, consecutive pixels (the number of pixels is twice the amount of movement v) which correspond to a direction in which the foreground object is moving and which are located at the boundary of the image object have a constant pixel value.

As discussed above, the mixture ratio α for a pixel belonging to the covered background area is computed by equation (21), and the mixture ratio α for a pixel belonging to the uncovered background area is computed by equation (22):

$$\alpha = (C-N)/(P-N) \qquad (21)$$

$$\alpha = (C-P)/(N-P) \qquad (22)$$

Figure 60:
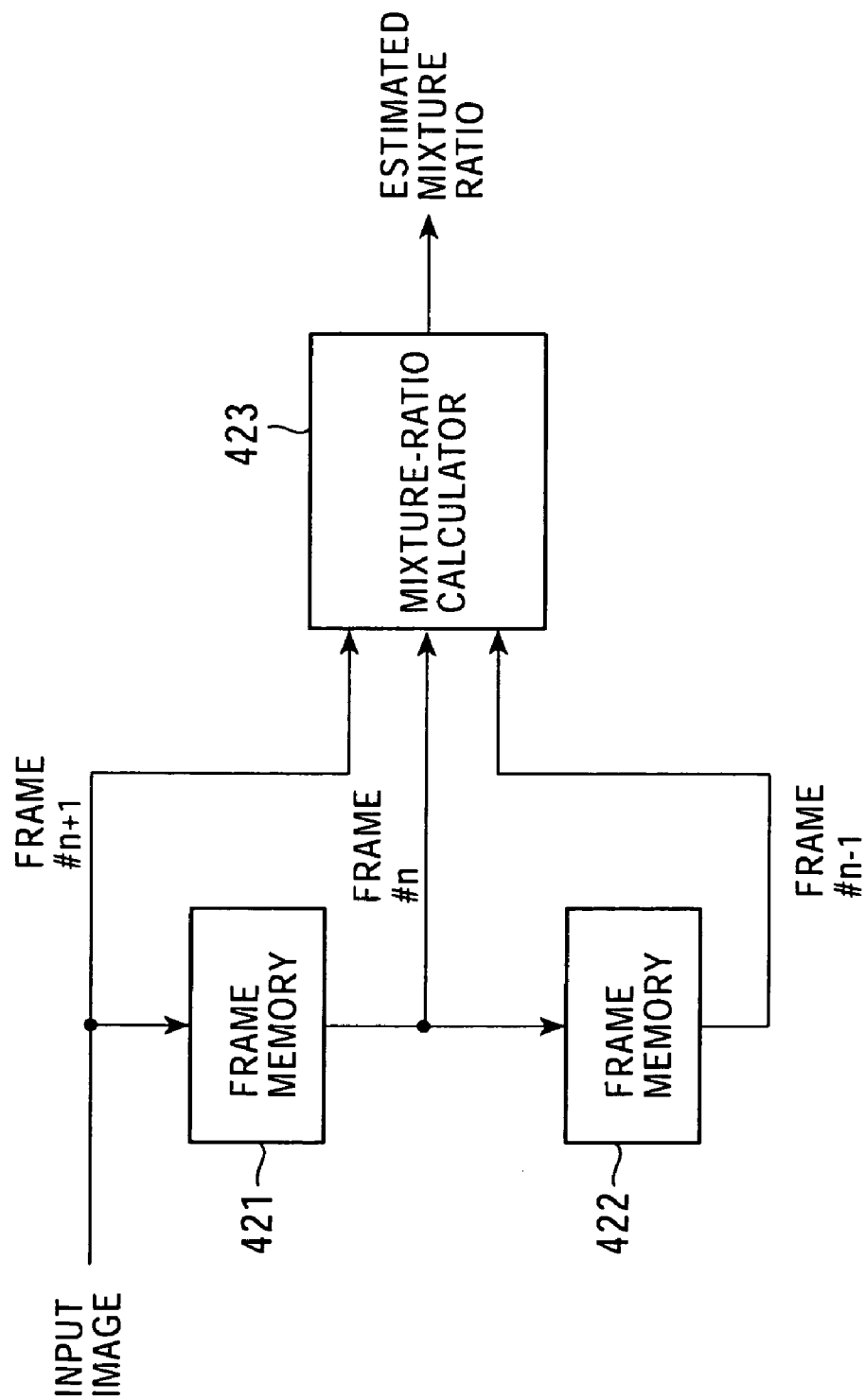
FIG. 60 is a block diagram illustrating the configuration of a mixture-ratio estimation processor 401.

FIG. 60 is a block diagram illustrating the configuration of the estimated-mixture-ratio processor 401. A frame memory 421 stores an input image in units of frames and supplies one frame subsequent to a frame input as an input image to a frame memory 422 and a mixture-ratio calculator 423.

The frame memory 422 stores the input image in units of frames and supplies one frame subsequent to the frame supplied from the frame memory 421 to the mixture-ratio calculator 423.

When frame #n+1 is input as the input image to the mixture-ratio calculator 423, the frame memory 421 supplies frame #n to the mixture-ratio calculator 423, and the frame memory 422 supplies frame #n−1 to the mixture-ratio calculator 423.

The mixture-ratio calculator 423 calculates equation (21) to compute an estimated mixture ratio for the designated pixel on the basis of the pixel value C of the designated pixel in frame #n, the pixel value N of the pixel in frame #n+1, whose spatial position corresponds to that of the designated pixel, and the pixel value P of the pixel in frame #n−1, whose spatial position corresponds to that of the designated pixel, and outputs the computed estimated mixture ratio. For example, when the background is stationary, the mixture-ratio calculator 423 computes an estimated mixture ratio for the designated pixel on the basis of the pixel value C of the designated pixel in frame #n, the pixel value N of the pixel in frame #n+1, whose position in the frame is the same as that of the designated pixel, and the pixel value P of the pixel in frame #n−1, whose position in the frame is the same as that of the designated pixel, and outputs the computed estimated mixture ratio.

In this manner, the estimated-mixture-ratio processor 401 is able to calculate the estimated mixture ratio based on the input image, and supplies it to the mixture-ratio determining portion 403.

Since the estimated-mixture-ratio processor 402 is similar to the estimated-mixture-ratio processor 401 except for the fact that the estimated-mixture-ratio processor 401 calculates equation (21) to compute the estimated mixture ratio for the designated pixel whereas the estimated-mixture-ratio processor 402 calculates equation (22) to compute the estimated mixture ratio for the designated pixel, a description thereof is omitted.

Figure 61:
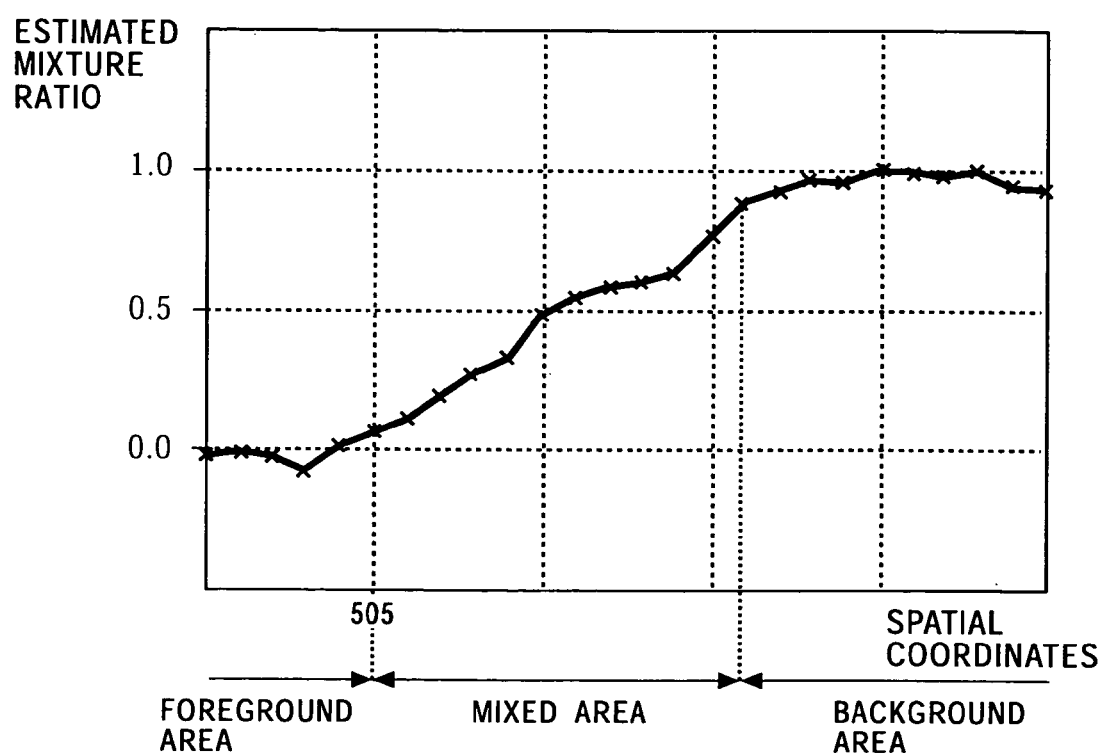
FIG. 61 illustrates an example of an estimated mixture ratio.

FIG. 61 illustrates an example of an estimated mixture ratio calculated by the estimated-mixture-ratio processor 401. The estimated mixture ratio shown in FIG. 61 indicates the result of a case, with respect to one line, in which the amount of movement v in the foreground corresponding to an object moving at a constant speed is 11.

FIG. 55 shows that the estimated mixture ratio changes substantially linearly in the mixed area.

Referring back to FIG. 54, the mixture-ratio determining portion 403 sets the mixture ratio $\alpha$ based on the area information supplied from the area specifying unit 103 and indicating to which of the foreground area, the background area, the covered background area, or the uncovered background area the pixel for which the mixture ratio $\alpha$ is to be calculated belongs. The mixture-ratio determining portion 403 sets the mixture ratio $\alpha$ to 0 when the corresponding pixel belongs to the foreground area, and sets the mixture ratio $\alpha$ to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio $\alpha$. When the corresponding pixel belongs to the uncovered background area, the mixture-ratio determining portion 403 sets the estimated mixture ratio supplied from the estimated-mixture-ratio processor 402 as the mixture ratio $\alpha$. The mixture-ratio determining portion 403 outputs the mixture ratio $\alpha$ which has been set based on the area information.

Figure 62:
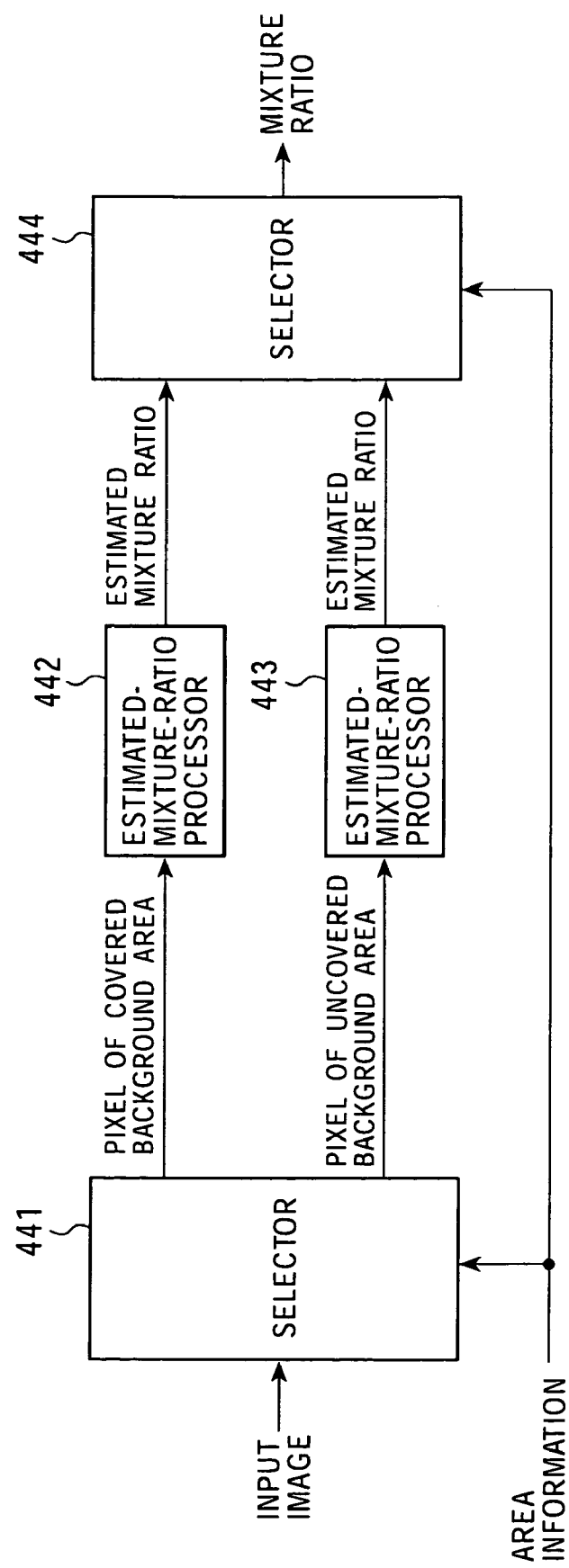
FIG. 62 is a block diagram illustrating another configuration of the mixture-ratio calculator 104.

FIG. 62 is a block diagram illustrating another configuration of the mixture-ratio calculator 104. A selector 441 supplies a pixel belonging to the covered background area and the corresponding pixels in the previous frame and the subsequent frame to an estimated-mixture-ratio processor 442 based on the area information supplied from the area specifying unit 103. The selector 441 supplies a pixel belonging to the uncovered background area and the corresponding pixels in the previous frame and the subsequent frame to an estimated-mixture-ratio processor 443 based on the area information supplied from the area specifying unit 103.

The estimated-mixture-ratio processor 442 calculates equation (21) based on the pixel values input from the selector 441 to compute an estimated mixture ratio for the designated pixel, which belongs to the covered background area, and supplies the computed estimated mixture ratio to a selector 444.

The estimated-mixture-ratio processor 443 calculates equation (22) based on the pixel values input from the selector 441 to compute an estimated mixture ratio for the designated pixel, which belongs to the uncovered background area, and supplies the calculated estimated mixture ratio to the selector 444.

Based on the area information supplied from the area specifying unit 103, the selector 444 sets the mixture ratio $\alpha$ to 0 when the designated pixel belongs to the foreground area, and sets the mixture ratio $\alpha$ to 1 when the designated pixel belongs to the background area. When the designated pixel belongs to the covered background area, the selector 444 selects the estimated mixture ratio supplied from the estimated-mixture-ratio processor 442 and sets it as the mixture ratio $\alpha$. When the designated pixel belongs to the uncovered background area, the selector 444 selects the estimated mixture ratio supplied from the estimated-mixture-ratio processor 443 and sets it as the mixture ratio $\alpha$. The selector 444 then outputs the mixture ratio $\alpha$ which has been selected and set based on the area information.

As discussed above, the mixture-ratio calculator 104 configured as shown in FIG. 62 is able to calculate the mixture ratio $\alpha$ for each pixel contained in the image, and outputs the calculated mixture ratio $\alpha$.

The calculation processing for the mixture ratio $\alpha$ performed by the mixture-ratio calculator 104 configured as shown in FIG. 54 is discussed below with reference to the flowchart of FIG. 63. In step S401, the mixture-ratio calculator 104 obtains area information supplied from the area specifying unit 103. In step S402, the estimated-mixture-ratio processor 401 executes the processing for estimating the mixture ratio by using a model corresponding to a covered background area, and supplies the estimated mixture ratio to the mixture-ratio determining portion 403. Details of the processing for estimating the mixture ratio are discussed below with reference to the flowchart of FIG. 64.

In step S403, the estimated-mixture-ratio processor 402 executes the processing for estimating the mixture ratio by using a model corresponding to an uncovered background area, and supplies the estimated mixture ratio to the mixture-ratio determining portion 403.

In step S404, the mixture-ratio calculator 104 determines whether the mixture ratios have been estimated for the whole frame. If it is determined that the mixture ratios have not yet been estimated for the whole frame, the process returns to step S402, and the processing for estimating the mixture ratio for the subsequent pixel is executed.

If it is determined in step S404 that the mixture ratios have been estimated for the whole frame, the process proceeds to step S405. In step S405, the mixture-ratio determining portion 403 sets the mixture ratio based on the area information supplied from the area specifying unit 103 and indicating to which of the foreground area, the background area, the covered background area, or the uncovered background area the pixel for which the mixture ratio $\alpha$ is to be calculated belongs. The mixture-ratio determining portion 403 sets the mixture ratio $\alpha$ to 0 when the corresponding pixel belongs to the foreground area, and sets the mixture ratio $\alpha$ to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio $\alpha$. When the corresponding pixel belongs to the uncovered background area, the mixture-ratio determining portion 403 sets the estimated mixture ratio supplied from the estimated-mixture-ratio processor 402 as the mixture ratio $\alpha$. The processing is then completed.

As discussed above, the mixture-ratio calculator 104 is able to calculate the mixture ratio $\alpha$, which indicates a feature quantity corresponding to each pixel, based on the area information supplied from the area specifying unit 103, and the input image.

The processing for calculating the mixture ratio α performed by the mixture-ratio calculator 104 configured as shown in FIG. 62 is similar to that discussed with reference to the flowchart of FIG. 63, and an explanation thereof is thus omitted.

Figure 63:
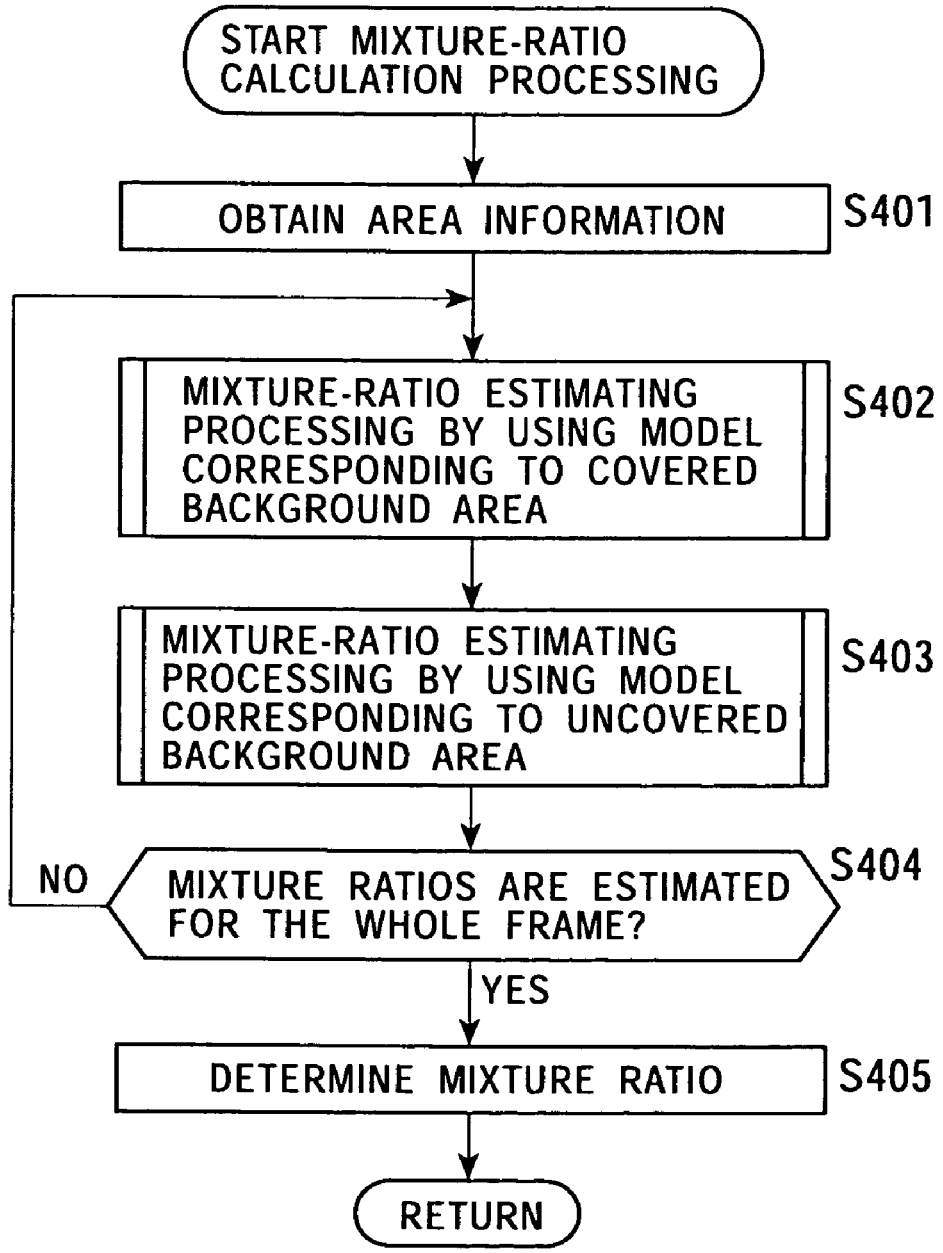
FIG. 63 is a flowchart illustrating the mixture-ratio calculation processing.
Figure 64:
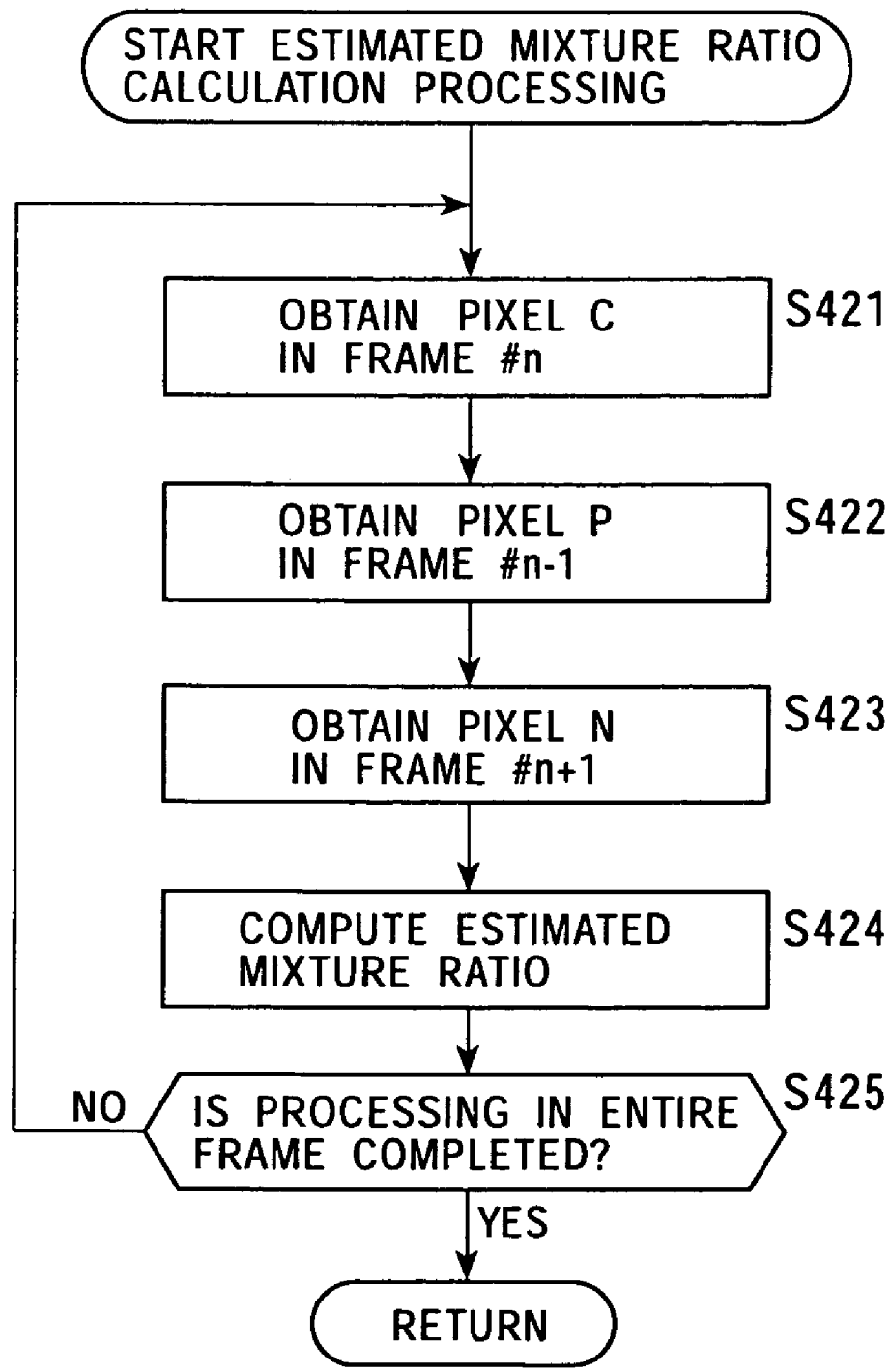
FIG. 64 is a flowchart illustrating the processing for calculating the estimated mixture ratio.

A description is now given, with reference to the flowchart of FIG. 64, of the mixture-ratio estimating processing by using a model of the covered background area in step S402 of FIG. 63.

In step S421, the mixture-ratio calculator 423 obtains the pixel value C of the designated pixel in frame #n from the frame memory 421.

In step S422, the mixture-ratio calculator 423 obtains the pixel value P of the pixel in frame #n−1, which corresponds to the designated pixel, from the frame memory 422.

In step S423, the mixture-ratio calculator 423 obtains the pixel value N of the pixel in frame #n+1, which corresponds to the designated pixel included in the input image.

In step S424, the mixture-ratio calculator 423 calculates an estimated mixture ratio based on the pixel value C of the designated pixel in frame #n, the pixel value P of the pixel in frame #n−1 and the pixel value N of the pixel in frame #n+1.

In step S425, the mixture-ratio calculator 423 determines whether the processing for calculating estimated mixture ratios in the entire frame is completed. If it is determined that the processing for calculating estimated mixture ratios in the entire frame is not completed, the process returns to step S421 and repeats the processing for calculating an estimated mixture ratio for the subsequent pixel.

If it is determined in step S425 that the processing for calculating estimated mixture ratios in the entire frame is completed, the processing is terminated.

As discussed above, the estimated-mixture-ratio processor 401 is able to calculate the estimated mixture ratio based on the input image.

The mixture-ratio estimating processing by using a model corresponding to the uncovered background area in step S403 of FIG. 63 is similar to the processing indicated by the flowchart of FIG. 64 by using the equations corresponding to a model of the uncovered background area, and an explanation thereof is thus omitted.

Since the estimated-mixture-ratio processor 442 and the estimated-mixture-ratio processor 443 shown in FIG. 62 perform the processing similar to that shown by the flowchart of FIG. 64 to calculate estimated mixture ratios, descriptions thereof are omitted.

The embodiment has been described, assuming that the object corresponding to the background is stationary. However, the above-described processing for calculating the mixture-ratio α can be applied even if the image corresponding to the background area contains motion. For example, if the image corresponding to the background area is uniformly moving, the estimated-mixture-ratio processor 401 shifts the overall image in accordance with the background motion, and performs processing in a manner similar to the case in which the object corresponding to the background is stationary. If the image corresponding to the background area contains locally different background motions, the estimated-mixture-ratio processor 401 selects the pixels corresponding to the background motions as the pixels belonging to the mixed area, and executes the above-described processing.

The mixture-ratio calculator 104 may execute the mixture-ratio estimating processing on all the pixels only by using a model corresponding to the covered background area, and outputs the calculated estimated mixture ratio as the mixture ratio α. In this case, the mixture ratio α indicates the ratio of the background components for the pixels belonging to the covered background area, and indicates the ratio of the foreground components for the pixels belonging to the uncovered background area. Concerning the pixels belonging to the uncovered background area, the absolute value of the difference between the calculated mixture ratio α and 1 is determined, and the calculated absolute value is set as the mixture ratio α. Then, the separating portion 91 is able to determine the mixture ratio α indicating the ratio of the background components for the pixels belonging to the uncovered background area.

Similarly, the mixture-ratio processor 104 may execute the mixture-ratio estimating processing on all the pixels only by using a model corresponding to the uncovered background area, and outputs the calculated estimated mixture ratio as the mixture ratio α.

The mixture-ratio calculator 104 for calculating the mixture ratio α using the characteristic that the mixture ratio α changes linearly will now be described.

As described above, since equations (11) and (12) each contain two variables, the mixture ratio α cannot be determined without modifying the equations.

The mixture ratio α linearly changes in accordance with a change in the position of the pixels because the object corresponding to the foreground is moving with constant velocity. By utilizing this characteristic, an equation in which the mixture ratio α and the sum f of the foreground components are approximated in the spatial direction can hold true. By utilizing a plurality of sets of the pixel values of the pixels belonging to the mixed area and the pixel values of the pixels belonging to the background area, the equation in which the mixture ratio α and the sum f of the foreground components are approximated is solved.

When a change in the mixture ratio α is approximated as a straight line, the mixture ratio α can be expressed by equation (23).

$$\alpha = il + p \quad (23)$$

In equation (23), i indicates the spatial index when the position of the designated pixel is set to 0, l designates the gradient of the straight line of the mixture ratio α, and p designates the intercept of the straight line of the mixture ratio α and also indicates the mixture ratio α of the designated pixel. In equation (23), the index i is known, and the gradient l and the intercept p are unknown.

Figure 65:
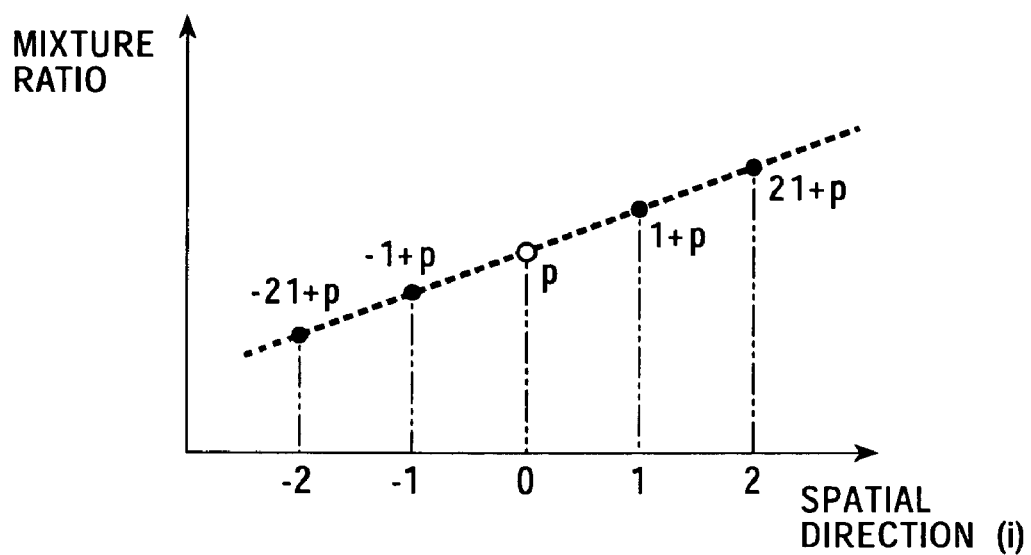
FIG. 65 illustrates a straight line for approximating the mixture ratio $\alpha$.

The relationship among the index i, the gradient l, and the intercept p is shown in FIG. 65. In FIG. 65, the white dot indicates the designated pixel, and the black dots indicate neighboring pixels.

By approximating the mixture ratio α as equation (23), a plurality of different mixture ratios a for a plurality of pixels can be expressed by two variables. In the example shown in FIG. 65, the five mixture ratios for five pixels are expressed by the two variables, i.e., the gradient l and the intercept p.

Figure 66:
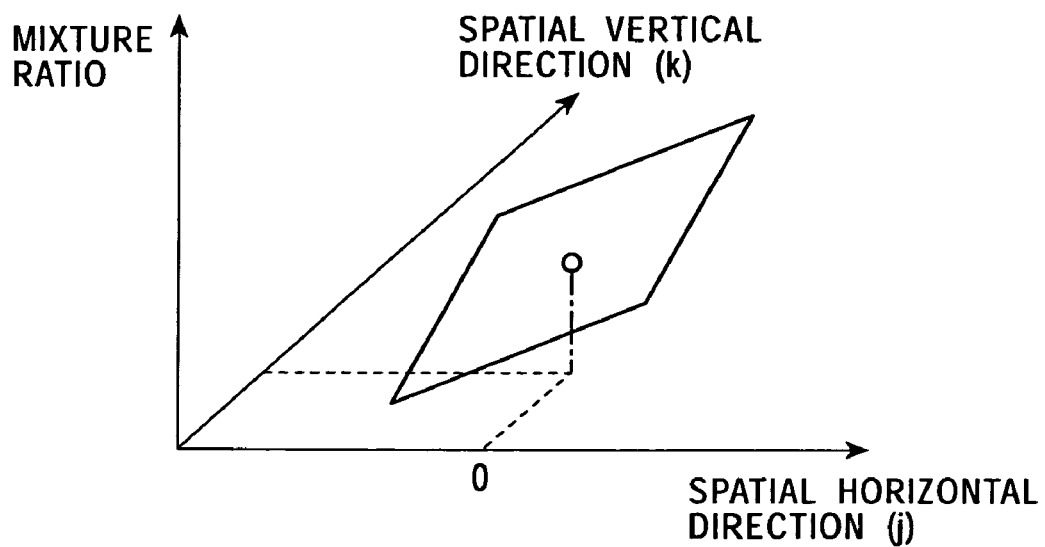
FIG. 66 illustrates a plane for approximating the mixture ratio $\alpha$.

When the mixture ratio α is approximated in the plane shown in FIG. 66, equation (23) is expanded into the plane by considering the movement v corresponding to the two directions, i.e., the horizontal direction and the vertical direction of the image, and the mixture ratio α can be expressed by equation (24). In FIG. 66, the white dot indicates the designated pixel.

$$\alpha = jm + kq + p \quad (24)$$

In equation (24), j is the index in the horizontal direction, and k is the index in the vertical direction when the position of the designated pixel is 0. In equation (24), m designates the horizontal gradient of the mixture ratio α in the plane, and q indicates the vertical gradient of the mixture ratio α in the plane. In equation (24), p indicates the intercept of the mixture ratio α in the plane.

For example, in frame #n shown in FIG. 56, equations (25) through (27) can hold true for C05 through C07, respectively.

$$C05 = \alpha 05 \cdot B05/v + f05 \tag{25}$$

$$C06 = \alpha 06 \cdot B06/v + f06 \tag{26}$$

$$C07 = \alpha 07 \cdot B07/v + f07 \tag{27}$$

Assuming that the foreground components positioned in close proximity with each other are equal to each other, i.e., that F01 through F03 are equal, equation (28) holds true by replacing F01 through F03 by fc.

$$f(x) = (1 - \alpha(x)) \cdot Fc \tag{28}$$

In equation (28), x indicates the position in the spatial direction.

When α(x) is replaced by equation (24), equation (28) can be expressed by equation (29).

$$\begin{aligned} f(x) &= (1 - (jm + kq + p)) \cdot Fc \\ &= j \cdot (-m \cdot Fc) + k \cdot (-q \cdot Fc) + ((1 - p) \cdot Fc) \\ &= js + kt + u \end{aligned} \tag{29}$$

In equation (29), (−m·Fc), (−q·Fc), and (1−p)·Fc are replaced, as expressed by equations (30) through (32), respectively.

$$s = -m \cdot Fc \tag{30}$$

$$t = -q \cdot Fc \tag{31}$$

$$u = (1-p) \cdot Fc \tag{32}$$

In equation (29), j is the index in the horizontal direction, and k is the index in the vertical direction when the position of the designated pixel is 0.

As discussed above, since it can be assumed that the object corresponding to the foreground is moving with constant velocity within the shutter period, and that the foreground components positioned in close proximity with each other are uniform, the sum of the foreground components can be approximated by equation (29).

When the mixture ratio α is approximated by a straight line, the sum of the foreground components can be expressed by equation (33).

$$f(x) = is + u \tag{33}$$

By replacing the mixture ratio α and the sum of the foreground components in equation (13) by using equations (24) and (29), the pixel value M can be expressed by equation (34).

$$\begin{aligned} M &= (jm + kq + p) \cdot B + js + kt + u \\ &= jB \cdot m + kB \cdot q + B \cdot p + j \cdot s + k \cdot t + u \end{aligned} \tag{34}$$

In equation (34), unknown variables are six factors, such as the horizontal gradient m of the mixture ratio α in the plane, the vertical gradient q of the mixture ratio α in the plane, and the intercepts of the mixture ratio α in the plane, p, s, t, and u.

According to the pixels in close proximity with the designated pixel, the pixel value M or the pixel value B is set in the normal equation shown by equation (34). Then, a plurality of normal equations in which the pixel value M or the pixel value B is set are solved by the method of least squares, thereby calculating the mixture ratio α.

For example, the horizontal index j of the designated pixel is set to 0, and the vertical index k is set to 0. Then, the pixel value M or the pixel value B is set in the normal equation shown by equation (34) for 3×3 pixels located close to the designated pixel, thereby obtaining equations (35) through (43).

$$M_{-1,-1} = (-1) \cdot B_{-1,-1} \cdot m + (-1) \cdot B_{-1,-1} \cdot q + \\ B_{-1,-1} \cdot p + (-1) \cdot s + (-1) \cdot t + u \tag{35}$$

$$M_{0,-1} = (0) \cdot B_{0,-1} \cdot m + (-1) \cdot B_{0,-1} \cdot q + \\ B_{0,-1} \cdot p + (0) \cdot s + (-1) \cdot t + u \tag{36}$$

$$M_{+1,-1} = (+1) \cdot B_{+1,-1} \cdot m + (-1) \cdot B_{+1,-1} \cdot q + \\ B_{+1,-1} \cdot p + (+1) \cdot s + (-1) \cdot t + u \tag{37}$$

$$M_{-1,0} = (-1) \cdot B_{-1,0} \cdot m + (0) \cdot B_{-1,0} \cdot q + \\ B_{-1,0} \cdot p + (-1) \cdot s + (0) \cdot t + u \tag{38}$$

$$M_{0,0} = (0) \cdot B_{0,0} \cdot m + (0) \cdot B_{0,0} \cdot q + \\ B_{0,0} \cdot p + (0) \cdot s + (0) \cdot t + u \tag{39}$$

$$M_{+1,0} = (+1) \cdot B_{+1,0} \cdot m + (0) \cdot B_{+1,0} \cdot q + \\ B_{+1,0} \cdot p + (+1) \cdot s + (0) \cdot t + u \tag{40}$$

$$M_{-1,+1} = (-1) \cdot B_{-1,+1} \cdot m + (+1) \cdot B_{-1,+1} \cdot q + \\ B_{-1,+1} \cdot p + (-1) \cdot s + (+1) \cdot t + u \tag{41}$$

$$M_{0,+1} = (0) \cdot B_{0,+1} \cdot m + (-1) \cdot B_{0,+1} \cdot q + \\ B_{0,+1} \cdot p + (0) \cdot s + (+1) \cdot t + u \tag{42}$$

$$M_{+1,+1} = (+1) \cdot B_{+1,+1} \cdot m + (+1) \cdot B_{+1,+1} \cdot q + \\ B_{+1,+1} \cdot p + (+1) \cdot s + (+1) \cdot t + u \tag{43}$$

Since the horizontal index j of the designated pixel is 0, and the vertical index k of the designated pixel is 0, the mixture ratio α of the designated pixel is equal to the value when j is 0 and k is 0 in equation (24), i.e., the mixture ratio α is equal to the intercept p in equation (24).

Accordingly, based on nine equations (35) through (43), the horizontal gradient m, the vertical gradient q, and the intercepts p, s, t, and u are calculated by the method of least squares, and the intercept p is output as the mixture ratio α.

A specific process for calculating the mixture ratio α by applying the method of least squares is as follows.

When the index i and the index k are expressed by a single index x, the relationship among the index i, the index k, and the index x can be expressed by equation (44).

$$x = (j+1) \cdot 3 + (k+1) \tag{44}$$

It is now assumed that the horizontal gradient m, the vertical gradient q, and the intercepts p, s, t, and u are expressed by variables w0, w1, w2, w3, w4, and W5, respectively, and jB, kB, B, j, k and l are expressed by a0, a1, a2, a3, a4, and a5, respectively. In consideration of the error ex, equations (35) through (43) can be modified into equation (45).

$$Mx = \sum_{y=0}^{5} ay \cdot wy + ex \qquad (45)$$

In equation (45), x is any one of the integers from 0 to 28. Equation (46) can be found from equation (45).

$$ex = Mx - \sum_{y=0}^{5} ay \cdot wy \qquad (46)$$

Since the method of least squares is applied, the square sum E of the error is defined as follows, as expressed by equation (47).

$$E = \sum_{x=0}^{8} ex^2 \qquad (47)$$

In order to minimize the error, the partial differential value of the variable Wv with respect to the square sum E of the error should be 0. v is any one of the integers from 0 to 5. Thus, wy is determined so that equation (48) is satisfied.

$$\frac{\partial E}{\partial Wv} = 2 \cdot \sum_{x=0}^{8} ex \cdot \frac{\partial ex}{\partial Wv} \qquad (48)$$

$$= 2 \cdot \sum_{x=0}^{8} ex \cdot av = 0$$

By substituting equation (46) into equation (48), equation (49) is obtained.

$$\sum_{x=0}^{8} \left( av \cdot \sum_{y=0}^{5} ay \cdot Wy \right) = \sum_{x=0}^{8} av \cdot Mx \qquad (49)$$

For example, the sweep-out method (Gauss-Jordan elimination) is applied to six equations obtained by substituting one of the integers from 0 to 5 into v in equation (49), thereby obtaining wy. As stated above, w0 is the horizontal gradient m, w1 is the vertical gradient q, w2 is the intercept p, w3 is s, w4 is t, and w5 is u.

As discussed above, by applying the method of least squares to the equations in which the pixel value M and the pixel value B are set, the horizontal gradient m, the vertical gradient q, and the intercepts p, s, t, and u can be determined.

A description has been given with reference to equations (35) through (43), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, when the mixture ratio α of the pixel contained in the covered background area in frame #n shown in FIG. 56 is determined, C04 through C08 of the pixels in frame #n and the pixel values P04 through P08 of the pixels in frame #n−1 are set in the normal equations.

For determining the mixture ratio α of the pixel contained in the uncovered background area in frame #n shown in FIG. 57, the pixels C28 through C32 of frame #n and the pixel values N28 through N32 of the pixels in frame #n+1 are set in the normal equations.

Figure 67:
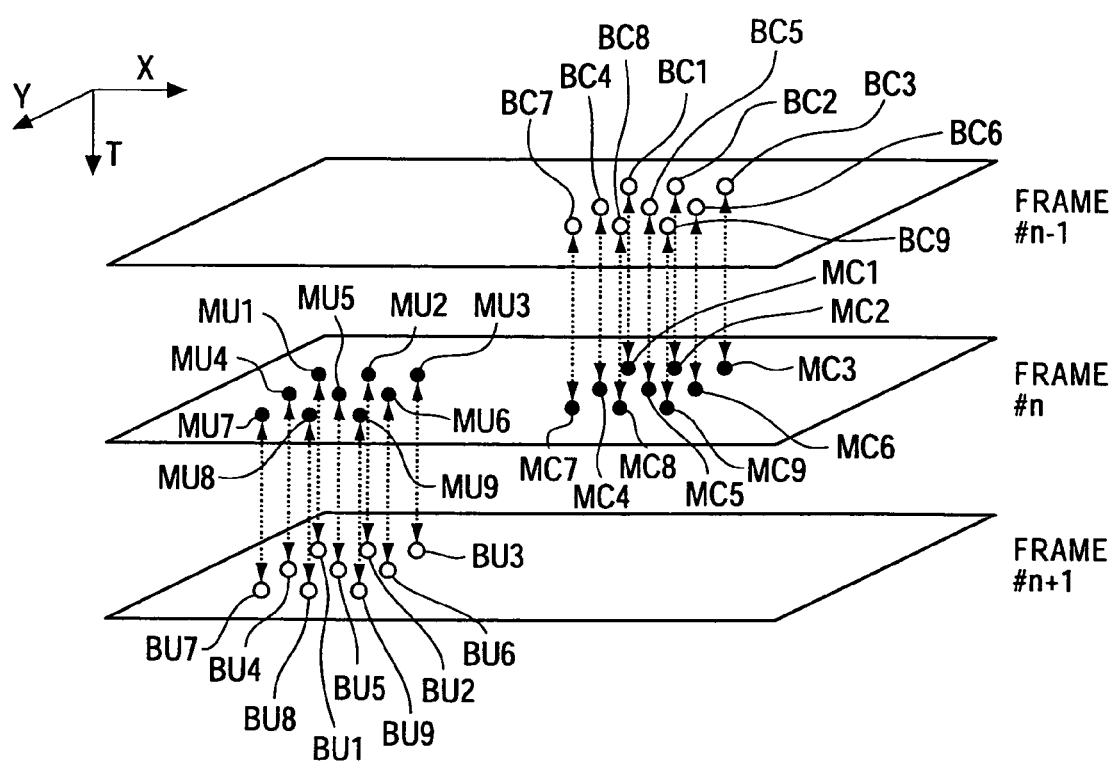
FIG. 67 illustrates the relationships of the pixels in a plurality of frames when the mixture ratio $\alpha$ is calculated.

Moreover, if, for example, the mixture ratio α of the pixel contained in the covered background area shown in FIG. 67 is calculated, the following equations (50) through (58) are set. The pixel value of the pixel for which the mixture ratio α is calculated is Mc5. In FIG. 67, the white dots indicate pixels to belong to the background, and the black dots indicate pixels to belong to the mixed area.

$$Mc1 = (-1) \cdot Bc1 \cdot m + (-1) \cdot Bc1 \cdot q + Bc1 \cdot p + (-1) \cdot s + (-1) \cdot t + u \qquad (50)$$

$$Mc2 = (0) \cdot Bc2 \cdot m + (-1) \cdot Bc2 \cdot q + Bc2 \cdot p + (0) \cdot s + (-1) \cdot t + u \qquad (51)$$

$$Mc3 = (+1) \cdot Bc3 \cdot m + (-1) \cdot Bc3 \cdot q + Bc3 \cdot p + (+1) \cdot s + (-1) \cdot t + u \qquad (52)$$

$$Mc4 = (-1) \cdot Bc4 \cdot m + (0) \cdot Bc4 \cdot q + Bc4 \cdot p + (-1) \cdot s + (0) \cdot t + u \qquad (53)$$

$$Mc5 = (0) \cdot Bc5 \cdot m + (0) \cdot Bc5 \cdot q + Bc5 \cdot p + (0) \cdot s + (0) \cdot t + u \qquad (54)$$

$$Mc6 = (+1) \cdot Bc6 \cdot m + (0) \cdot Bc6 \cdot q + Bc6 \cdot p + (+1) \cdot s + (0) \cdot t + u \qquad (55)$$

$$Mc7 = (-1) \cdot Bc7 \cdot m + (+1) \cdot Bc7 \cdot q + Bc7 \cdot p + (-1) \cdot s + (+1) \cdot t + u \qquad (56)$$

$$Mc8 = (0) \cdot Bc8 \cdot m + (+1) \cdot Bc8 \cdot q + Bc8 \cdot p + (0) \cdot s + (+1) \cdot t + u \qquad (57)$$

$$Mc9 = (+1) \cdot Bc9 \cdot m + (+1) \cdot Bc9 \cdot q + Bc9 \cdot p + (+1) \cdot s + (+1) \cdot t + u \qquad (58)$$

When calculating the mixture ratio α of the pixel contained in the covered background area in frame #n, the pixel values Bc1 through Bc9 of the pixels in the background area in frame #n−1 corresponding to the pixels in frame #n are used in equations (50) through (58).

When, for example, the mixture ratio α of the pixel contained in the uncovered background area shown in FIG. 67 is calculated, the following equations (59) through (67) are set. The pixel value of the pixel for which the mixture ratio α is calculated is Mu5.

$$Mu1 = (-1) \cdot Bu1 \cdot m + (-1) \cdot Bu1 \cdot q + Bu1 \cdot p + (-1) \cdot s + (-1) \cdot t + u \qquad (59)$$

$$Mu2 = (0) \cdot Bu2 \cdot m + (-1) \cdot Bu2 \cdot q + Bu2 \cdot p + (0) \cdot s + (-1) \cdot t + u \qquad (60)$$

$$Mu3 = (+1) \cdot Bu3 \cdot m + (-1) \cdot Bu3 \cdot q + Bu3 \cdot p + (+1) \cdot s + (-1) \cdot t + u \qquad (61)$$

$$Mu4 = (-1) \cdot Bu4 \cdot m + (0) \cdot Bu4 \cdot q + Bu4 \cdot p + (-1) \cdot s + (0) \cdot t + u \qquad (62)$$

$$Mu5 = (0) \cdot Bu5 \cdot m + (0) \cdot Bu5 \cdot q + Bu5 \cdot p + (0) \cdot s + (0) \cdot t + u \qquad (63)$$

$$Mu6 = (+1) \cdot Bu6 \cdot m + (0) \cdot Bu6 \cdot q + Bu6 \cdot p + (+1) \cdot s + (0) \cdot t + u \qquad (64)$$

$$Mu7 = (-1) \cdot Bu7 \cdot m + (+1) \cdot Bu7 \cdot q + Bu7 \cdot p + (-1) \cdot s + (+1) \cdot t + u \qquad (65)$$

$$Mu8 = (0) \cdot Bu8 \cdot m + (+1) \cdot Bu8 \cdot q + Bu8 \cdot p + (0) \cdot s + (+1) \cdot t + u \qquad (66)$$

$$Mu9 = (+1) \cdot Bu9 \cdot m + (+1) \cdot Bu9 \cdot q + Bu9 \cdot p + (+1) \cdot s + (+1) \cdot t + u \qquad (67)$$

When calculating the mixture ratio α of the pixel contained in the uncovered background area in frame #n, the pixel values Bu1 through Bu9 of the pixels of the background area in frame #n+1 corresponding to the pixels of frame #n are used in equations (59) through (67).

Figure 68:
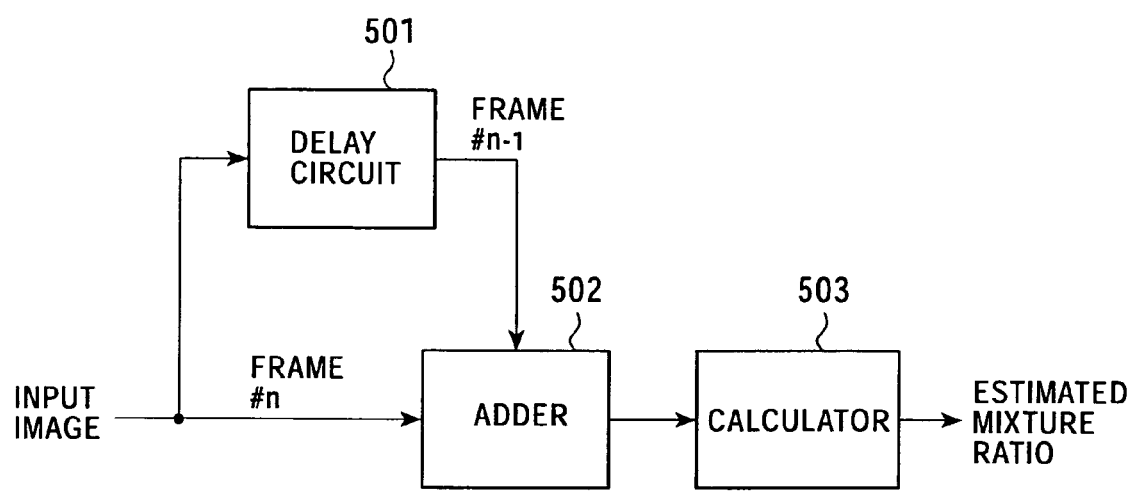
FIG. 68 is a block diagram illustrating another configuration of the mixture-ratio estimation processor 401.

FIG. 68 is a block diagram illustrating the configuration of the estimated-mixture-ratio processor 401. An image input into the estimated-mixture-ratio processor 401 is supplied to a delay circuit 501 and an adder 502.

The delay circuit 501 delays the input image for one frame, and supplies the image to the adder 502. When frame #n is supplied as the input image to the adder 502, the delay circuit 501 supplies frame #n−1 to the adder 502.

The adder 502 sets the pixel value of the pixel adjacent to the pixel for which the mixture ratio α is calculated, and the pixel value of frame #n−1 in the normal equation. For example, the adder 502 sets the pixel values Mc1 through Mc9 and the pixel values Bc1 through Bc9 in the normal equations based on equations (50) through (58), respectively. The adder 502 supplies the normal equations in which the pixel values are set to a calculator 503.

Using the sweep-out method or the like, the calculator 503 determines the estimated mixture ratio by solving the normal equations supplied from the adder 502, and outputs the determined estimated mixture ratio.

In this manner, the estimated-mixture-ratio processor 401 is able to calculate the estimated mixture ratio based on the input image, and supplies it to the mixture-ratio determining portion 403.

The estimated-mixture-ratio processor 402 is configured similar to the estimated-mixture-ratio processor 401, and an explanation thereof is thus omitted.

Figure 69:
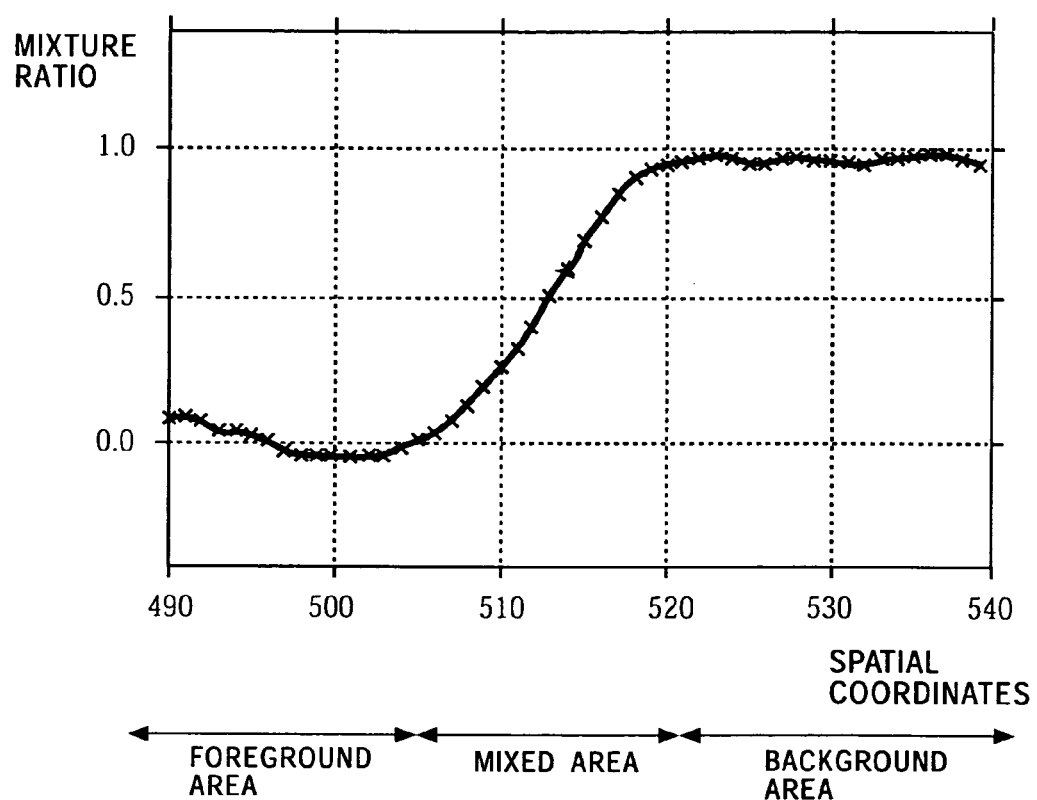
FIG. 69 illustrates an example of an estimated mixture ratio.

FIG. 69 illustrates an example of an estimated mixture ratio calculated by the estimated-mixture-ratio processor 401. The estimated mixture ratio shown in FIG. 69 indicates the calculation result, with respect to one line, obtained by generating and calculating an equation in units of 7×7-pixel blocks in which the amount of motion v in the foreground corresponding to an object moving at a constant speed is 11.

FIG. 68 shows that the estimated mixture ratio changes substantially linearly in the mixed area.

Figure 70:
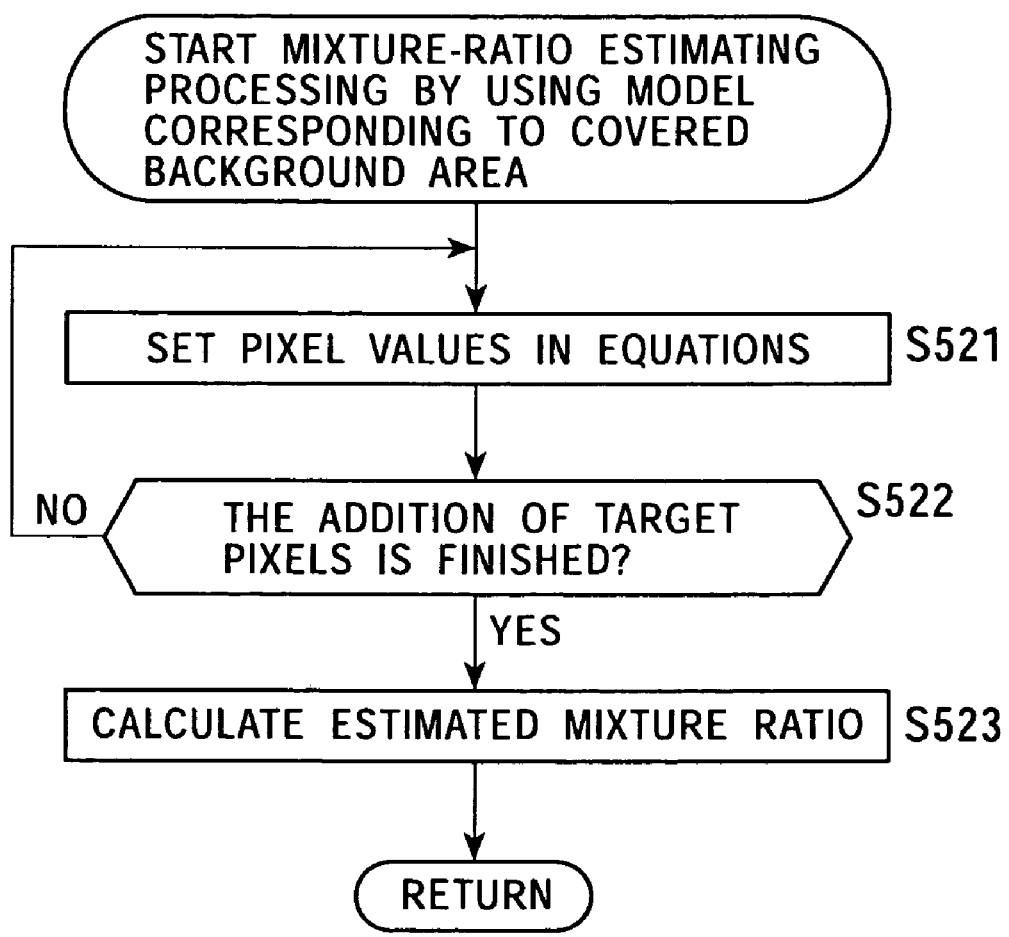
FIG. 70 is a flowchart illustrating the mixture-ratio estimating processing by using a model corresponding to a covered background area.

A description is now given, with reference to the flowchart of FIG. 70, of the mixture-ratio estimating processing by the estimated-mixture-ratio processor 401 having the configuration shown in FIG. 68 by using a model of the covered background area.

In step S521, the adder 502 sets the pixel value contained in the input image and the pixel value contained in the image supplied from the delay circuit 501 in a normal equation corresponding to a model of the covered background area.

In step S522, the estimated-mixture-ratio processor 401 determines whether the setting of the designated pixels is finished. If it is determined that the setting of the designated pixels is not finished, the process returns to step S521, and the processing for setting the pixel values in the normal equation is repeated.

If it is determined in step S522 that the setting for the designated pixels is finished, the process proceeds to step S523. In step S523, a calculator 173 calculates the estimated mixture ratio based on the normal equations in which the pixels values are set, and outputs the calculated mixture ratio.

As discussed above, the estimated-mixture-ratio processor 401 having the configuration shown in FIG. 68 is able to calculate the estimated mixture ratio based on the input image.

The mixture-ratio estimating processing by using a model corresponding to the uncovered background area is similar to the processing indicated by the flowchart of FIG. 70 by using the normal equations corresponding to a model of the uncovered background area, and an explanation thereof is thus omitted.

The embodiment has been described, assuming that the object corresponding to the background is stationary. However, the above-described mixture-ratio calculation processing can be applied even if the image corresponding to the background area contains motion. For example, if the image corresponding to the background area is uniformly moving, the estimated-mixture-ratio processor 401 shifts the overall image in accordance with this motion, and performs processing in a manner similar to the case in which the object corresponding to the background is stationary. If the image corresponding to the background area contains locally different motions, the estimated-mixture-ratio processor 401 selects the pixels corresponding to the motions as the pixels belonging to the mixed area, and executes the above-described processing.

As described above, the mixture-ratio calculator 102 is able to calculate the mixture ratio α, which is a feature quantity corresponding to each pixel, based on the input image and the area information supplied to the area specifying unit 101.

By utilizing the mixture ratio α, it is possible to separate the foreground components and the background components contained in the pixel values while maintaining the information of motion blur contained in the image corresponding to the moving object.

By combining the images based on the mixture ratio α, it is also possible to create an image which contains correct motion blur that coincides with the speed of a moving object and which faithfully reflects the real world.

Figure 71:
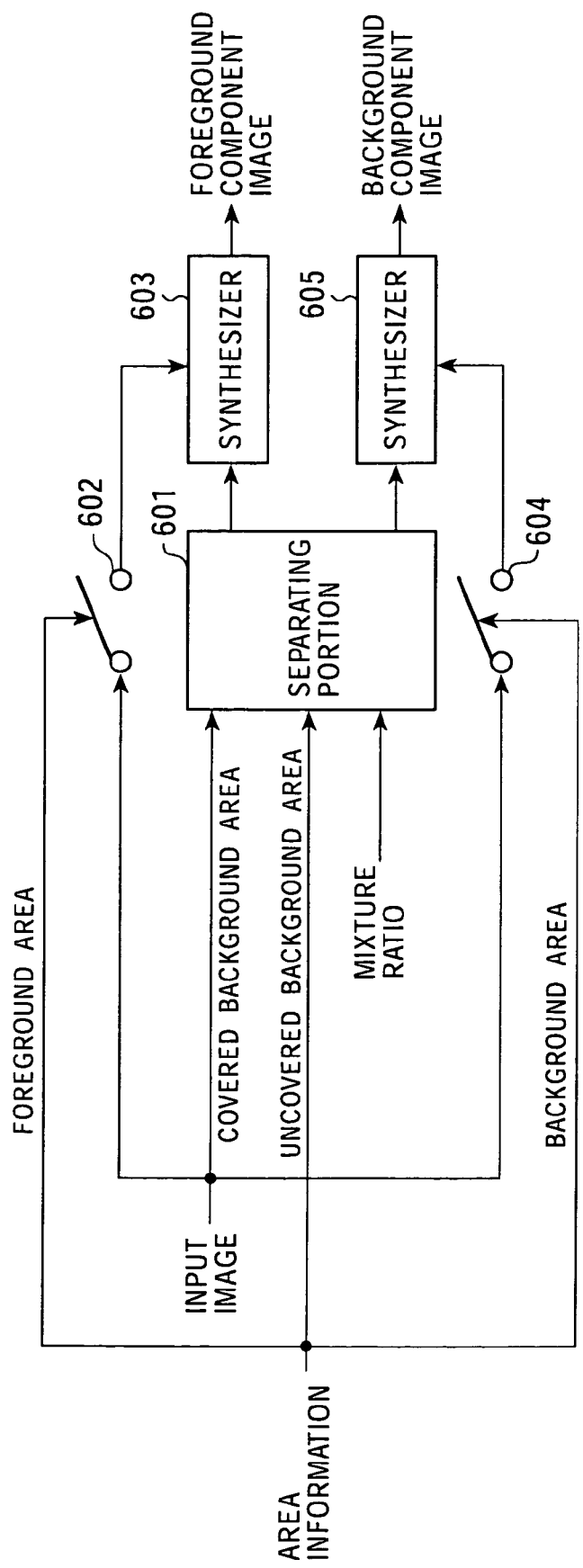
FIG. 71 is a block diagram illustrating an example of the configuration of a foreground/background separator 105.

The foreground/background separator 105 is discussed below. FIG. 71 is a block diagram illustrating an example of the configuration of the foreground/background separator 105. The input image supplied to the foreground/background separator 105 is supplied to a separating portion 601, a switch 602, and a switch 604. The area information supplied from the area specifying unit 103 and indicating the information of the covered background area and the uncovered background area is supplied to the separating portion 601. The area information indicating the foreground area is supplied to the switch 602. The area information indicating the background area supplied to the switch 604.

The mixture ratio α supplied from the mixture-ratio calculator 104 is supplied to the separating portion 601.

The separating portion 601 separates the foreground components from the input image based on the area information indicating the covered background area, the area information indicating the uncovered background area, and the mixture ratio α, and supplies the separated foreground components to a synthesizer 603. The separating portion 601 also separates the background components from the input image, and supplies the separated background components to a synthesizer 605.

The switch 602 is closed when a pixel corresponding to the foreground is input based on the area information indicating the foreground area, and supplies only the pixels corresponding to the foreground contained in the input image to the synthesizer 603.

The switch 604 is closed when a pixel corresponding to the background is input based on the area information indicating the background area, and supplies only the pixels corresponding to the background contained in the input image to the synthesizer 605.

The synthesizer 603 synthesizes a foreground component image based on the foreground components supplied from the separating portion 601 and the pixels corresponding to the foreground supplied from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components supplied from the separating portion 601 and the pixels corresponding to the background supplied from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 72B:
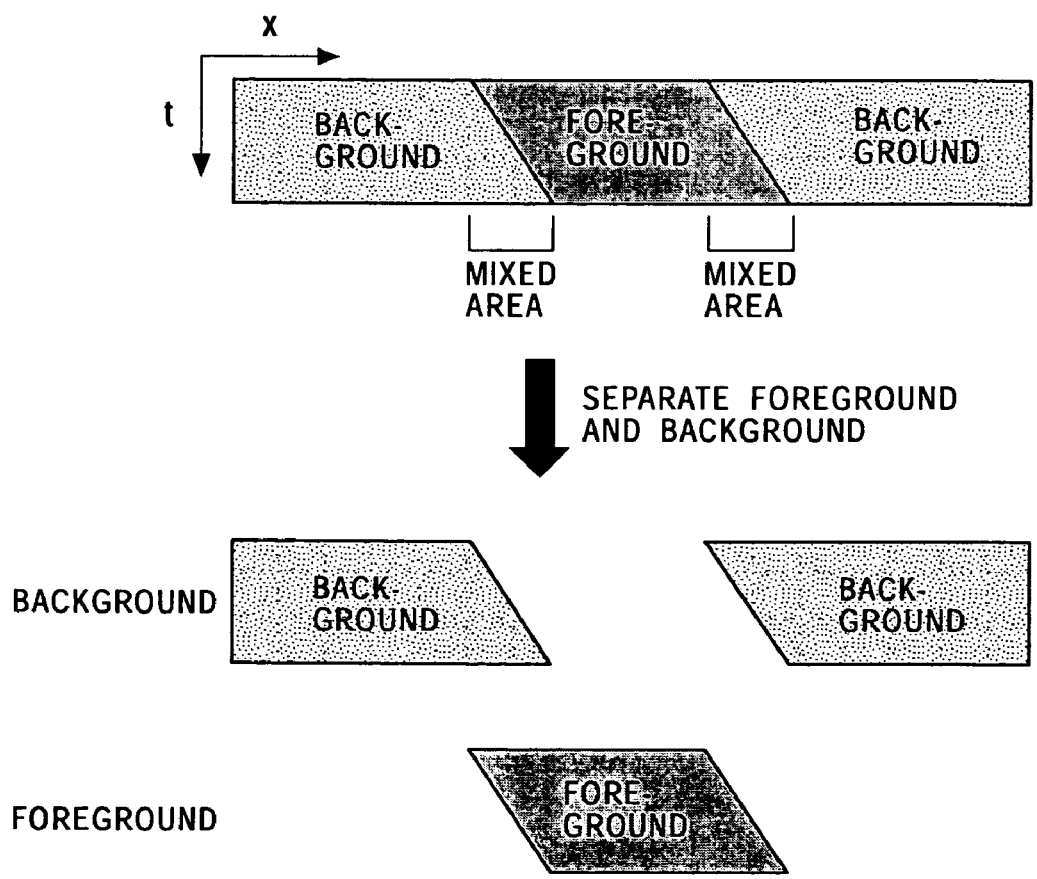
FIG. 72B illustrates an input image, a foreground component image, and a background component image.

FIGS. 72A and 72B illustrate the input image input into the foreground/background separator 105 and the foreground component image and the background component image output from the foreground/background separator 105.

FIG. 72A is a schematic diagram illustrating the image to be displayed, and FIG. 72B is a model obtained by expanding in the time direction the pixels disposed in one line including the pixels belonging to the foreground area, the pixels belonging to the background area, and the pixels belonging to the mixed area corresponding to FIG. 72A.

As shown in FIGS. 72A and 72B, the background component image output from the foreground/background separator 105 consists of the pixels belonging to the background area and the background components contained in the pixels of the mixed area.

As shown in FIGS. 72A and 72B, the foreground component image output from the foreground/background separator 105 consists of the pixel belonging to the foreground area and the foreground components contained in the pixels of the mixed area.

The pixel values of the pixels in the mixed area are separated into the background components and the foreground components by the foreground/background separator 105. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of the processing executed by the separating portion 601 for separating the foreground components and the background components from the pixels belonging to the mixed area.

Figure 73:
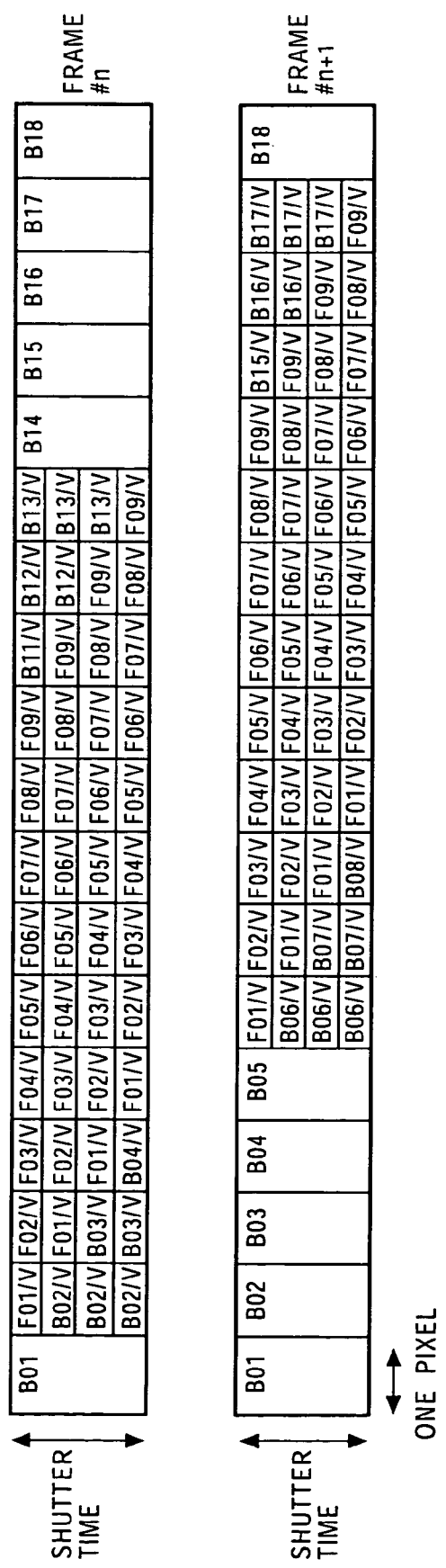
FIG. 73 illustrates a model in which pixel values are expanded in the time direction and the period corresponding to the shutter time is divided.

FIG. 73 illustrates a model of an image indicating foreground components and background components in two frames including a foreground object moving from the left to the right in FIG. 73. In the model of the image shown in FIG. 73, the amount of movement v is 4, and the number of virtual divided portions is 4.

In frame #n, the leftmost pixel and the fourteenth through eighteenth pixels from the left consist of only the background components and belong to the background area. In frame #n, the second through fourth pixels from the left contain the background components and the foreground components, and belong to the uncovered background area. In frame #n, the eleventh through thirteenth pixels from the left contain background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left contain background components and foreground components, and belong to the uncovered background area. In frame #n+1, the fifteenth through seventeenth pixels from the left contain background components and foreground components, and belong to the covered background area. In frame #n+1, the ninth through fourteenth pixels from the left consist of only the foreground components, and belong to the foreground area.

Figure 74:
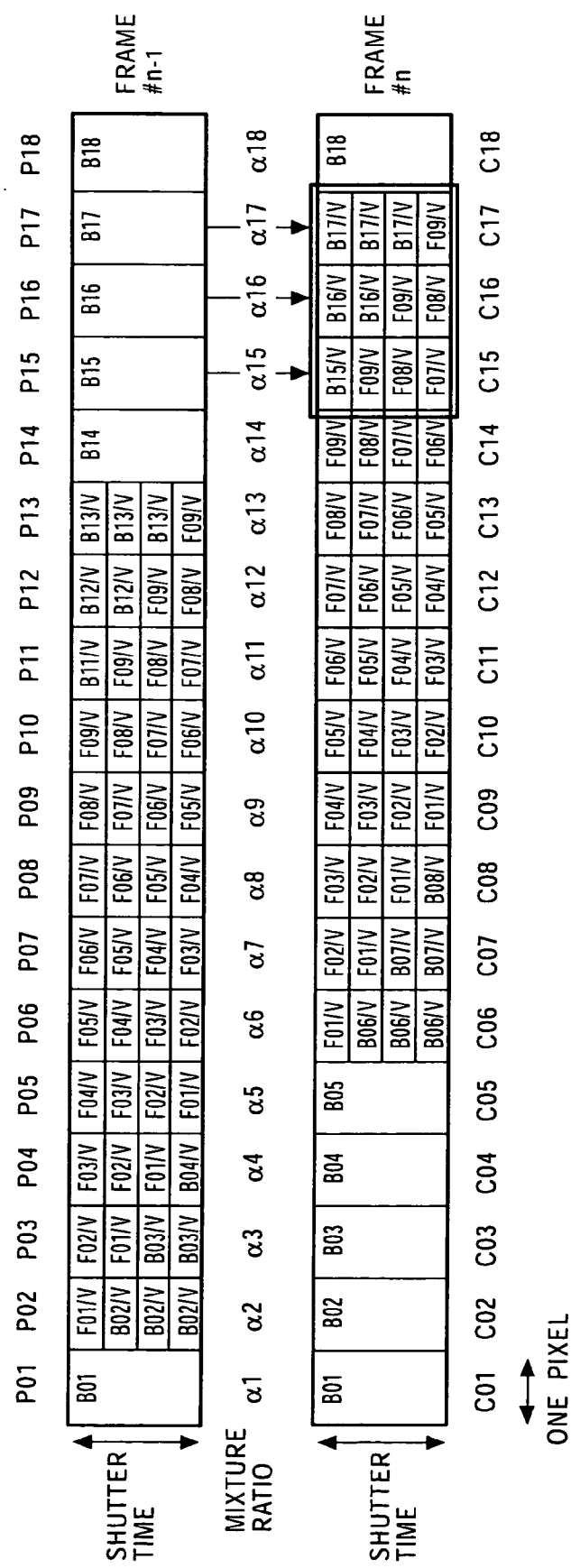
FIG. 74 illustrates a model in which pixel values are expanded in the time direction and the period corresponding to the shutter time is divided.

FIG. 74 illustrates the processing for separating the foreground components from the pixels belonging to the covered background area. In FIG. 74, $\alpha 1$ through $\alpha 18$ indicate mixture ratios of the individual pixels of frame #n. In FIG. 74, the fifteenth through seventeenth pixels from the left belong to the covered background area.

The pixel value C15 of the fifteenth pixel from the left in frame #n can be expressed by equation (68):

$$C15 = B15/v + F09/v + F08/v + F07/v \qquad (68)$$
$$= \alpha 15 \cdot B15 + F09/v + F08/v + F07/v$$
$$= \alpha 15 \cdot P15 + F09/v + F08/v + F07/v$$

where $\alpha 15$ indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (69) based on equation (68).

$$f15 = F09/v + F08/v + F07/v \qquad (69)$$
$$= C15 - \alpha 15 \cdot P15$$

Similarly, the sum f16 of the foreground components of the sixteenth pixel from the left in frame #n can be expressed by equation (70), and the sum f17 of the foreground components of the seventeenth pixel from the left in frame #n can be expressed by equation (71).

$$f16=C16-\alpha16 \cdot P16 \quad (70)$$

$$f17=C17-\alpha17 \cdot P17 \quad (71)$$

In this manner, the foreground components fc contained in the pixel value C of the pixel belonging to the covered background area can be expressed by equation (72):

$$fc=C-\alpha \cdot P \quad (72)$$

where P designates the pixel value of the corresponding pixel in the previous frame.

Figure 75:
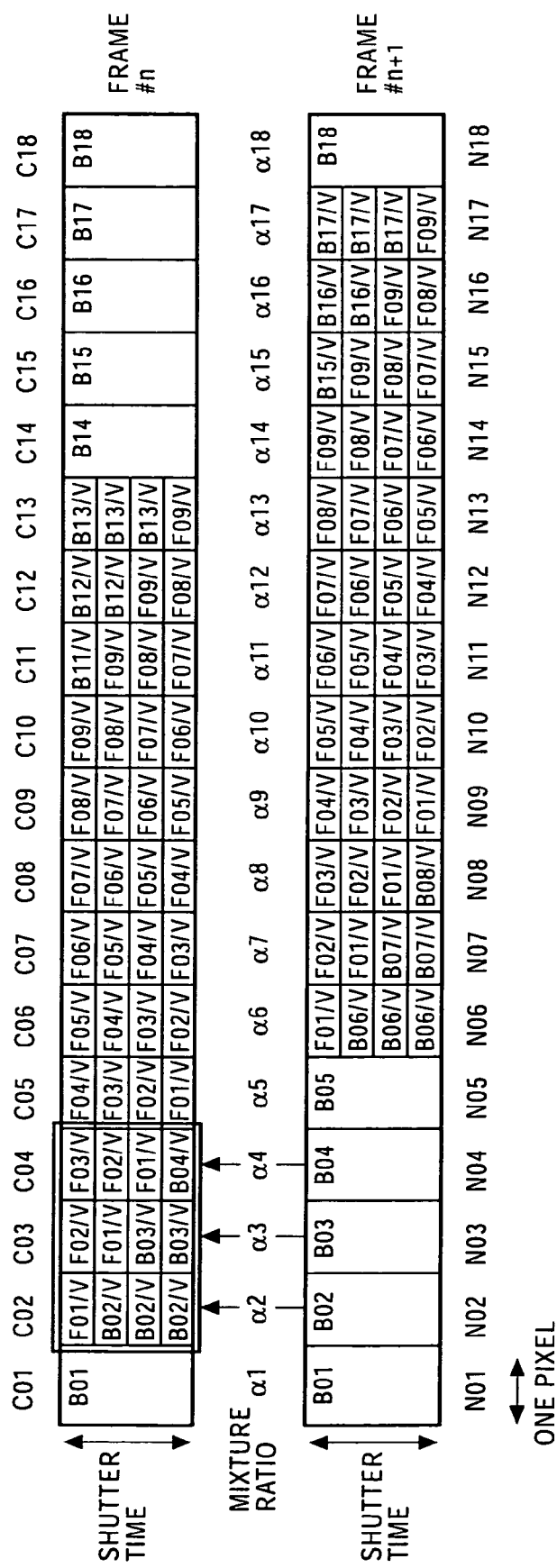
FIG. 75 illustrates a model in which pixel values are expanded in the time direction and the period corresponding to the shutter time is divided.

FIG. 75 illustrates the processing for separating the foreground components from the pixels belonging to the uncovered background area. In FIG. 75, $\alpha1$ through $\alpha18$ indicate mixture ratios of the individual pixels of frame #n. In FIG. 75, the second through fourth pixels from the left belong to the uncovered background area.

The pixel value C02 of the second pixel from the left in frame #n can be expressed by equation (73):

$$C02=B02/v+B02/v+B02/v+F01/v=\alpha2 \cdot B02+F01/v=\alpha2 \cdot N02+F01/v \quad (73)$$

where $\alpha2$ indicates the mixture ratio of the second pixel from the left in frame #n, and N02 designates the pixel value of the second pixel from the left in frame #n+1.

The sum f02 of the foreground components of the second pixel from the left in frame #n can be expressed by equation (74) based on equation (73).

$$f02=F01/v=C02-\alpha2 \cdot N02 \quad (74)$$

Similarly, the sum f03 of the foreground components of the third pixel from the left in frame #n can be expressed by equation (75), and the sum f04 of the foreground components of the fourth pixel from the left in frame #n can be expressed by equation (76).

$$f03=C03-\alpha3 \cdot N03 \quad (75)$$

$$f04=C04-\alpha4 \cdot N04 \quad (76)$$

In this manner, the foreground components fu contained in the pixel value C of the pixel belonging to the uncovered background area can be expressed by equation (77)

$$fu=C-\alpha \cdot N \quad (77)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area contained in the area information, and the mixture ratio $\alpha$ for each pixel.

FIG. 76 is a block diagram illustrating an example of the configuration of the separating portion 601 for executing the above-described processing. An image input into the separating portion 601 is supplied to a frame memory 621, and the area information indicating the covered background area and the uncovered background area supplied from the mixture-ratio calculator 104 and the mixture ratio $\alpha$ are supplied to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 supplies the corresponding pixels in frame #n−1, frame #n, and frame #n+1 to the separation processing block 622.

The separation processing block 622 applies the calculations discussed with reference to FIGS. 74 and 75 to the pixel values of the corresponding pixels in frame #n−1, frame #n, and frame #n+1 supplied from the frame memory 621 based on the area information indicating the covered background area and the uncovered background area and the mixture ratio $\alpha$ so as to separate the foreground components and the background components from the pixels belonging to the mixed area in frame #n, and supplies them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 supplied from the frame memory 621 by the mixture ratio $\alpha$, and outputs the resulting pixel value to a switch 642. The switch 642 is closed when the pixel of frame #n (corresponding to the pixel in frame #n+1) supplied from the frame memory 621 belongs to the uncovered background area, and supplies the pixel value multiplied by the mixture ratio $\alpha$ supplied from the multiplier 641 to a calculator 643 and the synthesizer 634. The value obtained by multiplying the pixel value of the pixel in frame #n+1 by the mixture ratio $\alpha$ output from the switch 642 is equivalent to the background components of the pixel value of the corresponding pixel in frame #n.

The calculator 643 subtracts the background components supplied from the switch 642 from the pixel value of the pixel in frame #n supplied from the frame memory 621 so as to obtain the foreground components. The calculator 643 supplies the foreground components of the pixel in frame #n belonging to the uncovered background area to the synthesizer 633.

A multiplier 651 of the covered area processor 632 multiplies the pixel value of the pixel in frame #n−1 supplied from the frame memory 621 by the mixture ratio $\alpha$, and outputs the resulting pixel value to a switch 652. The switch 652 is closed when the pixel of frame #n (corresponding to the pixel in frame #n−1) supplied from the frame memory 621 belongs to the covered background area, and supplies the pixel value multiplied by the mixture ratio $\alpha$ supplied from the multiplier 651 to a calculator 653 and the synthesizer 634. The value obtained by multiplying the pixel value of the pixel in frame #n−1 by the mixture ratio $\alpha$ output from the switch 652 is equivalent to the background components of the pixel value of the corresponding pixel in frame #n.

The calculator 653 subtracts the background components supplied from the switch 652 from the pixel value of the pixel in frame #n supplied from the frame memory 621 so as to obtain the foreground components. The calculator 653 supplies the foreground components of the pixel in frame #n belonging to the covered background area to the synthesizer 633.

The synthesizer 633 combines the foreground components of the pixels belonging to the uncovered background area and supplied from the calculator 643 with the foreground components of the pixels belonging to the covered background area and supplied from the calculator 653, and supplies the synthesized foreground components to the frame memory 623.

The synthesizer 634 combines the background components of the pixels belonging to the uncovered background area and supplied from the switch 642 with the background components of the pixels belonging to the covered background area and supplied from the switch 652, and supplies the synthesized background components to the frame memory 623.

The frame memory 623 stores the foreground components and the background components of the pixels in the mixed area of frame #n supplied from the separation processing block 622.

The frame memory 623 outputs the stored foreground components of the pixels in the mixed area in frame #n and the stored background components of the pixels in the mixed area in frame #n.

By utilizing the mixture ratio α, which indicates the feature quantity, the foreground components and the background components contained in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

FIGS. 77A and 77B illustrate an example of the foreground component image and an example of the background component image corresponding to frame #n in FIG. 73.

FIG. 77A illustrates the example of the foreground component image corresponding to frame #n in FIG. 73. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

FIG. 77B illustrates the example of the background component image corresponding to frame #n in FIG. 73. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 78:
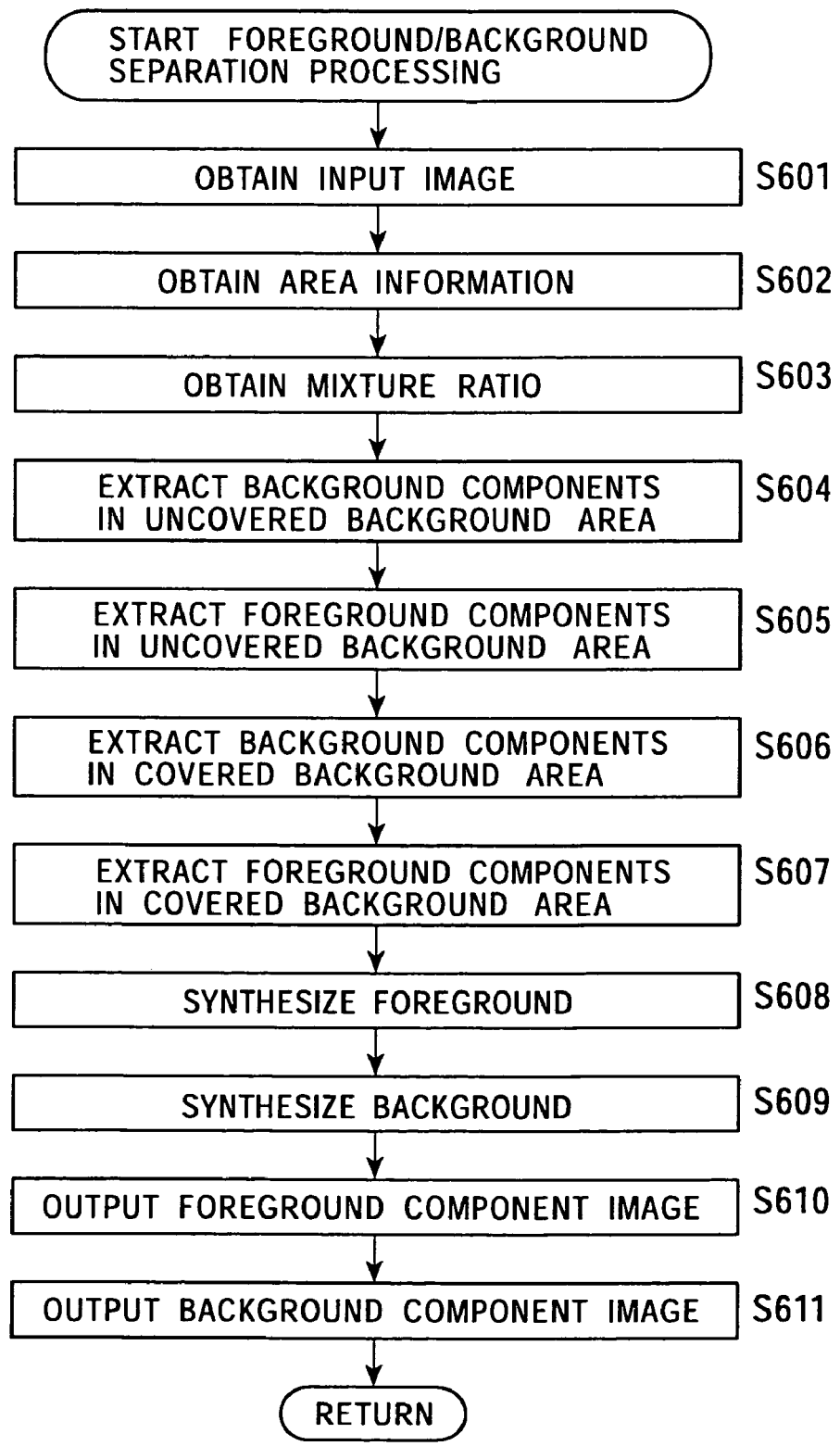
FIG. 78 is a flowchart illustrating the processing for separating a foreground and a background.

The processing for separating the foreground and the background executed by the foreground/background separator 105 is described below with reference to the flowchart of FIG. 78. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information supplied from the mixture-ratio calculator 104. In step S603, the separation processing block 622 of the separating portion 601 obtains the mixture ratio α supplied from the mixture-ratio calculator 104.

In step S604, the uncovered area processor 631 extracts the background components from the pixel values of the pixels belonging to the uncovered background area supplied from the frame memory 621 based on the area information and the mixture ratio α.

In step S605, the uncovered area processor 631 extracts the foreground components from the pixel values of the pixels belonging to the uncovered background area supplied from the frame memory 621 based on the area information and the mixture ratio α.

In step S606, the covered area processor 632 extracts the background components from the pixel values of the pixels belonging to the covered background area supplied from the frame memory 621 based on the area information and the mixture ratio α.

In step S607, the covered area processor 632 extracts the foreground components from the pixel values of the pixels belonging to the covered background area supplied from the frame memory 621 based on the area information and the mixture ratio α.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are supplied to the synthesizer 603. The synthesizer 603 further combines the pixels belonging to the foreground area supplied via the switch 602 with the foreground components supplied from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are supplied to the synthesizer 605. The synthesizer 605 further combines the pixels belonging to the background area supplied via the switch 604 with the background components supplied from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 105 is able to separate the foreground components and the background components from the input image based on the area information and the mixture ratio α, and outputs the foreground component image consisting of only the foreground components and the background component image consisting of only the background components.

Adjustments of the amount of motion blur in a foreground component image are described below.

Figure 79:
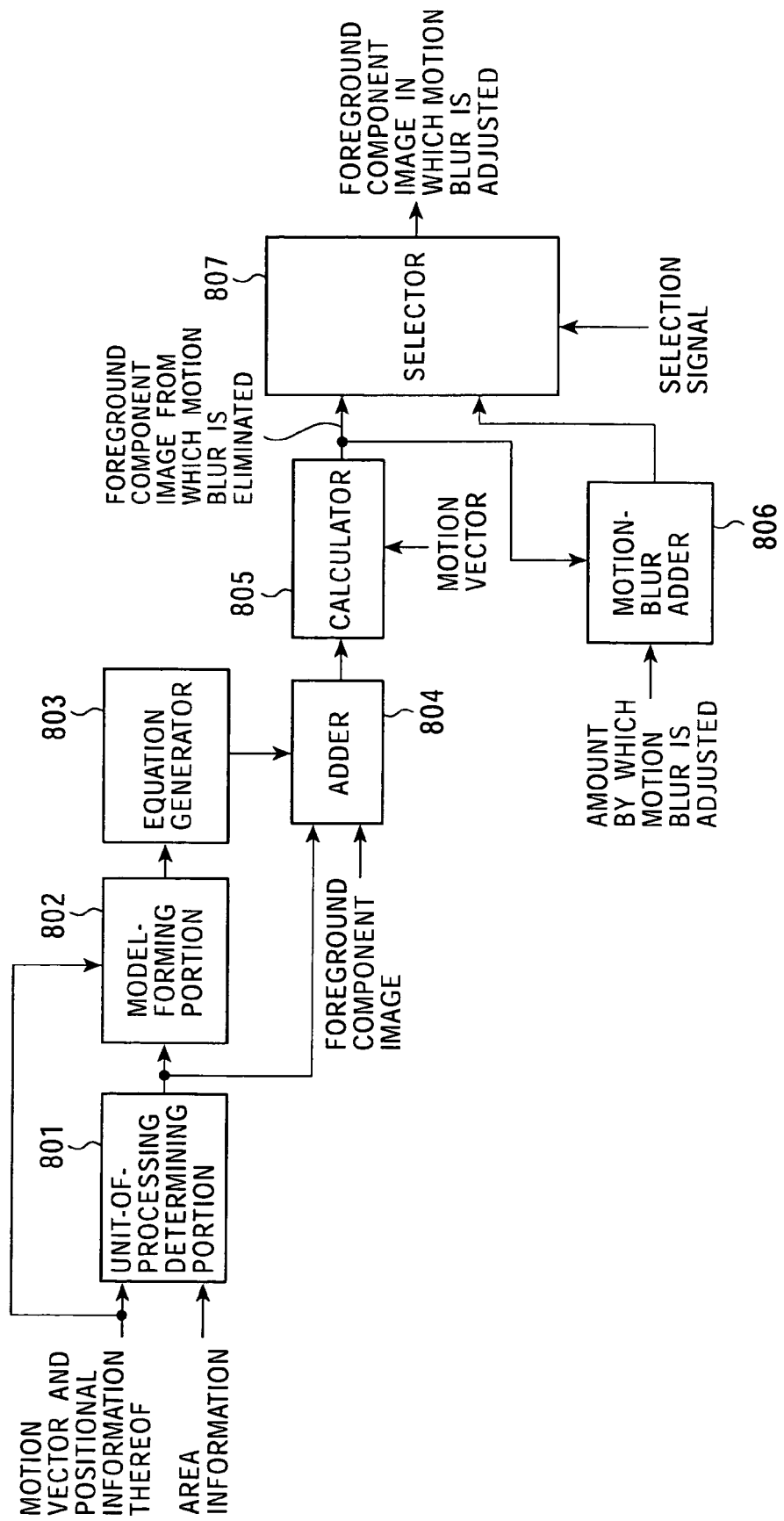
FIG. 79 is a block diagram illustrating an example of the configuration of a motion-blur adjusting unit 106.

FIG. 79 is a block diagram illustrating an example of the configuration of the motion-blur adjusting unit 106. The motion vector and the positional information thereof supplied from the motion detector 102 are supplied to a unit-of-processing determining portion 801, a model-forming portion 802, and a calculator 805. The area information supplied from the area specifying unit 103 is supplied to the unit-of-processing determining portion 801. The area information supplied from the foreground/background separator 105 is supplied to an adder 804.

The unit-of-processing determining portion 801 generates the unit of processing based on the motion vector, the positional information thereof, and the area information and supplies the generated unit of processing to the model-forming portion 802 and the adder 804.

Figure 80:
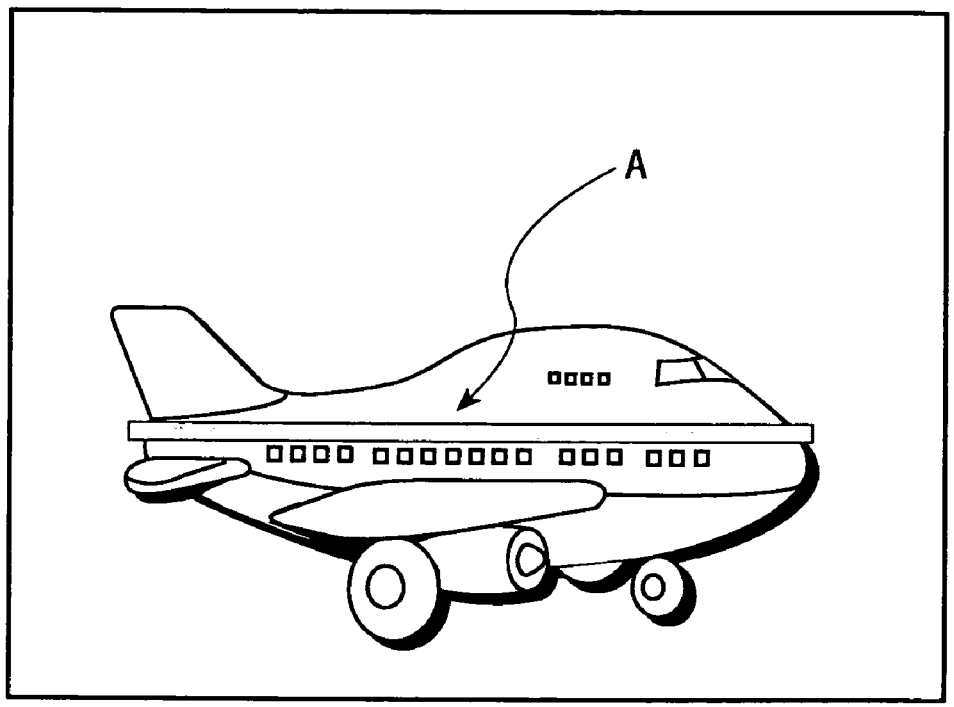
FIG. 80 illustrates the unit of processing.

As shown by an example in FIG. 80, the unit of processing A generated by the unit-of-processing determining portion 801 indicates consecutive pixels disposed in the moving direction starting from the pixel corresponding to the covered background area of the foreground component image until the pixel corresponding to the uncovered background area, or indicates consecutive pixels disposed in the moving direction starting from the pixel corresponding to the uncovered background area until the pixel corresponding to the covered background area. The unit of processing A is formed of two pieces of data which indicate, for example, the upper left point (which is the position of the leftmost or the topmost pixel in the image designated by the unit of processing A) and the lower right point.

Figure 81:
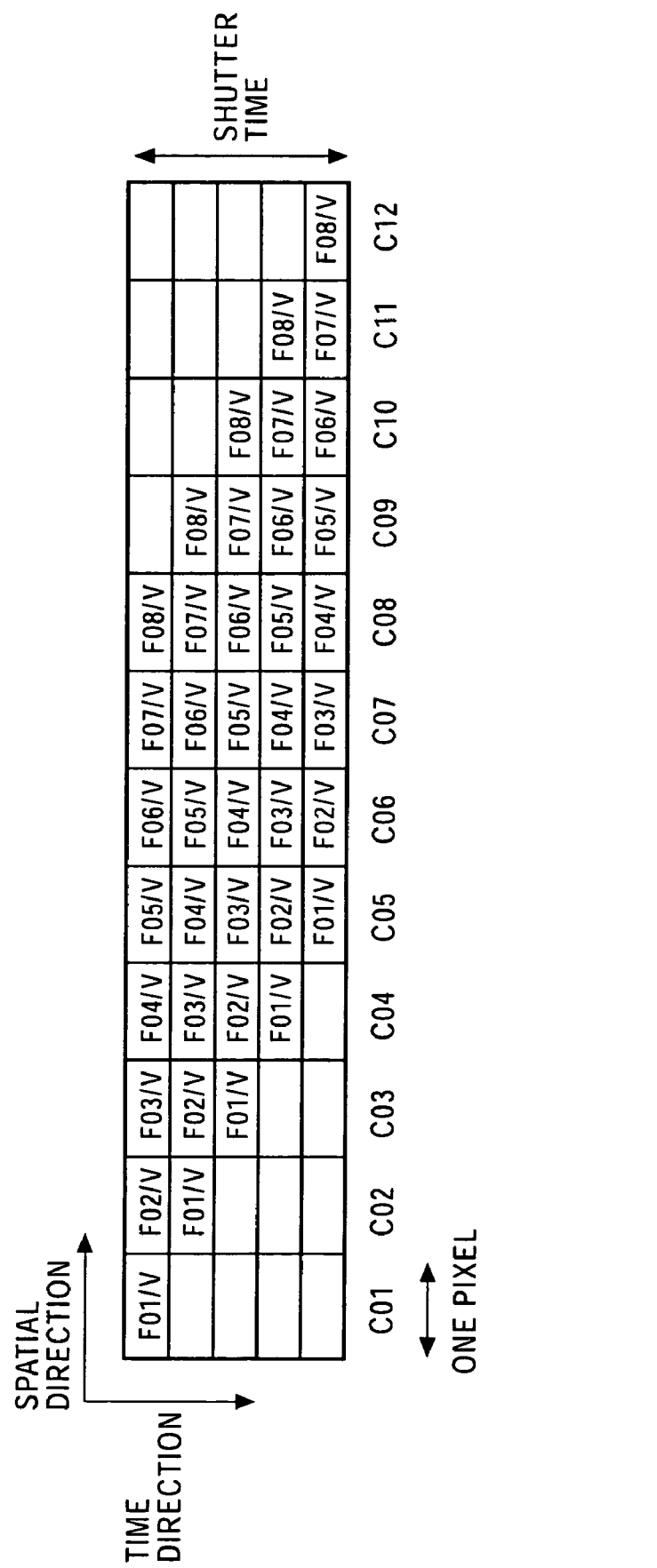
FIG. 81 illustrates a model in which the pixel values of a foreground component image are expanded in the time direction and the period corresponding to the shutter time is divided.

The model-forming portion 802 forms a model based on the motion vector and the input unit of processing A. More specifically, for example, the model-forming portion 802 may store in advance a plurality of models in accordance with the number of pixels contained in the unit of processing A, the number of virtual divided portions of the pixel value in the time direction, and the number of foreground components for each pixel. The model-forming portion 802 selects the model in which the correlation between the pixel values and the foreground components is designated, such as that in FIG. 81, based on the unit of processing A and the number of virtual divided portions of the pixel value in the time direction.

It is now assumed, for example, that the number of pixels corresponding to the unit of processing A is 12, and that the amount of movement v within the shutter time is 5. Then, the model-forming portion 802 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 802 may generate a model based on the motion vector and the unit of processing A when the motion vector and the unit of processing A are supplied.

The model-forming portion 802 supplies the selected model to an equation generator 803.

The equation generator 803 generates an equation based on the model supplied from the model-forming portion 802. A description is given below, with reference to the model of the foreground component image shown in FIG. 81, of equations generated by the equation generator 803 when the number of foreground components is 8, the number of pixels corresponding to the unit of processing A is 12, and the amount of movement v is 5.

When the foreground components contained in the foreground component image corresponding to the shutter time/v are F01/v through F08/v, the relationships between F01/v through F08/v and the pixel values C01 through C12 can be expressed by equations (78) through (89).

$$C01 = F01/v \tag{78}$$

$$C02 = F02/v + F01/v \tag{79}$$

$$C03 = F03/v + F02/v + F01/v \tag{80}$$

$$C04 = F04/v + F03/v + F02/v + F01/v \tag{81}$$

$$C05 = F05/v + F04/v + F03/v + F02/v + F01/v \tag{82}$$

$$C06 = F06/v + F05/v + F04/v + F03/v + F02/v \tag{83}$$

$$C07 = F07/v + F06/v + F05/v + F04/v + F03/v \tag{84}$$

$$C08 = F08/v + F07/v + F06/v + F05/v + F04/v \tag{85}$$

$$C09 = F08/v + F07/v + F06/v + F05/v \tag{86}$$

$$C10 = F08/v + F07/v + F06/v \tag{87}$$

$$C11 = F08/v + F07/v \tag{88}$$

$$C12 = F08/v \tag{89}$$

The equation generator 803 generates an equation by modifying the generated equations. The equations generated by the equation generator 803 are indicated by equations (90) though (101).

$$C01 = 1 \cdot F01/v + 0 \cdot F02/v + 0 \cdot F03/v + 0 \cdot F04/v + \\ 0 \cdot F05/v + 0 \cdot F06/v + 0 \cdot F07/v + 0 \cdot F08/v \tag{90}$$

$$C02 = 1 \cdot F01/v + 1 \cdot F02/v + 0 \cdot F03/v + 0 \cdot F04/v + \\ 0 \cdot F05/v + 0 \cdot F06/v + 0 \cdot F07/v + 0 \cdot F08/v \tag{91}$$

$$C03 = 1 \cdot F01/v + 1 \cdot F02/v + 1 \cdot F03/v + 0 \cdot F04/v + \\ 0 \cdot F05/v + 0 \cdot F06/v + 0 \cdot F07/v + 0 \cdot F08/v \tag{92}$$

$$C04 = 1 \cdot F01/v + 1 \cdot F02/v + 1 \cdot F03/v + 1 \cdot F04/v + \\ 0 \cdot F05/v + 0 \cdot F06/v + 0 \cdot F07/v + 0 \cdot F08/v \tag{93}$$

$$C05 = 1 \cdot F01/v + 1 \cdot F02/v + 1 \cdot F03/v + 1 \cdot F04/v + \\ 1 \cdot F05/v + 0 \cdot F06/v + 0 \cdot F07/v + 0 \cdot F08/v \tag{94}$$

$$C06 = 0 \cdot F01/v + 1 \cdot F02/v + 1 \cdot F03/v + 1 \cdot F04/v + \\ 1 \cdot F05/v + 1 \cdot F06/v + 0 \cdot F07/v + 0 \cdot F08/v \tag{95}$$

$$C07 = 0 \cdot F01/v + 0 \cdot F02/v + 1 \cdot F03/v + 1 \cdot F04/v + \\ 1 \cdot F05/v + 1 \cdot F06/v + 1 \cdot F07/v + 0 \cdot F08/v \tag{96}$$

-continued $$C08 = 0 \cdot F01/v + 0 \cdot F02/v + 0 \cdot F03/v + 1 \cdot F04/v + \\ 1 \cdot F05/v + 1 \cdot F06/v + 1 \cdot F07/v + 1 \cdot F08/v \tag{97}$$

$$C09 = 0 \cdot F01/v + 0 \cdot F02/v + 0 \cdot F03/v + 0 \cdot F04/v + \\ 1 \cdot F05/v + 1 \cdot F06/v + 1 \cdot F07/v + 1 \cdot F08/v \tag{98}$$

$$C10 = 0 \cdot F01/v + 0 \cdot F02/v + 0 \cdot F03/v + 0 \cdot F04/v + \\ 0 \cdot F05/v + 1 \cdot F06/v + 1 \cdot F07/v + 1 \cdot F08/v \tag{99}$$

$$C11 = 0 \cdot F01/v + 0 \cdot F02/v + 0 \cdot F03/v + 0 \cdot F04/v + \\ 0 \cdot F05/v + 0 \cdot F06/v + 1 \cdot F07/v + 1 \cdot F08/v \tag{100}$$

$$C12 = 0 \cdot F01/v + 0 \cdot F02/v + 0 \cdot F03/v + 0 \cdot F04/v + \\ 0 \cdot F05/v + 0 \cdot F06/v + 0 \cdot F07/v + 1 \cdot F08/v \tag{101}$$

Equations (90) through (101) can be expressed by equation (102).

$$Cj = \sum_{i=01}^{08} aij \cdot Fi/v \tag{102}$$

In equation (102), j designates the position of the pixel. In this example, j has one of the values from 1 to 12. In equation (102), i designates the position of the foreground value. In this example, i has one of the values from 1 to 8. In equation (102), aij has the value 0 or 1 according to the values of i and j.

Equation (102) can be expressed by equation (103) in consideration of the error.

$$Cj = \sum_{i=01}^{08} aij \cdot Fi/v + ej \tag{103}$$

In equation (103), ej designates the error contained in the designated pixel Cj.

Equation (103) can be modified into equation (104).

$$ej = Cj - \sum_{i=01}^{08} aij \cdot Fi/v \tag{104}$$

In order to apply the method of least squares, the square sum E of the error is defined as equation (105).

$$E = \sum_{j=01}^{12} ej^2 \tag{105}$$

In order to minimize the error, the partial differential value using the variable Fk with respect to the square sum E of the error should be 0. Fk is determined so that equation (106) is satisfied.

$$\frac{\partial E}{\partial Fk} = 2 \cdot \sum_{j=01}^{12} ej \cdot \frac{\partial ej}{\partial Fk} \tag{106}$$
$$= 2 \cdot \sum_{j=01}^{12} \left\{ \left( Cj - \sum_{i=01}^{08} aij \cdot Fi/v \right) \cdot (-akj/v) \right\} = 0$$

In equation (106), since the amount of movement v is a fixed value, equation (107) can be deduced.

$$\sum_{j=01}^{12} akj \cdot \left( Cj - \sum_{i=01}^{08} aij \cdot Fi/v \right) = 0 \tag{107}$$

To expand equation (107) and transpose the terms, equation (108) can be obtained.

$$\sum_{j=01}^{12} \left( akj \cdot \sum_{i=01}^{08} aij \cdot Fi \right) = v \sum_{j=01}^{12} akj \cdot Cj \tag{108}$$

Equation (108) is expanded into eight equations by substituting the individual integers from 1 to 8 into k in equation (108). The obtained eight equations can be expressed by one matrix equation. This equation is referred to as a "normal equation".

An example of the normal equation generated by the equation generator 803 based on the method of least squares is indicated by equation (109).

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \tag{109}$$

When equation (109) is expressed by A·F=v·C, C, A, and v are known, and F is unknown. A and v are known when the model is formed, while C becomes known when the pixel value is input in the addition processing.

By calculating the foreground components according to the normal equation based on the method of least squares, the error contained in the pixel C can be distributed.

The equation generator 803 supplies the normal equation generated as discussed above to the adder 804.

The adder 804 sets, based on the unit of processing supplied from the unit-of-processing determining portion 801, the pixel value C contained in the foreground component image in the matrix equation supplied from the equation generator 803. The adder 804 supplies the matrix in which the pixel value C is set to a calculator 805.

The calculator 805 calculates the foreground component Fi/v from which motion blur is eliminated by the processing based on a solution, such as a sweep-out method (Gauss-Jordan elimination), so as to obtain Fi corresponding to i indicating one of the integers from 1 to 8, which is the pixel value from which motion blur is eliminated. The calculator 805 then outputs the foreground component image consisting of the pixel values Fi without motion blur, such as that in FIG. 82, to a motion-blur adder 806 and a selector 807.

Figure 82:
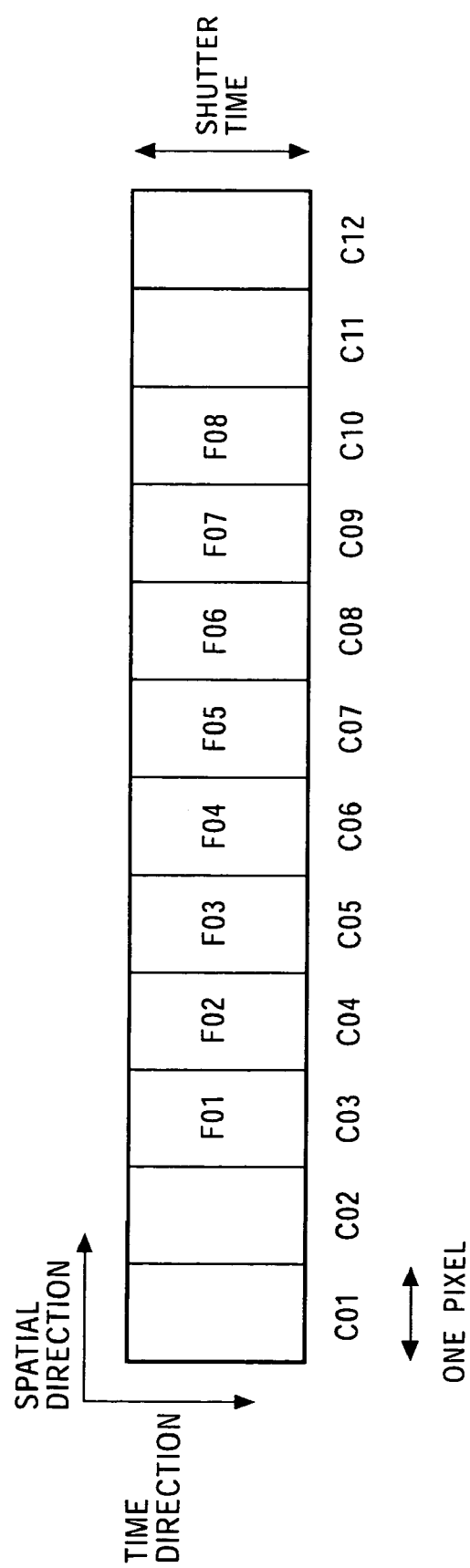
FIG. 82 illustrates a model in which the pixel values of a foreground component image are expanded in the time direction and the period corresponding to the shutter time is divided.

In the foreground component image without motion blur shown in FIG. 82, the reason for setting F01 through F08 in C03 through C10, respectively, is not to change the position of the foreground component image with respect to the screen. However, F01 through F08 may be set in any desired positions.

Figure 83:
FIG. 83 illustrates a model in which the pixel values of a foreground component image are expanded in the time direction and the period corresponding to the shutter time is divided.

The motion-blur adder 806 is able to adjust the amount of motion blur by adding the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 83, the motion-blur adder 806 divides the foreground pixel value Fi without motion blur by the amount v' by which motion blur is adjusted so as to obtain the foreground component Fi/v'. The motion-blur adder 806 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 806 supplies the foreground component image in which the amount of motion blur is adjusted to a selector 807.

The selector 807 selects one of the foreground component image without motion blur supplied from the calculator 805 and the foreground component image in which the amount of motion blur is adjusted supplied from the motion-blur adder 806 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 84:
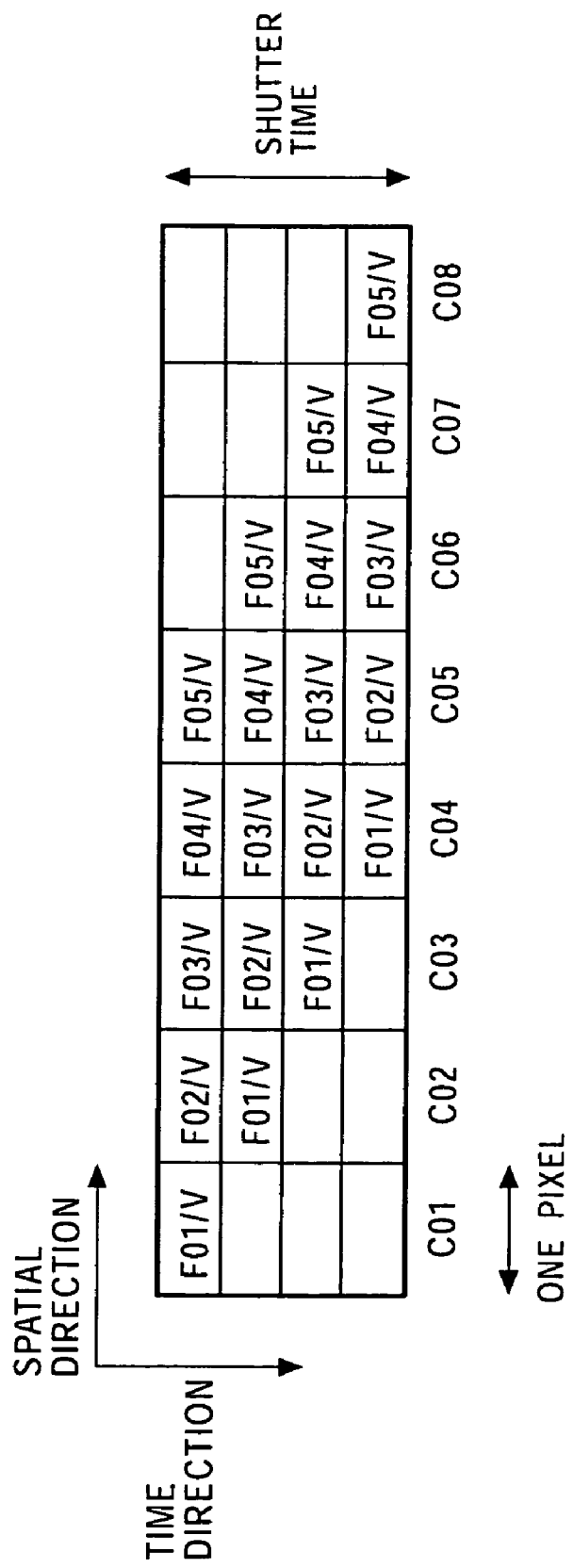
FIG. 84 illustrates a model in which the pixel values of a foreground component image are expanded in the time direction and the period corresponding to the shutter time is divided.

Also, for example, when the number of pixels corresponding to the unit of processing is 8, and the amount of movement v is 4, as shown in FIG. 84, the motion-blur adjusting unit 106 generates a matrix equation expressed by equation (110).

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix} \quad (110)$$

In this manner, the motion-blur adjusting unit 106 calculates Fi, which is the pixel value in which the amount of motion blur is adjusted, by setting up the equation in accordance with the length of the unit of processing. Similarly, for example, when the number of pixels contained in the unit of processing is 100, the equation corresponding to 100 pixels is generated so as to calculate Fi.

Figure 85:
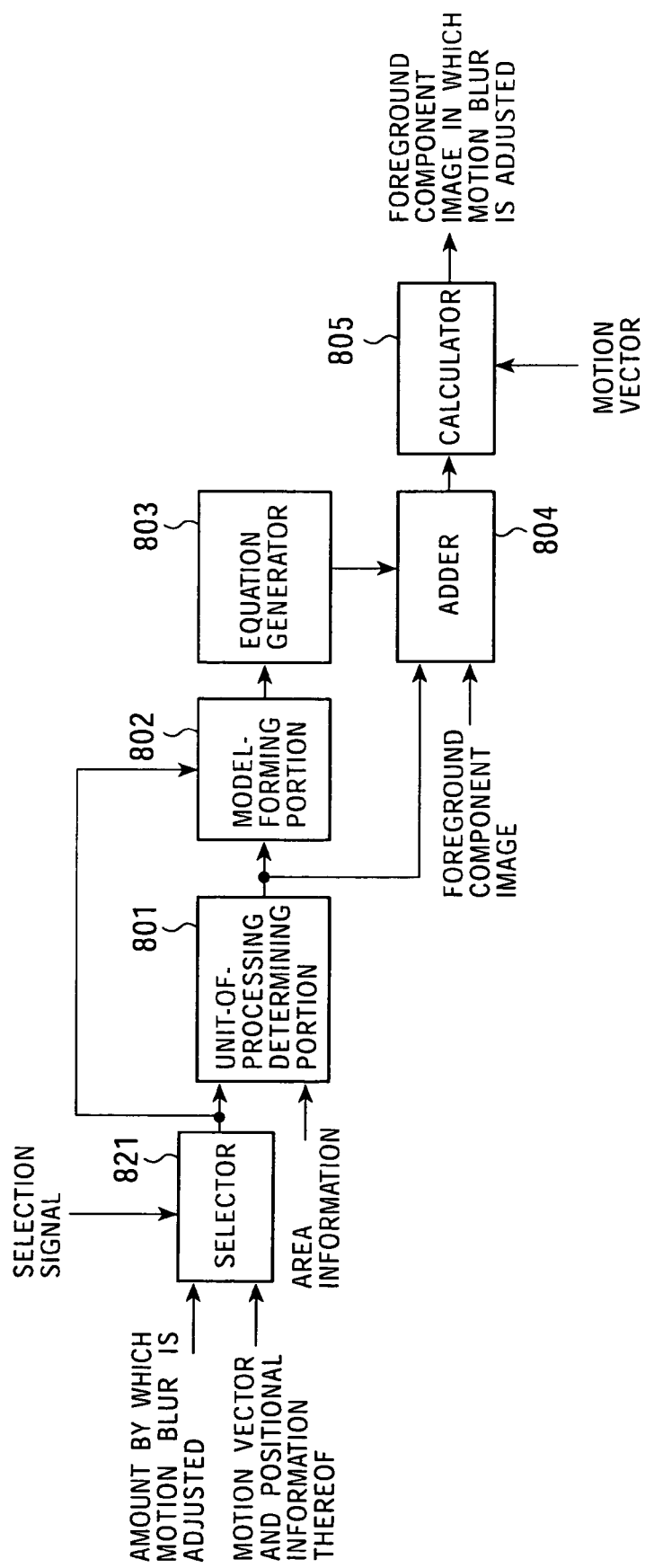
FIG. 85 illustrates an example of another configuration of the motion-blur adjusting unit 106.

FIG. 85 illustrates an example of another configuration of the motion-blur adjusting unit 106. The same elements as those shown in FIG. 79 are designated with like reference numerals, and an explanation thereof is thus omitted.

Based on a selection signal, a selector 821 directly supplies an input motion vector and a positional signal thereof to the unit-of-processing determining portion 801 and the model-forming portion 802. Alternatively, the selector 821 may substitute the magnitude of the motion vector by the amount v' by which motion blur is adjusted, and then supplies the motion vector and the positional signal thereof to the unit-of-processing determining portion 801 and the model-forming unit 802.

With this arrangement, the unit-of-processing determining portion 801 through the calculator 805 of the motion-blur adjusting unit 106 shown in FIG. 85 are able to adjust the amount of motion blur in accordance with the amount of movement v and the amount v' by which motion blur is adjusted. For example, when the amount of movement is 5, and the amount v' by which motion blur is adjusted is 3, the unit-of-processing determining portion 801 through the calculator 805 of the motion-blur adjusting unit 106 shown in FIG. 85 execute computation on the foreground component image in which the amount of movement v is 5 shown in FIG. 81 according to the model shown in FIG. 83 in which the amount v' by which motion blur is adjusted is 3. As a result, the image containing motion blur having the amount of movement v of (amount of movement v)/(amount v' by which motion blur is adjusted)=5/3, i.e., about 1.7 is obtained. In this case, the calculated image does not contain motion blur corresponding to the amount of movement v of 3. Accordingly, it should be noted that the relationship between the amount of movement v and the amount v' by which motion blur is adjusted is different from the result of the motion-blur adder 806.

As discussed above, the motion-blur adjusting unit 106 generates the equation in accordance with the amount of movement v and the unit of processing, and sets the pixel values of the foreground component image in the generated equation, thereby calculating the foreground component image in which the amount of motion blur is adjusted.

Figure 86:
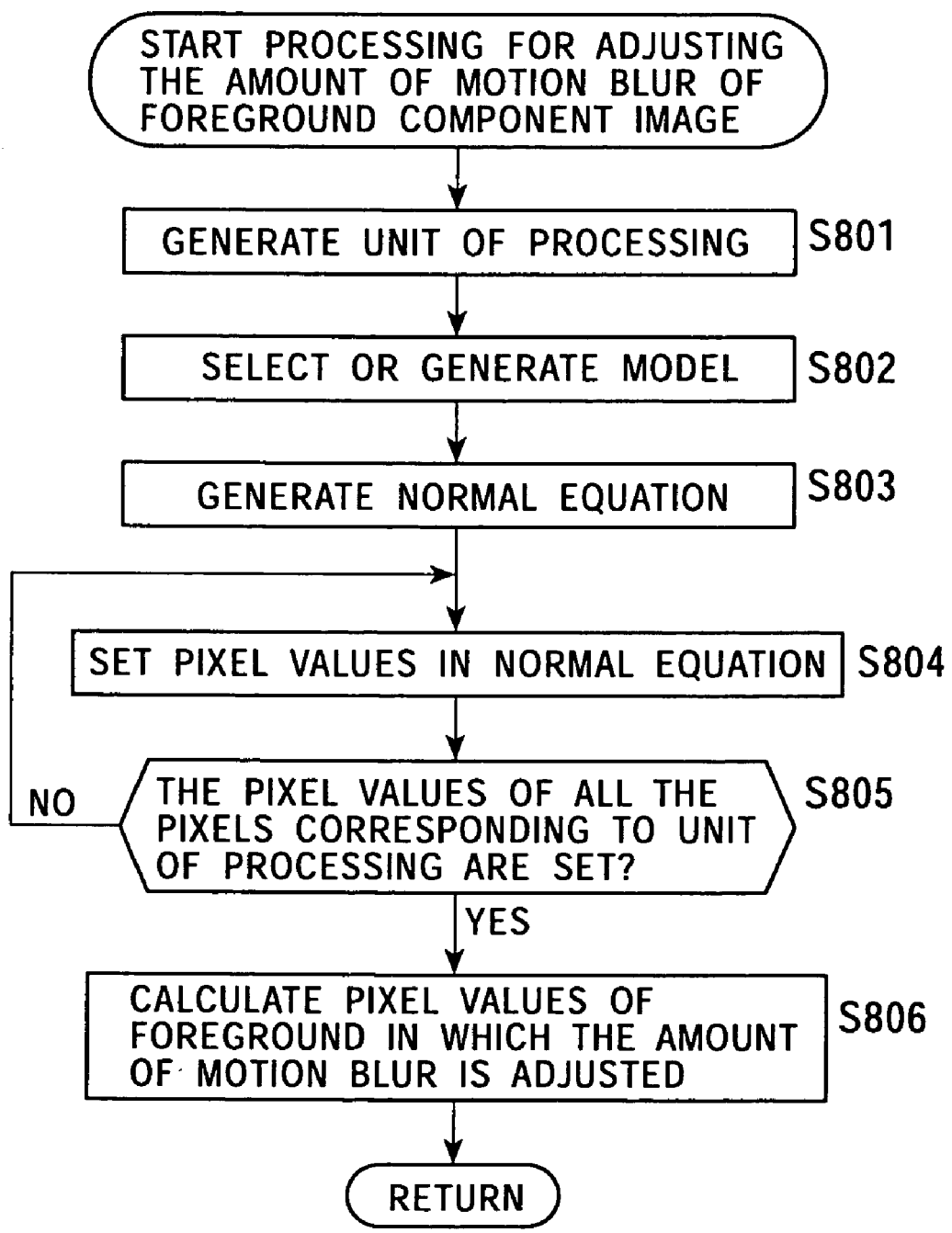
FIG. 86 is a flowchart illustrating the processing for adjusting the amount of motion blur contained in a foreground component image performed by the motion-blur adjusting unit 106.

The processing for adjusting the amount of motion blur contained in the foreground component image executed by the motion-blur adjusting unit 106 is described below with reference to the flowchart of FIG. 86.

In step S801, the unit-of-processing determining portion 801 of the motion-blur adjusting unit 106 generates the unit of processing based on the motion vector and the area information, and supplies the generated unit of processing to the model-forming portion 802.

In step S802, the model-forming portion 802 of the motion-blur adjusting unit 106 selects or generates the model in accordance with the amount of movement v and the unit of processing. In step S803, the equation generator 803 generates the normal equation based on the selected model.

In step S804, the adder 804 sets the pixel values of the foreground component image in the generated normal equation. In step S805, the adder 804 determines whether the pixel values of all the pixels corresponding to the unit of processing are set. If it is determined that the pixel values of all the pixels corresponding to the unit of processing are not yet set, the process returns to step S804, and the processing for setting the pixel values in the normal equation is repeated.

If it is determined in step S805 that the pixel values of all the pixels corresponding to the unit of processing are set, the process proceeds to step S806. In step S806, the calculator 805 calculates the pixel values of the foreground in which the amount of motion blur is adjusted based on the normal equation in which the pixel values are set supplied from the adder 804. The processing is then completed.

As discussed above, the motion-blur adjusting unit 106 is able to adjust the amount of motion blur of the foreground image containing motion blur based on the motion vector and the area information.

That is, it is possible to adjust the amount of motion blur contained in the pixel values, that is, contained in sampled data.

Figure 87:
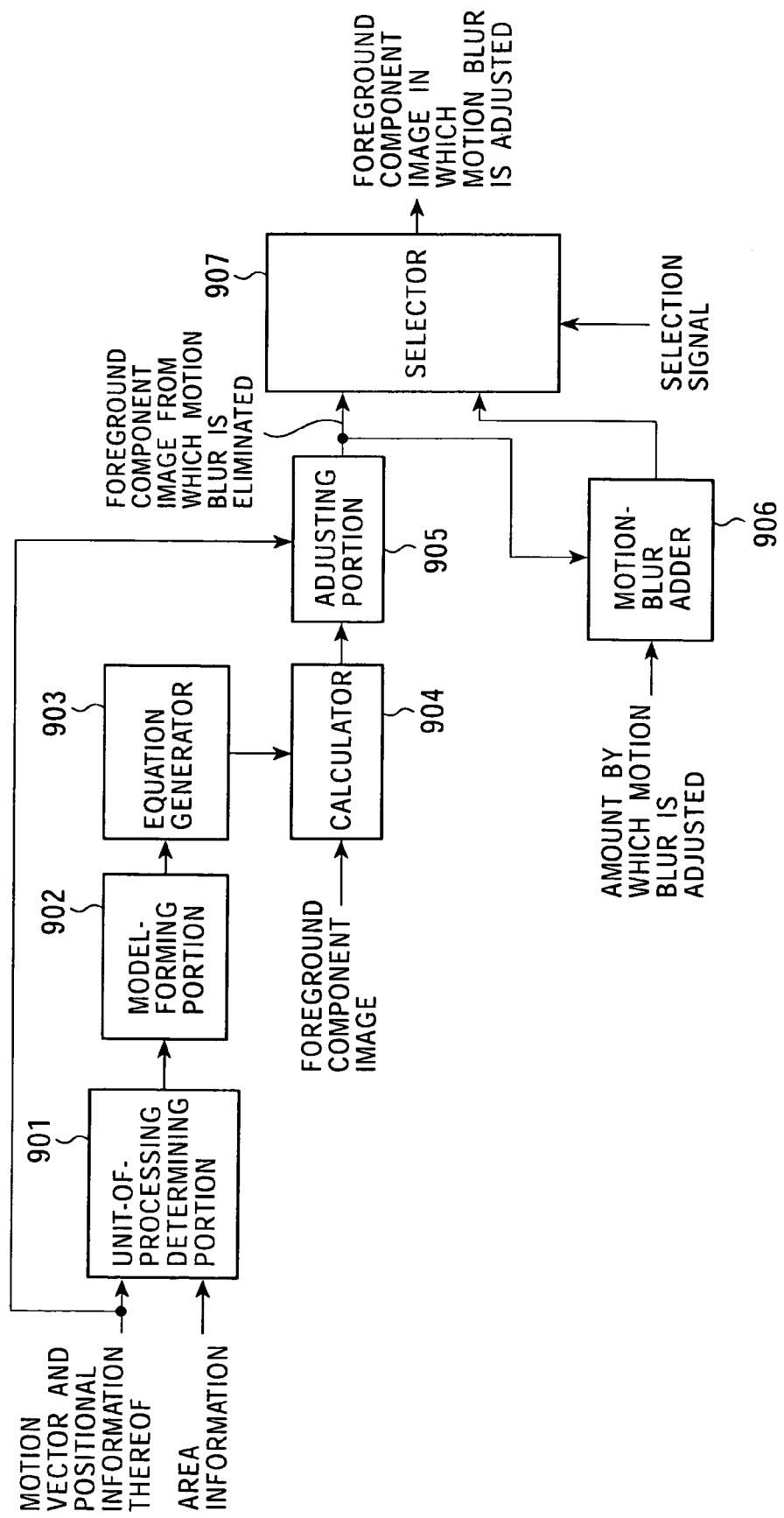
FIG. 87 is a block diagram illustrating an example of another configuration of the motion-blur adjusting unit 106.

FIG. 87 is a block diagram illustrating another example of the configuration of the motion-blur adjusting unit 106. The motion vector and the positional information thereof supplied from the motion detector 102 are supplied to a unit-of-processing determining portion 901 and an adjusting portion 905. The area information supplied from the area specifying unit 103 is supplied to the unit-of-processing determining portion 901. The foreground component image supplied from the foreground/background separator 105 is supplied to a calculator 904.

The unit-of-processing determining portion 901 generates the unit of processing on the basis of the motion vector, the positional information thereof, and the area information and supplies the generated unit of processing, together with the motion vector, to a model-forming portion 902.

The model-forming portion 902 forms a model based on the motion vector and the input unit of processing. More specifically, for example, the model-forming portion 902 may store in advance a plurality of models in accordance with the number of pixels contained in the unit of processing, the number of virtual divided portions of the pixel value in the time direction, and the number of foreground components for each pixel. The model-forming portion 902 selects the model in which the correlation between the pixel values and the foreground components is designated, such as that in FIG. 88, based on the unit of processing and the number of virtual divided portions of the pixel value in the time direction.

It is now assumed, for example, that the number of pixels corresponding to the unit of processing is 12, and that the amount of movement v is 5. Then, the model-forming portion 902 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 902 may generate a model based on the motion vector and the unit of processing when the motion vector and the unit of processing are supplied.

An equation generator 903 generates an equation based on the model supplied from the model-forming portion 902.

Figure 88:
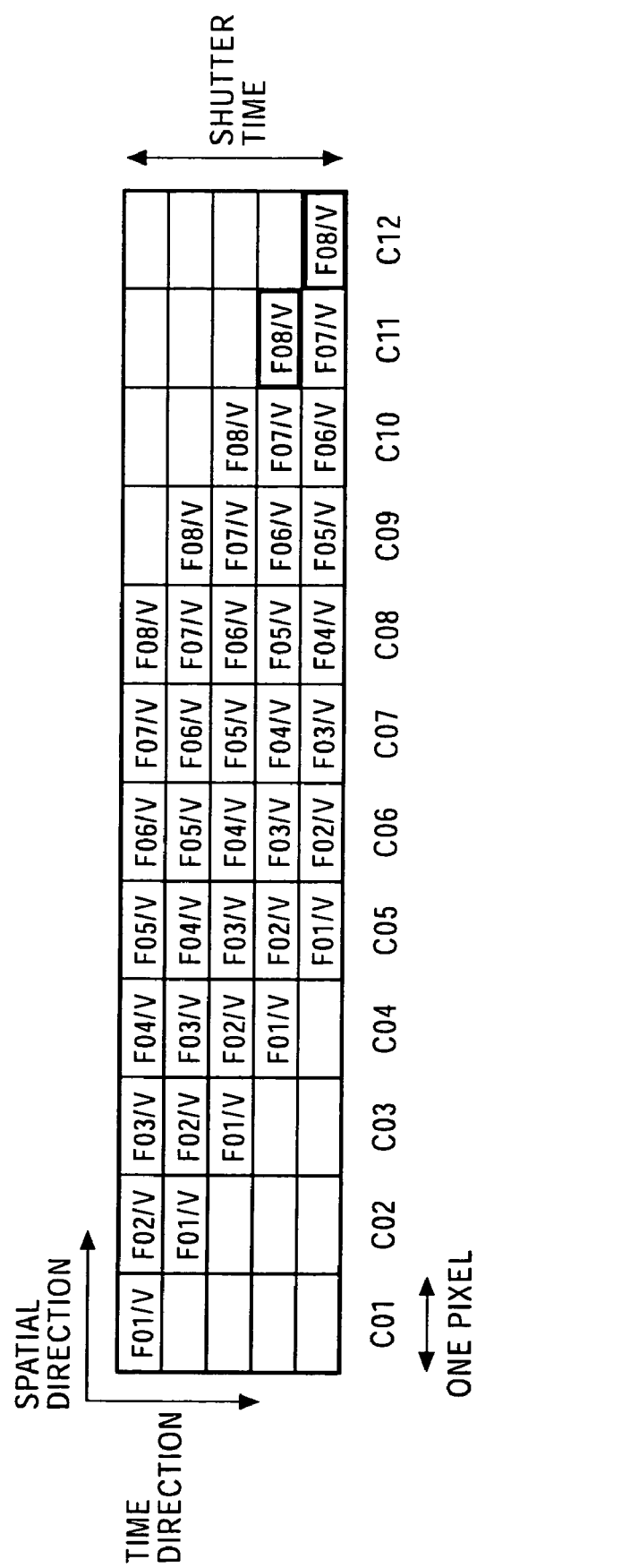
FIG. 88 illustrates an example of a model in which the relationships between pixel values and foreground components are indicated.
Figure 89:
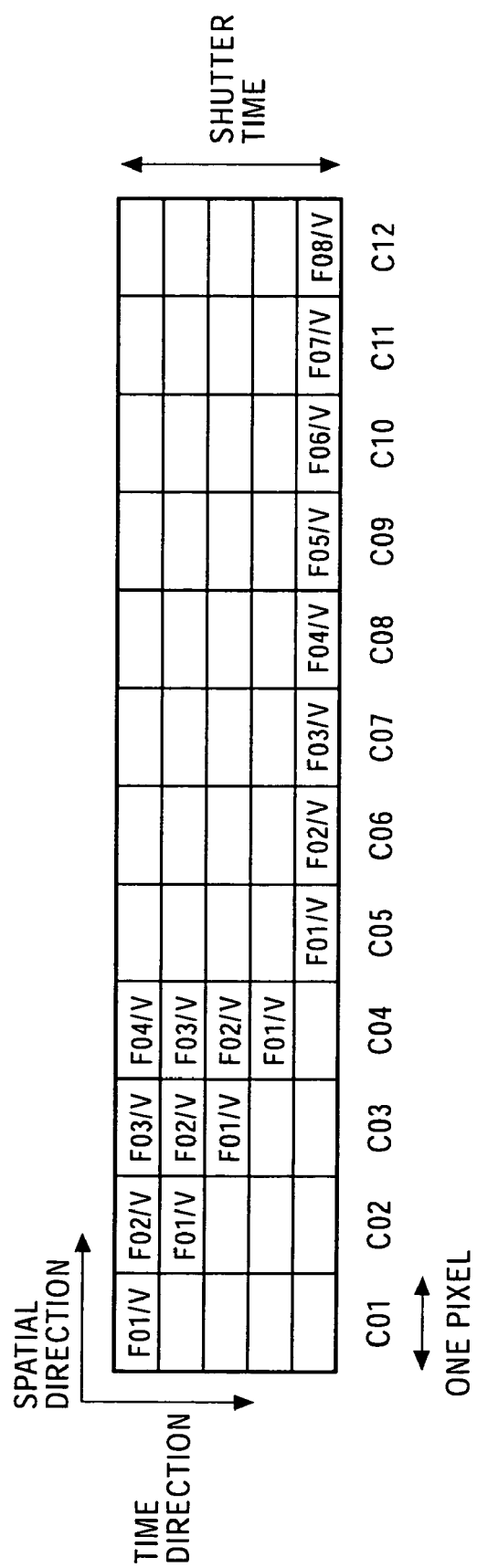
FIG. 89 illustrates the calculation of foreground components.
Figure 90:
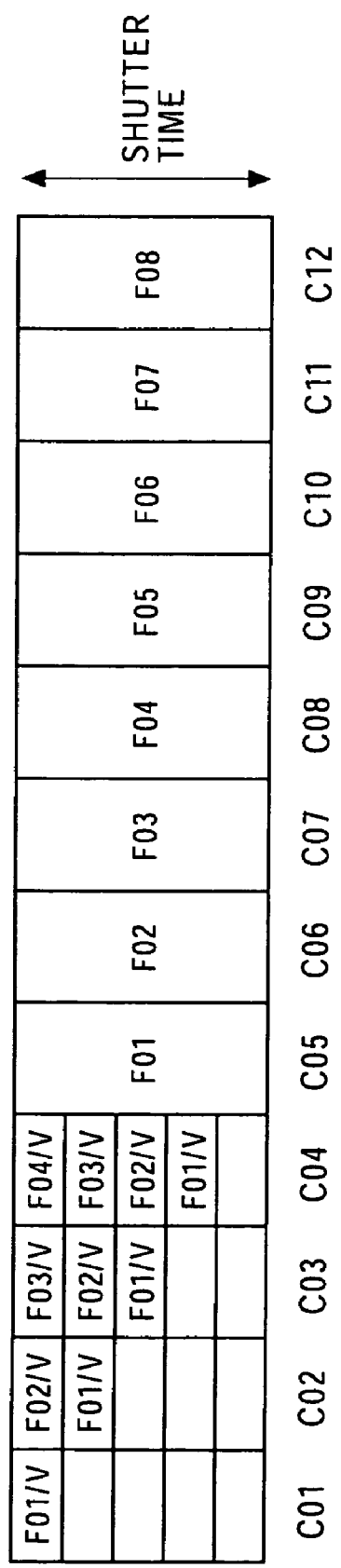
FIG. 90 illustrates the calculation of foreground components.

A description is now given, with reference to the models of foreground component images shown in FIGS. 88 through 90, of an example of the equation generated by the equation generator 903 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and pixel values C01 through C12 can be expressed by equations (78) through (89), as stated above.

By considering the pixel values C12 and C11, the pixel value C12 contains only the foreground component F08/v, as expressed by equation (111), and the pixel value C11 consists of the product sum of the foreground component F08/v and the foreground component F07/v. Accordingly, the foreground component F07/v can be found by equation (112).

$$F08/v = C12 \tag{111}$$

$$F07/v = C11 - C12 \tag{112}$$

Similarly, by considering the foreground components contained in the pixel values C10 through C01, the foreground components F06/v through F01/v can be found by equations (113) through (118), respectively.

$$F06/v = C10 - C11 \tag{113}$$

$$F05/v = C09 - C10 \tag{114}$$

$$F04/v = C08 - C09 \tag{115}$$

$$F03/v = C07 - C08 + C12 \tag{116}$$

$$F02/v = C06 - C07 + C11 - C12 \tag{117}$$

$$F01/v = C05 - C06 + C10 - C11 \tag{118}$$

The equation generator 903 generates the equations for calculating the foreground components by the difference between the pixel values, as indicated by the examples of equations (111) through (118). The equation generator 903 supplies the generated equations to the calculator 904.

The calculator 904 sets the pixel values of the foreground component image in the equations supplied from the equation generator 903 so as to obtain the foreground components based on the equations in which the pixel values are set. For example, when equations (111) through (118) are supplied from the equation generator 903, the calculator 904 sets the pixel values C05 through C12 in equations (111) through (118).

The calculator 904 calculates the foreground components based on the equations in which the pixel values are set. For example, the calculator 904 calculates the foreground components F01/v through F08/v, as shown in FIG. 89, based on the calculations of equations (111) through (118) in which the pixel values C05 through C12 are set. The calculator 904 supplies the foreground components F01/v through F08/v to the adjusting portion 905.

The adjusting portion 905 multiplies the foreground components supplied from the calculator 904 by the amount of movement v contained in the motion vector supplied from the unit-of-processing determining portion 901 so as to obtain the foreground pixel values from which motion blur is eliminated. For example, when the foreground components F01/v through F08/v are supplied from the calculator 904, the adjusting portion 905 multiples each of the foreground components F01/v through F08/v by the amount of movement v, i.e., 5, so as to obtain the foreground pixel values F01 through F08 from which motion blur is eliminated, as shown in FIG. 90.

The adjusting portion 905 supplies the foreground component image consisting of the foreground pixel values without motion blur calculated as described above to a motion-blur adder 906 and a selector 907.

The motion-blur adder 906 is able to adjust the amount of motion blur by using the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 83, the motion-blur adder 906 divides the foreground pixel value Fi without motion blur by the amount v' by which motion blur is adjusted so as to obtain the foreground component Fi/v'. The motion-blur adder 906 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 906 supplies the foreground component image in which the amount of motion blur is adjusted to the selector 907.

The selector 907 selects either the foreground component image without motion blur supplied from the adjusting portion 905 or the foreground component image in which the amount of motion blur is adjusted supplied from the motion-blur adder 906 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 91:
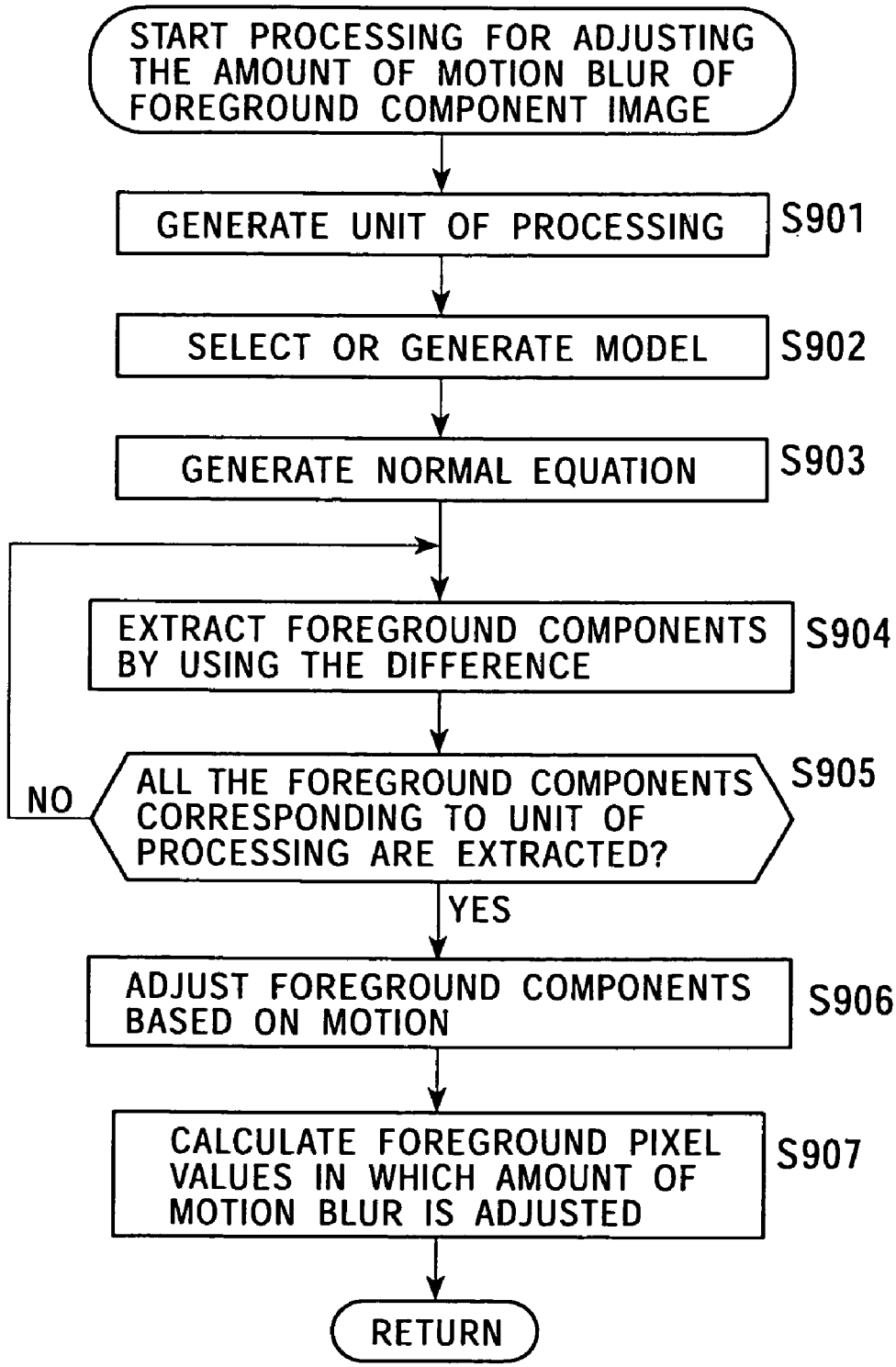
FIG. 91 is a flowchart illustrating the processing for eliminating motion blur contained in a foreground.

The processing for adjusting the amount of motion blur of the foreground executed by the motion-blur adjusting unit 106 configured as shown in FIG. 87 is described below with reference to the flowchart of FIG. 91.

In step S901, the unit-of-processing determining portion 901 of the motion-blur adjusting unit 106 generates the unit of processing based on the motion vector and the area information, and supplies the generated unit of processing to the model-forming portion 902 and the adjusting portion 905.

In step S902, the model-forming portion 902 of the motion-blur adjusting unit 106 selects or generates the model according to the amount of movement v and the unit of processing. In step S903, the equation generator 903 generates, based on the selected or generated model, the equations for calculating the foreground components by the difference between the pixel values of the foreground component image.

In step S904, the calculator 904 sets the pixel values of the foreground component image in the generated equations, and extracts the foreground components by using the difference between the pixel values based on the equations in which the pixel values are set. In step S905, the calculator 904 determines whether all the foreground components corresponding to the unit of processing have been extracted. If it is determined that all the foreground components corresponding to the unit of processing have not been extracted, the process returns to step S904, and the processing for extracting the foreground components is repeated.

If it is determined in step S905 that all the foreground components corresponding to the unit of processing have been extracted, the process proceeds to step S906. In step S906, the adjusting portion 905 adjusts each of the foreground components F01/v through F08/v supplied from the calculator 904 based on the amount of movement v so as to obtain the foreground pixel values F01/v through F08/v from which motion blur is eliminated.

In step S907, the motion-blur adder 906 calculates the foreground pixel values in which the amount of motion blur is adjusted, and the selector 907 selects the image without motion blur or the image in which the amount of motion blur is adjusted, and outputs the selected image. The processing is then completed.

As described above, the motion-blur adjusting unit 106 configured as shown in FIG. 87 is able to more speedily adjust motion blur of the foreground image containing motion blur according to simpler computations.

A known technique for partially eliminating motion blur, such as a Wiener filter, is effective when being used in the ideal state, but is not sufficient for an actual image quantized and containing noise. In contrast, it is proved that the motion-blur adjusting unit 106 configured as shown in FIG. 87 is sufficiently effective for an actual image quantized and containing noise. It is thus possible to eliminate motion blur with high precision.

As described above, the separating portion 91, which is configured as shown in FIG. 9, can adjust the amount of motion blur contained in the input image.

Figure 92:
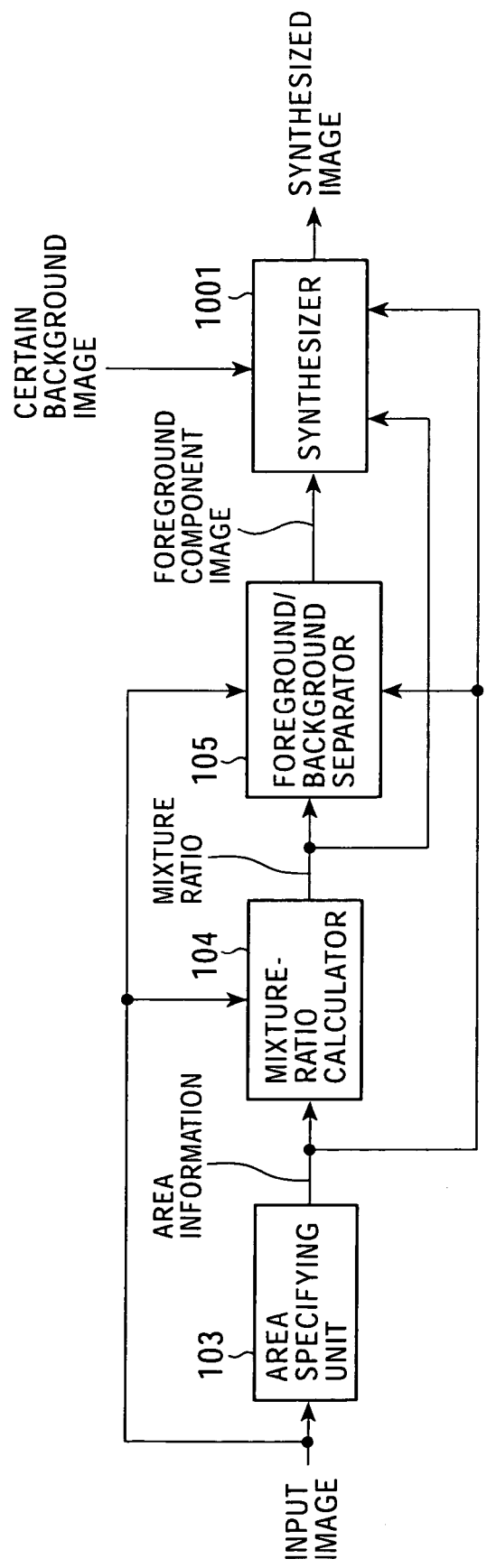
FIG. 92 is a block diagram illustrating another configuration of the function of the image processing apparatus.

FIG. 92 is a block diagram illustrating another configuration of the function of the separating portion 91.

The elements similar to those shown in FIG. 9 are designated with like reference numerals, and an explanation thereof is thus omitted.

The area specifying unit 103 supplies area information to the mixture-ratio calculator 104 and a synthesizer 1001.

The mixture-ratio calculator 104 supplies the mixture ratio α to the foreground/background separator 105 and the synthesizer 1001.

The foreground/background separator 105 supplies the foreground component image to the synthesizer 1001.

The synthesizer 1001 combines a certain background image with the foreground component image supplied from the foreground/background separator 105 based on the mixture ratio α supplied from the mixture-ratio calculator 104 and the area information supplied from the area specifying unit 103, and outputs the synthesized image in which the certain background image and the foreground component image are combined.

Figure 93:
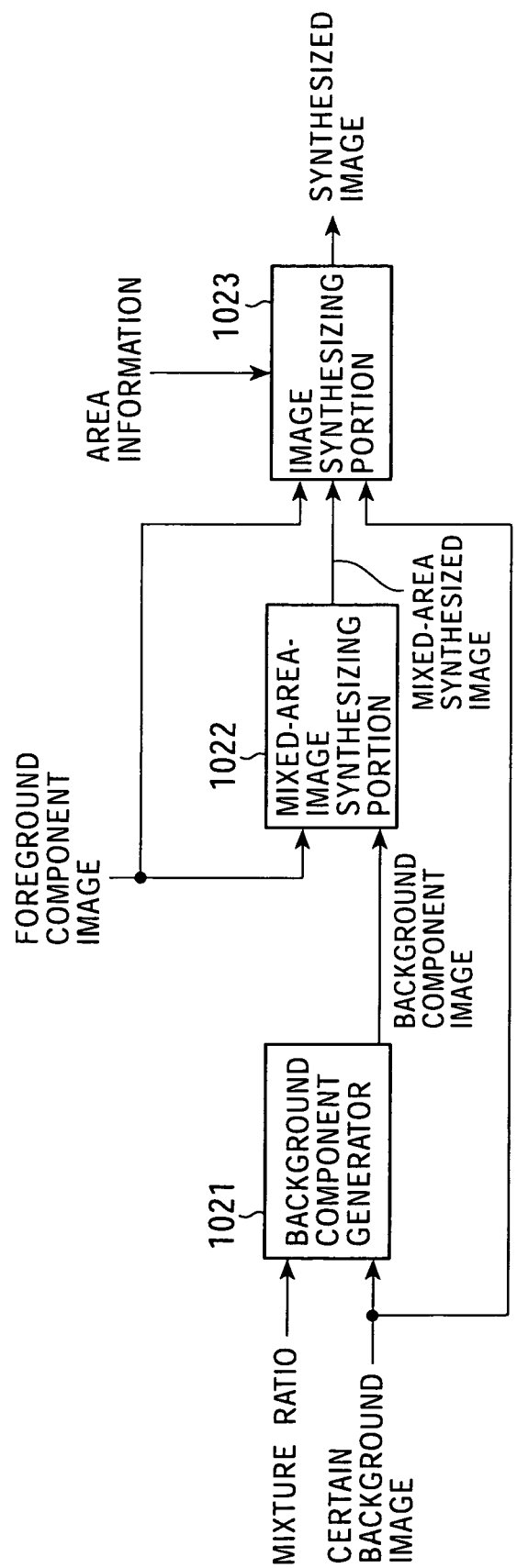
FIG. 93 illustrates the configuration of a synthesizer 1001.

FIG. 93 illustrates the configuration of the synthesizer 1001. A background component generator 1021 generates a background component image based on the mixture ratio α and a certain background image, and supplies the background component image to a mixed-area-image synthesizing portion 1022.

The mixed-area-image synthesizing portion 1022 combines the background component image supplied from the background component generator 1021 with the foreground component image so as to generate a mixed-area synthesized image, and supplies the generated mixture-area synthesized image to an image synthesizing portion 1023.

The image synthesizer 1023 combines the foreground component image, the mixed-area synthesized image supplied from the mixed-area-image synthesizing portion 1022, and the certain background image based on the area information so as to generate a synthesized image, and outputs it.

As discussed above, the synthesizer 1001 is able to combine the foreground component image with a certain background image.

The image obtained by combining a foreground component image with a certain background image based on the mixture ratio α, which is the feature quantity, appears more natural compared to an image obtained by simply combining pixels.

Figure 94:
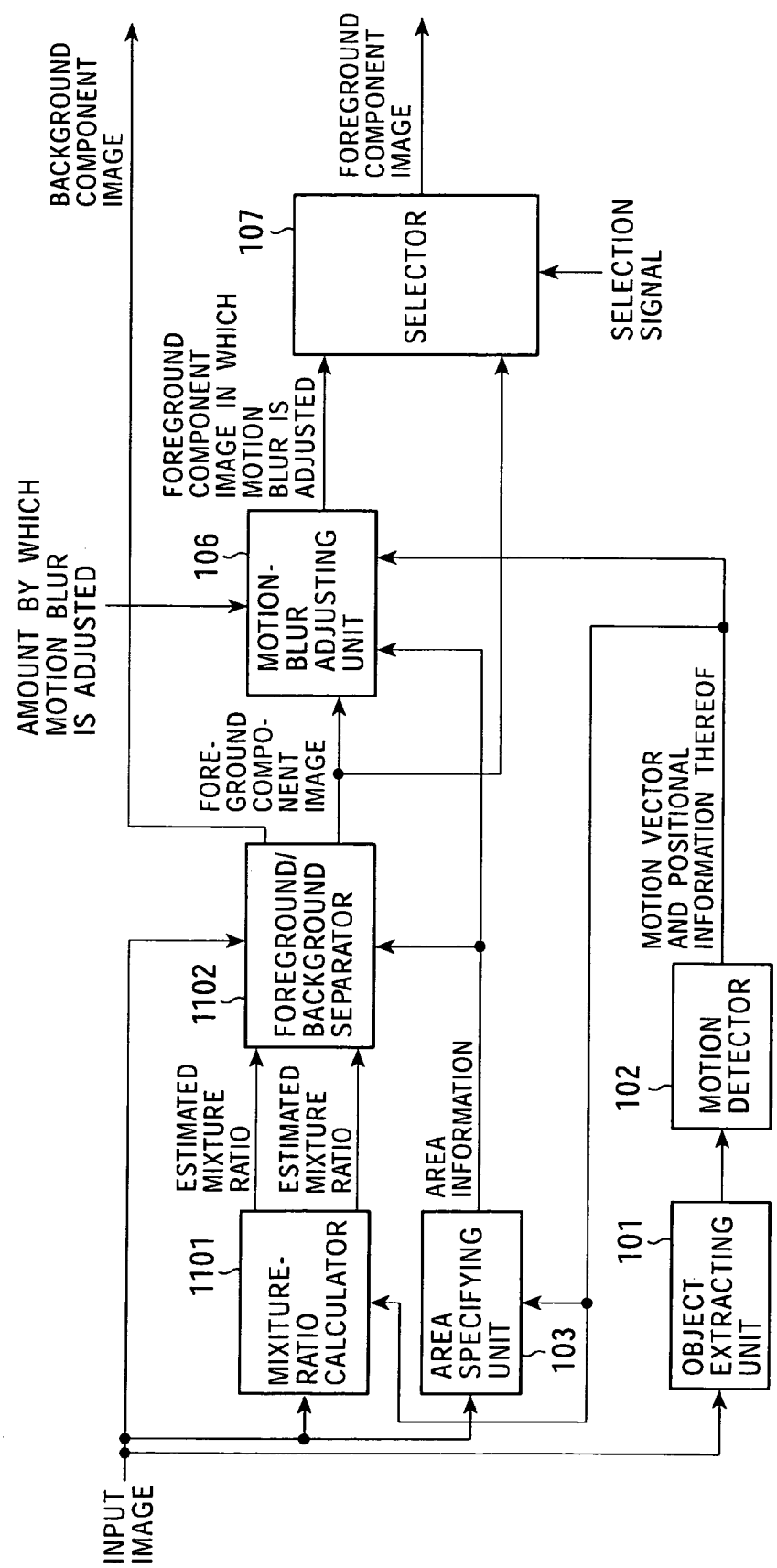
FIG. 94 is a block diagram illustrating still another configuration of the function of the image processing apparatus.

FIG. 94 is a block diagram illustrating another configuration of the function of the separating portion 91. The separating portion 91 shown in FIG. 9 sequentially performs the area-specifying operation and the calculation for the mixture ratio α. In contrast, the separating portion 91 shown in FIG. 94 simultaneously performs the area-specifying operation and the calculation for the mixture ratio α.

The functional elements similar to those indicated by the block of FIG. 9 are indicated by like reference numerals, and an explanation thereof is thus omitted.

An input image is supplied to a mixture-ratio calculator 1101, a foreground/background separator 1102, the area specifying unit 103, and the object extracting unit 101.

The mixture-ratio calculator 1101 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102.

Figure 95:
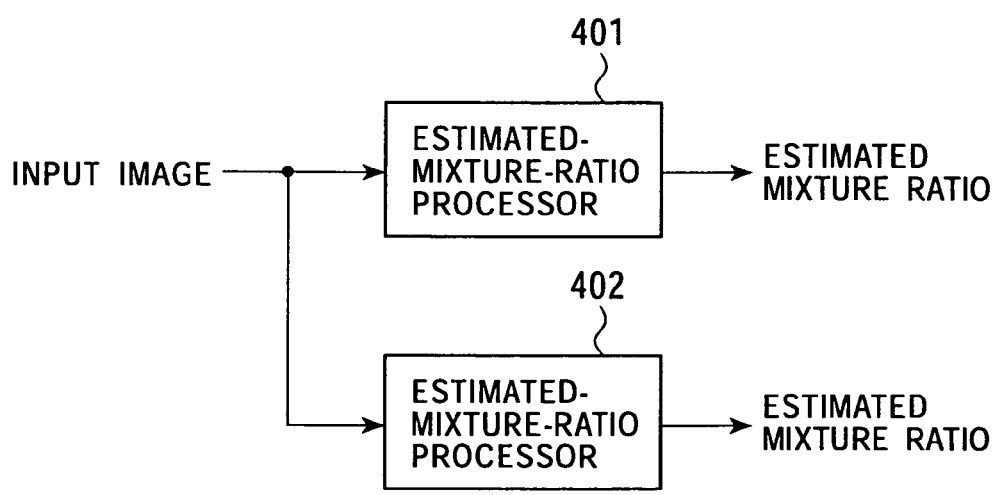
FIG. 95 is a block diagram illustrating the configuration of a mixture-ratio calculator 1101.

FIG. 95 is a block diagram illustrating an example of the configuration of the mixture-ratio calculator 1101.

An estimated-mixture-ratio processor 401 shown in FIG. 95 is the same as the estimated-mixture-ratio processor 401 shown in FIG. 54. An estimated-mixture-ratio processor 402 shown in FIG. 95 is the same as the estimated-mixture-ratio processor 402 shown in FIG. 54.

The estimated-mixture-ratio processor 401 calculates the estimated mixture ratio for each pixel by the computation corresponding to a model of the covered background area based on the input image, and outputs the calculated estimated mixture ratio.

The estimated-mixture-ratio processor 402 calculates the estimated mixture ratio for-each pixel by the computation corresponding to a model of the uncovered background area based on the input image, and outputs the calculated estimated mixture ratio.

The foreground/background separator 1102 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the motion-blur adjusting unit 106 and the selector 107.

Figure 96:
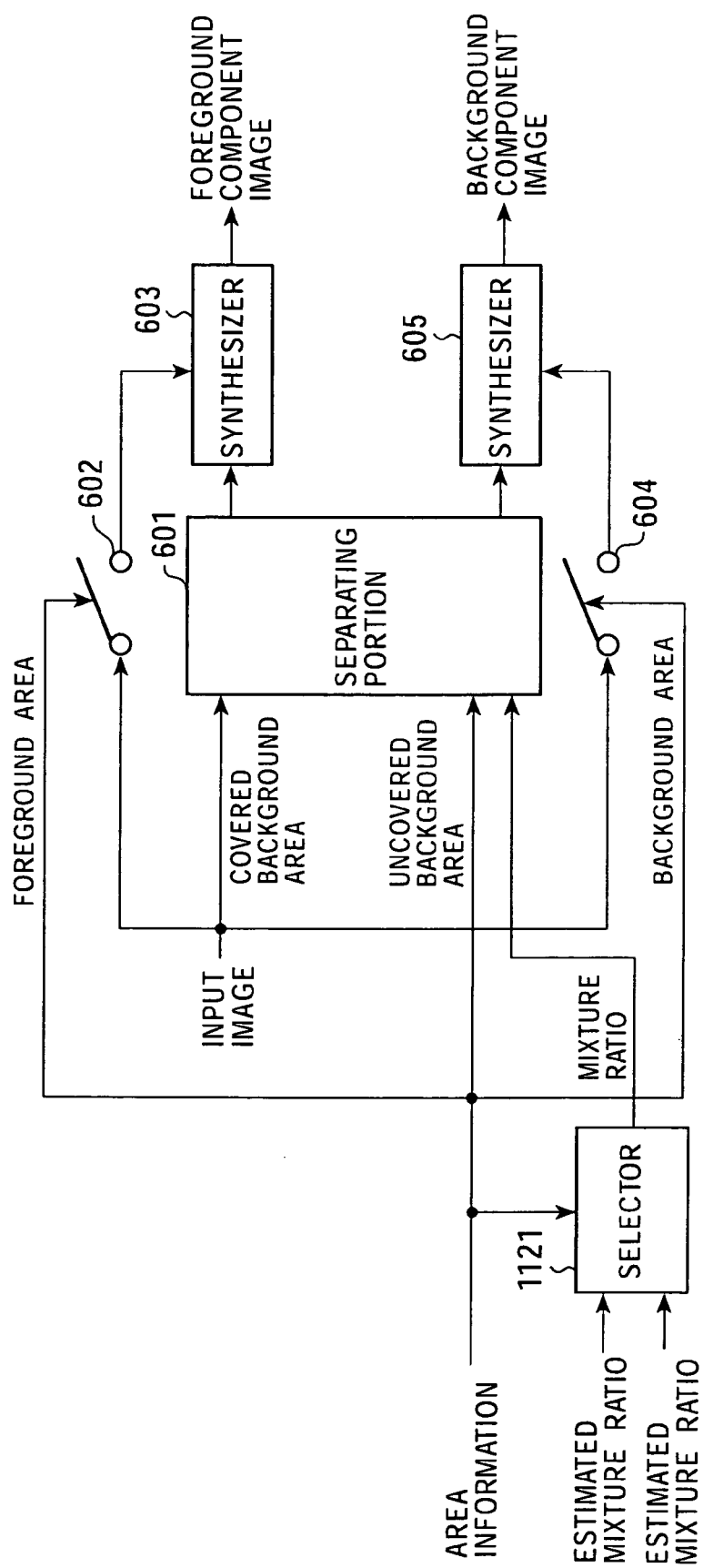
FIG. 96 is a block diagram illustrating the configuration of a foreground/background separator 1102.

FIG. 96 is a block diagram illustrating an example of the configuration of the foreground/background separator 1102.

The elements similar to those of the foreground/background separator 105 shown in FIG. 71 are indicated by like reference numerals, and an explanation thereof is thus omitted.

A selector 1121 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the separating portion 601 as the mixture ratio α.

The separating portion 601 extracts the foreground components and the background components from the pixel values of the pixels belonging to the mixed area based on the mixture ratio α supplied from the selector 1121 and the area information, and supplies the extracted foreground components to the synthesizer 603 and also supplies the foreground components to the synthesizer 605.

The separating portion 601 can be configured similarly to the counterpart shown in FIG. 76.

The synthesizer 603 synthesizes the foreground component image and outputs it. The synthesizer 605 synthesizes the background component image and outputs it.

The motion-blur adjusting unit 106 shown in FIG. 94 can be configured similarly to the counterpart shown in FIG. 9. The motion-blur adjusting unit 106 adjusts the amount of motion blur contained in the foreground component image supplied from the foreground/background separator 1102 based on the area information and the motion vector, and outputs the foreground component image in which the amount of motion blur is adjusted.

The selector 107 shown in FIG. 94 selects the foreground component image supplied from the foreground/background separator 1102 or the foreground component image in which the amount of motion blur is adjusted supplied from the motion-blur adjusting unit 106 based on, for example, a selection signal reflecting a user's selection, and outputs the selected foreground component image.

As discussed above, the separating portion 91 shown in FIG. 94 is able to adjust the amount of motion blur contained in an image corresponding to a foreground object of the input image, and outputs the resulting foreground object image. As in the first embodiment, the separating portion 91 having the configuration shown in FIG. 94 is able to calculate the mixture ratio α, which is embedded information, and outputs the calculated mixture ratio α.

Figure 97:
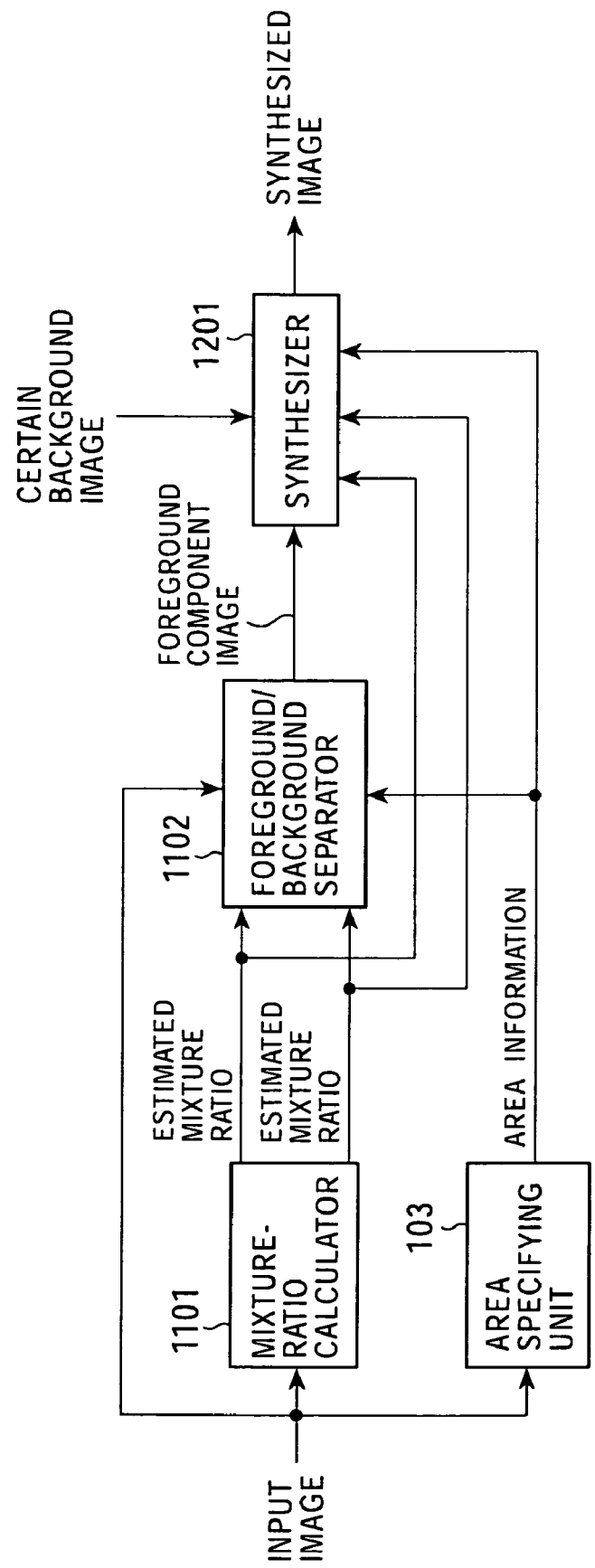
FIG. 97 is a block diagram illustrating still another configuration of the function of the image processing apparatus.

FIG. 97 is a block diagram illustrating another configuration of the function of the separating portion 91 for combining a foreground component image with a certain background image. The separating portion 91 shown in FIG. 92 serially performs the area-specifying operation and the calculation for the mixture ratio α. In contrast, the separating portion 91 shown in FIG. 97 performs the area-specifying operation and the calculation for the mixture ratio α in a parallel manner.

The functional elements similar to those of the block diagram of FIG. 94 are designated with like reference numerals, and explanation thereof is thus omitted.

The mixture-ratio calculator 1101 shown in FIG. 97 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102 and a synthesizer 1201.

The foreground/background separator 1102 shown in FIG. 97 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the synthesizer 1201.

The synthesizer 1201 combines a certain background image with the foreground component image supplied from the foreground/background separator 1102 based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and outputs the synthesized image in which the background image and the foreground component image are combined.

Figure 98:
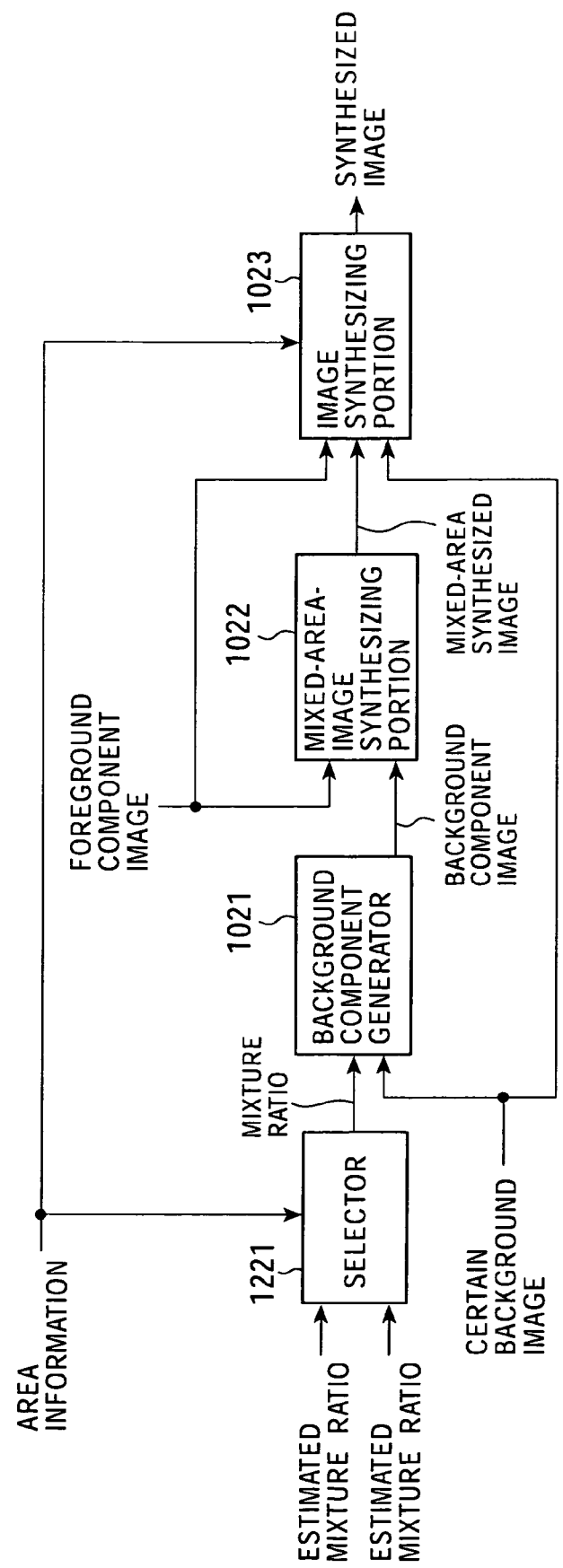
FIG. 98 illustrates the configuration of a synthesizer 1201.

FIG. 98 illustrates the configuration of the synthesizer 1201. The functional elements similar to those indicated by the block of FIG. 93 are indicated by like reference numerals, and an explanation thereof is thus omitted.

A selector 1221 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the background component generator 1021 as the mixture ratio α.

The background component generator 1021 shown in FIG. 98 generates a background component image based on the mixture ratio α supplied from the selector 1221 and a certain background image, and supplies the background component image to the mixed-area-image synthesizing portion 1022.

The mixed-area-image synthesizing portion 1022 shown in FIG. 98 combines the background component image supplied from the background component generator 1021 with the foreground component image so as to generate a mixed-area synthesized image, and supplies the generated mixed-area synthesized image to the image synthesizing portion 1023.

The image synthesizing portion 1023 combines the foreground component image, the mixed-area synthesized image supplied from the mixed-area-image synthesizing portion 1022, and the background image based on the area information so as to generate a synthesized image and outputs it.

In this manner, the synthesizer 1201 is able to combine the foreground component image with a certain background image.

The embodiment has been discussed above by setting the mixture ratio α to the ratio of the background components contained in the pixel values. However, the mixture ratio α may be set to the ratio of the foreground components contained in the pixel values.

The embodiment has been discussed above by setting the moving direction of the foreground object to the direction from the left to the right. However, the moving direction is not restricted to the above-described direction.

In the above description, a real-space image having a three-dimensional space and time axis information is projected onto a time space having a two-dimensional space and time axis information by using a video camera. However, the present invention is not restricted to this example, and can be applied to the following case. When a greater amount of first information in one-dimensional space is projected onto a smaller amount of second information in a two-dimensional space, distortion generated by the projection can be corrected, significant information can be extracted, or a more natural image can be synthesized.

The sensor is not restricted to a CCD, and may be another type of sensor, such as a solid-state image-capturing device, for example, a BBD (Bucket Brigade Device), a CID (Charge Injection Device), or a CPD (Charge Priming Device), or a CMOS (Complementary Metal Oxide Semiconductor). Also, the sensor does not have to be a sensor in which detection devices are arranged in a matrix, and may be a sensor in which detection devices are arranged in one line.

Referring to the flowchart of FIG. 99, the synthesis service processing for outputting a synthesized image generated by combining a foreground component image of an image captured in real time by the camera terminal device 2 with a specified background component image will now be described. It is assumed that the camera terminal device 2 is rented out to a user. A case in which fees are separately charged for the separation processing and the synthesis processing will now be described.

In step S1001, it is determined whether or not a shutter button is pressed. The processing is repeated until it is determined that the shutter button is pressed. When the shutter button is pressed, in step S1002, the signal controller 71 performs the processing to separate an image input from the image-capturing unit 74 into a background component image and a foreground component image. The image separation processing is a series of processes performed by the above-described separating portion 91. Specifically, the processing is to separate the input image into the foreground component image and the background component image and is implemented by the area specifying processing described with reference to the flowchart of FIG. 35, the mixture-ratio calculation processing described with reference to FIG. 63, the foreground/background separation processing described with reference to the flowchart of FIG. 78, and the foreground-component-image-motion-blur adjustment processing described with reference to the flowchart of FIG. 86. Since the processing is similar to the above, a description thereof is omitted.

In step S1003, the billing processor 75 performs the billing processing to charge fees to the billing server 5 via the network 1. At the same time, in step S1021, the billing server 5 performs the billing processing to charge fees to the camera terminal device 2.

Figure 100:
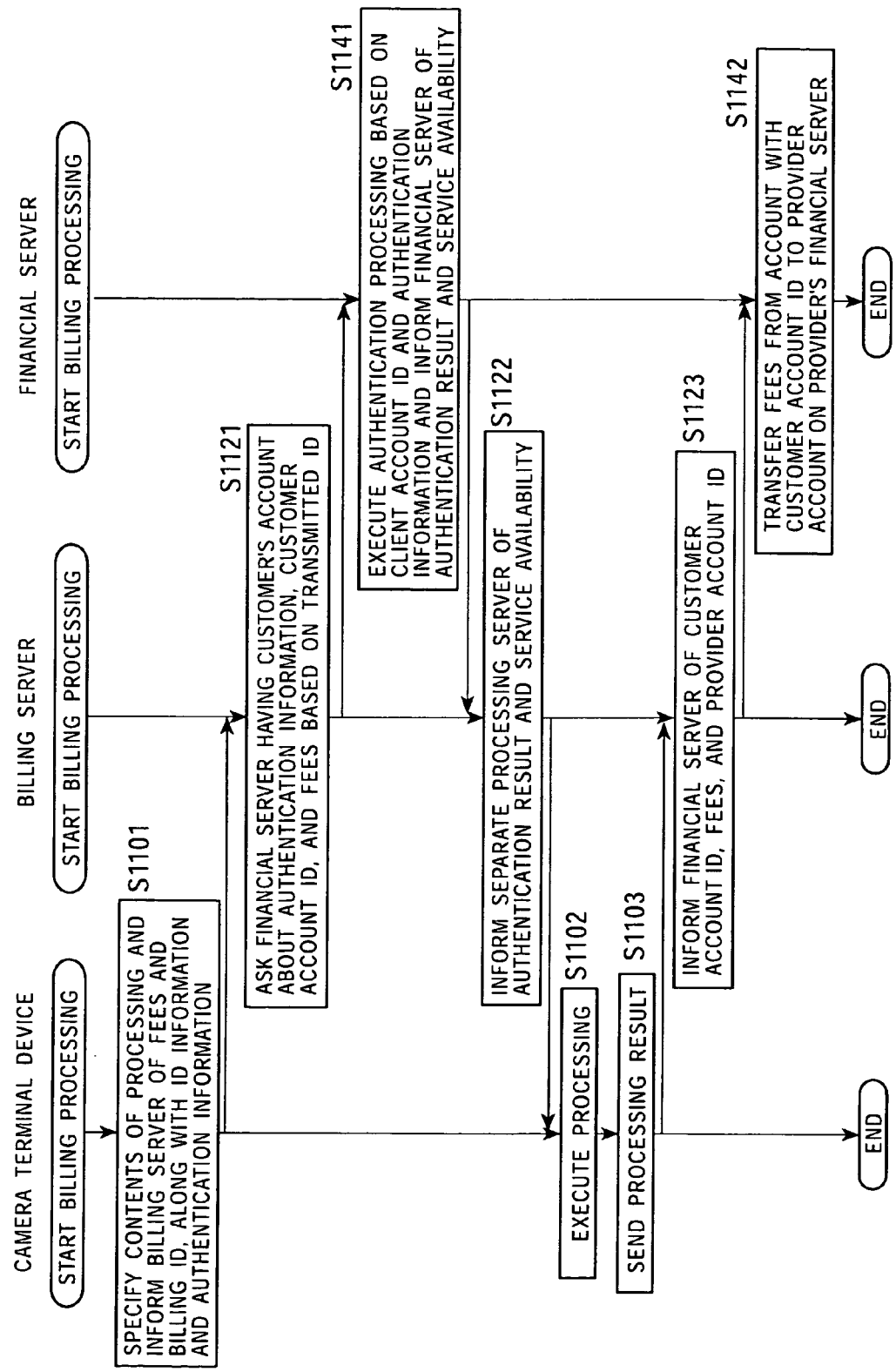
FIG. 100 is a flowchart illustrating the synthesis service billing processing.

With reference to the flowchart of FIG. 100, the above-described billing processing will now be described. In the billing processing, the user who has borrowed the camera terminal device 2 inputs, prior to the start of using the camera terminal device 2, for example, the user's account ID (credit card number may be input instead) and authentication information.

Figure 101:
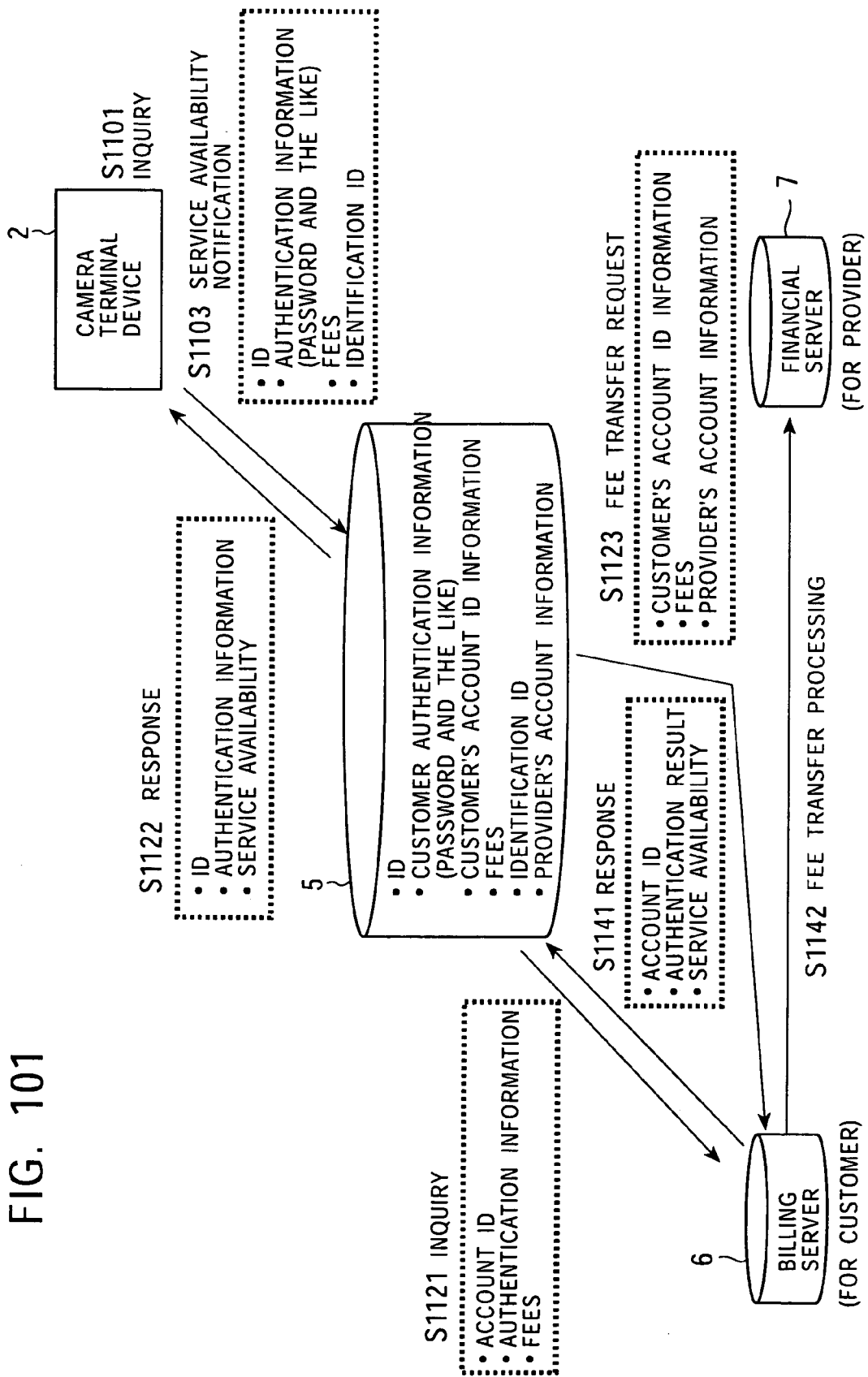
FIG. 101 illustrates the synthesis service billing processing.

In step S1101, as shown in FIG. 101, the billing processor 75 specifies the contents of the processing (service) and transmits ID information for identifying the user (user requesting image separation), authentication information (password and the like), fees, and ID stored therein (ID for specifying the provider) to the billing server 5 via the network 1. In this case, the image separation processing is specified as a service.

In step S1121, as shown in FIG. 101, the billing server 24 asks the financial server 6 under the management of a financial institution having the customer's account about the authentication information, the customer's account ID, and the fees on the basis of the (user's) ID transmitted from the camera terminal device 2.

In step S1141, as shown in FIG. 101, the financial server (for customer) 6 performs the authentication processing based on the customer's account ID and the authentication information and informs the billing server 5 of the authentication result and the service availability information.

In step S1122, as shown in FIG. 101, the billing server 5 transmits the authentication information and the service availability information to the camera terminal device 2. In the following description, the case will be described under the conditions that there is no problem with the authentication result and that the service is thus available. If there is a problem with the authentication result and information indicating that the service is unavailable is received, the processing is terminated.

In step S1102, as shown in FIG. 101, the camera terminal device 2 provides the service when the conditions that there is no problem with the authentication result and that the service is thus available are satisfied. In other words, in this case, the camera terminal device 2 executes the image separation processing.

In step S1103, the camera terminal device 2 transmits a service use notification to the billing server 5. In step S1123, the billing server 5 informs the financial server (for customer) 6 of the customer's account ID, the fees, and the provider's account ID.

In step S1142, the financial server (for customer) 6 transfers the fees from an account with the customer's account ID to the provider's financial server (for provider) 7.

Figure 99:
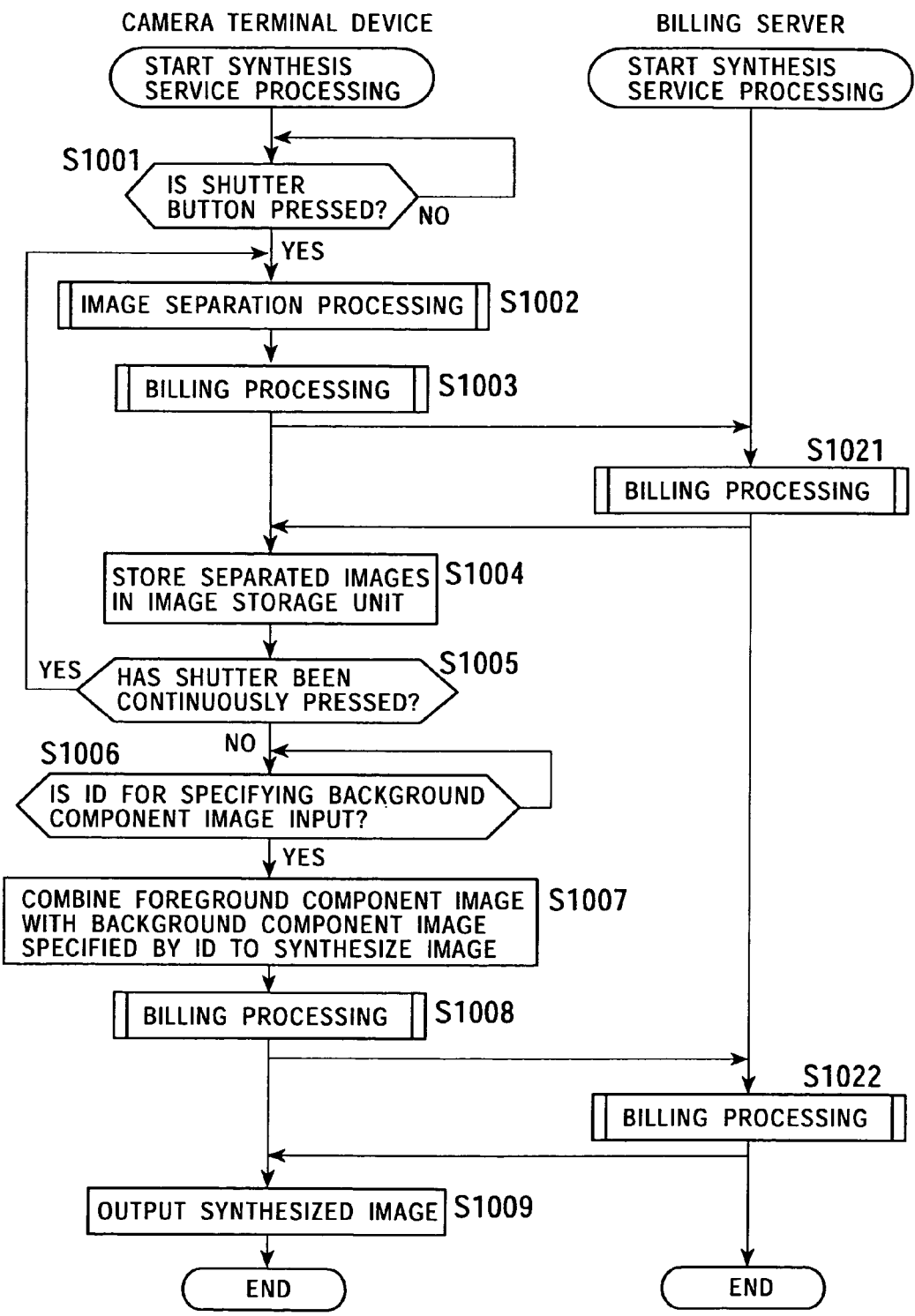
FIG. 99 is a flowchart illustrating the synthesis service processing performed by the camera terminal device.

The description returns to the flowchart of FIG. 99.

In step S1004, the signal controller 71 stores the separated images in the image storage unit 72. In step S1005, the billing processor 75 determines whether or not the shutter has been continuously pressed. If it is determined that the shutter has been continuously pressed, the processing returns to step S1002. That is, the billing processing is continuously executed while the shutter is continuously pressed.

If it is determined in step S1005 that the shutter is not pressed, in step S1006, the signal controller 71 determines whether or not the ID of an image to be selected as a background component image is input. The processing is repeated until the ID is input. The ID for specifying the background component image may be set prior to the start of using the camera terminal device 2. When there is no preset ID, the ID specified by default may be input. Accordingly, the separation processing and the synthesis processing are performed without an obstacle after the shutter is pressed.

Figure 102A:
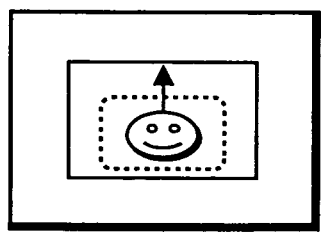
FIG. 102A illustrates the synthesis service billing processing.
Figure 102B:
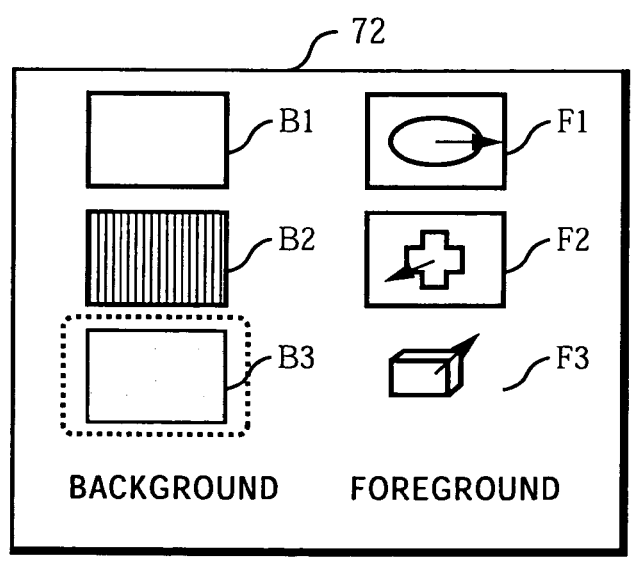
FIG. 102B illustrates the synthesis service billing processing.
Figure 102C:
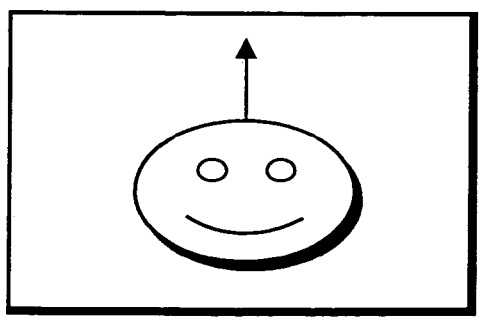
FIG. 102C illustrates the synthesis service billing processing.

In step S1007, the signal controller 71 combines the background component image having the specified ID with the foreground component image separated by the separation processing. For example, when an image shown in FIG. 102A is captured by the image-capturing unit 74, the signal controller 71 separates the image into a foreground component image and a background component image. Subsequently, as shown in FIG. 102B, when the processing in step S1006 selects background B3 from among images stored in the image storage unit 72 (including backgrounds B1 to B3 and foregrounds F1 to F3), the signal controller 71 combines background B3 and the foreground component image at the center of the image shown in FIG. 102A to generate a synthesized image shown in FIG. 102C.

In steps S1008 and S1022, the billing processor 71 of the camera terminal device 2 and the billing server 5 perform the billing processing for charging fees for the synthesis processing. Since the billing processing is similar to the processing described with reference to the flowchart of FIG. 100, a description thereof is omitted.

In step S1009, the signal controller 71 of the camera terminal device 2 displays the synthesized image on the display unit 73, assigns the ID to the image, and stores the image in the image storage unit 72.

In the foregoing example, the separation processing is repeated for a period of time during which the shutter is pressed, and the corresponding fees are continuously charged. Alternatively, fees may be charged every time the shutter is pressed.

Figure 103:
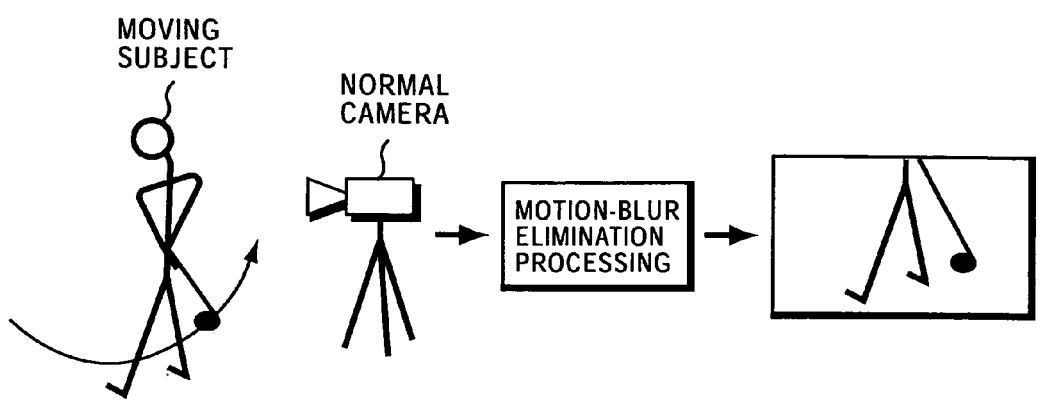
FIG. 103 illustrates a real-time synthesis service offered by the camera terminal device.
Figure 104:
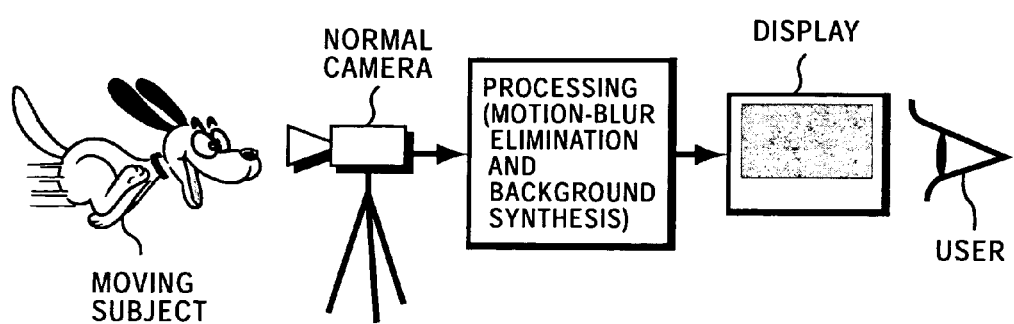
FIG. 104 illustrates another embodiment of a camera terminal device.

The television set terminal device 3 for eliminating in real time motion blur of an image of a moving subject captured by the camera device 4 and displaying the motion-blur-eliminated image, as shown in FIG. 103, or for eliminating motion blur in real time and combining the motion-blur-eliminated image with a background component image, as shown in FIG. 104, will now be described with reference to FIG. 105.

Figure 105:
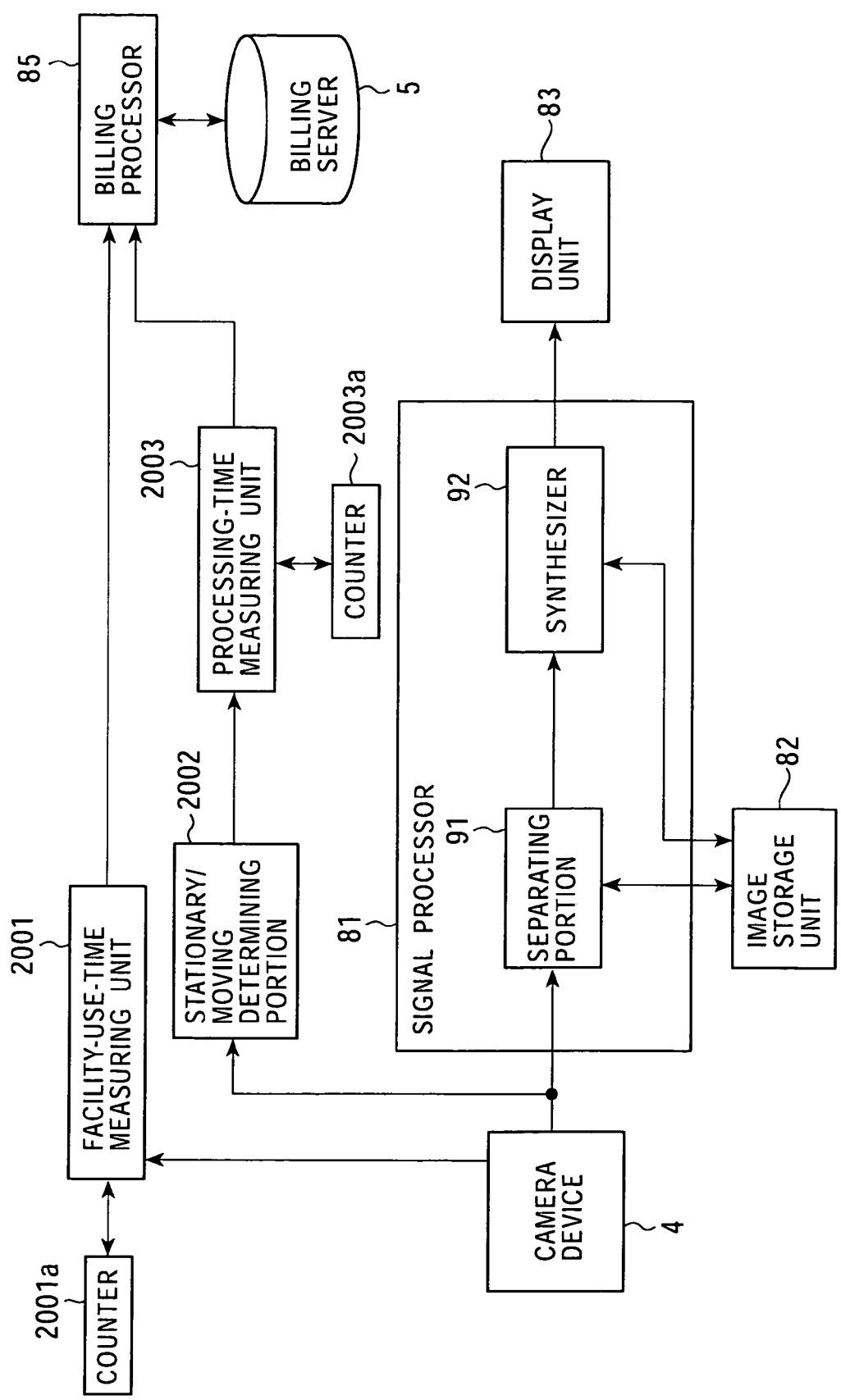
FIG. 105 is a flowchart illustrating the real-time synthesis service processing performed by the camera terminal device.

The television set terminal device 3 shown in FIG. 105 is, as shown in FIG. 104, to be rented out for use in wild animal observation at night or the like. The billing processing charges, to the television set terminal device 3, fees based on renting time (fees in accordance with the facility use time) and fees for the motion-blur elimination processing and the synthesis processing. The fees for the motion-blur elimination processing and the synthesis processing are charged only when there is a motion in the subject image (foreground component image).

A facility-use-time measuring unit 2001 of the television set terminal device 3 measures the time from the renting of the television set terminal device 3. The facility-use-time measuring unit 2001 stores the measured time in a counter 2001*a* and outputs the final measured facility use time to the billing processor 85. A still/motion determination unit 2002 scans the captured image input from the camera device 4 and determines whether or not there is a motion in the subject image (foreground component image). If there is a motion, the still/motion determination unit 2002 outputs a signal indicating the presence of the motion to a processing-time measuring unit 2003. When the signal indicating the presence of the motion is input to the processing-time measuring unit 2003, the processing-time measuring unit 2003 stores the time during which the signal is input in a counter 2003*a* and, finally in the billing processing, outputs the processing time stored in the counter 2003*a* to the billing processor 85. At this time, the billing processor 85 calculates the fees in accordance with the facility use time input from the facility-use-time measuring unit 2001 and the processing time input from the processing-time measuring unit 2003 and executes the billing processing to charge the fees to the billing server 5.

Since the configuration of the signal processor 81 is similar to that of the signal processor 71 shown in FIG. 8, a description thereof is omitted.

Referring to the flowchart of FIG. 106, the real-time synthesis service processing performed by the television set terminal device 3 for use in wild animal observation at night will now be described.

In step S1201, the facility-use-time measuring unit 2001 of the television set terminal device 3 starts measuring the facility use time. At this time, the camera device 4 starts outputting captured images one after another to the signal processor 71 and the still/motion determination unit 2002. In step S1202, the still/motion determination unit 2002 determines whether or not there is a motion in the subject. The processing is repeated until it is determined that there is a motion. If it is determined that there is a motion, the processing proceeds to step S1203.

In step S1203, the still/motion determination unit 2002 outputs a signal indicating the detection of the motion. In response, the processing-time measuring unit 2003 starts measuring the processing time.

In step S1204, the separating portion 91 of the signal controller 81 executes the processing to separate an input image. The processing is similar to the processing in step S1002 of the flowchart of FIG. 99 and includes the motion-blur adjustment processing (see the flowchart of FIG. 86). With this processing, the image is separated, and motion blur is eliminated by the foreground-component-image-motion-blur adjustment processing. In this case, after the image is separated, only the foreground component image is output to the synthesizer 92.

In step S1205, the synthesizer 92 reads a background component image to be combined from the image storage unit 72. In step S1206, the synthesizer 92 combines the read background component image and the motion-blur-eliminated foreground component image input from the separating portion 91 to synthesize an image and outputs the synthesized image to the display unit 83. The display unit 83 displays the synthesized image.

In step S1207, the still/motion determination unit 2002 determines whether or not there is a motion, that is, whether or not there has been intermittently a motion. If it is determined that there is a motion, the processing returns to step S1204, and the processing from this step onward is repeated.

If it is determined in step S1207 that there is no motion, in step S1208, the processing-time measuring unit 2003 measures the time used for the actual separation processing (motion-blur elimination processing) and the synthesis processing and stores the time in the counter 2003*a*.

In step S1209, the facility-use-time measuring unit 2001 determines whether or not the use of the facility is ended. For example, when the use of the facility is ended, in step S1210, the facility-use-time measuring unit 2001 measures the facility use time stored in the counter 2001*a* and outputs the measured time to the billing processor 75.

In steps S1211 and S1121, the billing processor 85 of the television set terminal device 3 and the billing server 5 calculate the fees based on the facility use time and the processing time used for the motion-blur elimination processing and the synthesis processing and executes the corresponding billing processing. Since the billing processing is similar to the processing described with reference to the flowchart of FIG. 100, a description thereof is omitted.

With the foregoing processing, a service for capturing a motion-blur-adjusted image in dim light, such as in wild animal observation at night, is provided. Since the billing processing for charging fees in accordance with renting time (facility use time) during which the television set terminal device 3 is rented and processing time (time used for the motion blur processing and the synthesis processing) is implemented, fees for the separation processing and the synthesis processing are not charged at night during which animals remain stationary. The user only pays fees when a situation in which the separation processing and the synthesis processing are necessary arises.

Alternatively, in the real-time synthesis service processing described with reference to the flowchart of FIG. 106, the billing processing charges fees not based on renting time but only on processing time. With reference to the flowchart of FIG. 107, the processing in which the television set terminal device 3 is rented out to a user at a golf course or the like so as that the user can check the user's golf swing will now be described.

Figure 106:
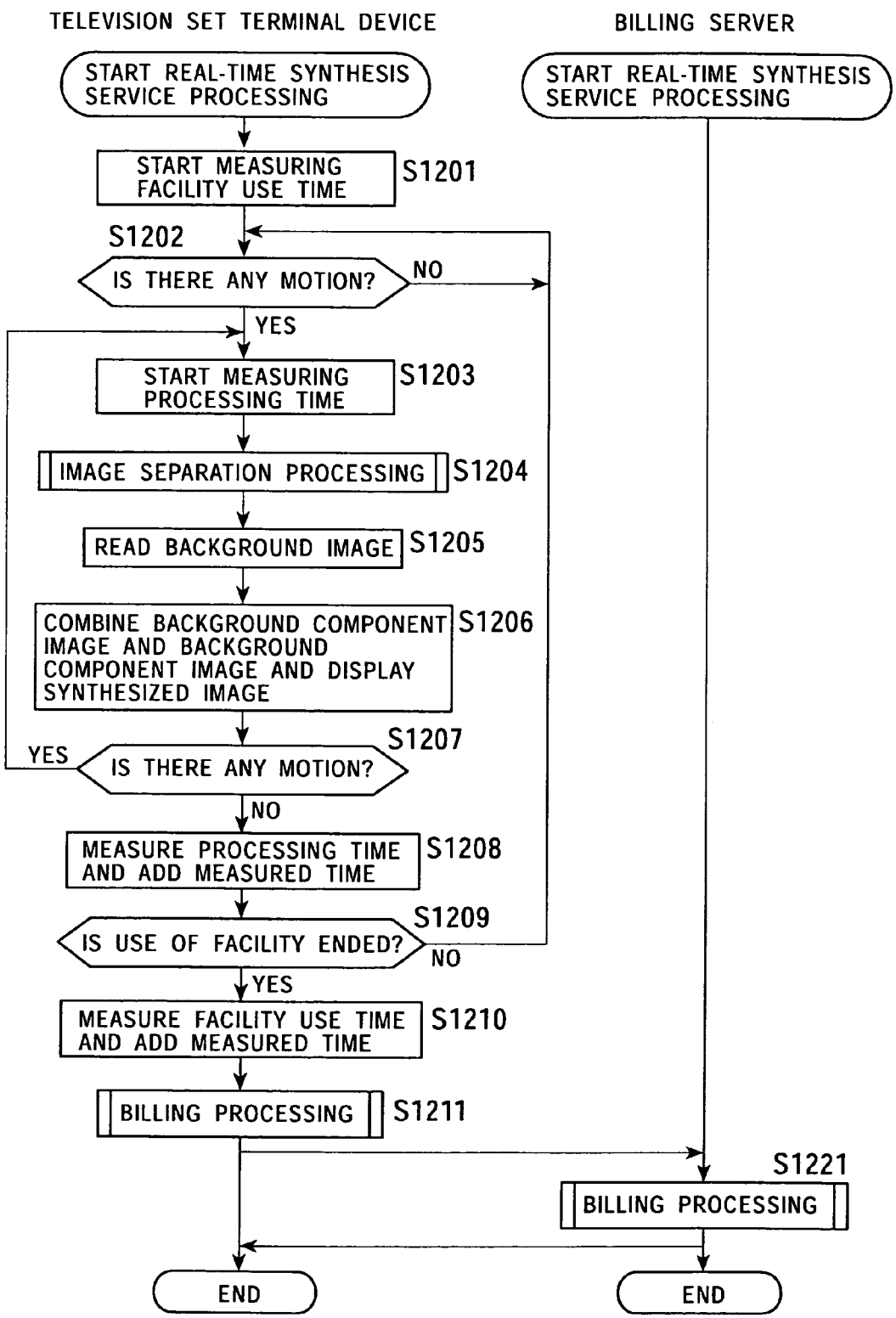
FIG. 106 illustrates the real-time synthesis service offered by the camera terminal device.
Figure 107:
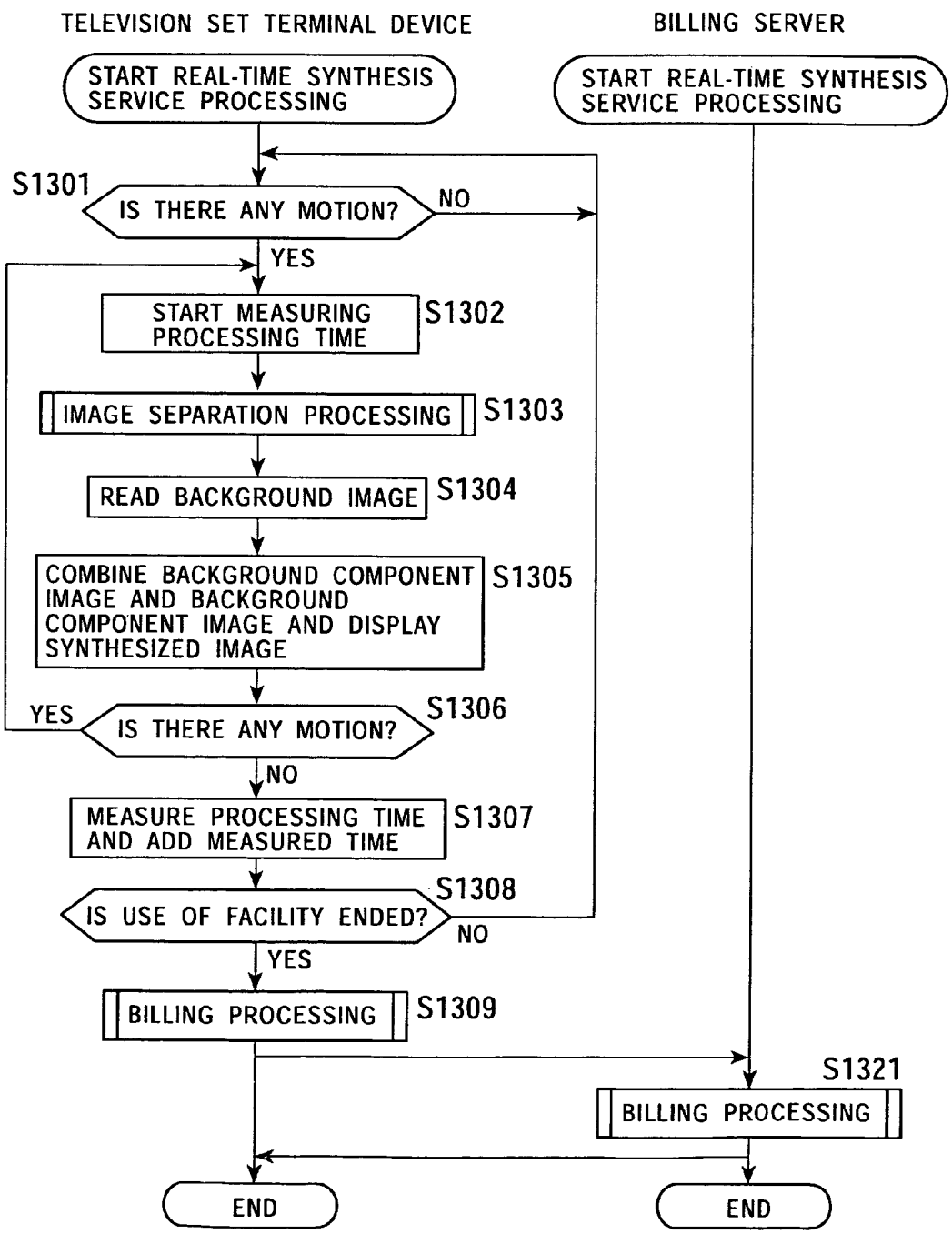
FIG. 107 illustrates the real-time synthesis service offered by the camera terminal device.

The processing is similar to the flowchart of FIG. 106 from which steps S1201 and S1210 are omitted. That is, in step S1301, the still/motion determination unit 2002 determines whether or not there is a motion in the subject. The processing is repeated until it is determined that there is a motion. If it is determined that there is a motion, the processing proceeds to step S1302. In other words, the processing is not executed and the billing processing is not executed until the user swings a golf club.

In step S1302, the still/motion determination unit 2002 outputs a signal indicating the detection of the motion. In response, the processing-time measuring unit 2003 starts measuring the processing time.

In step S1303, the separating portion 91 of the signal controller 81 executes the processing to separate an input image. The processing is similar to the processing in step S1002 of the flowchart of FIG. 99 and includes the motion-blur-amount adjustment processing. With this processing, the image is separated, and motion blur is eliminated by the foreground-component-image-motion-blur adjustment processing.

In step S1304, the synthesizer 92 reads a background component image to be combined from the image storage unit 82. In step S1305, the synthesizer 92 combines the read background component image and the motion-blur-eliminated foreground component image input from the separating portion 91 to synthesize an image and outputs the synthesized image to the display unit 83. The display unit 83 displays the synthesized image. In this case, the result is satisfactory when motion blur due to the swinging of the golf club is eliminated from the displayed image. A captured image does not need to be combined with a different background component image. Accordingly, a background component image is not necessarily read from the image storage unit 82.

In step S1306, the still/motion determination unit 2002 determines whether or not there is a motion, that is, whether or not there has been intermittently a motion. If it is determined that there is a motion, the processing returns to step S1204, and the processing from this step onward is repeated.

If it is determined in step S1306 that there is no motion, in step S1307, the processing-time measuring unit 2003 measures the time used for the actual separation processing (motion-blur elimination processing) and the synthesis processing and stores the measured time in the counter 2003*a*.

In step S1308, the facility-use-time measuring unit 2001 determines whether or not the use of the facility is ended. For example, when the use of the facility is ended (when the camera terminal device 2 is to be returned), in steps S1309 and S1321, the billing processor 71 of the camera terminal device 2 and the billing server 5 calculate the fees based on the facility use time and the processing time used for the motion-blur elimination processing and the synthesis processing and executes the corresponding billing processing. Since the billing processing is similar to the processing described with reference to the flowchart of FIG. 100, a description thereof is omitted.

In the foregoing description, the operation of the television set terminal device 3 has been described. Alternatively, for example, similar processing may be performed by the camera terminal device 2.

Accordingly, the separating portion 91 of the present invention separates in real time a captured image into a foreground component image (foreground component image) and a foreground component image (foreground component image) and performs in real time the motion-blur adjustment processing of the foreground component image.

A recording medium in which a program for performing the signal processing of the present invention is recorded may be formed of a package medium in which the program is recorded, which is distributed for providing the program to a user separately from the computer, as shown in FIGS. 4 and 5, such as the magnetic disks 41 and 61 (including a flexible disk), the optical discs 42 and 62 (including a CD-ROM (Compact Disc-Read Only Memory) and a DVD (Digital Versatile Disc)), the magneto-optical disks 43 and 63 (including an MD (Mini-Disc) (registered trade name)), or the semiconductor memories 44 and 64. The recording medium may also be formed of the ROMs 22 and 52 or hard disks contained in the storage units 28 and 58 in which the program is recorded, such recording medium being provided to the user while being prestored in the computer.

The steps forming the program recorded in a recording medium may be executed chronologically according to the orders described in the specification. However, they do not have to be executed in a time-series manner, and they may be executed concurrently or individually.

INDUSTRIAL APPLICABILITY

According to the present invention, a captured image is separated in real time into a foreground component image (foreground component image) and a foreground component image (foreground component image), and the motion-blur adjustment processing of the foreground component image is performed in real time.

The invention claimed is:

1. An image processing apparatus comprising:
    an input for inputting image data which is formed of a predetermined number of pixel data obtained by a predetermined number of image-capturing devices including pixels, the image-capturing devices each having a time integrating function;
    a mixture-ratio estimator for estimating a mixture ratio for a mixed area in the input image data, the mixed area including a mixture of foreground object components forming a foreground object of the image data and background object components forming a background object of the image data;
    a separator for separating in real time, on the basis of the estimated mixture ratio, the input image into a foreground component image formed of the foreground object components forming the foreground object of the image data and a background component image formed of the background object components forming the background object of the image data; and
    a store for storing in real time the foreground component image and the background component image, which are separated by the separator.

2. The image processing apparatus according to claim 1, further comprising an image-capturing unit for capturing an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

3. The image processing apparatus according to claim 2, further comprising: an image-capturing commander for giving a command to the image-capturing unit to capture the image; and a billing unit for executing billing processing in response to the command from the image-capturing commander.

4. The image processing apparatus according to claim 1, further comprising: a display for displaying the foreground component image and
    the background component image which are separated in real time by the separator and the foreground component image and the background component image which are already stored in the store; an image specifier for specifying a desired foreground component image and background component image from among the foreground component image and the background component image which are separated in real time by the separator and which are displayed by the display and the foreground component image and the background component image which are already stored in the store and which are displayed by the display; and a combiner for combining the desired foreground component image and background component image which are specified by the specifier.

5. The image processing apparatus according to claim 4, further comprising: a command unit for giving a command to the combiner to combine images; and a billing unit for executing billing processing in response to the command from the command unit.

6. The image processing apparatus according to claim 1, further comprising: a storage command unit for giving a command to the store, the command instructing whether or not to store in real time the foreground component image and the background component image which are separated by the separator; and a storage billing unit for executing billing processing in response to the command from the storage command unit.

7. The image processing apparatus according to claim 1, further comprising: a motion-blur adjusting unit for adjusting motion blur of the foreground component image which is separated in real time by the separator or the foreground component image which is already stored in the store.

8. The image processing apparatus according to claim 7, further comprising: a motion-blur-adjusted display for displaying the motion-blur-adjusted foreground component image generated by the motion-blur adjusting unit.

9. The image processing apparatus according to claim 8, further comprising: a combiner for combining the motion-blur-adjusted foreground component image generated by the motion-blur adjusting unit and the background component image, wherein the motion-blur-adjusted display displays an image generated by combining, by the combiner, the motion-blur-adjusted foreground component image generated by the motion-blur adjusting unit and the background component image.

10. The image processing apparatus according to claim 7, further comprising: a measuring unit for measuring time required by the motion-blur adjusting unit to adjust the motion blur of the foreground component image; and a motion-blur-adjustment billing unit for executing billing processing in accordance with the time measured by the measuring unit.

11. The image processing apparatus according to claim 8, further comprising: an operation-time measuring unit for measuring operation time thereof; and an operation billing unit for executing billing processing in accordance with the time measured by the operation-time measuring unit.

12. An image processing method comprising: an input step of inputting image data which is formed of a predetermined number of pixel data obtained by a predetermined number of image-capturing devices including pixels, the image-capturing devices each having a time integrating function; a mixture-ratio estimating step of estimating a mixture ratio for a mixed area in the image data input in the input step, the mixed area including a mixture of foreground object components forming a foreground object of the image data and background object components forming a background object of the image data; a separation step of separating in real time, on the basis of the mixture ratio estimated in the mixture-ratio estimating step, the image data input in the input step into a foreground component image formed of the foreground object components forming the foreground object of the image data and a background component image formed of the background object components forming the background object of the image data; and a storage step of storing in real time the foreground component image and the background component image, which are separated in the separation step.

13. An image processing method according to claim 12, further comprising: an image-capturing step of capturing an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

14. An image processing method according to claim 13, further comprising: an image-capturing command step of giving a command to the image-capturing step to capture the image; and an image-capturing billing step of executing billing processing in response to the command in the image-capturing command step.

15. An image processing method according to claim 12, further comprising: an image display step of displaying the foreground component image and the background component image which are separated in real time in the separation step and the foreground component image and the background component image which are already stored in the storage step; an image specifying step of specifying a desired foreground component image and background component image from among the foreground component image and the background component image which are separated in real time in the separation step and which are displayed in the image display step and the foreground component image and the background component image which are already stored in the storage step and which are displayed in the image display step; and a combining step of combining the desired foreground component image and background component image which are specified in the specifying step.

16. An image processing method according to claim 15, further comprising: a combining command step of giving a command to the combining step to combine images; and a combining billing step of executing billing processing in response to the command in the combining command step.

17. An image processing method according to claim 12, further comprising: a storage command step of giving a command to the storage step, the command instructing whether or not to store in real time the foreground component image and the background component image which are separated in the separation step; and a storage billing step of executing billing processing in response to the command in the storage command step.

18. An image processing method according to claim 12, further comprising: a motion-blur adjusting step of adjusting motion blur of the foreground component image which is separated in real time in the separation step or the foreground component image which is already stored in the storage step.

19. An image processing method according to claim 18, further comprising: a motion-blur-adjusted-image display step of displaying the motion-blur-adjusted foreground component image generated in the motion-blur adjusting step.

20. An image processing method according to claim 19, further comprising: a combining step of combining the motion-blur-adjusted foreground component image generated in the motion-blur adjusting step and the background component image, wherein the motion-blur-adjusted-image display step displays an image generated by combining, in the combining step, the motion-blur-adjusted foreground component image generated in the motion-blur adjusting step and the background component image.

21. An image processing method according to claim 18, further comprising: a processing-time measuring step of measuring time required by the motion-blur adjusting step to adjust the motion blur of the foreground component image; and a motion-blur-adjustment billing step of executing billing processing in accordance with the time measured in the processing-time measuring step.

22. An image processing method according to claim 19, further comprising: an operation-time measuring step of measuring operation time thereof; and an operation billing step of executing billing processing in accordance with the time measured in the operation-time measunng step.

23. A computer-readable medium storing a computer program to control a processor to carry out a method comprising: an input control step of controlling the inputting of image data which is formed of a predetermined number of pixel data obtained by a predetermined number of image-capturing devices including pixels, the image-capturing devices each having a time integrating function; a mixture-ratio estimating control step of controlling the estimation of a mixture ratio for a mixed area in the image data input in the input control step, the mixed area including a mixture of foreground object components forming a foreground object of the image data and background object components forming a background object of the image data; a separation control step of controlling the separation in real time, on the basis of the mixture ratio estimated in the mixture-ratio estimating control step, of the image data input in the input control step into a foreground component image formed of the foreground object components forming the foreground object of the image data and a background component image formed of the background object components forming the background object of the image data; and a storage control step of controlling the storing, in real time, of the foreground component image and the background component image, which are separated in the separation control step.

24. The computer-readable medium according to claim 23 having recorded thereon a computer-readable program, the program further comprising: an image-capturing control step of controlling the capturing of an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

25. The computer-readable medium according to claim 24 having recorded thereon a computer-readable program, the program further comprising: an image-capturing command control step of controlling the giving of a command to the image-capturing control step to capture the image; and an image-capturing billing control step of controlling the execution of billing processing in response to the command in the image-capturing command control step.

26. The computer-readable medium according to claim 23 having recorded thereon a computer-readable program, the program further comprising: an image display control step of controlling the displaying of the foreground component image and the background component image which are separated in real time in the separation control step and the foreground component image and the background component image which are already stored in the storage control step; an image specifying control step of controlling the specifying of a desired foreground component image and background component image from among the foreground component image and the background component image which are separated in real time in the separation control step and which are displayed in the image display control step and the foreground component image and the background component image which are already stored in the storage control step and which are displayed in the image display control step; and a combining control step of controlling the combining of the desired foreground component image and background component image which are specified in the specifying control step.

27. The computer-readable medium according to claim 26 having recorded thereon a computer-readable program, the program further comprising: a combining command control step of controlling the giving of a command to the combining control step to combine images; and a combining billing control step of controlling the execution of billing processing in response to the command in the combining command control step.

28. The computer-readable medium according to claim 23 having recorded thereon a computer-readable program, the program further comprising: a storage command control step of controlling the giving of a command to the storage control step, the command instructing whether or not to store in real time the foreground component image and the background component image which are separated in the separation control step; and a storage billing control step of controlling the execution of billing processing in response to the command in the storage command control step.

29. The computer-readable medium according to claim 23 having recorded thereon a computer-readable program, the program further comprising: a motion-blur adjusting control step of controlling the adjustment of motion blur of the foreground component image which is separated in real time in the separation control step or the foreground component image which is already stored in the storage control step.

30. The computer-readable medium according to claim 29 having recorded thereon a computer-readable program, the program further comprising: a motion-blur-adjusted-image display control step of controlling the displaying of the motion-blur-adjusted foreground component image generated in the motion-blur adjusting control step.

31. The computer-readable medium according to claim 30 having recorded thereon a computer-readable program, the program further comprising: a combining control step of controlling the combining of the motion-blur-adjusted foreground component image generated in the motion-blur adjusting control step and the background component image, wherein the motion-blur-adjusted-image display control step controls the display of an image generated by combining, in the combining control step, the motion-blur-adjusted foreground component image generated in the motion-blur adjusting control step and the background component image.

32. The computer-readable medium according to claim 29 having recorded thereon a computer-readable program, the program further comprising: a processing-time measuring control step of controlling the measurement of time required by the motion-blur adjusting control step to adjust the motion blur of the foreground component image; and a motion-blur-adjustment billing control step of controlling the execution of billing processing in accordance with the time measured in the processing-time measuring control step.

33. The computer-readable medium according to claim 30 having recorded thereon a computer-readable program, the program further comprising: an operation-time measuring control step of controlling the measurement of operation time thereof; and an operation billing control step of controlling the execution of billing processing in accordance with the time measured in the operation-time measuring control step.

34. A program embodied in a computer-readable medium for instructing a computer to perform a process comprising: an input control step of controlling the inputting of image data which is formed of a predetermined number of pixel data obtained by a predetermined number of image-capturing devices including pixels, the image-capturing devices each having a time integrating function; a mixture-ratio estimating control step of controlling the estimation of a mixture ratio for a mixed area in the image data input in the input control step, the mixed area including a mixture of foreground object components forming a foreground object of the image data and background object components forming a background object of the image data; a separation control step of controlling the separation in real time, on the basis of the mixture ratio estimated in the mixture-ratio estimating control step, of the image data input in the input control step into a foreground component image formed of the foreground object components forming the foreground object of the image data and a background component image formed of the background object components forming the background object of the image data; and a storage control step of controlling the storing, in real time, of the foreground component image and the background component image, which are separated in the separation control step.

35. The program according to claim 34 for instructing a computer to perform a process further comprising: an image-capturing control step of controlling the capturing of an image which is formed of the image data formed of pixel values determined in accordance with the intensity of light forming the image which is integrated with respect to time in each pixel by the predetermined number of image-capturing devices for converting the light forming the image into electrical charge and integrating with respect to time the electrical charge generated by the photoelectric conversion.

36. The program according to claim 35 for instructing a computer to perform a process further comprising: an image-capturing command control step of controlling the giving of a command to the image-capturing control step to capture the image; and an image-capturing billing control step of controlling the execution of billing processing in response to the command in the image-capturing command control step.

37. The program according to claim 34 for instructing a computer to perform a process further comprising: an image display control step of controlling the displaying of the foreground component image and the background component image which are separated in real time in the separation control step and the foreground component image and the background component image which are already stored in the storage control step; an image specifying control step of controlling the specifying of a desired foreground component image and background component image from among the foreground component image and the background component image which are separated in real time in the separation control step and which are displayed in the image display control step and the foreground component image and the background component image which are already stored in the storage control step and which are displayed in the image display control step; and a combining control step of controlling the combining of the desired foreground component image and background component image which are specified in the specifying control step.

38. The program according to claim 37 for instructing a computer to perform a process further comprising: a combining command control step of controlling the giving of a command to the combining control step to combine images; and a combining billing control step of controlling the execution of billing processing in response to the command in the combining command control step.

39. The program according to claim 34 for instructing a computer to perform a process further comprising: a storage command control step of controlling the giving of a command to the storage control step, the command instructing whether or not to store in real time the foreground component image and the background component image which are separated in the separation control step; and a storage billing control step of controlling the execution of billing processing in response to the command in the storage command control step.

40. The program according to claim 34 for instructing a computer to perform a process further comprising: a motion-blur adjusting control step of controlling the adjustment of motion blur of the foreground component image which is separated in real time in the separation control step or the foreground component image which is already stored in the storage control step.

41. The program according to claim 40 for instructing a computer to perform a process further comprising: a motion-blur-adjusted-image display control step of controlling the displaying of the motion-blur-adjusted foreground component image generated in the motion-blur adjusting control step.

42. The program according to claim 41 for instructing a computer to perform a process further comprising: a combining control step of controlling the combining of the motion-blur-adjusted foreground component image generated in the motion-blur adjusting control step and the background component image, wherein the motion-blur-adjusted-image display control step controls the display of an image generated by combining, in the combining control step, the motion-blur-adjusted foreground component image generated in the motion-blur adjusting control step and the background component image.

43. The program according to claim 40 for instructing a computer to perform a process further comprising: a processing-time measuring control step of controlling the measurement of time required by the motion-blur adjusting control step to adjust the motion blur of the foreground component image; and a motion-blur-adjustment billing control step of controlling the execution of billing processing in accordance with the time measured in the processing-time measuring control step.

44. The program according to claim 41 for instructing a computer to perform a process further comprising: an operation-time measuring control step of controlling the measurement of operation time thereof; and an operation billing control step of controlling the execution of billing processing in accordance with the time measured in the operation-time measuring control step.

* * * * *